(12) United States Patent
Edwards

(10) Patent No.: US 11,781,742 B2
(45) Date of Patent: Oct. 10, 2023

(54) FIXTURES, POWER AND CONTROL SYSTEMS FOR SAME

(71) Applicant: Wangs Alliance Corporation, Port Washington, NY (US)

(72) Inventor: Dimauro Andrade Edwards, Jamaica, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 14 days.

(21) Appl. No.: 17/315,661

(22) Filed: May 10, 2021

(65) Prior Publication Data

US 2021/0356108 A1    Nov. 18, 2021
US 2023/0250945 A9    Aug. 10, 2023

Related U.S. Application Data

(60) Provisional application No. 63/023,244, filed on May 11, 2020.

(30) Foreign Application Priority Data

Jun. 12, 2020 (CN) .......................... 202021096556.2
Jul. 28, 2020 (CN) .......................... 202021529651.7
(Continued)

(51) Int. Cl.
*F21V 21/14* (2006.01)
*F21V 14/06* (2006.01)
(Continued)

(52) U.S. Cl.
CPC ................ *F21V 21/14* (2013.01); *F21K 9/00* (2013.01); *F21S 2/005* (2013.01); *F21S 8/066* (2013.01);
(Continued)

(58) Field of Classification Search
CPC .......... F21V 21/14; F21V 7/10; F21V 14/003; F21V 14/02; F21V 14/06; F21V 17/02;
(Continued)

(56) References Cited

U.S. PATENT DOCUMENTS 1,606,873 A    11/1926 Gamache et al.
3,801,951 A     4/1974 Kemmerer et al.
(Continued)

FOREIGN PATENT DOCUMENTS

CA    2860617 A1 *  7/2013 .............. F21V 21/14
CN    108036241       5/2018
(Continued)

OTHER PUBLICATIONS

Photos of Vandolighting, Dec. 2020.
(Continued)

*Primary Examiner* — Jong-Suk (James) Lee
*Assistant Examiner* — Glenn Zimmerman
(74) *Attorney, Agent, or Firm* — Weiss & Arons LLP

(57) ABSTRACT

Apparatus and methods for deployment of fixtures. The apparatus may include a system for controlling deployed fixtures. The system may receive user commands different devices in different formats. The fixtures may be independently addressable. The fixtures may be magnetically supported by a fixture support. A brace may join two or more fixture supports without reducing space available to support fixtures. The brace may join a fixture support to a fixture support accessory. An accessory may include a variable-angle junction. The fixture may include articulating joints for controlling the direction of a beam. The fixture may include a lens having an electrically controllable beam spread angle. The fixture may be stowable in the fixture support. The fixture may be slidable along a cord to adjust a height of the fixture. The fixture may include an extendable (Continued)

US 11,781,742 B2

Page 2 ring. The system may coordinate motions of the fixtures to follow a target. The fixture may include an elongated board. The elongated board may include a non-polar power socket.

16 Claims, 93 Drawing Sheets

(30) Foreign Application Priority Data

| Aug. 12, 2020 | (CN) | 202021676898.1 |
|---|---|---|
| Sep. 24, 2020 | (CN) | 202022130240.7 |
| Sep. 24, 2020 | (CN) | 202022130319.X |
| Jan. 13, 2021 | (CN) | 202110043839.3 |
| Jan. 13, 2021 | (CN) | 202120090398.8 |

(51) Int. Cl.

| F21V 21/02 | (2006.01) |
|---|---|
| F21V 21/096 | (2006.01) |
| F21V 21/22 | (2006.01) |
| F21V 21/29 | (2006.01) |
| F21V 21/38 | (2006.01) |
| F21V 23/06 | (2006.01) |
| F21V 21/112 | (2006.01) |
| F21V 21/16 | (2006.01) |
| F21V 23/00 | (2015.01) |
| H05B 47/12 | (2020.01) |
| H05B 47/11 | (2020.01) |
| H05B 47/125 | (2020.01) |
| H05B 47/13 | (2020.01) |
| H05B 47/14 | (2020.01) |
| F21S 2/00 | (2016.01) |
| F21S 10/00 | (2006.01) |
| F21V 7/10 | (2006.01) |
| F21V 17/02 | (2006.01) |
| F21V 21/005 | (2006.01) |
| F21V 21/04 | (2006.01) |
| F21V 21/15 | (2006.01) |
| F21V 21/30 | (2006.01) |
| H05B 45/20 | (2020.01) |
| H05B 47/18 | (2020.01) |
| H05B 45/10 | (2020.01) |
| H05B 45/30 | (2020.01) |
| F21K 9/00 | (2016.01) |
| F21V 14/00 | (2018.01) |
| F21V 14/02 | (2006.01) |
| F21V 21/35 | (2006.01) |
| F21V 23/04 | (2006.01) |
| F21S 8/06 | (2006.01) |
| B24B 41/06 | (2012.01) |
| F21Y 115/10 | (2016.01) |

(52) U.S. Cl.
CPC .............. *F21S 10/005* (2013.01); *F21V 7/10* (2013.01); *F21V 14/003* (2013.01); *F21V 14/02* (2013.01); *F21V 14/06* (2013.01); *F21V 17/02* (2013.01); *F21V 21/005* (2013.01); *F21V 21/025* (2013.01); *F21V 21/04* (2013.01); *F21V 21/096* (2013.01); *F21V 21/112* (2013.01); *F21V 21/15* (2013.01); *F21V 21/16* (2013.01); *F21V 21/22* (2013.01); *F21V 21/29* (2013.01); *F21V 21/30* (2013.01); *F21V 21/35* (2013.01); *F21V 21/38* (2013.01); *F21V 23/002* (2013.01); *F21V 23/003* (2013.01); *F21V 23/0435* (2013.01); *F21V 23/06* (2013.01); *H05B 45/10* (2020.01); *H05B 45/20* (2020.01); *H05B 45/30* (2020.01); *H05B 47/11* (2020.01); *H05B 47/12* (2020.01); *H05B 47/125* (2020.01); *H05B 47/13* (2020.01); *H05B 47/14* (2020.01); *H05B 47/18* (2020.01); *B24B 41/06* (2013.01); *F21Y 2115/10* (2016.08)

(58) Field of Classification Search
CPC ...... F21V 21/005; F21V 21/025; F21V 21/04; F21V 21/096; F21V 21/112; F21V 21/15; F21V 21/16; F21V 21/22; F21V 21/29; F21V 21/30; F21V 21/35; F21V 21/38; F21V 23/002; F21V 23/003; F21V 23/0435; F21V 23/06; F21K 9/00; F21S 2/005; F21S 10/005; F21S 8/066; H05B 45/10; H05B 45/20; H05B 45/30; H05B 47/11; H05B 47/12; H05B 47/125; H05B 47/13; H05B 47/14; H05B 47/18; H05B 47/19; B24B 41/06; F21Y 2115/10; Y02B 20/40

See application file for complete search history.

(56) References Cited

U.S. PATENT DOCUMENTS

| 4,141,117 | A | 2/1979 | Van Gompel | |
|---|---|---|---|---|
| 4,475,226 | A | 10/1984 | Greenberg | |
| 4,533,190 | A | 8/1985 | Booty | |
| 5,154,509 | A * | 10/1992 | Wulfman | H01R 25/147 |
| | | | | 362/648 |
| 5,417,400 | A | 5/1995 | Arakawa | |
| 5,890,918 | A | 4/1999 | Hierzer | |
| 6,056,561 | A | 5/2000 | Lin | |
| 6,241,064 | B1 | 6/2001 | Hierzer | |
| 6,530,791 | B1 | 3/2003 | Hierzer | |
| 6,866,401 | B2 | 3/2005 | Sommers et al. | |
| 7,940,191 | B2 | 5/2011 | Hierzer | |
| 8,152,327 | B2 | 4/2012 | Brands et al. | |
| 8,371,710 | B2 | 2/2013 | Gupta et al. | |
| 9,039,230 | B2 | 5/2015 | Crimi et al. | |
| 9,494,299 | B2 | 11/2016 | Chang | |
| 9,726,339 | B2 | 8/2017 | Hierzer | |
| 9,739,472 | B1 | 8/2017 | Li | |
| 9,951,915 | B2 | 4/2018 | Hierzer | |
| 9,989,228 | B2 | 6/2018 | Tuchler | |
| 10,094,547 | B2 | 10/2018 | Hierzer | |
| 10,143,048 | B2 | 11/2018 | Hierzer | |
| 10,161,609 | B2 | 12/2018 | Tuchler | |
| 10,180,218 | B2 | 1/2019 | Hierzer | |
| 10,186,820 | B1 | 1/2019 | Gellert et al. | |
| 10,222,013 | B2 | 3/2019 | Hierzer | |
| 10,263,375 | B1 | 4/2019 | Gellert et al. | |
| 10,274,175 | B1 * | 4/2019 | Wood | G01D 5/145 |
| 10,295,161 | B1 | 5/2019 | Shih | |
| 10,323,822 | B2 | 6/2019 | Hierzer | |
| 10,323,837 | B2 | 6/2019 | Hierzer | |
| 10,330,269 | B2 | 6/2019 | Hierzer | |
| 10,337,699 | B2 | 7/2019 | Hierzer | |
| 10,337,701 | B2 | 7/2019 | Mastenbroek et al. | |
| 10,436,422 | B1 | 10/2019 | Takacs et al. | |
| 10,461,483 | B2 | 10/2019 | Gellert et al. | |
| 10,480,770 | B2 | 11/2019 | Hierzer | |
| 10,670,238 | B2 | 6/2020 | Shih | |
| 10,670,240 | B2 | 6/2020 | Shih | |
| 10,770,850 | B2 | 9/2020 | Gellert et al. | |
| 10,883,712 | B2 | 1/2021 | Chen et al. | |
| 2004/0155609 | A1 * | 8/2004 | Lys | H05B 45/325 |
| | | | | 315/316 |
| 2009/0213621 | A1 | 8/2009 | Hierzer | |
| 2010/0208371 | A1 | 8/2010 | Chao | |
| 2010/0284192 | A1 | 11/2010 | Chen | |
| 2010/0301769 | A1 | 12/2010 | Chemel et al. | |
| 2011/0286207 | A1 | 11/2011 | Chan et al. | |
| 2012/0025717 | A1 | 2/2012 | Klusmann et al. | |

(56) References Cited

U.S. PATENT DOCUMENTS

| | | | |
|---|---|---|---|
| 2012/0206927 A1 | 8/2012 | Miyahara | |
| 2012/0235579 A1 | 9/2012 | Chemel et al. | |
| 2015/0345762 A1* | 12/2015 | Creasman | F21V 21/30 |
| | | | 362/428 |
| 2016/0033098 A1 | 2/2016 | Bergman et al. | |
| 2016/0033099 A1 | 2/2016 | Bergman et al. | |
| 2016/0278186 A1 | 9/2016 | Van De Sluis et al. | |
| 2018/0252376 A1 | 9/2018 | Hierzer | |
| 2019/0140408 A1 | 5/2019 | Gellert et al. | |
| 2019/0145614 A1 | 5/2019 | Tuchler | |
| 2019/0186712 A1* | 6/2019 | Galstian | G02F 1/13318 |
| 2019/0195473 A1 | 6/2019 | Tuchler et al. | |
| 2019/0271456 A1 | 9/2019 | Hierzer | |
| 2019/0271461 A1 | 9/2019 | Hierzer | |
| 2019/0387590 A1 | 12/2019 | Hierzer | |
| 2020/0025010 A1 | 1/2020 | Bergman, et al. | |
| 2020/0044400 A1 | 2/2020 | Gellert et al. | |
| 2020/0061391 A1 | 2/2020 | Krishnaswamy et al. | |
| 2020/0295803 A1 | 9/2020 | Gellert et al. | |
| 2020/0403359 A1 | 12/2020 | Gellert et al. | |
| 2021/0025553 A1 | 1/2021 | Frederick et al. | |
| 2021/0109419 A1* | 4/2021 | Galstian | G02F 1/13306 |

FOREIGN PATENT DOCUMENTS

| | | | |
|---|---|---|---|
| CN | 207778165 | 8/2018 | |
| CN | CN109539024 | 3/2019 | |
| DE | 10207367 B4 * | 6/2010 | F21V 21/096 |
| WO | WO-2014147524 A1 * | 9/2014 | F21S 2/00 |

OTHER PUBLICATIONS

Photos of Stucchi, Sep. 2018.
Photos of Klick, Feb. 2019.
Photos of K-Module, Feb. 2019.
Photos of Liteline Klick System, Feb. 2019.
Photos of Coronet, May 2019.
"The First Linear Lighting System" Eden Design, Retrieved from World Wide Web May 2019.
"Neo-Ray-Define-Recessed-TB519031EN," Eaton, Jan. 16, 2919.
"Corelite Neo-Ray: Architectural-Linear Suspended Selection Guide," Eaton, Oct. 10, 2018.
"Neo-Ray PS524026EN," Eaton, Feb. 22, 2017.
"Neo-Ray: Define-LED Linear Recessed, Surface, Perimeter, Wall and Suspended Luminaries," Eaton, Oct. 2016.
"Neo-Ray Define 2 LED Recessed Direct TD519031EN," Eaton, Sep. 24, 2019.
"Neo-Ray IL519027EN: Installation Instructions-Define Gen 2 Recessed GYP/FSR S122-S125," Eaton, Jun. 25, 2018.
"Neo-Ray 1L519027EN: Installation Instructions-Define Gen 2 GYP/FSR S122-S125," Eaton, Aug. 22, 2019.
"Neo-Ray IL519027EN: Installation Instructions-Define Gen 2 Recessed Grid/ FES S122-S125," Eaton, Aug. 21, 2019.
"Neo-Ray PS524034EN," Eaton, Feb. 22, 2017.
"SLM26L-Profile: Installation Instructions," Delta Light NV, Jan. 21, 2019.
"Boxy L+ LED Specification Sheet," Delta Light NV, Jul. 4, 2018.
"Magneto Track System," Coronet, Inc., Feb. 12, 2020.
"Diversion Designed by Piero Lissoni," FLOS Architectural, Retrieved from World Wide Web Jan. 2020.
"Designed by Coronet LED," Coronet LED, Retrieved from World Wide Web 2019.
"Magneto Track System, Magneto REC-TRK," Coronet, Inc., Retrieved 2019.
"Magneto Track System, Magneto-TRK," Coronet, Inc., Retrieved from World Wide Web 2019.
"Race Signature Line Magnetic Track," Byiba Backlight, Retrieved from World Wide Web Jun. 2020.
"Byiba Race Magnetic Track System," Byiba Backlight, Retrieved from World Wide Web Jun. 2020.
"Byiba Backlight Mounting instructions," Byiba Backlight, Retrieved from World Wide Web Jun. 2020.
"SmarTrack Spec Sheet," Ledra Brands Inc., May 2, 2019.
"SmarTrack Kinetic Spot Spec Sheet," Ledra Brands Inc., Jan. 30, 2019.
"SmarTrack Installation Instructions," Ledra Brands Inc., Feb. 5, 2019.
"SmarTrack 60W 96W Power Supply," Ledra Brands Inc., May 29, 2019.
"SmarTrack 60W 96W Power Supply Spec Sheet," Ledra Brands Inc., May 29, 2019.
"Product Options," Birchwood Lighting, Inc., 2017.
"LED Supplement .5 W-LED Array," Birchwood Lighting, Inc., 2016.
"Jake LED 1.65" 2.25" 3.25" 5.00" Trim/Trimless Recessed Linear LED Fixture," Birchwood Lighting, Inc., 2017.
"Jake LED Regressed Lens 1.65" 2.25" 3.25" 5.00" Trim/Trimless 1" Regressed Lens Linear LED Fixture," Birchwood Lighting, Inc., 2017.
"Jake: PR-Perimeter Regress TL Mud Flange-Side Blocking Install Installation Guide," Birchwood Lighting, Inc., 2016.
"Jake and Jill (Optional) Trimless Mud Flange and Trim Flange Overhead Mounting Bracket Method Installation Guide OHMB," Birchwood Lighting, Inc., 2016.
"Jake and Jill TR-Trim Flange Hanger Bracket Install Method Installation Guide," Birchwood Lighting, Inc., 2016.
"Jake and Jill TL-Trimless Mud Flange Side Blocking Install Method Installation Guide,". Birchwood Lighting, Inc., 2016.
"Jake and Jill TL-Trim Flange Side Blocking Install Method Installation Guide," Birchwood Lighting, Inc., 2016.
"Jake and Jill TL-Trimless Mud Flange Hanger Bracket Install Method Installation Guide,"Birchwood Lighting, Inc., 2016.
"Stencil Pendant-Playful Modular Lighting System," Axis Lighting Inc., 2018.
"Stencil Family Guide," Axis Lighting Inc., 2018.
"Sculpt-Pendant With Accent Option Only," Axis Lighting Inc., Oct. 29, 2019.
"Regolo 1 RP11 Pendant/Flush Lens," Nulite, 2019.
"Perspectives 2-Architectural Lighting Innovations," Axis Lighting Inc., 2016.
"Palco Low Voltage Spotlight," iGuzzini, North America, Retrieved from World Wide Web 2016.
"Downlighting and Accent Lighting Innovations," Axis Lighting Inc., 2018.
"Beam2 LED," Axis Lighting Inc., Retrieved from World Wide Web Feb. 2019.
"Riverbank Acoustical Laboratories Test Report," Axis Lighting Inc., May 16, 2019.
"Sculpt-Pendant Mount Direct/Indirect," Axis Lighting Inc., Jan. 28, 2019.
"Sculpt-Pendant Mount Direct," Axis Lighting Inc., Dec. 20, 2018.
"Sculpt-MikroLite 1.5 Recessed-With Mikrolite Option Only," Axis Lighting Inc., Jan. 14, 2019.
"Sculpt-MikroLite 1.5 Recessed-Combined Distribution," Axis Lighting Inc., Jan. 14, 2019.
"The 2019 Collection: Lite & Life," Arkos Light, Retrieved from World Wide Web Jul. 2019.
"Tracklights 166," Arkos Light, Retrieved Jul. 2019.
"Slots & Dots 48V Low Voltage Track Low Profile Pendant/Surface," Amerlux LLC, Dec. 23, 2019.
"Slots & Dots 48V Low Voltage Track Deep Profile Pendant/Surface," Amerlux, Dec. 23, 2019.
"Slots & Dots 48V Low Voltage Track Low Profile Recessed," Amerlux, Dec. 23, 2019.
"Slots & Dots 48V Low Voltage Track Deep Profile Recessed," Amerlux, Dec. 23, 2019.
"Slots & Dots, Track Cutting Instruction Sheet," Amerlux, Retrieved from World Wide Web Jan. 2020.
"Pursuit," Hubbell Lighting Inc., Retrieved from World Wide Web Oct. 2018.
"Multi System Tracks, Connections and Accessories A.A.G. s.r.l. u.s.," Stucchi, Mar. 2018.

(56) References Cited

OTHER PUBLICATIONS

"The Future of Lighting Has Arrived with Connected Solutions," Focal Point LLC, Retrieved Jul. 2018.
"Suspenders Catalog vol. 5," Sonneman—A Way of Light, 2019.
"ERCO Minirail 48V Track-Small Cross Section, Large Flexibility," ERCO, Nov. 27, 2019.
"Function-Modular and Architectural Profiles," Eurofase Inc., 2019.
"Modular Systems//Function," Eurofase Inc., Retrieved from World Wide Web Jan. 2021.
"MonoRail 2-Modular Low Voltage Track System with Flexibility and Creativitiy," Feelux Lighting, Inc., Jan. 2020.
"HP-2 With Tailored Lighting-High Performance 2" Aperture LED Collection," Finelite, Inc., Sep. 28, 2018.
"Seem 2 LED Trim Flange FSM2L-TF," Focal Point LLC, 2018.
"Seem 1 LED Direct," Focal Point LLC, Dec. 2018.
"Seem 1 LED Direct/Indirect," Focal Point, LLC, Dec. 2018.
"Seem 2 LED," Focal Point LLC, Aug. 2018.
"Seem 2 LED," Focal Point LLC, Dec. 2018.
"Dallas Showroom #4002," Eurofase Inc., Jun. 2019.
"A-Line KL-Bar Klick Solid Lightbar Track Lighting," Liteline Corporation, Retrieved from World Wide Web Nov. 2018.
"A-LNE KL-TR Klick Track-Track Lighting," Liteline Corporation, Nov. 14, 2018.
"Cana 40-1.5" Wide Aperture Linear Channel System," Kreon, Jun. 2018.
"Light Reinvented—Jan. 2018 Product Catalog," LumaStream, Jan. 2018.
"Paladio Lens 35-Single Luminaire Specification Sheet," Sattler Lighting, Aug. 21, 2020.
"Paladio Prism 35-Single Luminaire Specification Sheet," Sattler Lighting, Aug. 21, 2020.
"Paladio Prism 35-System Luminaire Specification Sheet," Sattler Lighting, Aug. 21, 2020.
"Paladio Prism 54-Single Luminaire Specification Sheet," Sattler Lighting, Aug. 21, 2020.
"Paladio Track 35 Single Luminaire Specification Sheet," Sattler Lighting, Aug. 21, 2020.
"Preferred Light-13 Experience Better Color Brochure," Focal Point, LLC, Nov. 2017.
"Sattler Catalog Essentials," Sattler Gmbh, Retrieved from World Wide Web Sep. 2020.
"A-Line Klick: Maximize Creativity," Liteline Corporation, Retrieved from World Wide Web Oct. 2018.
"M36 LED Direct," Selux Corporation, Sep. 2017.
"M36 LED Recessed," Selux Corporation, Sep. 2017.
Shopline products, Alphabet by Ledra Brands, May 7, 2018.
"Paladio Connect 35 Prism Lens Track Specification Sheet," Sattler Lighting, Aug. 20, 2020.
"Paladio Connect 54 Prism Lens Specification Sheet," Sattler Lighting, Aug. 20, 2020.
"Paladio Lens 35 System Luminaire Specification Sheet," Sattler Lighting, Aug. 21, 2020.
"Paladio Prism 54 System Luminaire Specification Sheet," Sattler Lighting, Aug. 21, 2020.
"Paladio Track 35 System Luminaire Specification Sheet," Sattler Lighting, Aug. 21, 2020.
"M2M Series: Dynamic Beam Shaping Lenses Product Datasheet," LensVector, Inc., 2020.
"LensVector Design Guide," LensVector, Inc., 2019.
Stills of video entitled, "Amerlux Slots and Dots," Retrieved from World Wide Web Feb. 2021.
Stills of video entitled, "SmartTrack by Bruck Lighting," Retrieved Jul. 2019.
Stills of video entitled, "Klick Liteline-1," Feb. 2019.
Stills of video entitled, "Klick Liteline-2," Feb. 2019.
Stills of video entitled, "Klick Liteline-3," Feb. 2019.
Stills of video entitled, "Klick Liteline-4," Feb. 2019.
Stills of video entitled, "Klick Liteline-5," Feb. 2019.
Stills of video entitled, "Klick Liteline-6," Feb. 2019.
Photos of Flua, Aug. 2018.
Photos of Flua, Sep. 2018.
Photos of Shenshen Sanwen Optoelectronics Co., Ltd., Oct. 2018.
Photos of V-Tech Lighting Corp., Oct. 2018.
Photos of Visual Feast Lighting, Oct. 2018.
Photos of Yisen Lighting, Oct. 2018.
Photos of Zhongshan YND Opotoelectronic Technology Co., Ltd., Oct. 2018.
Photos of Ledluz Lighting Co., Ltd., Oct. 2018.
Photos of Mercanvee, Oct. 2018.
Photos of Mirico, Oct. 2018.
Photos of Rocalux Lighting, Oct. 2018.
Photos of Great Beam Lighting, Oct. 2018.
Photos of Lancesun, Oct. 2018.
Photos of Ledarsun, Oct. 2018.
Photos of Hong Kong Light Fair, Oct. 2018
Photos of Aliu Lighting, Dec. 2018.
Photos of FLOS Tracking Magnet, May 2019.
Photos of Rayven, Jul. 2019.
Photos of XAL, Sep. 2019.
Photos of FLOS Running Magnet, Oct. 2019.
Photos of FLOS Running Magnet, Nov. 2019.
Photos of FLOS Running Magnet, Jan. 2020.
Photos of FLOS Running Magnet, Mar. 2020.
Photos of XAL Power Supply, Jun. 2020.
"XAL Quote No. USVAN1900650/1," by Hossley Lighting Associates, May 15, 2019.
"Quotation," Zhongshan PNY Lighting Tech Co., Ltd., Jul. 25, 2019.
"XAL Move It System: Magnetic Profile LED System," XAL Inc., 2018.
"Move It 25 Trimless System," www:xal.com/move-it, Retrieved from World Wide Web Mar. 2020.
"Move It System 1.2 Recessed," www.xal.com, XAL Inc., Jan. 2020.
"Move It 1.2 System," XAL Inc., Jan. 2020.
"Move It 1.1/1.2 Surface: Mounting Instructions," www.xalusa.com, XAL Inc., Apr. 28, 2020.
"Move It 1.1/1.2 Suspended: Mounting Instructions," www.xalusa.com, XAL Inc., Apr. 28, 2020.
"Move It System 1.2 Direct," www.xal.com, Jan. 2020.
"Move It 1.1/1.2 Surface: 2020, Mounting Instructions," www.xalusa.com, XAL Inc., Feb. 5, 2020.
"XAL Move It System: Magnetic Profile LED System," XAL Inc., Nov. 2018.
"XAL Move It System 45: Magnetic Profile LED System," www.xal.com, XAL Inc., 2019.
"Move It 25 S: Trimless System," www.xal.com/move-it, XAL Inc., 2019.
"Move It 45: Trimless System," www.xal.com/move-it-45, XAL Inc., 2019.
"Move It System 1.2 Recessed: Mounting Instructions," www.xalusa.com, XAL Inc., Retrieved from World Wide Web, 2020.
"Move It System 1.1 & 1.2 Surface: Mounting Instructions," www.xalusa.com, XAL Inc., Dec. 31, 2014.
"Move It System 1.1 & 1.2 Suspended: Mounting Instructions," www.xalusa.com, XAL Inc., Dec. 31, 2014.
"Move It 25/45 Insets: Mounting Instructions," www.xal.com, XAL GmbH, Nov. 15, 2016.
"Move It System 48V Power Supply," XAL Inc., Nov. 2018.
"Move It System Profiles Direct," XAL Inc., Mar. 2019.
"The Running Magnet-Recessed: Installation Instructions," Flos, Retrieved from World Wide Web Jul. 2020,
"The Running Magnet-Surface: Installation Instructions," Flos, Retrieved from World Wide Web Jul. 2020.
"The Running Magnet-Suspension Up & Down: Installation Instructions," Flos, Retrieved from World Wide Web Jul. 2020.
"The Running Magnet-Suspension Down: Installation Instructions," Flos, Retrieved from World Wide Web Jul. 2026.
"Collection Catalog," Flos, 2018.
"Running Magnet 2.0 Suspension Down," Flos Architectural, Apr. 12, 2018.
"Voltage Drop Chart for Flos 24 & 48 Volt Systems" Flos USA/ Lukas Lighting, Retrieved from World Wide Web May 2020.

(56) References Cited

OTHER PUBLICATIONS

"The Running Magnet," Flos, Retrieved from World Wide Web Mar. 2020.
"Running Magnet 2.0 Suspension Up & Down," Flos, Apr. 1, 2019.
"Running Magnet 2.0," Flos, Sep. 24, 2019.
"Box Accessories," Flos, Retrieved from World Wide Web Nov. 2017.
"Flos Smart Control App: User Manual," Flos, Retrieved from World Wide Web Nov. 2019.
Flos Smart Settings App: User Manual, Flos, Retrieved from World Wide Web Nov. 2019.
"Click System: Technical Brochure," Onok Lighting, Retrieved from World Wide Web Dec. 2018.
"Aliu Lighting Catalog," Shenzhen Aliu Lighting Co. Ltd., Retrieved from World Wide Web Dec. 2018.
"Flua Architectural Lighting Spring," Flua S.R.L., Retrieved from World Wide Web Aug. 2018.
"Laser Blade," www.products.iguzzini.com, Retrieved from World Wide Web Feb. 2019.
"Gemini System LED Module 120/277V-LED," Lighting Services Inc., Feb. 2017.
"Gemini Housing-Specifications," Lighting Services Inc., Jun. 2016.
"Light Matrix Product Catalog," LightMatrix (HK) Co., Limited, Retrieved from World Wide Web Aug. 2018.
"2Look4 Makes a Difference: Playbook," Prolicht, Retrieved from World Wide Web Jul. 2019.
"Hypro Makes a Difference: Playbook," Prolicht, Retrieved from World Wide Web Jul. 2019.
"9.2 News Spring 2019: Workbook Update," Prolicht, Retrieved from World Wide Web Jul. 2019.
"9.1 News Autumn 2018: Workbook Update," Prolicht, Retrieved from World Wide Web Jul. 2019.
"TruTrack 2-Circuit (Circuit 1 Track, Circuit 2 Soft Strip)," www.PureEdgeLighting.com, Jun. 4, 2019.
"Installation Instructions for Pipeline 1 Suspension Modular Channel," PureEdge Lighting, 2016.
"Bring the Lines to the Forefront: Now You Can Do More," Reggiani Lighting USA, Inc., Retrieved from World Wide Web Jul. 2019.
"Sanwen," Shenzhen Sanwen Optoelectronics Co., Ltd, 2018.
"Oz," Targetti Sankey S.p.a, Mar. 2020.
"Lighttools Modular Lighting System," Zumtobel Staff Lighting, Retrieved from the World Wide Web Feb. 2019.
"Lincor: Pendant LED Luminaire," Zumtobel Lighting GmbH, Mar. 2016.
"Linelight," Zumtobel Lighting GmbH, Mar. 2018.
"Slotlight Infinity: Recessed, Surface-Mounted and Pendant Luminaire," Zumtobel Lighting GmbH, Nov. 2017.
"Supersystem," Zumtobel Lighting GmbH, Dec. 2019.
"Bio2 Linear, Surface, Wall 2" Linear: Installation Instructions," Prudential Ltg. 2014.
"Dimension Linear Wall Wash," Alphabet by Ledra Brands, Inc., Oct. 9, 2019.
"48V Nano Track System," Intense Lighting, LLC, 2017.
"RA-(75W) (200W) 48V Power Supply," Intense Lighting, LLC, 2018.
"Track Low Voltage (48V)," iGuzzini North America, Retrieved from World Wide Web Feb. 2019.
"Accessories Track Low Voltage," iGuzzini North America, Retrieved from World Wide Web Feb. 2019.
"Palco Low Voltage 48V," iGuzzini North America, Retrieved from World Wide Web Feb. 2019.
"Pasta: The Next Big Thing in Miniaturization," Modular Lighting Instruments, 2018.
"Track Low Voltage Surface/Pendant," iGuzzini North America, Feb. 7, 2019.
"Pru-Toggle (X1) CAX (T-BAR): Adjustable Toggle: Cable Installation Instructions," Prudential Ltg., 2015.
"Who We Are," Deco Lighting, Inc., 2019.
"Move It System: Node Channel Direct," XAL Inc., Dec. 2019.
"Move It 1.1/1.2 Suspended Mounting Instructions," XAL Inc., Dec. 11, 2019.
"Running Magnet 2.0: High-Tech Lighting System for Interior Architecture," Flos, Sep. 24, 2019.
Stills of video entitled "Aliu Lighting," Dec. 2018.

* cited by examiner

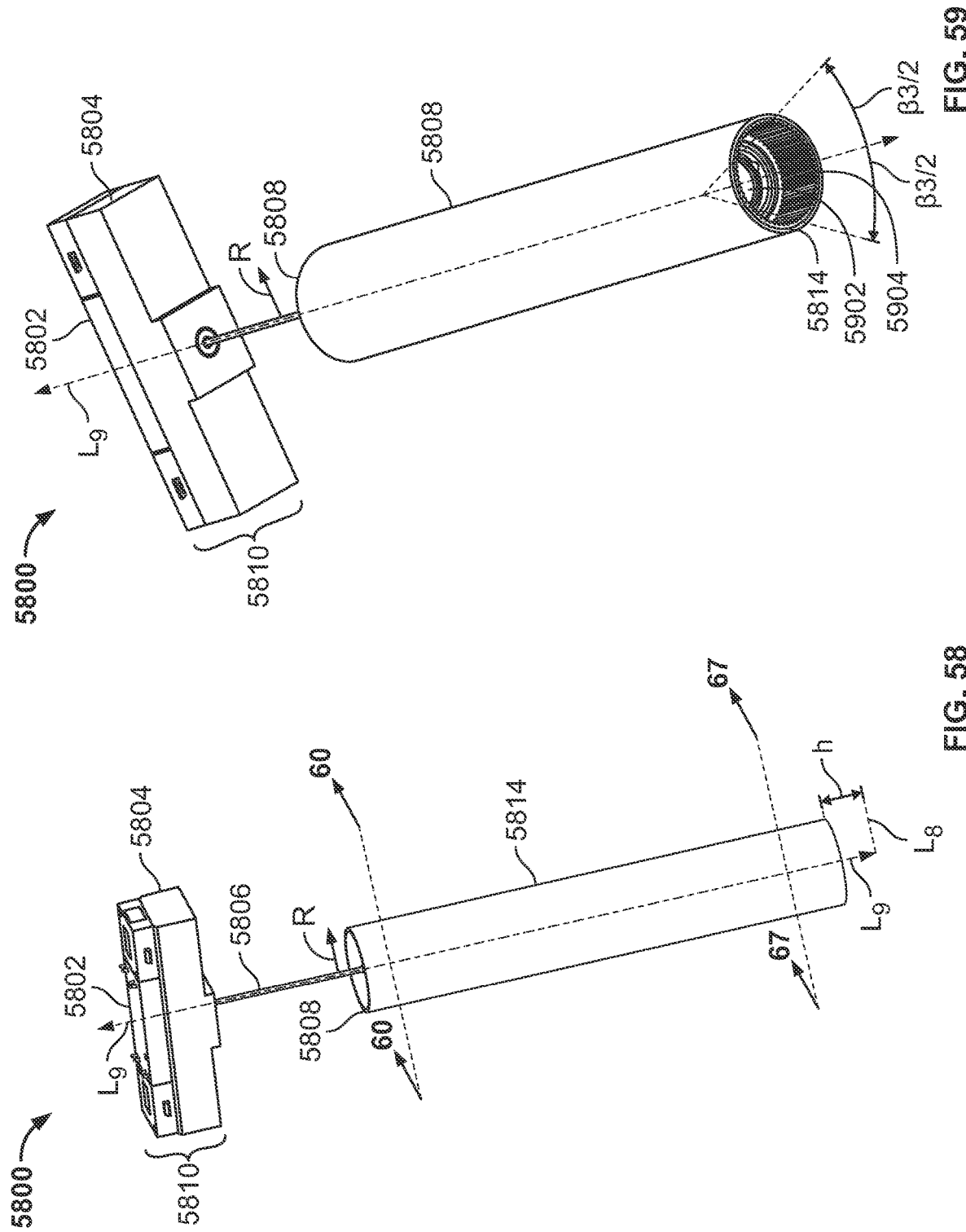

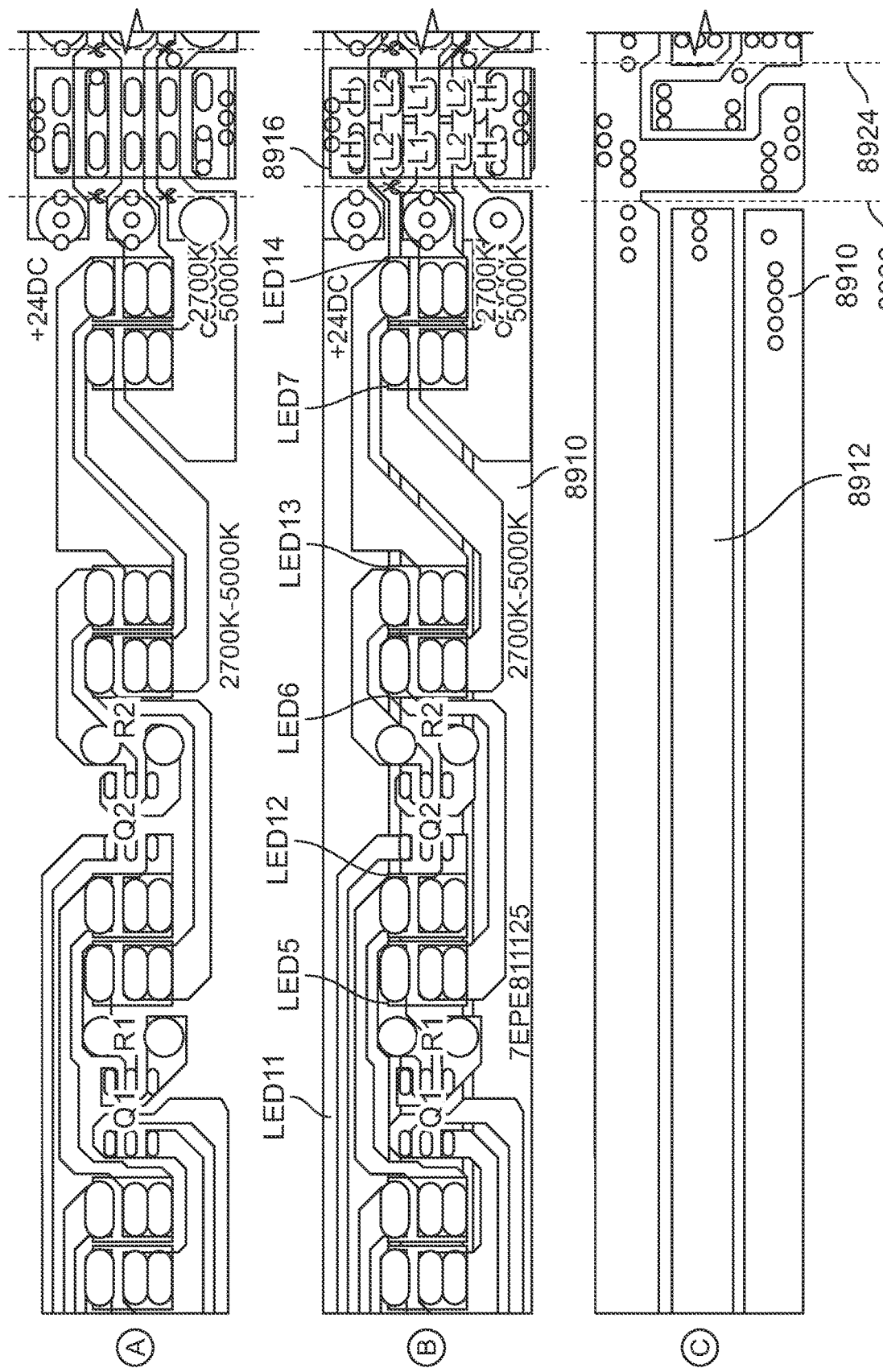

FIXTURES, POWER AND CONTROL SYSTEMS FOR SAME

CROSS-REFERENCES TO RELATED APPLICATIONS

This is a nonprovisional of U.S. Provisional Application No. 63/023,244, filed May 11, 2020, which is hereby incorporated by reference herein in its entirety. This application claims the benefit of priority under 35 U.S.C. 119(a) of commonly-owned P.R.C. Utility Model Applications Nos. 202021096556.2, filed Jun. 12, 2020, 202021529651.7, filed Jul. 28, 2020, 202021676898.1, filed Aug. 12, 2020, 202022130240.7, filed Sep. 24, 2020, and 202022130319.X, filed Sep. 24, 2020, P.R.C. Invention Application No. 202110043839.3, filed Jan. 13, 2021, and P.R.C. Utility Model Applications Nos. 202120090398.8, filed Jan. 13, 2021, and 202120328550.1, filed Feb. 5, 2021, all of which are hereby incorporated by reference herein in their entireties.

BACKGROUND

Deployment of fixtures in architectural environments typically involves interrelationship of fixture layout, functionality and performance control. Adapting fixture layout, functionality or performance to different environments, or to changes in the environment, can be difficult.

It would therefore be desirable to provide apparatus and methods for deployment of fixtures.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 21 shows illustrative apparatus in accordance with principles of the invention.

FIG. 58 shows illustrative apparatus in accordance with principles of the invention.

FIG. 59 shows illustrative apparatus in accordance with principles of the invention.

Figure 1:
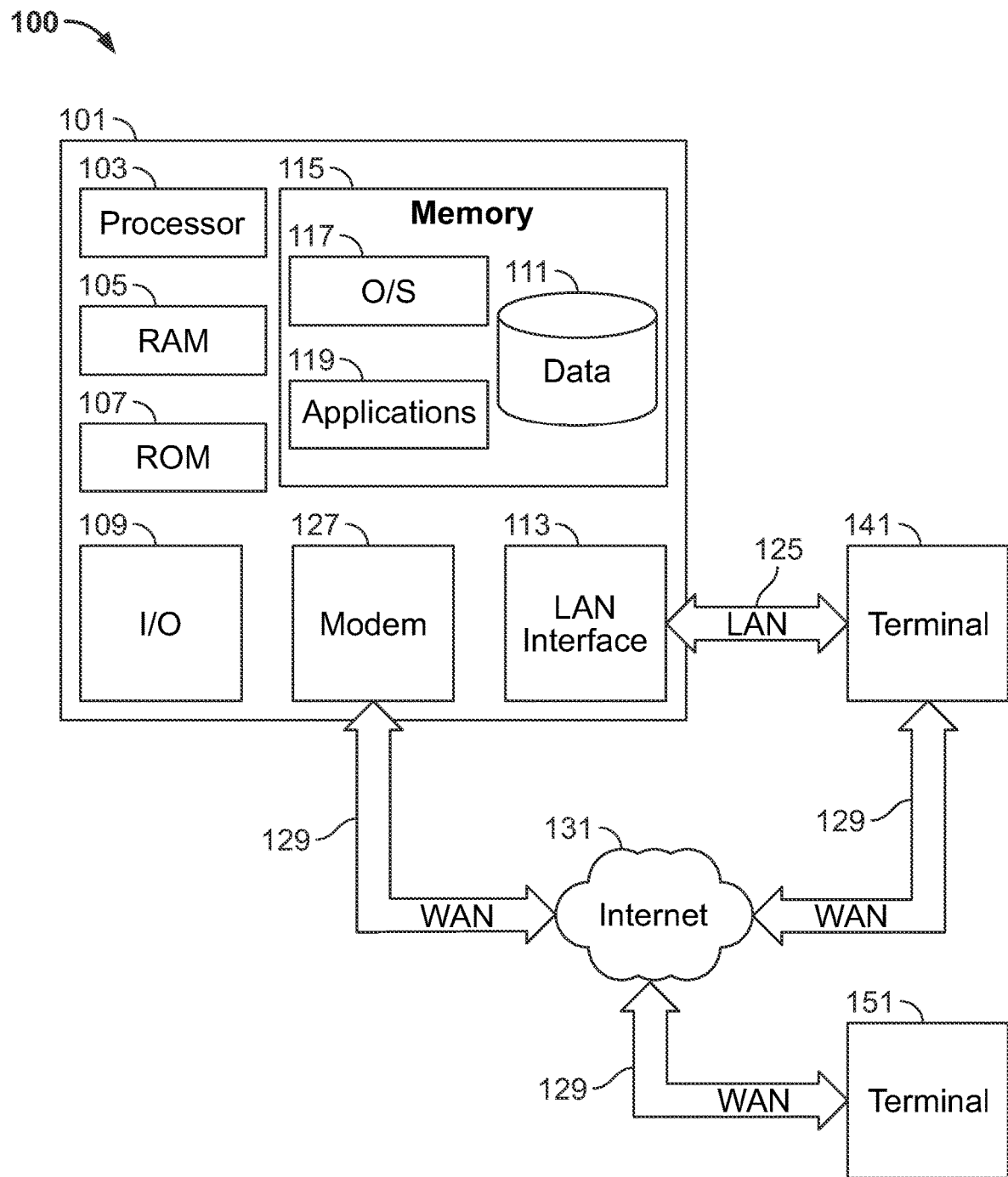
FIG. 1 shows illustrative apparatus in accordance with principles of the invention.

Generally, the leftmost digit (e.g., "L") of a three-digit reference numeral (e.g., "LRR"), and the two leftmost digits (e.g., "LL") of a four-digit reference numeral (e.g., "LLRR"), identify the first figure in which a part is called-out.

DETAILED DESCRIPTION

Apparatus and methods for fixture implementations are provided.

The apparatus may include apparatus for controlling a fixture. The fixture may include an emitter. The emitter may include a light-emitting diode ("LED"). The fixture may include an LED circuit. The LED circuit may include an LED driver. The fixture may be configured to provide direct light to a subject. The fixture may be configured to provide indirect light to the subject. The apparatus may include one or more directly configured fixtures. The apparatus may include one or more indirectly configured fixtures. The fixture may be electronically addressable. The apparatus may include a first receptacle for receiving an input power line. The apparatus may include a second receptacle for receiving an input communication line. The apparatus may include an output power terminal. The apparatus may include an output communication terminal. The apparatus may include a microprocessor. The microprocessor may be configured to regulate power delivered at the output power terminal based on a signal received at the second receptacle. The power may be stepped down from 120-48V. The power may be stepped down to any other suitable voltage, such as 24, 12, 10, 5V, or any range or subrange therein. The microprocessor may be configured to detect a power level at the first receptacle, and regulate power delivered at the output power terminal based on the level. The microprocessor may be configured to detect a power level at the first receptacle, and regulate power delivered at the output power terminal in proportion to the level.

The control signal may define a group. The group may be one of multiple groups. The group may include one or more of the fixtures. The group may be electronically addressable. A user may assign a fixture to a group. Directly configured fixtures may be assigned to a first group. Indirectly configured fixtures may be assigned to a second group.

The apparatus may include a user interface circuit. The user interface circuit may be configured to receive a control signal. The control signal may include a control message. The message may be addressed to a fixture. The message may be addressed to a group. The message may include a FIXTURE-ON instruction. The message may include a FIXTURE OFF instruction. The message may include a DIM-LEVEL instruction. The message may include a correlated color temperature ("CCT") value. The control signal may include any other suitable control message. The message may correspond to a fixture parameter.

The apparatus may transmit the message from the user interface circuit to the fixture. The apparatus may transmit the message from the user interface circuit to the group. The transmission may be over a wire. The transmission may be wireless.

The user interface circuit may be configured to electronically communicate with a remote device. The user interface circuit may be configured to communicate with the remote device wirelessly. The user interface circuit may be configured to communicate with the remote device over wire. The user interface circuit may be configured to communicate with the remote device in conformance with a specification part set forth in IEEE 802.3, 802.11, 802.15, 802.16 or any other suitable standard.

The apparatus may include a connecting-power unit. The apparatus may include a power management housing. The connecting-power unit may be disposed in the housing.

The user interface circuit may be disposed in the housing.

The user interface circuit may include an I/O panel. The panel may include a keypad. The panel may include a display. The panel may include a touch-screen. The panel may be mounted on the housing. The panel may be included in a package that is separate from the housing. The package may be wall-mountable.

The user interface circuit may include a PHY interface to provide control signal to output terminal.

The apparatus may include machine readable memory. The memory may be configured to provide instructions conforming to a control protocol. The apparatus may include a cartridge receptacle. The receptacle may accept a cartridge. The cartridge may include instructions that conform to a control protocol. The control protocol may be one of multiple control protocols.

The microprocessor may be configured to control the fixture based on the protocol or protocols in the cartridge. The microprocessor may be configured to control the fixture consistent with the protocol or protocols in the cartridge.

The apparatus may include a first photo sensor. The first photo sensor may register a spectrum of ambient light. The ambient light may include exterior light. The ambient light may include interior light. The microprocessor may be configured to coordinate a hue of the fixture with the ambient light. The hue-coordination may be based on the spectrum. The microprocessor may be configured to update the hue as the ambient light changes. The hue may be based on a combination of coordinated color temperatures.

The apparatus may include a second photo sensor. The second photo sensor may detect a presence of a human in a space in which the track is disposed.

The first and second photo sensors may be collocated. The first and second photo sensors may be integrated into a single chip. Functions of both the first and second photo sensors may be provided by a single sensor device.

The code may include code configured to run on the remote device. The microprocessor may be configured to transmit to the remote device layout information. The layout information may include a configuration of two or more tracks or fixtures. The layout information may include location and parameters of each fixture. The code may be configured to simulate a light scene corresponding to the layout information.

The apparatus may include a natural lighting and time module. The module may include a global positioning chip or take a global coordinates input. The module may include a clock. The module may use the coordinates and the clock to derive, on location, natural light availability based on geophysical data. The module may transmit the coordinates and time to a remote platform. The platform may derive the natural light availability and transmit back to the module. The module may provide available daylight for harvesting. The module may provide circadian controls for the fixture based on the natural light availability.

The apparatus may include a mounting track. The mounting track may support the fixture. The apparatus may include a magnet. The magnet may hold the fixture on the track. The track may include a control signal bus. The control signal bus may transmit the control signal from the microprocessor to the fixture. The track may include a power rail. The power rail may transmit power from the connected power unit to the emitter. The power rail may transmit power from the connected power unit to the actuator. The power rail may transmit the control signal from the microprocessor to the fixture. The fixture may be motorized, including, among other things, for beam angle adjustment and motion of the fixture in different directions and along different axes.

The track may be one of multiple tracks. The apparatus may include a track connector. The connector may include an engagement feature for each of the tracks. The engagement features may be disposed at an angle relative to each other such that the tracks are oriented at that angle with respect to each other. The angle may be fixed. The angle may be variable. The angle may be selectable from predetermined discrete angles. The connector includes 2, 3, 4, 5, 6 or more tracks.

The connector may include a power rail jumper. The power rail jumper may conduct power from a first track to a second track.

The connector may include a control signal jumper. The control signal jumper may conduct the control signal from a first track to a second track.

The track may include a mounting plane. The mounting plane may face downward when the track is in operation. The fixture may be mountable to the mounting plane. The mounting plane may be continuous from a first end of the track to a second end of the track. One or both of the jumpers may be disposed above the mounting plane such that the connector does not interfere with placement of a fixture in a position. The position may be near an end of a track. The position may bridge from a first track to a second track.

The track may include a U-channel. The U-channel may include a spine. The U-channel may include a first web that extends down from a side of the spine. The U-channel may include a second web that extends down from an opposite side of the spine. The first web may face the second web across a channel. The fixture may be disposed in the channel.

The connector may include a plate. The plate may be configured for insertion: in a first track, below (a) a first-track spine and (b) above a first-track control signal bus and power rail; and, in a second track, below (c) a second-track spine and (d) above a second-track control signal bus and power rail. The plate may connect a first track and a second track at their top sides. The plate may be a plate that does not intervene between butt-ends of first and second tracks. The plate may be a plate that does not interfere with placement of fixtures in the track U-channels.

The fixture may include an actuator. An actuator may be configured to vertically displace an emitter. An actuator may be configured to rotate the emitter about a vertical axis. An actuator may be configured to adjust an angle of latitude of the emitter relative to the vertical axis. The angle of latitude may be a pitch angle. An actuator may be configured to adjust an offset between the emitter and a lens. The offset may determine the spread of a beam emitted by the emitter.

An actuator may include a motor. The motor may be a stepper motor. The motor may be a servo motor. The motor may be any suitable type of motor.

The fixture may include a stem. The fixture may include a housing. An actuator may adjust the angle between the stem and the housing to adjust the beam latitude. An actuator may retract the housing into the track. For example, the track may include a horizontal U-channel, with open side down. An actuator may adjust the beam latitude to 0 degrees, which may be defined as straight down. Then, a second actuator may retract the housing up into the channel. A lower lip of the housing may be positioned flush with the edges of the U-channel. The lower lip may be positioned above the edges of the U-channel. A third actuator may adjust the beam angle.

The fixture may include a reflector. The reflector may be configured to reduce or eliminate glare experienced by an individual in a space illuminated by the fixture. The reflector may be configured to reduce or eliminate glare when the individual's field of vision encompasses the fixture. The reduction or elimination may occur only when there is no direct line of sight between the individual and a lens of the fixture.

The fixture may include a power cord. The power cord may suspend the fixture at a distance from the track. A first end of the power cord may be fixed to the track. A second end of the power cord may be fixed inside a housing of the fixture. The housing may include a cleat and a receptacle. As the distance decreases, the cleat may engage the cord at a higher level. Cord below the cleat may be hidden from view inside the receptacle.

The fixture may include a lens-adjusting ring. The ring may rotate to cause a linear displacement of the lens relative to the emitter. The ring may telescopically extend from the fixture housing. The ring may be configured to cause the displacement only when the ring is in a telescopically extended configuration. The rotation of the ring or other adjusting of the lens or the lens holder in the fixture may cause a change in the angle of the beam emitted by the emitter.

The apparatus may include a beacon detector. The beacon detector may include an array of detectors. The array may be configured to provide optical intensities that can be used to triangulate to the 3-D location of a beacon. The microprocessor may perform the triangulation. A satellite processor mounted on the track may perform the triangulation. The detector may detect spatial coordinates of the optical beacon. The detector may detect a strength of the beacon. The detector may transmit the coordinates to the microprocessor. The detector may transmit the strength to the microprocessor. The microprocessor may adjust a direction of the fixture beam to a location relative to the beacon. The microprocessor may adjust a fixture parameter in response to the beacon location. The memory may store different relative target attitudes for different fixtures to create a predetermined light pattern relative to the beacon.

The apparatus may include a light tape. The light tape may be mountable on a surface of the track. The surface may face up from the track. The surface may face laterally away from the track. The tape may support the fixture. The tape may be mounted to the track by a clip. The tape may include a tape power rail. The tape may include a tape control signal bus. The apparatus may include a track-to-tape connector. The track-to-tape connector may connect the track power rail to the tape power rail. The track-to-tape connector may connect the track control signal bus to the tape control signal bus.

The tape may include sections. The sections may be defined by break-away connections. The break-away connections may be configured to enable a user to obtain tape of different preselected lengths. The tape power rail and tape control signal bus of a section may be configured to operate after the section is separated from an adjacent section.

The apparatus may include, and the methods may involve, one or more features such as a multi-protocol fixture control; a mechanical interconnection; beam spread control, beam direction control; positioning a fixture within a fixture support; fixture height adjustment; lens ring adjustability; fixture release from a fixture support; fixture operational targeting; and wired fixture deployment at a distance. Table 1 lists illustrative fixtures.

TABLE 1

Illustrative fixtures.

| Illustrative fixtures |
| --- |
| Light |
| Fan |
| Audio speaker |
| Audio/Video projector |
| Camera |
| Detector/Sensor |
| Range sensor |
| Temperature sensor |
| Motion sensor |
| Occupancy sensor |
| Visible light sensor |
| Inertia sensor |
| Spectral energy sensor |
| Other suitable fixtures |

The fixture may include one or more devices. Table 2 lists illustrative devices.

TABLE 2

Illustrative devices.

| Illustrative devices |
| --- |
| LED emitter |
| Switch |
| Electro-acoustic transducer |

TABLE 2-continued

Illustrative devices.

Illustrative devices

Video display
Microphone
Motor
Linear actuator
Antenna
RF transmitter
RF receiver
Transponder
Detector
Sensor
Other suitable devices The fixture may be characterized by one or more fixture parameters. Table 3 lists illustrative fixture parameters.

TABLE 3

Illustrative fixture parameters.

| Illustrative fixture parameters | Illustrative values, scale increments |
|---|---|
| Vertical displacement from track | |
| Horizontal displacement from reference point (e.g., end, middle, adjacent light fixture, other reference point) | |
| Beam pitch relative to vertical axis | |
| Beam pan angle about vertical axis | |
| On/Off | Values: on, off |
| Dimming curve mode | Values: linear, logarithmic. |
| Soft on fade rate | scale = 1 ms. |
| Fade to black rate | scale = 1 ms. |
| Initial status level | Values: 0.00-100.00%, scale: 0.01% |
| luminance level | Values: 0.00-100.00%, scale: 0.01% |
| Color temperature mix level | Values: 0.00-100.00%, scale: 0.01% |
| Dimming channel (RED) | Values: 0.00-100.00%, scale: 0.01% |
| Dimming channel (GREEN) | Values: 0.00-100.00%, scale: 0.01% |
| Dimming channel (BLUE) | Values: 0.00-100.00%, scale: 0.01% |
| Dimming channel (WHITE) | Values: 0.00-100.00%, scale: 0.01% |
| Dimming channel (COOL) | Values: 0.00-100.00%, scale: 0.01% |
| Dimming channel (WARM) | Values: 0.00-100.00%, scale: 0.01% |
| Occupancy sensitivity level | Values: 0-255 |
| Ocupancy range of detection | Values: 0-7 |
| Moving fixture | |
| Up/down (tilt) | |
| Direction | Values: 1 = up, 0 = down. |
| Type of motion | Values: 1 = absolute, 0 = relative. |
| Absolute Position | Values: 0-14,600 Scale = 0.025 degrees) |
| Left/right (pan) | |
| Direction | Values: 1 = left, 0 = right. |
| Type of motion | Values: 1 = absolute, 0 = relative. |
| Absolute Position | Values: 0-14,600 Scale = 0.025 degrees) |
| Beam spread angle | Values: 0.255 |
| Combination of any of the above | |
| Other suitable fixture parameters | |

The apparatus may include a receiver. The receiver may be configured to receive a user command. The user command may correspond to a function of the fixture. The apparatus may include a microprocessor. The microprocessor may be configured to generate a fixture control message. The fixture control message may correspond to the function. Generation of a fixture control message may include translation of the fixture control message.

The receiver may be configured to receive the user command from a network. Table 4 lists illustrative networks.

TABLE 4

Illustrative networks.

Illustrative networks

Wide Area Network (e.g., Internet)
Local Area Network
DMX 512
Dali
Other suitable networks The receiver may be configured to receive a signal that conforms to a protocol. Table 5 lists illustrative signal protocols.

TABLE 5

Illustrative signal protocols.

Illustrative signal protocols

IEEE 802.11
IEEE 802.15.1
IEEE 802.3
ANSI E1.11-2008 (R2018) Entertainment Technology—USITT DMX512-AA synchronous Serial Digital Data Transmission Standard for Controlling Lighting Equipment and Accessories
IEC 62386
TCP/IP
Other suitable signal protocols The user command may be a first user command. The user command may conform to a first fixture control protocol. The receiver may be configured to receive a second user command that corresponds to the function. The second user command may conform to a second fixture control protocol. The second fixture control protocol may be different from the first fixture control protocol.

The user command may be a first user command. The user command, in a first protocol, may correspond to the fixture function. The fixture function, in a second protocol, may be expressed as a second user command. The second user command may be different from the first user command. The control message may include an instruction. The instruction may correspond to the first user command and the second user command.

The microprocessor may be configured to select the instruction in response to the first user command.

The microprocessor may be configured to select the instruction in response to the second user command.

The microprocessor may be configured to select the instruction based on a table that maps the first user command and the second user command to the instruction.

The apparatus may include machine readable memory. The table may be stored in the machine readable memory.

The microprocessor may be of several microprocessors that are configured, in aggregate, to allocate power to a fixture control circuit and the fixture.

The microprocessor may be of several microprocessors that are configured, in aggregate, to receive the user command from an input channel of input channels, each corresponding to a different fixture control protocol. The microprocessor may be of several microprocessors that are configured, in aggregate, to translate the user command into the control message.

The user command may be rendered in a first protocol. The microprocessor may be configured to render the control message in a second protocol that is different from the first protocol.

The microprocessor may be a first microprocessor. The apparatus may include a fixture having a second microprocessor. The first microprocessor may be configured to process the user command. The second microprocessor may be configured to process the control message. The second microprocessor may be a microprocessor that is not configured to process the user command.

The apparatus may include a fixture support. The fixture support may support the fixture. The microprocessor may be disposed in a power control enclosure. The power control enclosure may be separate from the fixture support. The power control enclosure may be in electrical communication with the fixture support.

The microprocessor may be in wired electrical communication with a conductor of the fixture support.

The enclosure may be configured to be mounted a wall.

The apparatus may include a receptacle for receiving an input communication line. The fixture control message may be configured to change a load of the fixture in response to a voltage change in the input communication line.

The change of the load may be proportional to the voltage change.

The apparatus may include a frame. The frame may define a cartridge socket. The cartridge socket may be configured to receive a cartridge. The cartridge socket may include input contacts configured to receive the user command. The cartridge may include a physical interface configured to receive a connector having an input format that conforms to the user command. The cartridge may include output contacts that are in electrical communication with respective input contacts.

The input format may be mismatched to the input contacts.

Table 6 lists illustrative input formats.

TABLE 6

Illustrative input formats.

Illustrative formats

DMX (Digital Multiplexer)
DALI (Digital Addressable Lighting Interface)
Triac or ELV (Phase cut dimmer signal)
0-10 V dimmer signal
Z-wave (Z-wave Alliance, Beaverton, Oregon)
Zigbee (Zigbee Alliance, of San Ramon, California)
Custom—user defined
Default—provided in memory
Other third-party control protocol
Other suitable input formats The cartridge may be a first cartridge. The physical interface may be a first physical interface. The connector may be a first connector. The format may be a first format. The output contacts may be first output contacts. The cartridge socket may be configured to receive a second cartridge. The second cartridge may include a second physical interface. The second physical interface may be configured to receive a second connector. The second connector may have a second format that conforms to the user command. The second connector may have output contacts that are, respectively, in electrical communication with the input contacts.

The microprocessor may be configured to detect a pre-regulated power level at the receptacle. The fixture control message may be configured to set the load at the fixture in proportion to the pre-regulated power level.

The apparatus may include an input power supply that may be configured to receive line voltage. The apparatus may include a control power unit that may include the microprocessor. The apparatus may include a power distribution circuit. The power distribution circuit may be configured to supply a first current to the control power unit. The power distribution circuit may be configured to supply a second current to the fixture.

The power supply may reduce the line voltage to a constant operational voltage. The first current may be delivered at the constant operational voltage. The second current may be delivered at the constant operational voltage.

The fixture may be configured to be supported by a fixture support. The fixture may be configured to be recessed in the fixture support. The fixture may be configured to be flush-mounted in the fixture support. The fixture may be configured to be pendant from the fixture support. The fixture may be configured to be magnetically suspended from the fixture support.

The microprocessor may be a first microprocessor. The fixture may include a second microprocessor. The second microprocessor may be configured to be in electronic communication with the first microprocessor. The second microprocessor may be configured to receive the control message from the first microprocessor. The second microprocessor may be configured to control the fixture responsive to the control message.

The apparatus may include a fixture support. The fixture may be a first fixture. The fixture support may support the first fixture. The fixture support may support several second fixtures. The first and second fixture supports may have different lengths. The second fixture supports may have different lengths. The microprocessor may be configured to address the message to the first fixture and not to any of the second fixtures.

The fixture may be of a first group of fixtures. The fixture support may support a second group of fixtures. The microprocessor may be configured to address the message only to fixtures in the first group.

The apparatus may include a transmitter. The transmitter may be configured to transmit the message to the fixture over wire. The transmitter may be configured to transmit the message to the fixture over a wireless gap.

The receiver may be configured to receive the user command from a remote communication unit. The remote communication unit may include a mobile telephone. The remote communication unit may include a wall-mounted control.

The receiver may be configured to receive the user command wirelessly. The receiver may be configured to receive the user command over a wire.

Table 7 lists illustrative user commands.

TABLE 7

Illustrative user commands.

Illustrative user commands

Voltage level
Increase intensity
Decrease intensity
Increase CCT
Decrease CCT
Illustrative user commands
Power ON
Power OFF
Select layout
Track circadian lighting
(automatically adjust fixture parameter to match circadian cycles)
Complement ambient lighting (Light harvesting automation)
Automatically adjust fixture parameter based on occupancy of a space
(select occupied, unoccupied scenes)
Automatically adjust fixture parameter based on occupancy of a space
(select occupied, unoccupied scenes)
Motion activation ON
Motion activation OFF
Motion deactivation ON
Motion deactivation OFF
Select hue for fixture
Select hue for group
Select power setting
Select ambient temperature setting for automatic ON
Select ambient temperature setting for automatic OFF
Adjust vertical displacement of an LED
Adjust horizontal displacement of an LED (e.g., move left/right 5 degs.)
Adjust tilt angle of an LED
Adjust pan angle of an LED (e.g., pan to a different heading)
Adjust light beam spread angle
Other suitable user commands A beam spread angle may be an angle between opposed edges of a beam. A beam edge may be defined by a decrease of 50% intensity relative to a maximum intensity of the beam. Beam edges may be identified by a goniophotometer.

The microprocessor may be configured to transmit to a remote communication unit lighting layout information. The layout information may identify the fixture support. The layout information may include, for the fixture, a location on the fixture support. The layout information may include, for the fixture, a fixture on the fixture support.

The layout information may include, for the fixture, a fixture parameter.

The fixture parameter may be a first fixture parameter. The layout information may include, for a second fixture, a second fixture parameter.

The fixture may be a first fixture. The location may be a first location. The layout information may include, for a second fixture, a second location on the fixture support corresponding to the second fixture.

The fixture support may be a first fixture support. The layout information may identify a second fixture support. The layout information may identify an orientation of the second fixture support relative to the first fixture support. The fixture may be a first fixture. The location may be a first location. The layout information may include, for a second fixture, a second location on the second fixture support corresponding to the second fixture.

The remote communication unit may be configured to render a display corresponding to the lighting layout information.

The user command may include a command to select, responsive to an ambient light spectrum, a hue of a light beam to be emitted from the fixture.

The apparatus may include a photo sensor. The photo sensor may be configured to register a spectrum of ambient light in which the fixture is disposed.

The microprocessor may be configured to select, responsive to the spectrum, a coordinated color temperature of a light beam to be emitted from the fixture.

The photo sensor may be a first photo sensor. The apparatus may include a second photo sensor.

The second photo sensor may be configured to detect a presence of a human in a space in which the fixture support is disposed. The microprocessor may be configured to change a parameter of the fixture based on a presence of the human. The second photo sensor may be configured to detect a departure of a human from a space in which the fixture support is disposed. The microprocessor may be configured to change a parameter of the fixture based on the departure.

The first photo sensor and the second photo sensor may be collocated on a substrate.

The apparatus may include a sensor integrated circuit. The first photo sensor and the second photo sensor may be part of the sensor integrated circuit.

Table 8 lists illustrative control messages.

TABLE 8

Illustrative control messages.

Illustrative control messages

Voltage level
Increase intensity
Decrease intensity
Increase CCT
Decrease CCT
Power ON
Power OFF
Select layout
Track circadian lighting
Complement ambient lighting
Motion activation ON
Motion activation OFF
Motion deactivation ON
Motion deactivation OFF
Select hue for fixture
Select hue for group
Select power setting
Select ambient temperature setting for automatic ON
Select ambient temperature setting for automatic OFF
Adjust vertical displacement of an LED TABLE 8-continued Illustrative control messages.

Illustrative control messages

Adjust horizontal displacement of an LED
Adjust tilt angle of an LED
Adjust pan angle of an LED
Adjust light beam spread angle
Other suitable control messages The apparatus may include a brace. The brace that may be configured to align a fixture support with an electrical accessory to the fixture support. The apparatus may include a circuit. The circuit may be configured to transmit power between the fixture support and the accessory. The fixture support may define a fixture docking area. The fixture docking area may be configured to receive a fixture. The fixture docking area may be configured to removably retain the fixture. The brace may be detachably engageable with the fixture support. Engagement of the brace with the fixture support may be an engagement that does not reduce the area.

The circuit may include an electrical terminal. The terminal may be elastically biases. The terminal may include a contact. The contact may electrically contact the fixture support when the brace engages the fixture support.

The circuit may be a first circuit. The contact may be a first contact. The apparatus may include a second circuit. The second circuit may include a second contact. The second contact may electrically contact the fixture support when the brace engages the fixture support.

The first and second circuits may be electrically isolated from each other inside the brace. The first circuit may be configured to conduct power. The second circuit may be configured to conduct a communication signal.

The apparatus may include an accessory. The accessory may include a power terminal in electrical communication with the first contact. The accessory may include a signal terminal in electrical communication with the second contact. The accessory may include a wall that abuts the area.

The accessory may include a first closed-loop conductor slidingly engaged with a first power terminal that may be in electrical communication with the first contact. The accessory may include a second closed-loop conductor slidingly engaged with a second power terminal that may be in electrical communication with the second contact. The accessory may include a guide. The guide may be configured to maintain electrical communication of the first power terminal with the first closed-loop conductor. The guide may be configured to maintain electrical communication of the second power terminal with the second closed-loop conductor. The guide may be configured to maintain the electrical communication while the brace is repositioned along the first and second closed-loop conductors.

The brace may be repositionable continuously along the first and second closed-loop conductors.

The apparatus may include a power switch. The power switch may be configured to break electrical communication between the first closed-loop conductor and the first circuit.

The brace may be of a plurality of braces. The first and second closed-loop conductors may be configured to be electrically engaged by the plurality of braces concurrently with each other.

The brace may be a first brace. The fixture support may be a first fixture support. The area may be a first area. The accessory may include a second brace. The second brace may extend at a fixed angle relative to the first brace. The second brace may be configured to detachably engage a second fixture support at the angle relative to the first fixture support. The second fixture support may include a second a fixture docking area. The second fixture docking area may be configured to receive the fixture. The second fixture docking area may be configured to receive removably the fixture. Engagement of the second brace with the second fixture support may be an engagement that does not reduce the second area.

The circuit may be a first circuit. The second brace may include a second circuit that may be configured to transmit power between the first circuit and the second fixture support.

Table 9 lists illustrative ranges that may include the angle.

TABLE 9

Illustrative angle ranges.
Illustrative angle ranges
(degrees of arc)

| Lower | Upper |
|---|---|
| 0 | 29 |
| 30 | 44 |
| 45 | 59 |
| 60 | 74 |
| 75 | 89 |
| 90 | 104 |
| 105 | 119 |
| 120 | 134 |
| 135 | 149 |
| 150 | 164 |
| 165 | 179 |
| 180 | 194 |
| Other suitable lower limits | Other suitable upper limits |

The apparatus may include a connector that may be configured to join a first end of a first fixture support defining a first fixture-docking area to a second end of a second fixture support defining a second fixture-docking area. Connection by the connector may form a joint that does not subtract docking area from a third area that is defined as a sum of the first fixture-docking area and the second fixture-docking area.

The first fixture-docking area may be configured to receive the device.

The second fixture-docking area may be configured to receive the device.

The first docking area may include a first mounting surface. The second docking area may include a second mounting surface. The connector may be configured to join the first and second surfaces such that the first and second surfaces are flush with each other. The connector may be configured to join electrically a first power rail of the first fixture support to a second power rail of the second fixture support. The power rail may be configured to transmit power. The power rail may be configured to transmit control messages, as in a power line communication ("PLC") architecture.

The connector may be configured to join electrically a first control communication bus of the first fixture support to a second control communication bus of the second fixture support.

The connector may be configured to hold a second end of a second mounting surface in abutment with a first end of a first mounting surface.

The connector may be configured to hold the second end spaced apart from the first end with no structure intervening between the second end and the first end.

The first fixture support may provide a first continuous stretch of locations at which a light fixture may be mountable on the first surface. The second fixture support may provide a second continuous stretch of locations at which the light fixture may be mountable on the second surface. The connector may be configured to form, from the first and second continuous stretches, a third continuous stretch of locations at which the light fixture may be mountable. The third continuous stretch may include the first and second stretches.

The apparatus may include a power rail jumper. The power rail jumper may be configured to join electrically a first power rail of the first fixture support to a second power rail of the second fixture support. A first mounting surface of the first fixture support may be configured to support a fixture. A second mounting surface of the second fixture support may be configured to support the fixture. The power rail jumper may be configured to connect with the first power rail at a first location behind the first surface. The power rail jumper may be configured to connect with the second power rail at second location behind the second surface. The fixture may include a light fixture.

The connector may include a first projection. The connector may include a second projection. The first projection may be configured to mate with the first fixture support. The second projection may be configured to mate with the second fixture support.

The first projection may extend along a plane. The second projection may extend along the plane.

The plane may be horizontal when the apparatus may be in operation.

The first projection may include a male engagement component. The male engagement component may be configured to mate with a female engagement component on the first fixture support.

The first projection may include a female engagement component configured. The female engagement component may be configured to mate with a male engagement component on the first fixture support.

The apparatus may include a power rail jumper that is configured to provide power conductivity between a first power rail of the first fixture support and a second power rail of the second fixture support.

The apparatus may include a communication bus jumper that is configured to provide signal conductivity between a first communication bus of the first fixture support and a second communication bus of the second fixture support.

The first fixture support may include a first mounting surface. The second fixture support may include a second mounting surface. The connector, in operation, may hold a second end of the second mounting surface level with a first end of the first mounting surface.

The first projection and the second projection, in operation, may hold the second mounting surface in abutment with the first mounting surface.

The first projection and the second projection, in operation, may hold the second mounting surface spaced apart from the first mounting surface with no structure intervening between the second mounting surface and the first mounting surface.

The first projection may include a first plate that may be configured for insertion, in the first fixture support, between: (a) a first U-channel spine; and (b) a first control communication bus and a first power rail. The second projection may include a second plate that may be configured for insertion, in the second fixture support, between: (a) a second U-channel spine; and (b) a second control communication bus and a second power rail.

The apparatus may be configured so that neither the first plate nor the second plate intervenes between butt-ends of the first and second fixture supports. The apparatus may be configured so that neither the first plate nor the second plate intervenes interferes with placement of a light fixture in the U-channel.

The apparatus include a junction. The junction may define a central axis that may define continuous circumferential angles about the axis. The junction may be configured to support a fixture support bracket at any of the angles. The junction may be configured to provide electrical communication with the bracket at any of the angles. The junction may include a track configured to support the bracket. The junction may include a conductor that is configured to provide the electrical communication.

The track may be configured to slidingly support the bracket. The conductor may be configured to provide the electrical communication at any of the angles to which the bracket is, in operation, moved.

The bracket may be configured to support an end of an elongated fixture support.

The bracket may be configured to provide the electrical communication from the conductor to the fixture support.

The bracket may include a projection that extends radially away from the central axis. The bracket may be a first bracket. The electrical communication may be a first electrical communication. The fixture support may be a first fixture support. A second bracket that may be configured to slidingly engage the track. The second bracket that may be configured to slidingly engage the track. The second bracket may be configured to provide a second electrical communication from the conductor to a second fixture support.

The second bracket may include a projection that extends radially away from the central axis.

The apparatus may include a third bracket. The third bracket may be configured to slidingly engage the track. The third bracket may be configured to provide a third electrical communication from the conductor to a third fixture support.

The third bracket may include a projection that extends radially away from the central axis.

The first fixture support may include a first mounting surface. The second fixture support may include a second mounting surface. The junction, in operation, may hold a second end of the second mounting surface level with a first end of the first mounting surface.

The conductor may be a first conductor. The electrical communication may be a first electrical communication. A second conductor that may be configured to provide a second electrical communication with the bracket. The first conductor and the second conductor may be configured to provide the respective first and second electrical communications at any of the angles to which the bracket is, in operation, moved.

The first conductor and the second conductor in operation may provide power to the bracket.

The first conductor and the second conductor in operation may provide a communication signal to the bracket.

The apparatus may include a third conductor that may be configured to provide a third electrical communication with the bracket.

The apparatus may include a fourth conductor that may be configured to provide a fourth electrical communication with the bracket. The third conductor and the fourth conductor may be configured to provide the respective third and fourth electrical communications at any of the angles to which the bracket is, in operation, moved.

The third conductor and the fourth conductor in operation may provide power to the bracket.

The third conductor and the fourth conductor in operation may provide a communication signal to the bracket.

The conductor may be a first conductor. The apparatus may include a second conductor. The apparatus may include a third conductor. The apparatus may include a fourth conductor. Each of the first, second, third and fourth conductors may define a continuous loop about the central axis.

The junction may include a frame. The frame may support the conductors. The frame may support the track. The frame may include a plate on which the conductors may be disposed.

The plate may be a first plate. The apparatus may include a second plate. The first and second plates may be spaced apart by a spacer. The first plate, the second plate and the spacer may define a receptacle. The receptacle may be configured to receive the bracket. The receptacle may be configured to slidably support the bracket such that the bracket may be movable about the spacer.

The apparatus may include a fixture head. The fixture head may include a back wall. The back wall may have a back side that may be configured to be retained against a fixture support. The back wall may have a front side, opposite the back side, that, in relation to the back side, defines a forward direction. The apparatus may include a detent. The detent may extend from the head. The detent may be configured to engage the fixture support to retain a position of the head relative to the fixture support. The apparatus may include a release. The release may be disposed inside the fixture head. The release may be configured to withdraw the detent from the fixture support. The release may be accessible only from a location forward of the release.

The fixture head may support engagement of a fixture with a fixture support. The fixture support may support engagement of any suitable object, including signage, with the fixture support.

The release may be disposed forward of the back side.

The release may be disposed such that, in operation, the back wall may be between the fixture support and the release.

The back side may define, in relation to the front side, a rear direction. The back side may be configured to be retained against the fixture support such that the fixture support is rear of the back side. The release may be disposed forward of the back side.

The detent may be configured to bridge between the head and the fixture support to engage the fixture support.

The head may have a first side opposite a second side. The detent bridges between the first side and the fixture support.

The detent may be biased to engage the fixture support.

The release may define an engagement element. The engagement element may be configured to be engaged to operate the release. The release may include a slide, a button, a lever or any other suitable release element.

The engagement element may be disposed parallel the back wall.

The apparatus may include a side wall. The side wall may extend perpendicular the back wall. The engagement element may be disposed parallel the side wall.

The engagement element may include an edge. The edge may be configured to be engaged by a tip of an elongated hand-held instrument.

The engagement element may define a catch. The catch may be configured to be engaged by a tip of an elongated hand-held instrument.

The engagement element may be configured to be operated by a user finger.

The head in operation may span a recess of the fixture support in a direction transverse the fixture support such that a side wall of the head may be flush with the fixture support.

The side wall may be supported by the back wall. The side wall may define, with the back wall, an interior. The release may be disposed in the interior.

The side wall may define an open side of the head. The release may be accessible only via the open side. The release may be a release that is not accessible via the side wall.

The head may be configured to be seated in a recess defined by the fixture support. The detent may be configured to secure the head in the recess. The detent may be configured to bridge between the head and the fixture support to engage the fixture support.

The head may have a first side opposite a second side. The detent may bridge between the first side and the fixture support.

The head in operation may span the recess in a direction transverse the fixture support such that the first and second sides are flush with the fixture support.

The detent may be biased to engage the fixture support.

The release may define an edge that may be configured to be engaged by a tip of an elongated hand-held instrument.

The head may define an interior. The release may be disposed in the interior.

The head may include a side that in operation lies flush against a spine of the recess. The side, relative to the spine, may define a downward direction. A fixture power conductor may be disposed in the interior. The release, in operation, may be disposed below the side. The release, in operation, may be disposed above the fixture power conductor.

An LED circuit may be disposed in the interior. The release, in operation, may be disposed below the side. The release, in operation, may be disposed below the side above the LED circuit. The release, in operation, may be disposed above the LED emitter.

A reflector may be disposed in the interior. The release, in operation, may be disposed above the reflector.

A translucent layer may be disposed against the head. The release, in operation, may be disposed above the translucent layer.

The apparatus may include a light fixture. The light fixture may include an LED emitter. The light fixture may be configured to depend from a fixture support. The light fixture may be configured to emit a beam. The light fixture may be configured to receive a control message from a conductor of the fixture support. The light fixture may be configured to, in response to the control message, adjust a beam-spread angle of the beam.

The conductor may include a bus. The conductor may include a power bus. The conductor may include a communication bus.

The apparatus may include a lens. The lens may be configured to adjust the beam-spread angle in response to an electrical field applied to the lens. The lens may include a liquid crystal.

The light fixture may be further configured to adjust, in response to the control message, a height along a vertical direction that passes through the fixture when the fixture is in operation.

The light fixture may be configured to adjust, in response to the control message, a tilt angle between a centerline of the beam and a vertical direction that passes through the fixture when the fixture is in operation.

The light fixture may be configured to adjust, in response to the control message, a pan angle defined about a vertical direction that passes through the fixture when the fixture is in operation.

The light fixture may include a receiver. The light fixture may include a tilt actuator. The light fixture may include a pan actuator. The receiver may be configured to be in electronic communication with the tilt actuator. The receiver may be configured to be in electronic communication with the pan actuator. The tilt actuator may be configured to change an angle between a centerline of the beam and a vertical direction that passes through the fixture when the fixture may be in operation. The pan actuator may be configured to angularly translate the emitter about the vertical direction.

The light fixture may include a magnetic coupler. The magnetic coupler may be configured to suspend the fixture from the fixture support. The magnetic coupler may include a permanent magnet. The magnetic coupler may include ferrous metal. The magnetic coupler may be intrinsic to a wall of the fixture.

The light fixture may include a power contact. The power contact may be configured to contact a power rail on the fixture support. The light fixture may include further a power contact. The power contact may be configured to contact a power rail on a fixture support. The power contact may be configured to be held in contact with the power rail by the magnetic coupler. The power contact may be configured to push against the power rail. The power contact may be configured to be held against the power rail solely by the magnetic coupler.

The light fixture may include a communication bus contact. The communication bus contact may be configured to contact a communication bus on the fixture support. The communication bus contact may be configured to push against a power rail of the fixture support. The communication bus contact may be configured to be held against the power rail solely by the magnetic coupler.

The tilt actuator may be configured to move a housing, relative to the vertical direction, through an angular displacement of 180°. Table 10 lists illustrative ranges that may include the tilt angle.

TABLE 10

Illustrative tilt angle ranges.
Illustrative tilt angle ranges
(degrees of arc)

| Lower | Upper |
|---|---|
| 0 | 29 |
| 30 | 44 |
| 45 | 59 |
| 60 | 74 |
| 75 | 89 |
| 90 | 104 |
| 105 | 119 |
| 120 | 134 |
| 135 | 149 |
| 150 | 164 |
| 165 | 179 |
| 180 | 194 |
| Other suitable lower limits | Other suitable upper limits |

The pan actuator may be configured to angularly translate the emitter through an angular displacement of 360° or more. Table 11 lists illustrative ranges that may include the pan angle.

TABLE 11

Illustrative pan angle ranges.
Illustrative pan angle ranges
(degrees of arc)

| Lower | Upper |
|---|---|
| 0 | 29 |
| 30 | 44 |
| 45 | 59 |
| 60 | 74 |
| 75 | 89 |
| 90 | 104 |
| 105 | 119 |
| 120 | 134 |
| 135 | 149 |
| 150 | 164 |
| 165 | 179 |
| 180 | 194 |
| 165 | 179 |
| 180 | 194 |
| 195 | 209 |
| 210 | 224 |
| 225 | 239 |
| 240 | 254 |
| 255 | 269 |
| 270 | 284 |
| 285 | 299 |
| 300 | 314 |
| 315 | 329 |
| 330 | 344 |
| 345 | 359 |
| 360 | 365 |
| 366 | 366+ |
| Other suitable lower limits | Other suitable upper limits |

The apparatus may include an LED emitter. The apparatus may be configured to The apparatus may be configured to depend from a fixture support. The apparatus may be configured to receive a control message from a conductor of the fixture support. The apparatus may be configured to, in response to the control message, pan the LED emitter. The apparatus may be configured to, in response to the control message, tilt the LED emitter. The apparatus may be configured to adjust, in response to the control message, a beam-spread angle of a beam to be emitted, in operation, from the emitter.

The apparatus may include a base. The apparatus may include a housing. The apparatus may include an LED emitter. The LED emitter may be disposed in the housing. The apparatus may include a collar. The collar may, in operation, by rotatable relative to the housing to adjust a beam spread angle of a beam emitted from the emitter.

The base may include a fixture head. The fixture head may include a latch. The fixture head may include a pick-up unit.

The base may be configured to be docked in an interior of a U-channel fixture support. Docking may include causing a mechanical engagement of the base with the fixture support. Docking may include making electrical contact to transfer power between the base and the fixture support. The base may be configured to support the housing at different user-selectable heights relative to the U-channel fixture support.

The collar may be threadingly engaged with the housing.

Linear translation of the collar relative to a central axis of the housing changes a distance between the emitter and a lens.

The housing may include a detent to prevent the collar from separating from the housing.

The housing may include an annular recess adjacent threads through which the collar rotates. The detent may include a "C"-clip. The "C"-clip may be disposed in the recess. The "C"-clip may defines a circumference. The "C"-clip may a reentrant angle interior the circumference.

The apparatus may include an articulating joint. The articulating joint may provide freedom for the housing to be manually moved vertically relative to the base.

The housing and the support may be configured such that an entirety of the housing may be movable into the interior.

The housing may include a lip distal the base. The fixture support may include a U-channel spine. The fixture support may include an edge distal the spine. The lip may be movable into the interior, past the edge.

The articulating joint may be a first articulating joint. The apparatus may include a second articulating joint. The second articulating joint may provide freedom for the housing to rotate about a vertical direction that passes through the base when the base is in operation.

The apparatus may include a third articulating joint. The third articulating joint may provide freedom for the housing to tilt relative to the base.

The apparatus may include an LED emitter disposed in a housing. The apparatus may include a base. The base may be configured to dock to a fixture support. The apparatus may include a cord. The cord may have a first end. The first end may be electrically terminated in the base. The cord may have a second end. The second end may be electrically terminated in the housing. The cord may be configured to suspend the housing from the base. The housing may be configured to engage the cord at a location along the cord between the first end and the second end to suspend the housing at the location. The housing may be configured to store a slack length of the cord in the housing.

The cord may include a plurality of locations continuously distributed along the cord. The housing may be configured to engage the cord at any location in the plurality. Engagement of the cord by the housing at the location may retain the housing at a height corresponding to the location. The housing may be configured to engage the cord by mechanical interference with the cord.

The height may be adjustable by manually withdrawing the cord from the housing. The height may be adjustable by manually pushing the cord into the housing.

The housing may include a normally-closed gripper. The gripper may be configured to grip the cord at the location. The gripper may be configured to relax in response to passage of the cord into the housing. The passage may be a manual passage. The gripper may be configured for manual insertion of the cord into the housing. The gripper may be configured for manual withdrawal of the cord from the housing.

The gripper may include a spring. The spring may be disposed coaxially about an axis of the cord. The gripper may include a bumper. The bumper may be supported by the spring. Compression of the spring may displace the bumper radially away from the axis to release the cord. Urging of the cord into the housing may cause the compression.

Under a first tension from the housing, the bumper may engage the cord to suspend the housing. Under a second tension from a user, the cord may be slidable out of the housing against the bumpers. The second tension may be greater than the first tension.

The apparatus may include an LED emitter. The emitter may be disposed in a housing. The apparatus may include a ring. The ring may include a baffle. The ring may be configured to be supported by the housing at a first user-selectable position relative to the housing. The ring may be configured to be supported by the housing at a second user-selectable position relative to the housing. The ring may be configured to be supported by the housing at a third user-selectable position relative to the housing. The third user-selectable position may be continuously selectable between the first user-selectable position and the second user-selectable position.

The ring may configured to be moved between the positions without rotation about a central axis of the ring. At the positions, in operation, rotation of the ring may change a beam spread angle of light emitted from the LED. Rotating the ring may cause a linear displacement of a lens relative to the LED emitter. Projecting the ring away from the housing, in operation, may prevent light from the emitter from illuminating outside a region defined by a cut-off angle. The cut-off angle may be in the range 0-45° below a horizontal plane defined by the lower edge of the ring. Projecting the ring away from the housing, in operation, may eliminate glare experienced by a person at a distance from the vertical axis of the housing. The higher the ring is set, the greater is the distance at which the person may experience glare.

The ring may be configured to be manually rotated by a user. The ring may be configured to nest in the housing. The ring may be configured to be manually telescopically extended away from the housing. The ring may be configured to be manually telescopically moved relative to the housing, without, in operation, changing the beam spread angle.

The apparatus may include a slotted bushing. The ring may be configured to translate along the axis relative to the bushing, and not rotate relative about the axis relative to the bushing. The bushing may be affixed to the housing. The bushing may be rotatable with respect to the housing.

Rotation of the bushing may change a distance between the emitter and lens.

The apparatus may include a light fixture depending from a fixture support and configured to emit a beam of light. The apparatus may include a detector that is configured to generate a signal based on detection of a target. The apparatus may include a microprocessor. The microprocessor may be configured to direct the beam to a target based on a first location of the target. The microprocessor may be configured to redirect the beam to the target when the target moves to a second location. Table 12 lists illustrative target types.

TABLE 12

| Illustrative target types. |
| --- |
| Illustrative target types |
| Active |
| RF broadcast circuit |
| Bluetooth |
| Optical emitter |
| Acoustic signal generator |
| Reactive |
| RFID |
| Acoustic/Magnetic signal generator |
| Acoustic |
| Passive |
| Optical (//) |
| visual |
| IR |
| UV |
| AR-based natural feature |
| Other suitable target types |

The target may be configured to change from a low power mode to a high power mode upon detection of an acceleration. In the low power mode, the target may consume energy at a rate that is too low to emit a locating signal. In the high power mode, the target may consume energy at a rate that is not too low to emit a locating signal.

The microprocessor may be configured to adjust a beam parameter of the beam so that when the target moves from the first location to the second location, a metric of the beam at the target does not change. A beam parameter is an adjustable parameter of a beam, as emitted from the fixture. A metric is a state of the beam as observed at the target. Table 13 lists illustrative beam parameters.

TABLE 13

Illustrative beam parameters.
Illustrative beam parameters

Beam-angle spread
Luminous flux
Spectral power profile
Coordinated color temperature
Fixture parameter
Other suitable beam parameters Table 14 lists illustrative beam metrics.

TABLE 14

Illustrative beam metrics
Illustrative beam metrics

Two-dimensional luminous flux
Beam width transverse to the beam
Beam width along a horizontal plane
Beam area in a horizontal plane
Beam Diameter
Elliptical axis ratio
Other suitable beam metrics The apparatus may include machine readable memory. The microprocessor may be configured to store in the memory a reference bearing from the light fixture to the target. The bearing may include a pan angle. The bearing may include a tilt angle. The microprocessor may transform a pan angle by 180° to account for a negative tilt angle. The reference bearing may correspond to the first location. The microprocessor may be configured to adjust a beam parameter of the beam at the second location to conform to a predetermined instruction corresponding to the second location. Table 15 lists illustrative predetermined instructions. A metric may be a value that quantifies a beam parameter.

TABLE 15

Illustrative predetermined instructions.
Illustrative predetermined instructions

| Illustrative instructions | Illustrative functionality |
| --- | --- |
| Conform a second-location metric of the beam to a first-location metric of the beam. | Provides at the second location the same metric that was provided at the first location |
| Conform a second-location metric of the beam to a predetermined metric corresponding to the second location. | Provides at the second location a metric previously set for the second location |
| Conform a second-location beam parameter to a predetermined beam parameter corresponding to the second location | Provides for the second location a beam parameter previously set for the second location |
| Conform a second-location beam parameter in response to an ambient wavelength-intensity spectrum at the second location. | Provides for the second location a beam parameter that is responsive, in a predetermined manner, to an ambient light spectrum sensed at the second location in connection with providing illumination at the second location. |
| Conform a second-location metric of the beam in response to an ambient wavelength-intensity spectrum at the second location. | Provides at the second location a metric that is responsive, in a predetermined manner, to an ambient light spectrum sensed at the second location in connection with providing illumination at the second location. |
| Other suitable instructions | Other suitable functionality |

The microprocessor may be configured to store in the memory a reference beam parameter that corresponds to the first location. The microprocessor may be configured to store in the memory a reference beam metric that corresponds to the first location.

The microprocessor may be configured to calculate, for the second location, a redirected bearing from the light fixture to the target.

The microprocessor may be configured to calculate, for the second location, a redirected beam parameter that causes the beam metric, when the target is at the second location, to be the same as the reference metric.

The microprocessor may be further configured to receive from a user an instruction to set a reference beam profile. The reference beam profile may include one or more beam parameters. The reference beam profile may include one or more beam metrics. The apparatus may capture a reference beam profile from a live beam from the fixture.

The microprocessor may be configured to receive from a user an instruction to reset a reference beam profile. The beam may have a beam spread angle. The light fixture may include a lens. The lens may be configured to reshape the beam in response to an electric field applied to the lens. The lens may be available, for example, under the tradename LENSVECTOR (from LensVector Inc., San Jose, Calif.). The lens may be configured to adjust the beam spread angle between a first value and a second value, continuously. The first value may be a value that is not less than 15. The second value may be a value that is not more than 40.

Table 16 lists illustrative detector types.

TABLE 16

Illustrative detector types.
Illustrative detector types

Camera
Microphone
RF antenna
Optical sensor

TABLE 16-continued

Illustrative detector types.
Illustrative detector types

Acoustic sensor
Other suitable target types

The microprocessor may be disposed on the fixture support. The microprocessor may be disposed in a lighting power control enclosure. The enclosure may in operation be spaced apart from the fixture support. The enclosure may in operation be in electrical communication with the fixture support.

The beam may be a first beam. The apparatus may include a second light fixture that is configured to emit a second beam of light. The microprocessor may be configured to direct the second beam to the target based on the first location.

The light fixture may be a first light fixture. The fixture support may be a first fixture support. The apparatus may include a second light fixture that is configured to be supported by a second fixture support. The second fixture support may be a fixture support that is not fixed directly to the first fixture support.

The second light fixture may be configured to be supported by a second fixture support. The apparatus may include a brace that fixes the second fixture support to the first fixture support.

The detector may be a first detector. The beam may be a first beam. The target may be first target. The signal may be a first signal. The apparatus may include a second light fixture depending from the fixture support and configured to emit a second beam of light. The second detector may be configured to generate the second signal based on detection of the second target. The microprocessor may be configured to direct the first beam to the first target based on the first signal. The microprocessor may be configured to direct the second beam to a second target based on the second signal.

The apparatus may include a current-regulated LED circuit. The current-regulated LED circuit may be configured to receive control information corresponding to the LED emitter. The current-regulated LED circuit may be configured to provide power to the LED emitter based on control information addressed to the circuit. The current-regulated LED circuit may be configured to provide power to the LED emitter. The apparatus may include a non-polar socket that may be in electrical communication with the LED circuit. The LED circuit may include a PM2071 current regulation device.

The LED emitter may be a first LED emitter. The LED circuit may be a first LED circuit. The information may be first information. The apparatus may include a second LED emitter. The apparatus may include a second LED circuit. The second LED circuit that may be configured to receive second control information corresponding to the second LED emitter. The second LED circuit that may be configured to provide power to the second LED emitter. The second information may be addressed to the second LED circuit. The second information may be information that is not addressed to the first LED circuit. The first LED circuit may be mounted on a first lamina section having a first power rail configured to receive power from a power source. The second LED circuit may be mounted on a second lamina section having a second power rail, electrically parallel the first power rail, that may be configured to receive power from the power source. The information may include a fixture parameter. The information may include a beam parameter.

The apparatus may include a DC power supply. The apparatus may include a transmission line having a length. The current-regulated LED circuit may include a current regulator. The length may extend from the DC power supply to the socket. The transmission line may include power conductors. The power conductors may have a wire diameter. The LED circuit may have a linear light-output density, which may be quantified in terms of lumens/(foot of lamina or laminae).

Table 17 lists illustrative minimum values of the length.

TABLE 17

Illustrative ranges for minimum values of the length.
Illustrative ranges for minimum values of the
length (ft)
Range

| Lower | Upper |
| --- | --- |
| <20 | 20 |
| 20 | 40 |
| 40 | 60 |
| 60 | 80 |
| 80 | 100 |
| 100 | 120 |
| 120 | 140 |
| 140 | 160 |
| 160 | 180 |
| 180 | 200 |
| 200 | 220 |
| 220 | 240 |
| 240 | 260 |
| 260 | 280 |
| 280 | 300 |
| 300 | 320 |
| 320 | 340 |
| 340 | 360 |
| 360 | 380 |
| 380 | 400 |
| 400 | 420 |
| 420 | 440 |
| 440 | 460 |
| 460 | 480 |
| 480 | 500 |
| 500 | 520 |
| 520 | 540 |
| 540 | 560 |
| 560 | 580 |
| 580 | 600 |
| 600 | >600 |
| Other suitable ranges of lengths | |

The apparatus may include a lamina section. The lamina section may include a circuit board. The LED emitter may be mounted on the lamina section. The LED circuit may be mounted lamina section. The socket may be mounted lamina section.

The LED emitter may be a first LED emitter. The LED circuit may be a first LED circuit. The apparatus may include a second LED emitter. The apparatus may include a second current-regulated LED circuit. The first LED circuit and the first LED emitter together may define a first string. The second current-regulated LED circuit and the second LED emitter together may define a second string. The first string may conduct from a hot conductor to a first neutral conductor. The second string may conduct from the hot conductor to a second neutral conductor. The hot conductor, the first neutral conductor and the second neutral conductor may be in electrical communication with the socket.

The information may be first information. The second current-regulated LED circuit that may be configured to receive second information corresponding to the second LED emitter. The second current-regulated LED circuit that may be configured to provide power to the second LED emitter. The first information may correspond to a first power. The second information may correspond to a second power. A ratio of output from the second LED emitter to output from the first LED emitter may be a function of a ratio of the second power to the first power.

The first LED may be configured to emit light having a first coordinated color temperature ("CCT"). The second LED may be configured to emit light having a second CCT. The second CCT may be greater than the first CCT. Table 18 lists illustrative ranges that may include nominal CCT values for the first and second CCTs.

TABLE 18

Illustrative ranges that may include nominal CCT values for the first and second CCTs.
Illustrative ranges (° K)

| Range | |
|---|---|
| Lower | Upper |
| 1,800 | 1,849 |
| 1,850 | 1,899 |
| 1,900 | 1,949 |
| 1,950 | 1,999 |
| 2,000 | 2,049 |
| 2,050 | 2,099 |
| 2,100 | 2,149 |
| 2,150 | 2,199 |
| 2,200 | 2,249 |
| 2,250 | 2,299 |
| 2,300 | 2,349 |
| 2,350 | 2,399 |
| 2,400 | 2,449 |
| 2,450 | 2,499 |
| 2,500 | 2,549 |
| 2,550 | 2,599 |
| 2,600 | 2,649 |
| 2,650 | 2,699 |
| 2,700 | 2,749 |
| 2,750 | 2,799 |
| <2,800 | 2,799 |
| 2,800 | 2,849 |
| 2,850 | 2,899 |
| 2,900 | 2,949 |
| 2,950 | 2,999 |
| 3,000 | 3,049 |
| 3,050 | 3,099 |
| 3,100 | 3,149 |
| 3,150 | 3,199 |
| 3,200 | 3,249 |
| 3,250 | 3,299 |
| 3,300 | 3,349 |
| 3,350 | 3,399 |
| 3,400 | 3,449 |
| 3,450 | 3,499 |
| 3,500 | 3,549 |
| 3,550 | 3,599 |
| 3,600 | 3,649 |
| 3,650 | 3,699 |
| 3,700 | 3,749 |
| 3,750 | 3,799 |
| 3,800 | 3,849 |
| 3,850 | 3,899 |
| 3,900 | 3,949 |
| 3,950 | 3,999 |
| 4,000 | 4,049 |
| 4,050 | 4,099 |
| 4,100 | 4,149 |
| 4,150 | 4,199 |
| 4,200 | 4,249 |
| 4,250 | 4,299 |
| 4,300 | 4,349 |
| 4,350 | 4,399 |
| 4,400 | 4,449 |
| 4,450 | 4,499 |
| 4,500 | 4,549 |
| 4,550 | 4,599 |
| 4,600 | 4,649 |
| 4,650 | 4,699 |
| 4,700 | 4,749 |
| 4,750 | 4,799 |
| 4,800 | 4,849 |
| 4,850 | 4,899 |
| 4,900 | 4,949 |
| 4,950 | 4,999 |
| 5,000 | 5,049 |
| 5,050 | 5,099 |
| 5,100 | 5,149 |
| 5,150 | 5,199 |
| 5,200 | 5,249 |
| 5,250 | 5,299 |
| 5,300 | 5,349 |
| 5,350 | 5,399 |
| 5,400 | 5,449 |
| 5,450 | 5,499 |
| 5,500 | 5,549 |
| 5,550 | 5,599 |
| 5,600 | 5,649 |
| 5,650 | 5,699 |
| 5,700 | 5,749 |
| 5,750 | 5,799 |
| 5,800 | 5,849 |
| 5,850 | 5,899 |
| 5,900 | 5,949 |
| 5,950 | 5,999 |
| 6,000 | 6,049 |
| 6,050 | 6,099 |
| 6,100 | 6,149 |
| 6,150 | 6,199 |
| 6,200 | 6,249 |
| 6,250 | 6,299 |
| 6,300 | 6,349 |
| 6,350 | 6,399 |
| 6,400 | 6,449 |
| 6,450 | 6,499 |
| 6,500 | 6,549 |
| 6,550 | 6,599 |
| 6,600 | 6,649 |
| 6,650 | 6,699 |
| 6,700 | 6,749 |
| 6,750 | 6,799 |
| 6,800 | 6,849 |
| 6,850 | 6,899 |
| 6,900 | 6,949 |
| 6,950 | 6,999 |
| 7,000 | 7,049 |
| 7,050 | 7,099 |
| 7,100 | 7,149 |
| 7,150 | 7,199 |
| 7,200 | 7,249 |
| 7,250 | 7,299 |
| 7,300 | 7,349 |
| 7,350 | 7,399 |
| 7,400 | 7,449 |
| 7,450 | 7,499 |
| 7,500 | 7,549 |
| 7,550 | 7,599 |
| 7,600 | 7,649 |
| 7,650 | 7,699 |
| 7,700 | 7,749 |
| 7,750 | 7,799 |
| 7,800 | 7,849 |
| 7,850 | 7,899 |
| 7,900 | 7,949 |
| 7,950 | 7,999 |
| 8,000 | >8,000 |

Other Suitable Ranges

The first string and the second string may define a first CCT mixing circuit. The apparatus may include second CCT mixing circuits. Each of the second CCT mixing circuits may be arranged: (1) in parallel with the first CCT mixing circuit between (a) the hot conductor; and (b) the first and second neutral conductors; and (2) along an elongated substrate.

The apparatus may include a DC power supply. The apparatus may include a transmission line having the length. The length may extend from the DC power supply to the socket.

The DC power supply may be configured to provide a voltage to the transmission line. The transmission line may attenuate the voltage by an amount that is no more than a threshold number of volts. Table 19 lists illustrative threshold volts.

TABLE 19

Illustrative threshold volts.
Illustrative ranges of threshold volts

| Range | |
|---|---|
| Lower | Upper |
| <2 | 2 |
| 2 | 2.2 |
| 2.2 | 2.4 |
| 2.4 | 2.6 |
| 2.6 | 2.8 |
| 2.8 | 3 |
| 3 | 3.2 |
| 3.2 | 3.4 |
| 3.4 | 3.6 |
| 3.6 | 3.8 |
| 3.8 | 4 |
| 4 | 4.2 |
| 4.2 | 4.4 |
| 4.4 | 4.6 |
| 4.6 | 4.8 |
| 4.8 | 5 |
| 5 | 5.2 |
| 5.2 | 5.4 |
| 5.4 | 5.6 |
| 5.6 | 5.8 |
| 5.8 | 6 |
| 6 | >6 |
| Other suitable ranges of threshold volts | |

For a given threshold voltage, the length may be extended by increasing the transmission line conductor diameter (reducing the wire diameter). Table 19A lists illustrative wire diameters.

TABLE 19A

Illustrative wire diameters.
Illustrative wire diameters (mm)

| Range | |
|---|---|
| Lower | Upper |
| <.08 | 0.08 |
| 0.08 | 0.09 |
| 0.09 | 0.1 |
| 0.1 | 0.11 |
| 0.11 | 0.13 |
| 0.13 | 0.14 |
| 0.14 | 0.16 |
| 0.16 | 0.18 |
| 0.18 | 0.2 |
| 0.2 | 0.23 |
| 0.23 | 0.26 |
| 0.26 | 0.29 |
| 0.29 | 0.32 |
| 0.32 | 0.36 |

TABLE 19A-continued

Illustrative wire diameters.
Illustrative wire diameters (mm)

| Range | |
|---|---|
| Lower | Upper |
| 0.36 | 0.41 |
| 0.41 | 0.46 |
| 0.46 | 0.51 |
| 0.51 | 0.57 |
| 0.57 | 0.64 |
| 0.64 | 0.72 |
| 0.72 | 0.81 |
| 0.81 | 0.91 |
| 0.91 | 1.02 |
| 1.02 | 1.15 |
| 1.15 | 1.29 |
| 1.29 | 1.45 |
| 1.45 | 1.63 |
| 1.63 | 1.83 |
| 1.83 | 2.05 |
| 2.05 | 2.31 |
| 2.31 | 2.59 |
| 2.59 | 2.91 |
| 2.91 | 3.26 |
| 3.26 | 3.67 |
| 3.67 | 4.12 |
| 4.12 | 4.62 |
| 4.62 | 5.19 |
| 5.19 | 5.83 |
| 5.83 | 6.54 |
| 6.54 | 7.35 |
| 7.35 | 8.25 |
| 8.25 | 9.27 |
| 9.27 | 10.41 |
| 10.41 | 11.68 |
| 11.68 | >11.68 |
| Other suitable ranges of wire diameters | |

For a given threshold voltage, the length may be extended by decreasing the linear light-output density. Table 19B lists illustrative linear light-output densities.

TABLE 19B

Illustrative linear light-output densities.
Illustrative linear light-output densities (lumen/foot)

| Range | |
|---|---|
| Lower | Upper |
| <10 | 10 |
| 10 | 20 |
| 20 | 30 |
| 30 | 40 |
| 40 | 50 |
| 50 | 60 |
| 60 | 70 |
| 70 | 80 |
| 80 | 90 |
| 90 | 100 |
| 100 | 110 |
| 110 | 120 |
| 120 | 130 |
| 130 | 140 |
| 140 | 150 |
| 150 | 160 |
| 160 | 170 |
| 170 | 180 |
| 180 | 190 |
| 190 | 200 |
| 200 | 210 |
| 210 | 220 |
| 220 | 230 |
| 230 | 240 |

TABLE 19B-continued

Illustrative linear light-output densities.
Illustrative linear light-output densities
(lumen/foot)
Range

| Lower | Upper |
|---|---|
| 240 | 250 |
| 250 | 260 |
| 260 | 270 |
| 270 | 280 |
| 280 | 290 |
| 290 | 300 |
| 300 | >300 |
| Other suitable ranges of linear light-output densities | |

For a threshold voltage of 4 VDC, with linear light density of 100 lumens/foot, and 20 AWG wire, a length of 100 ft. may be used.

The apparatus may include a user-adjustable CCT mixing circuit. The mixing circuit may be configured to allocate power from a DC power supply to the first LED emitter. The mixing circuit may be configured to allocate power from a DC power supply to the second LED emitter.

The mixing circuit may be configured to distribute power from the power supply between the first LED emitter and the second LED emitter.

The socket may be a mounted socket. The mounted socket may be configured to engage a free socket in: a first orientation relative to the mounted socket; and a second orientation relative to the mounted socket. The second orientation may be opposite the first orientation.

The socket may include first power rail contacts. The first power rail contacts may include a first hot contact. The first power rail contacts may include a first high coordinated color temperature ("CCT") neutral contact. The first power rail contacts may include a first low CCT neutral contact. The socket may include second power rail contacts. The second power rail contacts may include a second hot contact. The second power rail contacts may include a second high CCT neutral contact. The second power rail contacts may include a second low CCT neutral contact.

The first and second power rail contacts may be disposed in a block. The block may define receptacles. Each of the first and second power rail contacts may be disposed in a different receptacle. The receptacles may define a number of rows. The receptacles may define a number of columns. Table 20 lists illustrative numbers of rows.

TABLE 20

Illustrative numbers of rows.
Illustrative numbers of rows 2
3
4
5
6
Other suitable numbers of rows Table 21 lists illustrative numbers of columns.

TABLE 21

Illustrative numbers of columns.
Illustrative numbers of columns 2
3
4
5
6
Other suitable numbers of columns The first and second hot contacts may be wired in parallel with each other. The first and second high CCT neutral contacts may be wired in parallel with each other. The first and second low CCT neutral contacts may be wired in parallel with each other.

The socket may have a central axis. The central axis may be normal to a plane defined by the receptacles. The second hot contact may be displaced 180°, about the central axis, from the first hot contact. The second high CCT neutral contact may be displaced 180°, about the central axis, from the first high CCT neutral contact. The second low CCT neutral contact may be displaced 180°, about the central axis, from the first low CCT neutral contact.

The emitter may be first emitter. The LED circuit may be a first LED circuit. The socket may be a first socket. The apparatus may include a second emitter. The apparatus may include a second LED circuit. The apparatus may include a second non-polar socket. The first emitter, the first LED circuit, and the first socket may define a first lighting circuit. The first light circuit may be disposed on a first lamina section. The second emitter, the second LED circuit, and the second socket may define a second lighting circuit. The second lighting circuit may be disposed on a second lamina section. A break-away joint may separably join the first and second lamina section. The first lighting circuit may be configured to transmit power and control information to the second lighting circuit. The first lighting circuit may be operable to provide light having an adjustable correlated color temperature when the second lamina section is joined to the first lamina section. The first lighting circuit may be operable to provide light having an adjustable correlated color temperature when the second lamina section is separated from the first lamina section.

The first lighting circuit may include a first LED circuit. The first lighting circuit may include a first LED emitter. The first lighting circuit may include a first power rail. The second lighting circuit may include a second LED circuit. The second lighting circuit may include a second LED emitter. The second lighting circuit may include a second power rail in electrical communication with the first power rail.

The apparatus may include a socket that includes a power rail jumper. The power rail jumper may be configured to bridge between a fixture support power rail and the first power rail. The apparatus may include a holder. The holder may be configured to hold a lamina section to a fixture support.

Illustrative embodiments of apparatus and methods in accordance with the principles of the invention will now be described with reference to the accompanying drawings, which form a part hereof. It is to be understood that other embodiments maybe utilized and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 schematically illustrates a computing server such as 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of a fixture arrangement, or any component thereof, a fixture control module, or any component thereof, and an input, or any component thereof, and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
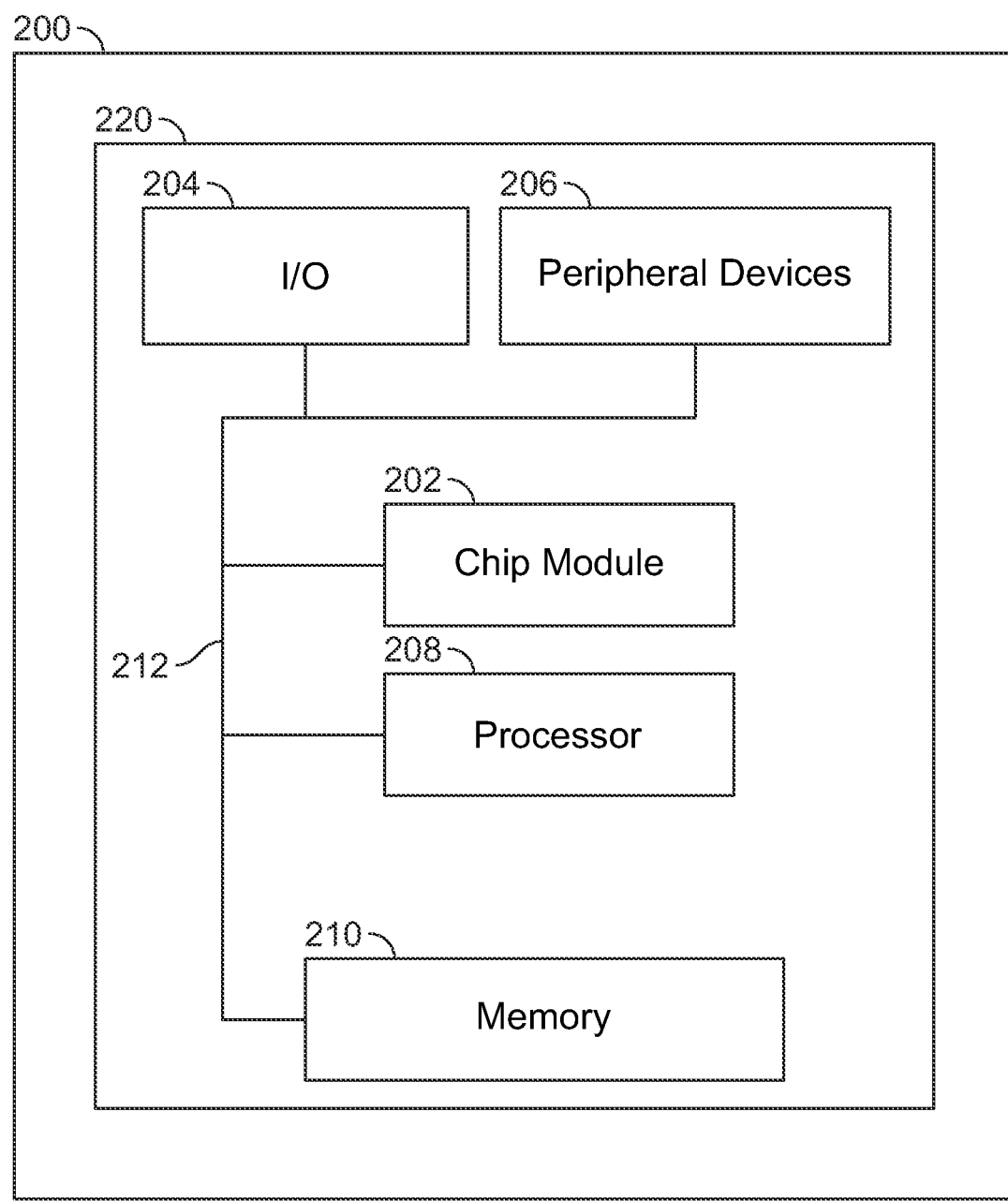
FIG. 2 shows illustrative apparatus in accordance with principles of the invention.

FIG. 2 shows an illustrative apparatus such as 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may perform functions of one or more of a fixture arrangement, or any component thereof, a fixture control module, or any component thereof, and an input, or any component thereof, and perform any other suitable tasks or other methods described herein; and machine-readable memory 210.

Machine-readable memory 210 may be configured to store in machine-readable data structures information of one or more of a fixture arrangement, or any component thereof, a fixture control module, or any component thereof, and an input, or any component thereof, and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
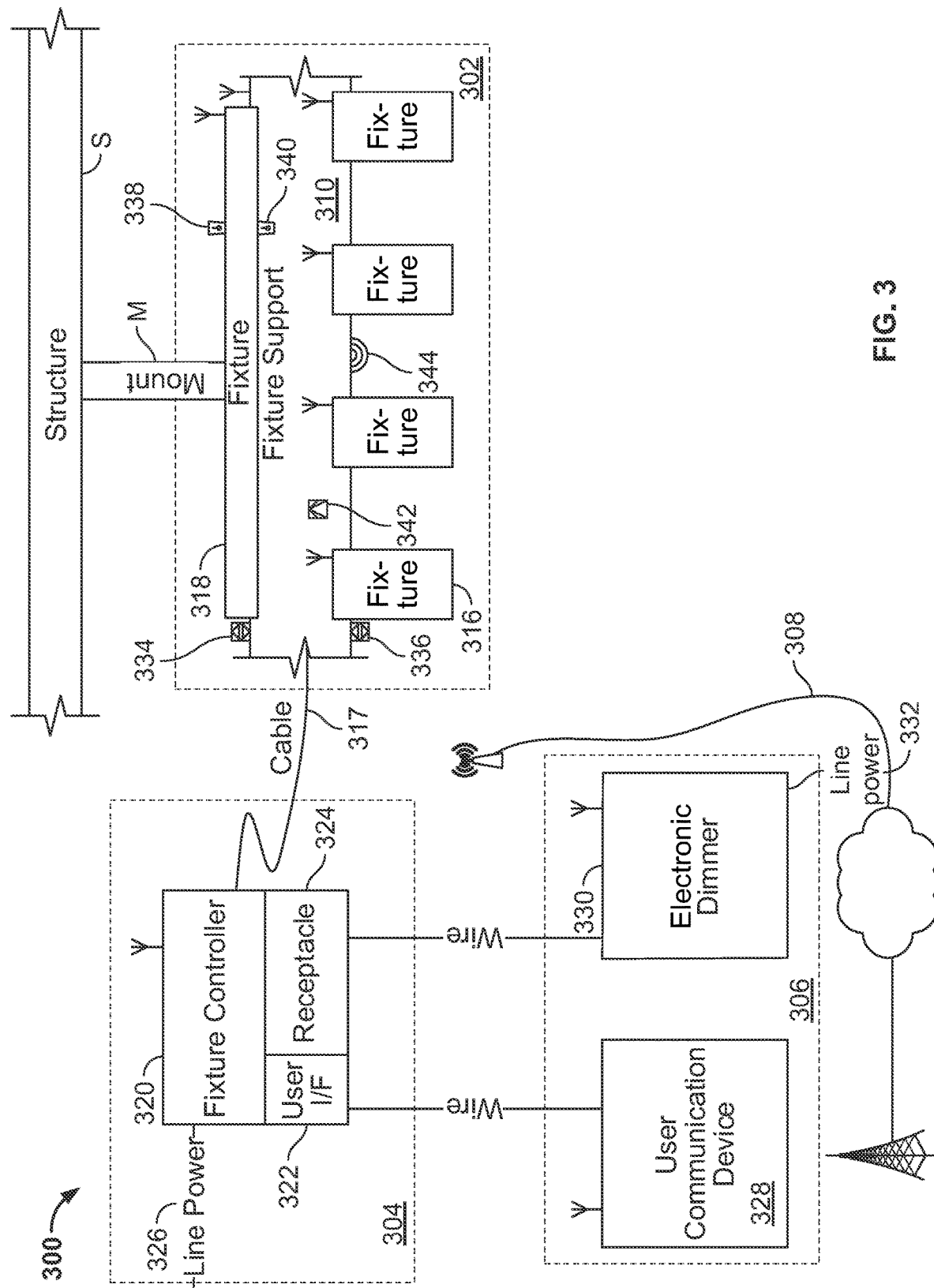
FIG. 3 shows illustrative apparatus in accordance with principles of the invention.

FIG. 3 shows illustrative architecture 300 for controlling fixtures. Architecture 300 may include fixture arrangement 302. Architecture 300 may include fixture control module 304. Architecture 300 may include inputs 306. Architecture 300 may include wide area network 308. Architecture 300 may define one or more network segments. A first segment may include inputs 306. A second segment may include fixtures such as 316 and 318 in fixture arrangement 302.

A segment may include one or more individually addressable devices. A segment may include one or more addressable groups.

Fixture arrangement 302 may include fixture support 310. Fixture arrangement 302 may be supported by mount M. Mount M may fix fixture support 310 to structure S. Structure S may include a ceiling, a wall, a beam, cabinet, a free-standing object or any other suitable structure. Fixture support 310 may support one or more fixtures such as fixture 316. Fixture support 310 may support one or more fixtures such as fixture 318. One or more of fixtures 316 and 318 may be disposed on top of fixture support 310. One or more of fixtures 316 and 318 may be disposed on bottom of fixture support 310. One or more of fixtures 316 and 318 may be disposed on a side of fixture support 310. One or more of fixtures 316 and 318 may be disposed on an end of fixture support 310.

Fixture control module 304 may include fixture controller 320. Fixture control module 304 may include user interface 322. Fixture control module 304 may include receptacle 324. Fixture controller 320 may be in electrical communication with line power 326. Line power 326 may provide two-phase or three-phase power at 110 V or 220 V, DC voltage at any suitable level, or any other suitable voltage. Receptacle 324 may receive a dimmer voltage from electronic dimmer 330. Fixture 316 may operate over a range of operational levels. Fixture 316 may operate at a maximum operational level. The dimmer voltage may have a maximum voltage. A proportion of the maximum dimmer voltage that is represented by the dimmer voltage may correspond to an operational level at which a fixture 316 is to be operated. The dimmer voltage proportion, if applied to the maximum operational level, may define the operational level at which a fixture 316 is to be operated.

The operational level may be a power level, a current level, or any other suitable level.

Input 306 may include user communication device 328. Input 306 may include electronic dimmer 330.

Fixture controller 320 may include one or more elements of apparatus shown in FIG. 1 or 2.

Fixture controller 320 may be in wired electrical communication with fixture arrangement 302. The wired electrical communication may be provided by cable 317. The wired electrical communication may provide power to fixture arrangement 302. The wired electrical communication may provide control messages to fixture arrangement 302. Fixture controller 320 may provide the power and the control messages over different conductors. Fixture controller 320 may provide the power and the control messages simultaneously over a conductor, as is done in power line control methods.

Fixture controller 320 may be in wireless communication with fixture arrangement 302. The wireless electrical communication may provide control messages to fixture arrangement 302.

Communication between fixture controller 320 and fixture arrangement 302 may be wholly or in part by wired electrical communication. Communication between fixture controller 320 and fixture arrangement 302 may be wholly or in part by wireless electrical communication. Communication between fixture controller 320 and fixture arrangement 302 may be wholly or in part by wireless communication. The wireless communication may include optical communication. The wireless communication may include acoustic communication. Communication between fixture controller 320 and fixture arrangement 302 may be partially by wired electrical communication and partially wireless communication.

Fixture control module 304 may be in communication with input 306.

User interface 322 may provide communication functions for fixture control module 304. The communication may include transmission of a user command to fixture control module 304. The communication may include transmission of fixture information to input 306. The fixture information may include a fixture parameter. The communication may be wireless. The communication may be wired.

User interface 322 may receive a user command from communication device 328. User interface 322 may include a data input device. The data input device may include one or more of a touch screen, a key pad and any other suitable device. User interface 322 may receive a user command from communication device 328. User communication device 328 may include one or more of the elements shown in FIG. 1 or 2. Control over a fixture may be passed from user communication device 328 to user interface 322. Control over a fixture may be passed from user interface 322 to user communication device 328. The control may be passed by the user. The control may be configured to be passed automatically. The control may be configured to be passed automatically upon the fulfilment of a condition. The condition may be a temporal condition. The condition may be based on a fixture parameter. The condition may be based on an ambient lighting condition. The condition may be based on any suitable condition.

Electronic dimmer 330 may provide Triac/ELV dimming. Electronic dimmer 330 may receiver electrical current from line power 332.

Arrangement 100 may include one or more sensors. The sensors may include a range sensor such as 334 and 336. The range sensor may sense a distance to a surface. The sensors may include a temperature sensor such as 338 and 340. The temperature sensor may sense an ambient temperature. The temperature sensor may sense a temperature or a differential temperature of a surface at a distance from the sensor. The sensors may include a motion sensors such as 342. The sensors may include one or more light sensors such as 344. The light sensor may sense visible light. The light sensor may sense energy associated with one or more wavelengths of light.

Figure 4:
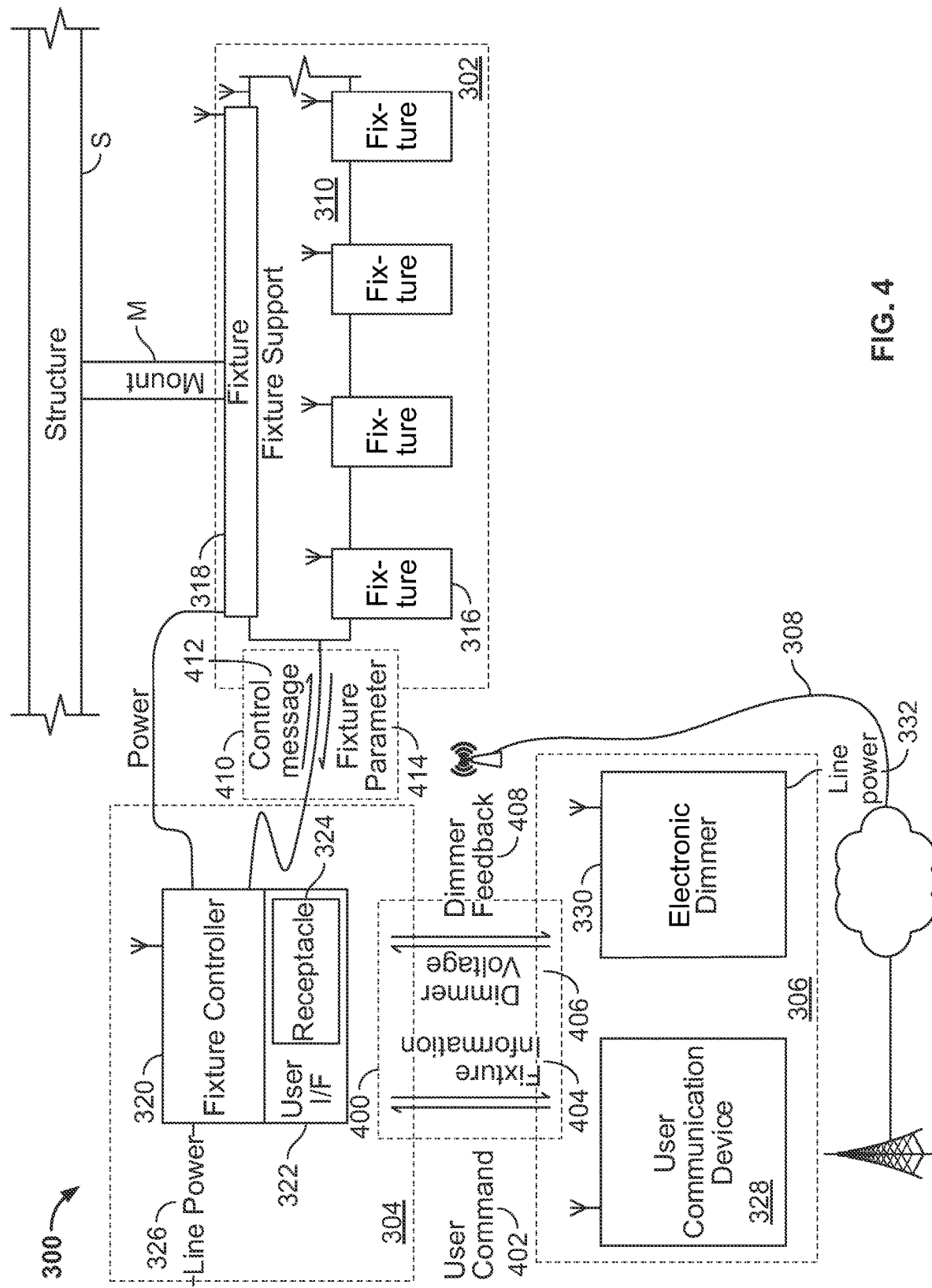
FIG. 4 shows illustrative apparatus in accordance with principles of the invention.

FIG. 4 shows illustrative communications 400 between fixture controller 320 and input 306. Illustrative communications 400 may include user command 402, fixture information 404, dimmer voltage 406, dimmer feedback 408 or any other suitable communication.

FIG. 4 shows illustrative communications 410 between fixture controller 320 and fixture arrangement 302. Communications 410 may include control messages 412 for control performance of fixtures such as 316. Communications 410 may include fixture parameter 414.

Figure 5:
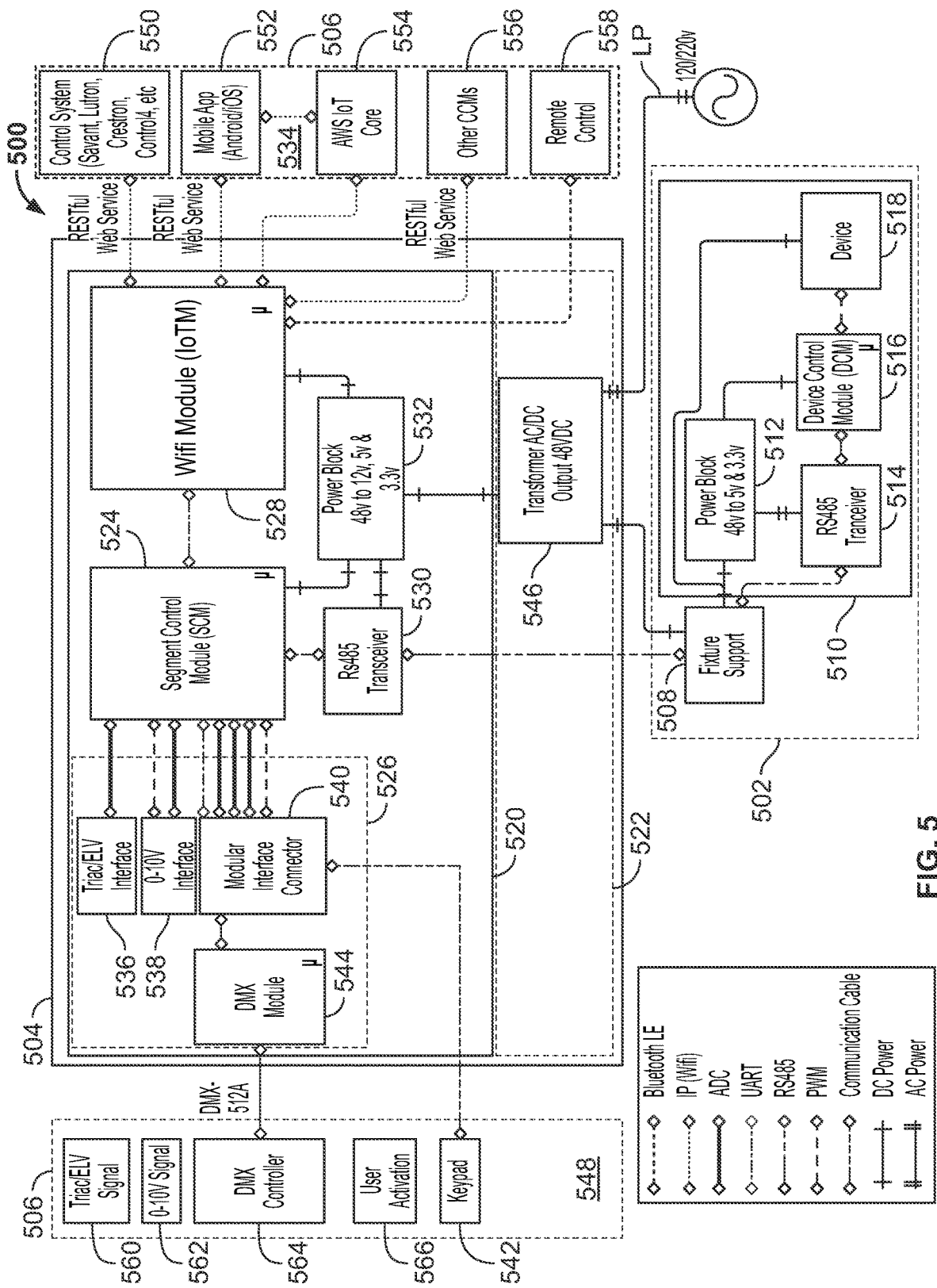
FIG. 5 shows illustrative apparatus in accordance with principles of the invention.

FIG. 5 shows illustrative architecture 500 for controlling fixtures. Architecture 500 may have one or more features in common with architecture 300 (shown in FIG. 3). Architecture 500 may include fixture arrangement 502. Architecture 500 may include fixture control module 504. Architecture 500 may include inputs 506.

Fixture arrangement 502 may include one or more fixture supports such as fixture support 508. Fixture support 508 may provide mechanical to support to one or more fixtures such as fixture 510. Fixture support 508 may convey electrical power from control module 504 to one or more fixtures such as fixture 510. Fixture support 508 may convey electrical signals from control module 504 to one or more fixtures such as fixture 510.

Fixture 510 may include power block 512. Power block 512 may receive electrical power from fixture support 508. Power block 512 may receive current from fixture support 508. The current may include DC current. The current may include AC current. Power block 512 may receive the current at a voltage. The voltage may be 48 V. Table 22 lists illustrative ranges that may include the voltage.

TABLE 22

Illustrative voltage ranges.
Illustrative voltage ranges
(V)

| Lower | Upper |
|---|---|
| 0 | 5 |
| 5 | 10 |
| 10 | 15 |
| 15 | 20 |
| 20 | 25 |
| 25 | 30 |
| 30 | 35 |
| 35 | 40 |
| 40 | 45 |
| 45 | 50 |
| 50 | 55 |
| 55 | 60 |
| 60 | >60 |
| Other suitable lower limits | Other suitable upper limits |

Power block 512 may provide output voltage to components of fixture 510. The output may include an AC voltage. The output may include a DC voltage. Power block 512 may provide different output voltages to different components of fixture 510. Table 23 lists illustrative output voltage ranges that may include the output voltage.

TABLE 23

Illustrative output voltage ranges.
Illustrative voltage ranges
(V)

| Lower | Upper |
|---|---|
| 0 | 5 |
| 5 | 10 |
| 10 | 15 |
| 15 | 20 |
| 20 | 25 |
| 25 | 30 |
| 30 | 35 |
| 35 | 40 |
| 40 | 45 |

TABLE 23-continued

Illustrative output voltage ranges.
Illustrative voltage ranges
(V)

| Lower | Upper |
|---|---|
| 45 | 50 |
| 50 | 55 |
| 55 | 60 |
| 60 | >60 |
| Other suitable lower limits | Other suitable upper limits |

The output voltage may be a step-down from 48 VDC to 5 VDC. The output voltage may be a step-down from 48 VDC to 3.3 VDC.

Fixture 510 may include transceiver 514. Transceiver 514 may receive electrical signals from fixture support 508. Transceiver 514 may receive electrical power from power block 512. The electrical power may include AC power. The electrical power may include DC power. Transceiver 514 may exchange communications 410 with fixture support 508. Transceiver 514 may exchange communications 410 with device control module 516.

Fixture 510 may include one or more device control modules such as device control module ("DCM") 516. Fixture 510 may include a device control module for each of one or more devices in fixture 510. Device control module 516 may receive electrical signals from transceiver 514. Device control module 516 may receive electrical power from power block 512. Device control module 516 may include a microprocessor. Device 518 may receive electrical signals from device control module 516. The electrical signals may cause device 518 to change a fixture parameter.

Table 24 lists illustrative functions of device control module 516.

TABLE 24

Illustrative functions of device control module 516.
Illustrative functions of device control module 516

Manage fixture behaviors during power on
Reset based on detection of segment control module ("SCM") 524
Receive control messages such as 412 from segment control module 524
Execute instructions in control messages such as 412
Transmit fixture parameters such as 414 to segment control module 524
Respond to requests from segment control module 524 for fixture status
Other suitable functions Table 25 lists illustrative resources with which control module 516 may interface.

TABLE 25

Illustrative resources.
Illustrative resources

Segment control module 524
Other suitable resources

Fixture control module 504 may include fixture controller 520. Fixture control module may include power unit 522.

Fixture controller 520 may include segment control module 524. Fixture controller 520 may include user interface 526. Fixture controller 520 may include transceiver 530. Fixture controller 520 may include a Wifi module such as 528. Fixture controller 520 may include power block 532.

Segment control module 524 may manage one or more network segments. A network segment may include a network of device control modules such as 516. Table 26 lists illustrative functions of segment control module 524.

TABLE 26

| Illustrative functions of segment control module 524. |
|---|
| Illustrative functions of segment control module 524 |
| Manage the network of device control modules such as 516 |
| Manage and maintaining the groups of devices such as 518 defined for the network. |
| Receive inputs from inputs 506. |
| Translate inputs from inputs 506 into control messages 412 |
| Translate inputs from inputs 506 into Wifi module 528 inputs |
| Manage interface(s) connected to a modular interface connector in user interface 526 |
| Provide network and device updates to Wifi module 528 |
| Manage addition of devices to network |
| Manage removal of devices from network |
| Other suitable functions |

Table 27 lists illustrative interfaces that segment control module 524 may manage.

TABLE 27

| Illustrative interfaces. |
|---|
| Illustrative interfaces |
| IoT Module |
| Device Control Module |
| 0-10 V |
| Triac/EL V Interface |
| Modular I/O-DALI |
| Modular I/O-DMX |
| Modular I/O-Multiple 0-10 V inputs |
| Other suitable interfaces |

Wifi module 528 may manage communications with channels 548 of input 506. Table 28 lists illustrative functions of Wifi module 528.

TABLE 28

| Illustrative functions of Wifi module 528. |
|---|
| Illustrative functions of Wifi module 528 |
| Manage cloud connectivity (e.g., keeping cloud resources synchronized with current fixture parameters; receiving user commands from inputs 534; dispatching user commands received from the inputs 534 to segment control module 524). |
| Advertise availability on a network of devices such as 518 for use by 3rd party systems (MDNS (multicast DNS), |
| SDDP (Simple Device Discovery Protocol) associated with inputs 534 etc.) |
| Manage interactions with devices associated with inputs 534 |
| Manage connectivity with wireless remote controls (identify remote controls that are included in inputs 534) |
| Manage update of firmware (e.g., on 516, 524, 528, 544) |
| Manage scheduled actions |
| Other suitable functions |

Table 29 lists illustrative resources with which Wi-Fi module 528 may interface.

TABLE 29

| Illustrative resources. |
|---|
| Illustrative resources |
| Segment control module 524 |
| Local IP devices (e.g., Control4) |
| Fixture controllers other than fixture controller 520, and having one or more features in common with fixture controller 520 |
| Cloud resources |
| Devices associated with inputs 534 |
| Other suitable resources |

Table 30 lists illustrative message types for communications between segment control module 524 and Wi-Fi module 528.

TABLE 30

| Illustrative message types for communications between segment control module 524 and Wi-Fi module 528. Illustrative SCM-WIFI Module communications | |
|---|---|
| Instruction(s) | Argument(s) |
| NODE_GET_PARAM | |
| WIFI Module to SCM | Fixture Address |
| SCM to WIFI Module | Data structure containing fixture parameters |
| | Device, general |
| | Device index |
| | Acknowledge or Failure Code |
| | Value contains static and dynamic parameter |
| | Value contains only dynamic parameter. |
| | Device ID |
| | YYYYMMDD(BCD) |
| | Factory list |
| | Model number |
| | Led driver model number |
| | Rate current output |
| | Percentage of customize current level (0.01%) |
| | PCB version (ASCII) |
| | Firmware: minor version, major version (BCD) |
| | Communication protocol version: minor version, major version (BCD) |
| | Light |
| | Pointer to respond list |
| | On/Off: 0: off, 1: on. |
| | Dimming curve mode, 0: linear, 1: logarithm. |
| | Soft on fade rate(s). 0: disable, |

TABLE 30-continued

Illustrative message types for communications between
segment control module 524 and Wi-Fi module 528.
Illustrative SCM-WIFI Module communications

| Instruction(s) | Argument(s) |
|---|---|
| NODE_CONTROL<br>WIFI Module to SCM<br><br><br>SCM to WIFI Module | 0 × FF: invalid function<br>Fade to black rate(s). 0: disable,<br>0 × FF: invalid function<br>Initial status level (0.01%) (power on)<br>Color temperature mix level, (0.01%)<br>Luminance level, (0.01%)<br>Channel number :( m <= 12)<br>Address and Command<br>Index 0<br>Channel 0, dimming level (0.01%)<br>Acknowledgement or<br>Failure Code<br>Index m<br>Channel m, dimming level (0.01%)<br>STM32<br>Device0 ID<br>Device1ID<br>. . .<br>DeviceN ID<br>Motion Senso<br>Pointer to respond list<br>On/Off, 0 = off. 1 = on.<br>Product lifetime (hour)<br>Trigger state, 0 = no trigger, 1 = triggered.<br>Sensitivity level.<br>Range of detection (feet)<br>Standby time(s)<br>Daylight sensor<br>Pointer to respond list<br>On/Off, 0 = off. 1 = on.<br>Trigger state, 0 = no trigger, 1 = triggered.<br>Sensitivity level<br>Product lifetime (hour)<br>Motorlight<br>Pointer to Respond List<br>On/Off, 0 = off. 1 = on.<br>Dimming curve mode, 0 = linear. 1 = logarithm.<br>Product lifetime<br>Soft on fade rate(s). 0 = disable,<br>0 × FF = invalid function.<br>Fade to black rate(s). 0 = disable,<br>0 × FF = invalid function<br>Initial status level (0.01%)<br>Color temperature mix level, (0.01%)<br>Luminance level, (0.01%)<br>Axis, 7: up, 6: down, 5: left, 4: right.<br>Lens, (0.01%)<br>Channel number(m <= 12)<br>Index0<br>Channel 0, dimming level (0.01%)<br>Index m<br>Channel m dimming level (0.01%) |
| CREATE GROUP | |
| WIFI Module to SCM | Create New Group |
| SCM to WIFI Module | Address for the newly requested group |
| GROUP CONTROL | |
| WIFI Module toSCM | Group Address and Command |
| SCM to WIFI Module | Acknowledgement or Failure Code |
| SET FIXTURE PARAMETER | |
| WIFI Module to SCM | Device ID<br>Value<br>On/Off: 0: off, 1: on.<br>Dimming curve mode, 0: linear, 1: logarithm.<br>Soft on fade rate(s). 0: disable,<br>0 × FF: invalid function<br>Fade to black rate(s). 0:disable,<br>0 × FF: invalid function<br>Initial status level scale = 0.01%<br>Luminance level scale = 0.01%<br>Color temperature mix level scale = 0.01%<br>Dimming channel (RED) Scale = 0.01% |

TABLE 30-continued

Illustrative message types for communications between
segment control module 524 and Wi-Fi module 528.
Illustrative SCM-WIFI Module communications

| Instruction(s) | Argument(s) |
|---|---|
| | Dimming channel (GREEN) Scale = 0.01% |
| | Dimming channel (BLUE) Scale = 0.01% |
| | Dimming channel (WHITE) scale = 0.01% |
| | Dimming channel (COOL) scale = 0.01% |
| | Dimming channel (WARM) scale = 0.01% |
| | Sensitivity level. |
| | Range of detection(feet) |
| | Standby time(s) |
| | Motor light Axis |
| | Motor light Lens |
| SCM to WIFI Module | 1: Successful |
| | 0: Fail |
| NODE ADD | |
| WIFI Module to SCM | 0: Add all device |
| | 2: Add motion |
| | 3: Add motor |
| | 4: Add daylight |
| | 5: Add light |
| SCM to WIFI Module | 1: Successful |
| | 0: Fail |
| NODE DELETE | |
| WIFI Module to SCM | Device ID |
| SCM to WIFI Module | Acknowledgement or Failure Code |
| NODE OTA (Over the Air (firmware update))READY | |
| WIFI Module to SCM | Device ID |
| SCM to WIFI Module | 1: Successful |
| | 0: Fail |
| NODE OTA FIRMWARE INFO | |
| WIFI Module to SCM | Device ID |
| | Packet number |
| | Checksum entire firmware updated |
| SCMto WIFI Module | Successful |
| | 0: Fail |
| SEND NODE FIRMWARE PACKET TO SCM | |
| WIFI Module to SCM | ID |
| | Packet index |
| | Firmware data |
| SCM to WIFI Module | 1: Successful |
| | 0: Fail |
| NODE OTA FINISH | |
| WIFI Module to SCM | ID |
| SCM to WIFI Module | 1: Successful |
| | 0: Fail |
| RESET | |
| WIFI Module to SCM | 1: Factory reset |
| | 0: Common reset |
| SCM to WIFI Module | 1: Successful |
| | 0: Fail |

Architecture 500 may be an architecture in which some or all communications between segment control module 524 and Wi-Fi module 528 are initiated by Wi-Fi module 528.

Architecture 500 may be an architecture in which some or all communications between segment control module 524 and Wi-Fi module 528 are initiated by segment control module 524.

Transceiver 530 may receive communications 410 from segment control module 524. Transceiver 530 may transmit communications 410 to fixture support 508. Transceiver 530 may receive power from power block 532.

Power block 532 may receive current from control power unit 522. The current may include DC current. The current may include AC current. Power block 532 may receive the current at a voltage. The voltage may be 48 V. Table 31 lists illustrative ranges that may include the voltage.

TABLE 31

Illustrative voltage ranges.
Illustrative voltage ranges
(V)

| Lower | Upper |
|---|---|
| 0 | 5 |
| 5 | 10 |
| 10 | 15 |
| 15 | 20 |

TABLE 31-continued

Illustrative voltage ranges.
Illustrative voltage ranges
(V)

| Lower | Upper |
| --- | --- |
| 20 | 25 |
| 25 | 30 |
| 30 | 35 |
| 35 | 40 |
| 40 | 45 |
| 45 | 50 |
| 50 | 55 |
| 55 | 60 |
| 60 | >60 |
| Other suitable lower limits | Other suitable upper limits |

Power block 532 may provide output voltage to components of fixture controller 520. The output may include an AC voltage. The output may include a DC voltage. Power block 532 may provide different output voltages to different components of fixture 510. Table 32 lists illustrative output voltage ranges that may include the output voltage.

TABLE 32

Illustrative output voltage ranges.
Illustrative voltage ranges
(V)

| Lower | Upper |
| --- | --- |
| 0 | 5 |
| 5 | 10 |
| 10 | 15 |
| 15 | 20 |
| 20 | 25 |
| 25 | 30 |
| 30 | 35 |
| 35 | 40 |
| 40 | 45 |
| 45 | 50 |
| 50 | 55 |
| 55 | 60 |
| 60 | >60 |
| Other suitable lower limits | Other suitable upper limits |

The output voltage may be a step-down from 48 VDC to 12 VDC. The output voltage may be a step-down from 48 VDC to 5 VDC. The output voltage may be a step-down from 48 VDC to 3.3 VDC.

User interface 526 may include Triac/ELV interface 536. User interface 526 may include 0-10 V interface 538. User interface 526 may include modular interface connector 540. User interface 526 may include DMX module 544.

Triac/ELV interface 536 may include a receptacle for a Triac/ELV connector.

0-10 V interface 538 may include a receptacle for a 0-10 V connector.

Modular interface 540 may include a receptacle for a modular interface connector.

DMX module 544 may include a microprocessor. DMX module 544 may include a receptacle for a DMX connector.

Interface 526 may include one or more sockets (not shown in FIG. 5). A socket may receive a cartridge. The cartridge may include one or more of the receptacles. Each receptacle may be configured to mate with a connector corresponding to an input 506. The cartridge may be insertable in, and removable from, the socket by the user. The cartridge may include terminals that match corresponding terminals in the socket. The socket may be used to receive signals from different inputs 506 in conjunction with a corresponding cartridge that is configured to mate with the desired input 506 and with interface 526.

Inputs 534 may include control system 550, such as those available under the tradenames Savant (available from Savant Systems, Inc., Hyannis, Mass.), Lutron (available from Lutron Electronics Co., Inc., Coopersburg, Pa.), Crestron (available from Crestron Electronics, Inc., Rockleigh, N.J.), Control4 (available from Wirepath Home Systems, LLC, dba Control4, Salt Lake city, Utah) and others.

Inputs 534 may include mobile app 552, such as a mobile app available in conjunction with operating systems available under the tradenames Android (associated with the Open Handset Alliance, Mountainview, Calif.) and iOS (available from Apple Inc., Cupertino, Calif.) and others.

Inputs 534 may include communication from AWS IoT Core 554 (available from Amazon Web Services, Inc, Seattle, Wash.).

Inputs 534 may include other fixture controllers 556. Fixture controllers of other fixtures controllers 556 may have one or more features in common with fixture controller 520.

Inputs 534 may include remote control 558. Remote control 558 may include a wall control. Remote control 558 may include one or more devices that communicate under a Bluetooth protocol. The Bluetooth protocol may be a Bluetooth LE protocol.

One or more of inputs 534 may be in communication with WIFI module 524 under a RESTful web service protocol.

Inputs 506 may include Triac/ELV unit 560.

Inputs 506 may include 0-10V connector 562.

Inputs 506 may include DMX controller 564.

Inputs 506 may include user activation input 566. User activation input 566 may include key-activation, touchscreen activation, contact-free interaction or any other suitable user activation input.

Inputs 506 may include keypad 542. Keypad 542 may include a display. Keypad 542 may include keys. Keypad 542 may include a touchscreen.

Power unit 522 may include transformer 546. Transformer 546 may receive power from power line LP. Powerline LP may provide 120 VAC, 220 VAC, or any other suitable power.

Transformer 546 may provide output power to fixture arrangement 502. Transformer 546 may provide output power to fixture controller 520. The output power may include an AC voltage. The output may include a DC voltage. Transformer 546 may provide different output power to different destinations, such as fixture arrangement 502, fixture controller 520, or an auxiliary destination. Table 33 lists illustrative output voltage ranges that may include an output voltage of transformer 546.

TABLE 33

Illustrative output voltage ranges.
Illustrative voltage ranges
(V)

| Lower | Upper |
| --- | --- |
| 0 | 5 |
| 5 | 10 |
| 10 | 15 |
| 15 | 20 |

TABLE 33-continued

Illustrative output voltage ranges.
Illustrative voltage ranges
(V)

| Lower | Upper |
|---|---|
| 20 | 25 |
| 25 | 30 |
| 30 | 35 |
| 35 | 40 |
| 40 | 45 |
| 45 | 50 |
| 50 | 55 |
| 55 | 60 |
| 60 | >60 |
| Other suitable lower limits | Other suitable upper limits |

The output voltage of transformer 546 may be a step-down from 120 VAC or 220 VAC to 48 VDC.

Communications such as 410 between segment control module 524 and device control module 516 may be transmitted along a bus. The bus may be a conductor. The conductor may connect segment control module 524 and device control module 516. Communications 410 may conform to a bus protocol.

Segment control module 524 may manage one or more groups of fixtures.

A group may include one, two or more fixtures. The group may be managed by The segment control module may manage one, two or more groups. The fixtures in a group may be controlled together as one entity. A group will may be represented as a single network address. The address may be recognized on a segment. The segment control module may communicate with the fixtures of a group using a multicast networking approach.

The segment control module may notify a fixture when the fixture has been added to a group. The segment control module may notify a fixture when the fixture has been registered to a network address of the group. The device control unit of a fixture in a group may be programmed to act on all control messages that are addressed to the group network address. The segment control module may notify a fixture when the fixture has been removed from a group. The segment control module may notify a fixture when the fixture has been de-registered from a network address of the group. The device control unit of a fixture that is not in a group may be programmed, e.g., by default, to not act on control messages that are addressed to the group network address.

Architecture 500 may include one, two or more fixture control modules such as fixture control module 504. The fixture control modules may be in a single location. The fixture control modules may be in different locations. Two or more fixture control modules that are connected to the same OSI Layer 2 network may be considered to be in the same location.

A command that sets the state of one or more fixtures in a location may be considered a "scene." Within a scene, fixture parameters of all fixtures may be set independently of other fixtures in the scene. Architecture 500 may support 200 scenes, or more, or less, in a location. A scene may be defined to include fixtures associated with one or more fixture control modules such as 520.

A scene may be used to effect a group when fixtures in different segments are desired to be managed as if they were in a single-segment group.

Table 34 lists illustrative address-related communications between segment control module 524 and device control module 516.

TABLE 34

Illustrative address-related communications between segment control module 524 and device control module 516.
ADDRESS

| Instruction(s) | Argument(s) |
|---|---|
| Set the DCM to generate a random number and delay, then reply once | |
| SCM to DCM | Illegal DCM<br>Legal DCM<br>All DCMs<br>Maximum random number<br>[x] = delay unit. Delay time = (random number * payload[x]) (ms) |
| DCM TO SCM | Pointer to RespondList |
| Set the DCM to accept current SCM ID | |
| SCM to DCM | SCM ID |
| DCM TO SCM | Acknowledge or Failure Code<br>Pointer to RespondList |
| Set the DCM to delete SCM ID accepted | |
| SCM to DCM | SCM ID |
| DCM TO SCM | Acknowledge or Failure Code<br>Pointer to RespondList |
| Get the SCM ID accepted by the DCM | |
| SCM to DCM | REQUEST_SCM_ID<br>Pointer to RespondList |
| DCM TO SCM | SCM ID |

Table 35 lists illustrative operation-related communications between segment control module 524 and device control module 516.

TABLE 35

Illustrative operation-related communications between segment
control module 524 and device control module 516.
OPERATION

| Instruction(s) | Argument(s) |
|---|---|
| Get product info | |
| SCM to DCM | GET_PRODUCT_INFOPointer to RespondList |
| DCM TO SCM | Data structure containing information on the fixture for which the DCM is housedYYYYMMDD(BCD)<br>YY<br>YY<br>MM<br>DD |

TABLE 35-continued

Illustrative operation-related communications between segment control module 524 and device control module 516.

OPERATION

| Instruction(s) | Argument(s) |
| --- | --- |
| | Pointer to FactoryList |
| | Model number (ASCII) |
| | Model number of led driver (ASCII) |
| | Rated current output level ID (mA) |
| | Percentage of customize current level (0.01%) |
| | Schematic version (ASCII), PCB version (ASCII) |
| | DeviceID |
| | Firmware version (BCD) |
| | Major |
| | Bus protocol (BCD) |
| | Major |
| | Minor |
| | Device type (Pointer to tab DeviceCategory) |
| | Initial status level (0.01%) |
| Set product info | |
| Manufacturing to DCM | Data structure containing fixture parmmetersYYYYMMDD(BCD) |
| | Pointer to FactoryList |
| | Model number (ASCII) |
| | Model number of led driver (ASCII) |
| | Rated current output Level ID (mA) |
| | Percentage of customize current Level (0.01%) |
| | Schematic version (ASCII), PCB version (ASCII) |
| | DeviceID |
| | Initial status level (0.01%) |
| DCM to specialized tool | Acknowledge or Failure Code |
| | Pointer to RespondList |
| Get current state of DCM | |
| SCM to DCM | Get_Product_State |
| | Pointer to RespondList |
| DCM (lighting fixture) to SCM | Data structure containing information on fixture state. |
| | Including: On/Off, 0 = off, 1 = On |
| | Dimming curve mode, 0 = linear. 1 = logarithm |
| | Product lifetime (hour) |
| | Soft on fade rate |
| | Fade to black rate |
| | Initial status level (0.01%) (power on) |
| | Color temperature mix level, (0.01%) |
| | luminance level, (0.01%) |
| | Channel number |
| | Channel index (Pointer to tab SetParameterTable) |
| | Channeldimming level (0.01%) ... |
| | Channel index (Pointer to tab SetParameterTable) |
| | Channel dimming level (0.01%) |
| DCM (motorize track head) to SCM | Data structure containing information on fixture state. |
| | Including: Pointer to RespondList |
| | On/Off, 0 = off, 1 = on |
| | Dimming curve mode, 0 = linear. 1 = logarithm |
| | Product lifetime (hour) |
| | Soft on fade rate |
| | Fade to black rate |
| | Initial status level (0.01%) |
| | Color temperature mix level, (0.01%) |
| | Luminance level, (0.01%) |
| | Up/down position |
| | Left/right position |
| | Lens position |
| | Channel number |
| | Channel index (Pointer to tab SetParameterTable) |
| | Channel index (Pointer to tab SetParameterTable) |
| | Channel dimming level (0.01%) |
| Set the parameter to DCM and DCM return state info | |
| SCM to DCM (lighting fixture) | |
| SCM to DCM (motion sensor) | |

TABLE 35-continued

Illustrative operation-related communications between segment control module 524 and device control module 516.
OPERATION

| Instruction(s) | Argument(s) |
|---|---|
| SCM to DCM (daylight sensor) | |
| SCM to DCM (motorize track head) | |
| DCM TO SCM | Pointer to RespondList |
| Get product lifetime from DCM | |
| SCM to DCM | Pointer to RespondList |
| DCM TO SCM | Product lifetime (hour) |

Table 36 lists illustrative group-related communications between segment control module 524 and device control module 516.

TABLE 36

Illustrative group-related communications between segment control module 524 and device control module 516.
GROUP

| Instruction(s) | Argument(s) |
|---|---|
| Set specific DCMs to join specific group | |
| SCM to DCM | Group number<br>Device1 ID<br>Device2 ID... |
| Set specific DCMs to quit from specific group | |
| SCM to DCM | Group number<br>Device1 ID<br>Device2 ID... |
| Delete specific group number from specific DCM | |
| SCM to DCM | Number of group, 999 = delete all groups<br>Group number one by one |
| DCM TO SCM | Acknowledge or Failure Code<br>Pointer to RespondList |
| Get group number from the DCM | |
| SCM to DCM | GET_GROUP_MEMBERSHIP<br>Pointer to RespondList |
| DCM TO SCM | Number of group<br>Group number one by one |

Table 37 lists illustrative broadcast-related communications between segment control module 524 and device control module 516.

TABLE 37

Illustrative broadcast-related communications between segment control module 524 and device control module 516.
BROADCAST

| Instruction(s) | Argument(s) |
|---|---|
| Broadcast operation | |
| SCM to DCM | Group number, 0 = all device operation, other value is corresponding group number<br>Pointer to tab SetParameterTable |

Table 38 lists illustrative update-related communications between segment control module 524 and device control module 516.

TABLE 38

Illustrative update-related communications between segment control module 524 and device control module 516.
UPDATE

| Instruction(s) | Argument(s) |
|---|---|
| Set DCM is ready to update firmware | |
| SCM to DCM | START_Pointer to RespondList<br>FIRMWARE_UPDATE |
| DCM TO SCM | |
| Set updated packet info to DCM | |
| SCM to DCM | Length of data content in bin file |
| DCM TO SCM | Acknowledge or Failure Code<br>Pointer to RespondList |
| Set specific packet to DCM | |
| SCM to DCM | Specific packet number<br>Corresponding content |
| DCM TO SCM | Acknowledge or Failure Code<br>Pointer to RespondList |

TABLE 38-continued

Illustrative update-related communications between segment control module 524 and device control module 516.
UPDATE

| Instruction(s) | Argument(s) |
|---|---|
| Set DCM to end update | |
| SCM to DCM | Pointer to RespondList |
| | END_FIRMWARE_UPDATE |
| DCM TO SCM | |

Figure 6:
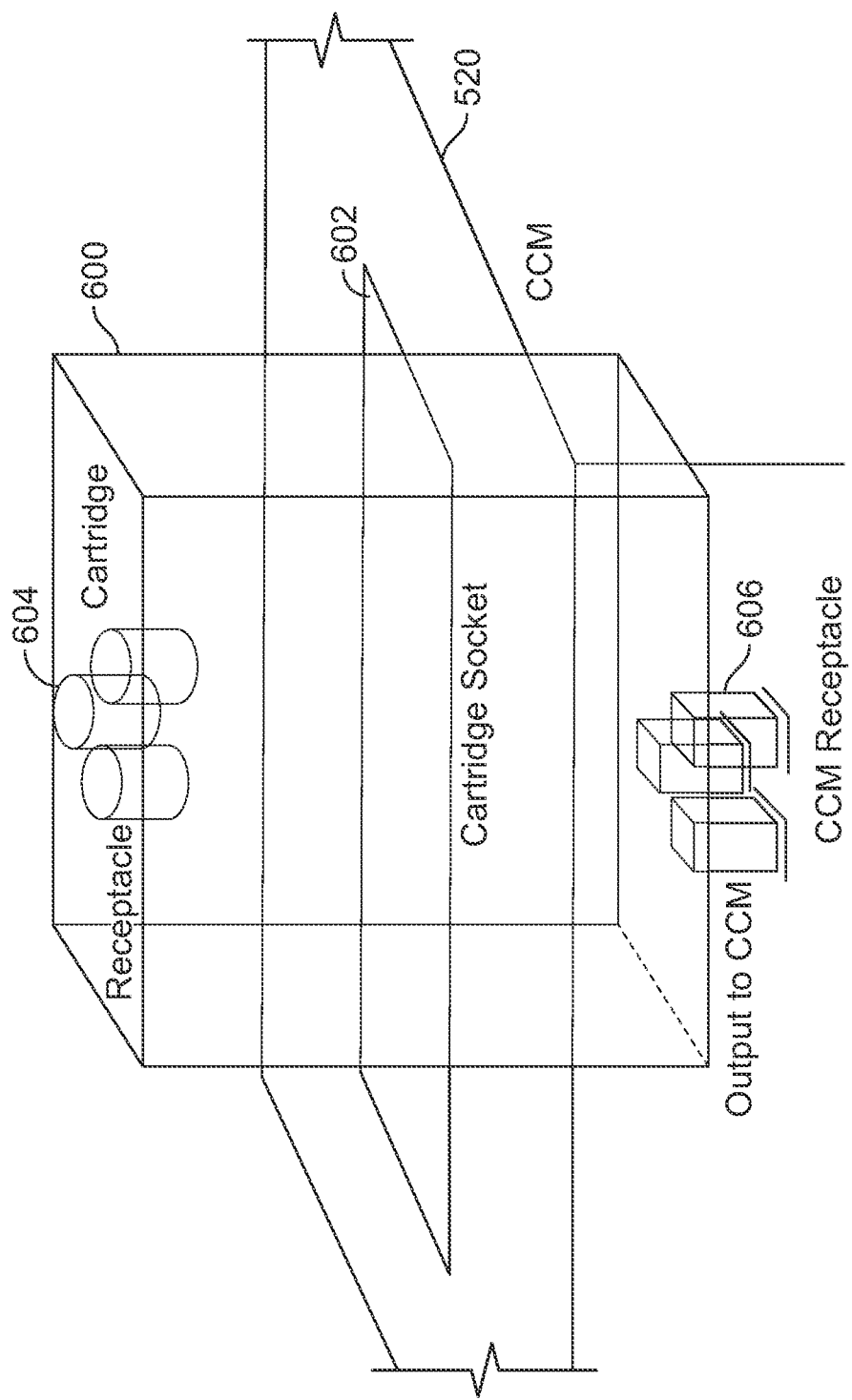
FIG. 6 shows illustrative apparatus in accordance with principles of the invention.

FIG. 6 shows illustrative cartridge 600. Cartridge 600 is seated in socket 602 in interface 526 (shown in FIG. 5). Cartridge 600 includes receptacle 604 for receiving an input 506. Cartridge 600 may include terminals 606 for communicating electronically with interface 526 of fixture controller 520. Receptacles 604 may be configured to match a standard commercially available connector corresponding to one of inputs 506.

Figure 7:
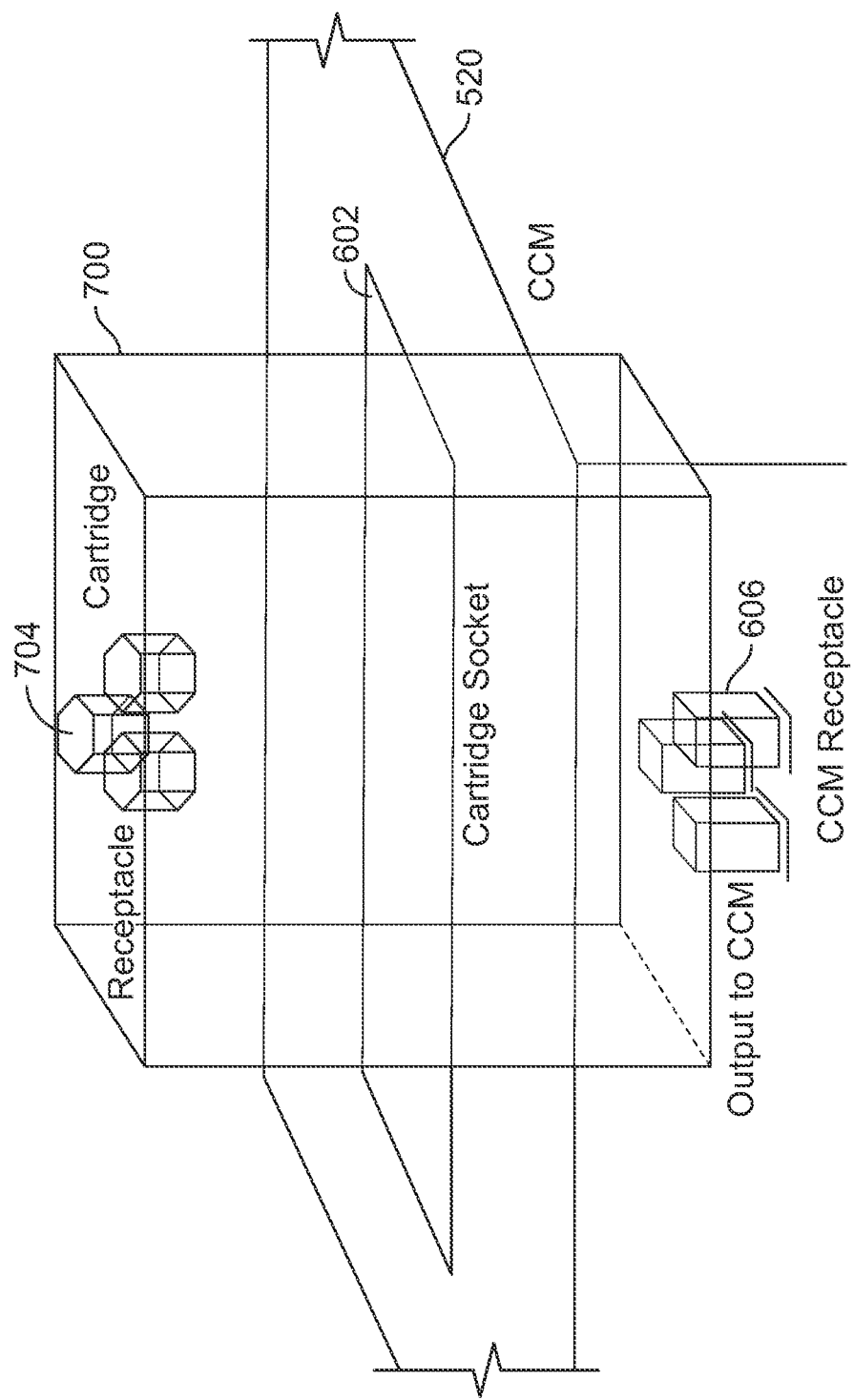
FIG. 7 shows illustrative apparatus in accordance with principles of the invention.

FIG. 7 shows illustrative cartridge 700. Cartridge 700 is seated in socket 602 in interface 526 (shown in FIG. 5). Cartridge 700 includes receptacle 704 for receiving an input 506 of fixture controller 520. Cartridge 700 includes terminals 606 for communicating electronically with interface 526. Receptacles 704 may be configured to match a standard commercially available connector corresponding to one of inputs 506.

Receptacle 704 may be configured such that it cannot receive a connector that may be received by receptacle 604. Receptacle 604 may be configured such that it cannot receive a connector that may be received by receptacle 704.

Figure 8:
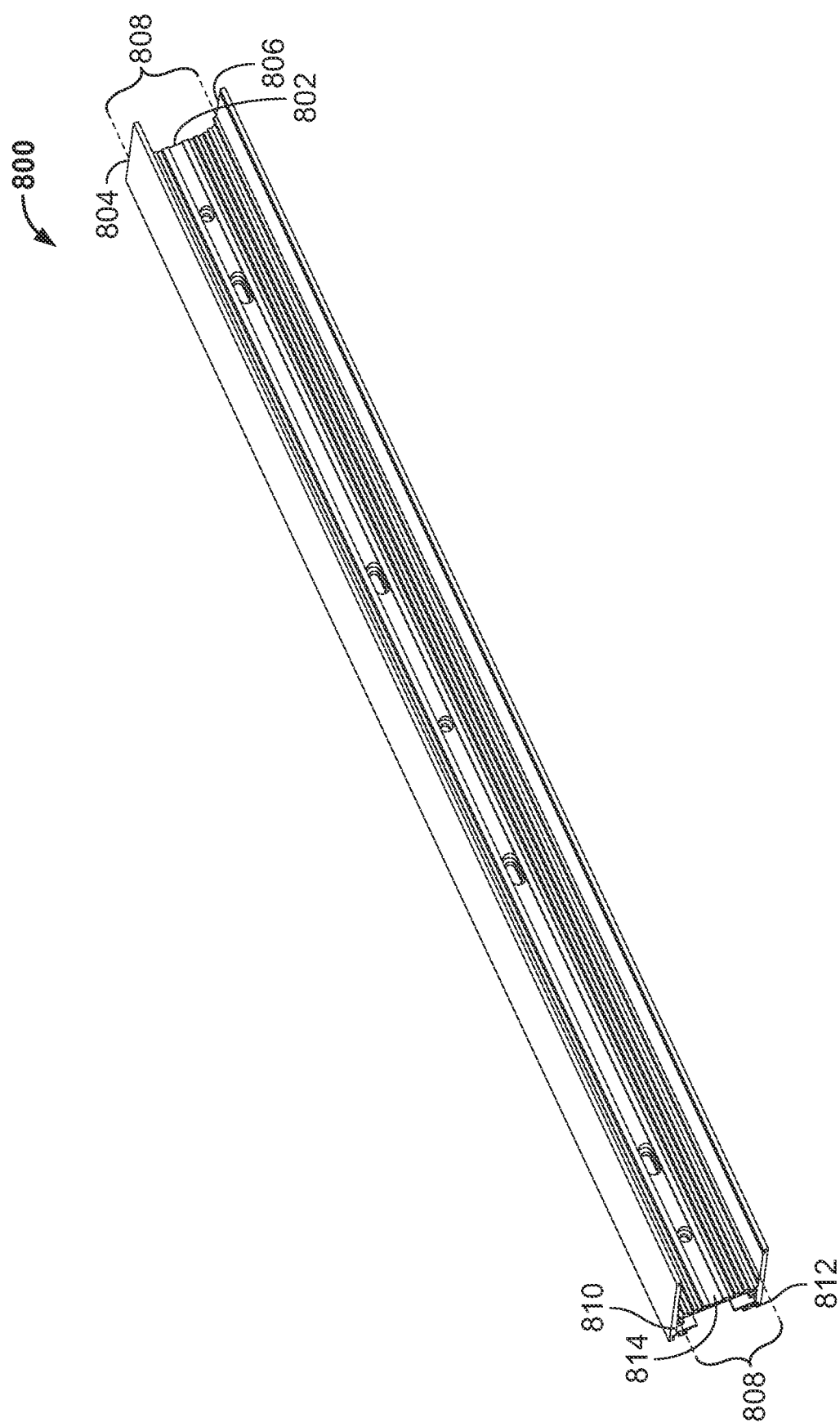
FIG. 8 shows illustrative apparatus in accordance with principles of the invention.

FIG. 8 shows illustrative fixture support 800. Fixture support 800 may have one or more features in common with fixture support 310 (shown in FIG. 3). Fixture support 800 may include spine 802. Fixture support may include panel 804. Fixture support may include panel 806. Spine 802, panel 804 and panel 806 may define fixture docking area 808. Spine 802, panel 804 and panel 806 may define connector slot 810. Panel 804 and panel 806 may define fixture slot 812. Fixtures such as 316 (shown in FIG. 3) may be docked in docking area 808. Fixtures such as 318 (shown in FIG. 3) may be mounted in fixture slot 812. Fixture docking tier 814 may be disposed between panel 804 and 806.

Figure 9:
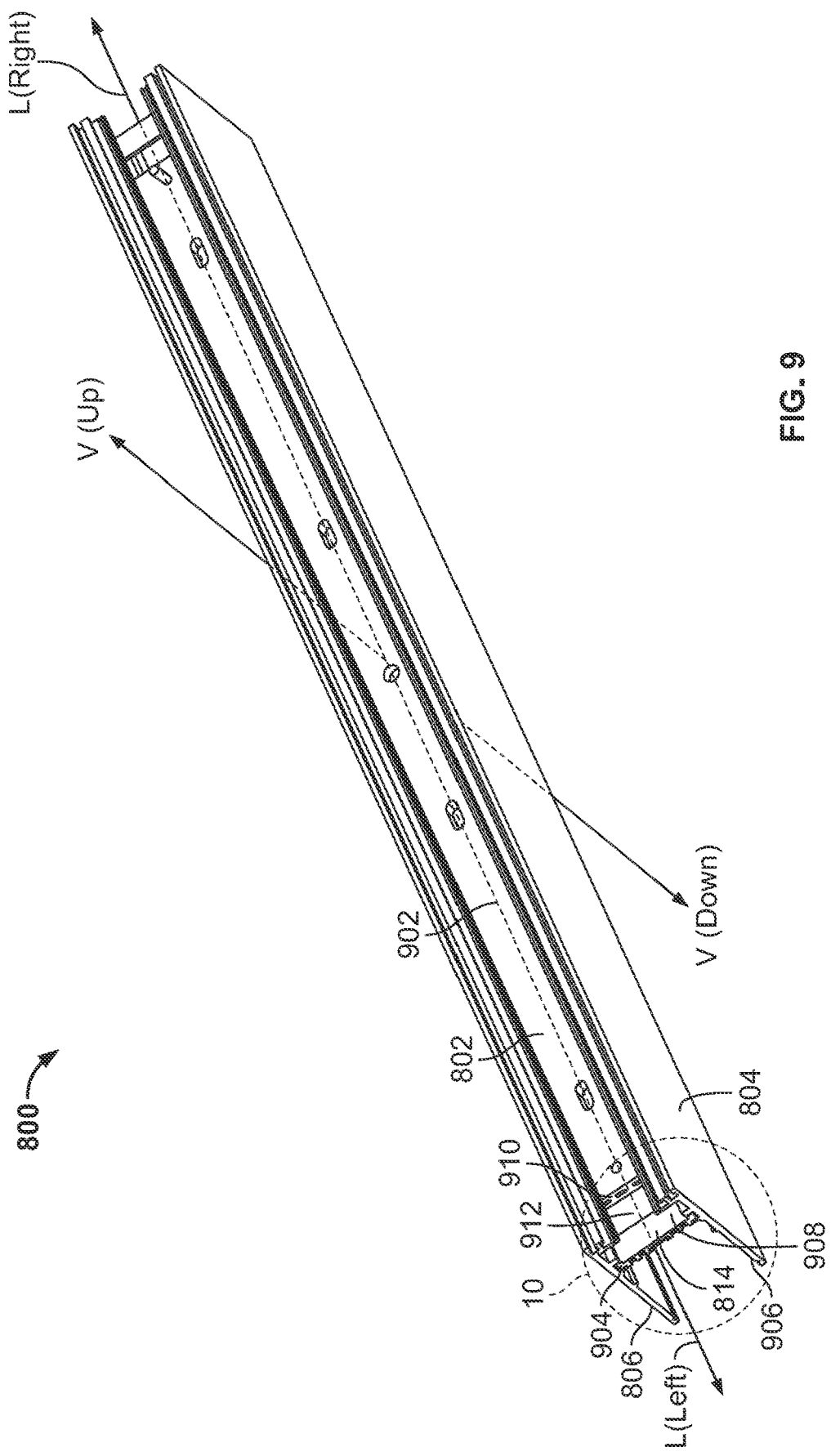
FIG. 9 shows illustrative apparatus in accordance with principles of the invention.

FIG. 9 is a view of fixture support 800 that is different from that shown in FIG. 8. FIG. 9 shows that spine 802 may include bridge 902. Bridge 902 may span between panel 804 and panel 806. Fixture docking tier 814 may extend longitudinally to the left along longitudinal direction L (left). End 904 of tier 814 may be flush with end 906 of fixture support 800. Tier 814 may include platform 908. Tier 814 may include connection field 912. Bridge 902 may include abutment 910. Abutment 910 may be set back to the right along direction L (right) from end 904. The directions L (left) and R (right) are for description of relative positions within fixture support 800, and do not necessarily define an orientation of fixture support 800 relative to any other frame of reference.

Figure 10:
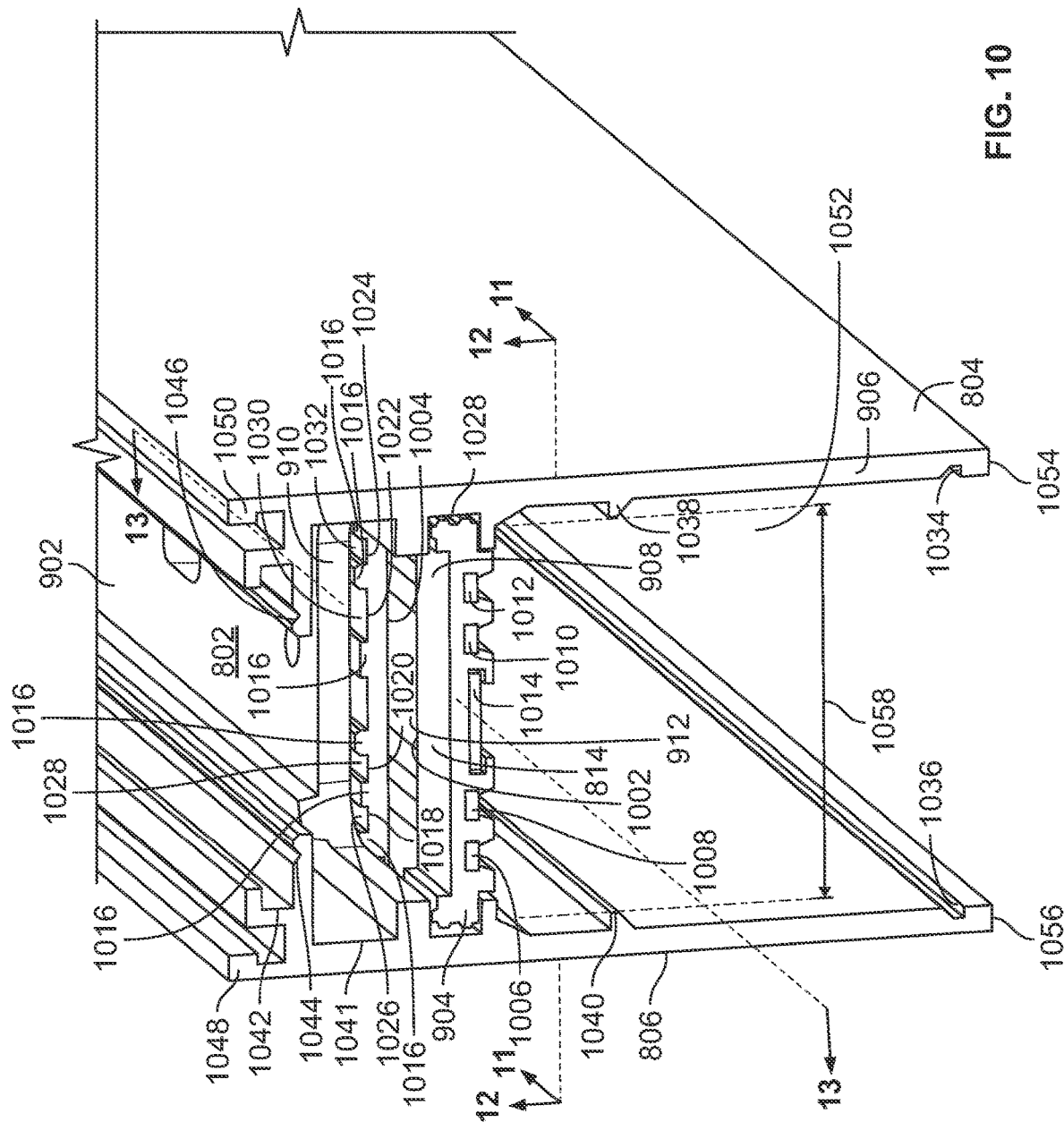
FIG. 10 is partial view "10," approximately identified in FIG. 9.

FIG. 10 shows that platform 908 may be disposed above, in direction V (up), from connection field 912. The directions V (up) and V (down) are for description of relative positions within fixture support 800, and do not necessarily define an orientation of fixture support 800 relative to any other frame of reference. Platform 908 may include abutment 1002 between platform 908 and connection field 912.

Tier 814 may include back-plate 1004. Back-plate 1004 may extend above, and define a right limit of, connection field 912. Connection field 912 may provide access, from above tier 814, to conductors in tier 814. A connector bridging from another fixture support to fixture support 800 may thus be made without interfering with fixture docking area 808 below tier 814.

Docking tier 814 may include conductor 1006. Docking tier 814 may include conductor 1008. Docking tier 814 may include conductor 1010. Docking tier 814 may include conductor 1012. A pair of the conductors, one positive and one negative, may be a communication bus that may transmit communications 410 (shown in FIG. 4). A pair of the conductors, one positive and one negative, may be a power rail that may transmit power from transformer 546 (shown in FIG. 5). Docking tier 814 may include magnetic strip 1014. Back-plate 1004 may include ribs such 1016. Back-plate 1004 may include grooves 1018, 1020, 1022 and 1024. Together with bridge 902, grooves 1018, 1020, 1022 and 1024 may form slots 1026, 1028, 1030 and 1032.

Panel 804 may include groove 1034. Panel 806 may include groove 1036. The grooves may engage with a complementary feature on a fixture such as 316 (shown in FIG. 3). Panel 804 may include ridge 1038. Panel 806 may include ridge 1040. The ridges may engage with a complementary feature on the fixture.

Docking tier 814 may be disposed in slot 1028.

Fixture support 800 may include slot 1041. Slot 1041 may be above tier 814. Slot 1041 may receive a fixture support connector.

Fixture support 800 may include slot 1042. Slot 1042 may be above slot 1041. Slot 1042 may include grooves 1044 and 1046. Slot 1042 may receive a fixture such as fixture 318 (shown in FIG. 3).

Fixture support 800 may include overhangs 1048 and 1050.

Fixture support 800 may define U-channel 1052. U-channel 1052 may be defined by docking tier 814, panel 804 and panel 806. Panel 804 may include distal edge 1054. Panel 806 may include distal edge 1056. The fixture may be retractable within U-channel 1052. A lowest extreme of the fixture may be retracted above distal edge 1054. A lowest extreme of the fixture may be retracted above distal edge 1056. The lowest extreme may be a lip.

Fixture support 814 may have docking area width 1058.

Figure 11:
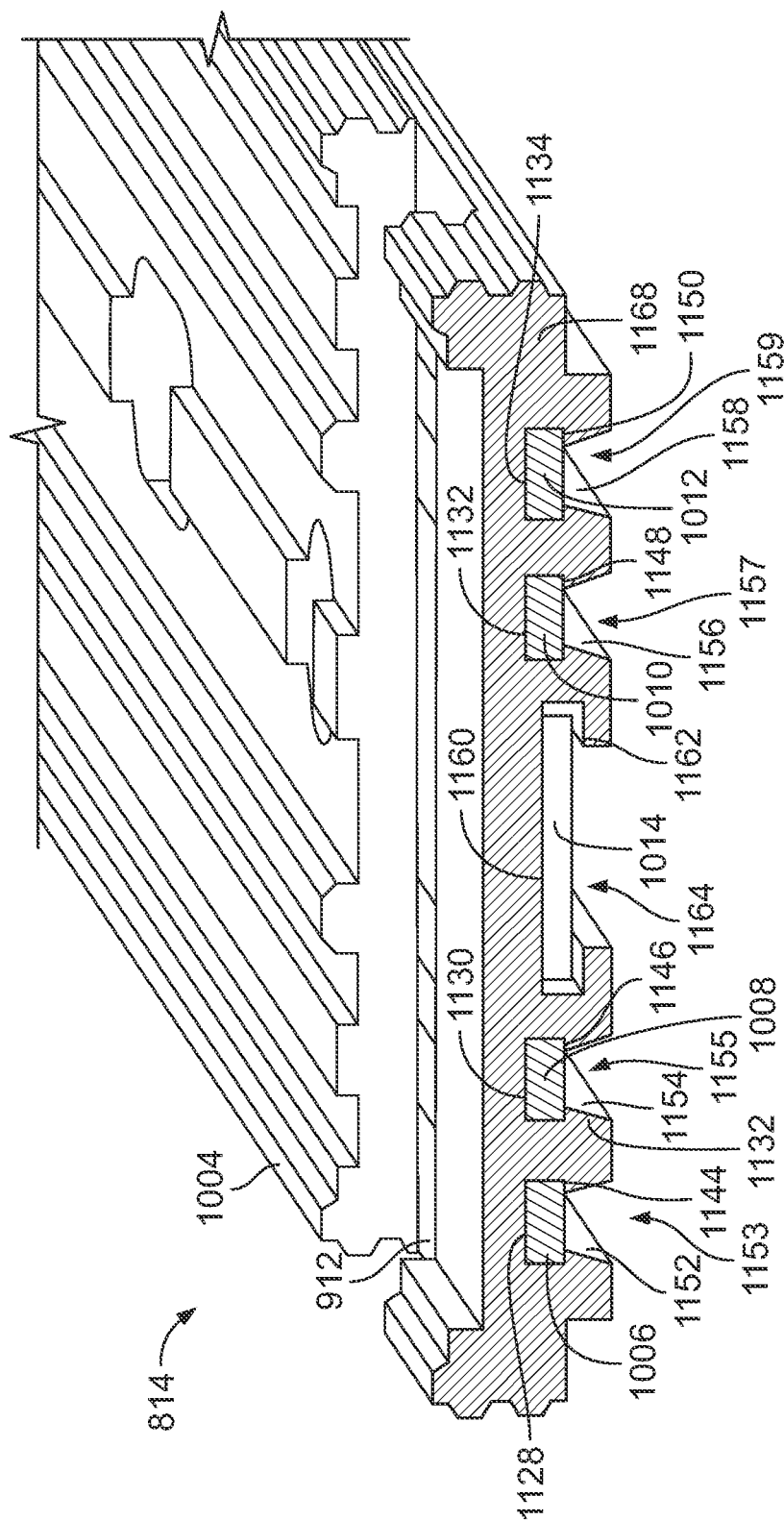
FIG. 11 is a partial cross-sectional view taken along lines 11-11 in FIG. 10.

FIG. 11 shows that conductors 1006, 1008, 1010 and 1012 may be disposed in grooves 1128, 1130, 1132 and 1134, respectively. Tier 814 may include lips 1144, 1146, 1148 and 1150, corresponding to grooves 1128, 1130, 1132 and 1134. The lips may retain the conductors in tier 814. Tier 814 may include tapers 1153, 1155, 1157 and 1159, corresponding to grooves 1128, 1130, 1132 and 1134. A taper may guide a terminal from a fixture such as 316 toward a conductor. A taper may guide a terminal from a fixture such as 316 into electrical communication with a conductor. A taper may guide a terminal from a fixture such as 316 into direct contact with a conductor. Gaps 1152, 1154, 1156, and 1158 may provide access for direct contact between the fixture and a conductor.

Magnetic strip 1014 may be disposed in groove such as 1160. Tier 814 may include lip 1162 for retaining magnetic strip 1014. Gap 1164 may expose magnetic strip 1014. Gap 1164 may have a magnetic permeability that is less than that of body 1168 of tier 814. Gap 1164 may be a gap that includes no solid material.

Figure 12:
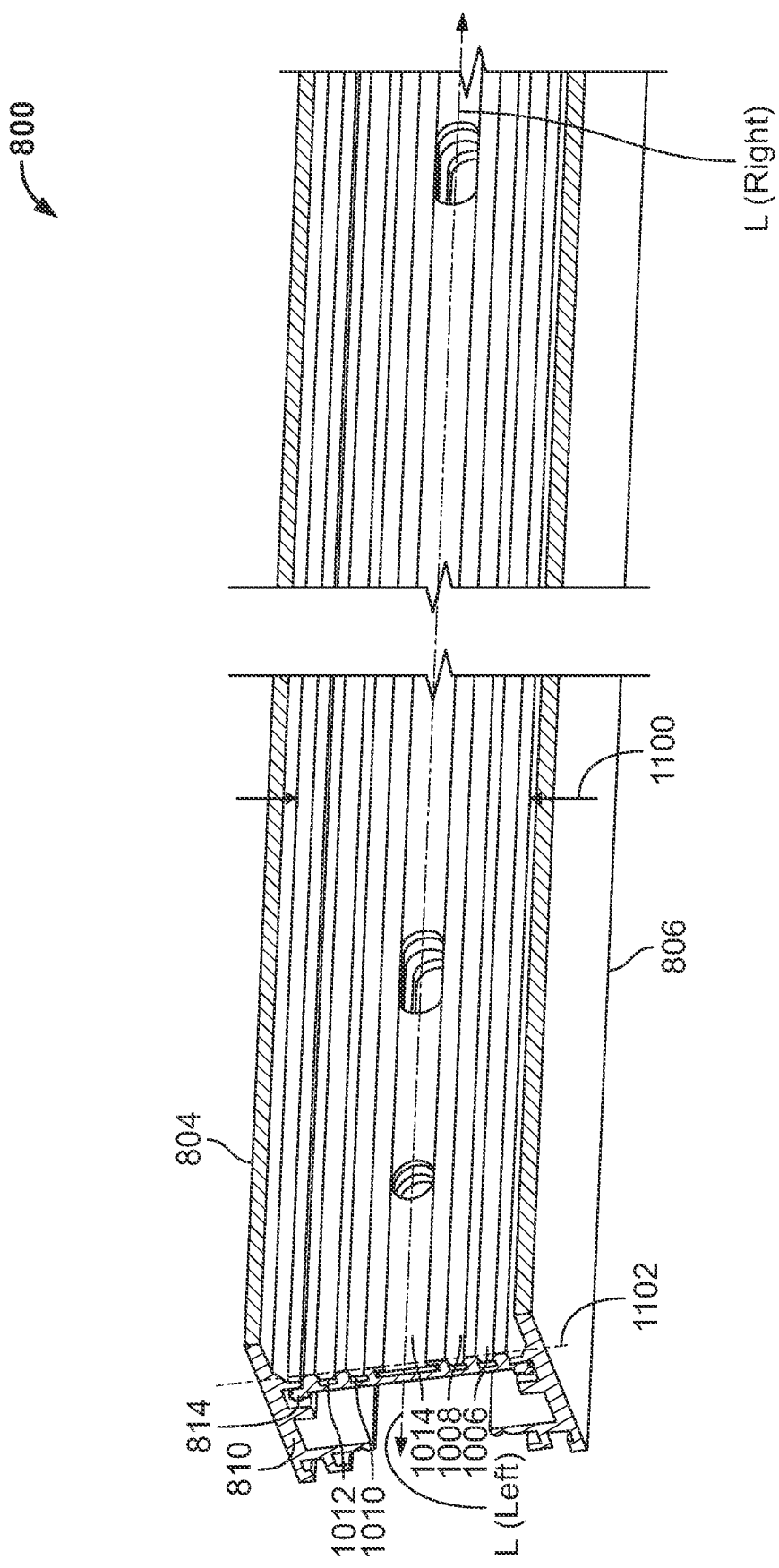
FIG. 12 is a partial cross-sectional view taken along lines 11-11 and 12-12 in FIG. 10.

FIG. 12 shows that docking area 808 (shown in FIG. 8) may have width 1100. Width 100 may be commensurate with docking area width 1058. Docking area 808 may have left end 1102. Left end 1102 may be coincident with end 906. Docking area 808 may have a counterpart end on an opposite end (not shown) of fixture support 800. One or more of conductors 1006, 1008, 1010 and 1012, grooves 1128, 1130, 1132 and 1134, tapers 1153, 1155, 1157 and 1159, gaps 1152, 1154, 1156, and 1158, groove 1160 and gap 1164 may extend between left end 1102 and the opposite right end of fixture support 800.

Figure 13:
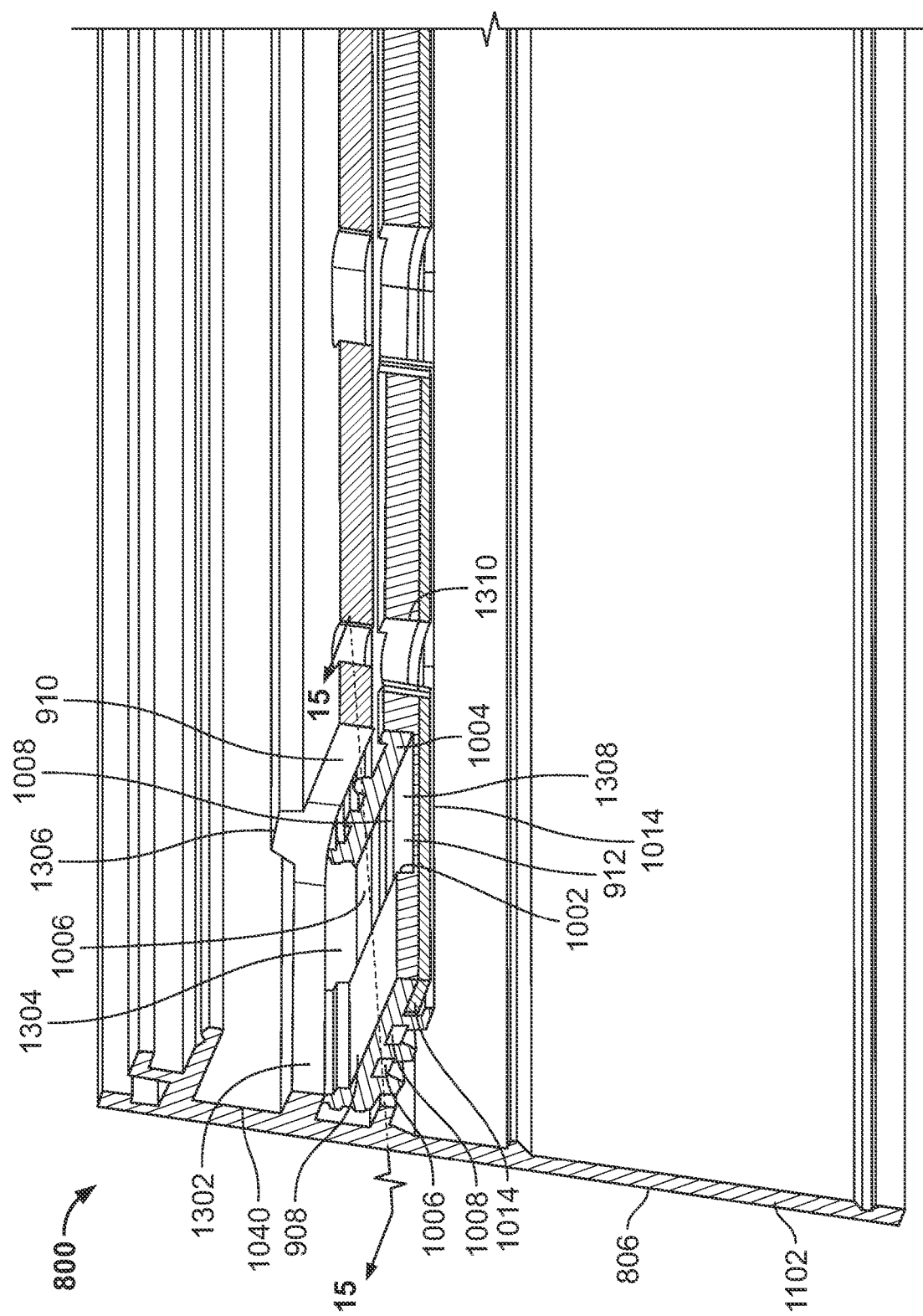
FIG. 13 is a partial cross-sectional view taken along lines 11-11 and 13-13 in FIG. 10.

FIG. 13 shows that support 800 may include wall 1302. Wall 1302, a facing, opposite wall (not shown) on panel 804, and abutment 910 may form bay 1304 in which a connector may be lodged. Rail 1306 may be mated with a corresponding groove on the connector. Another rail (not shown) on panel 804 may be mated with another corresponding groove on the connector. The panels and rails may secure the connector against rotation about a longitudinal axis in directions L. The panels and rails may secure the connector against rotation about a vertical axis in directions V.

Abutment 1002, field 912 and back-plate 1004 may form recess 1308 in which the connector can make electrical contact with conductors. Abutment 1002 may be oriented at an angle with respect to field 912. The angle may be sufficiently steep to retain the connector. The angle may be sufficiently shallow to allow the connector to be withdrawn by a user by hand by overcoming resistance of the slope.

Fixture support 800 may include hole 1310. Hole 1310 may provide clearance for a fastener. The fastener may be threaded for engagement with the connector after the connector is inserted in fixture support 800.

Figure 14:
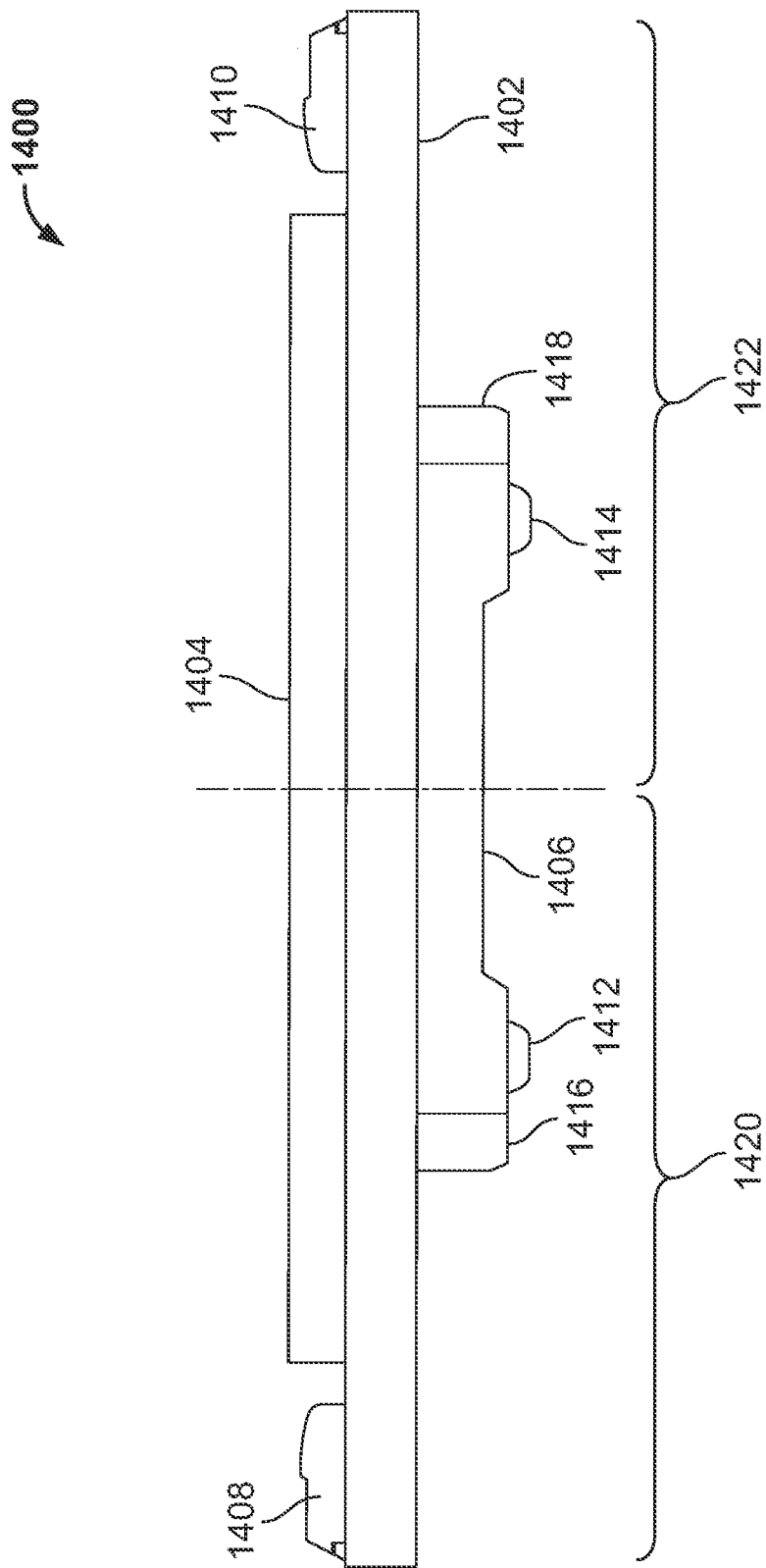
FIG. 14 shows illustrative apparatus in accordance with principles of the invention.

FIG. 14. shows illustrative connector 1400. Connector 1400 may include base 1402. Connector 1400 may include cap 1404. Connector 1400 may include cover 1406. Connector 1400 may include port 1408. Connector 1400 may include port 1410. Connector 1400 may include contact 1412. Connector 1400 may include contact 1414. Contact 1412 may be in electrical communication with contact 1414. A contact may include a sprung terminal.

Cover 1406 may include foot 1416. Cover 1406 may include foot 1418.

Contact 1412 may be biased to extend through a slot (not shown) in foot 1416. Contact 1414 may be biased to extend through a slot (not shown) in foot 1418.

Brace 1420 may encompass a first region of connector 1400. Brace 1422 may encompass a second region of connector 1400. Brace 1422 may have one or more features in common with brace 1420.

Brace 1424 may be inserted into slot 1041 to lodge brace 1424 in fixture support 800. Foot 1418 may be disposed in recess 1308. Contact 1414 may be urged downward into contact with a conductor in field 912.

Brace 1422 may provide to, or receive from, brace 1420 electrical continuity. Brace 1422 may provide to, or receive from, brace 1420 mechanical stability. When brace 1422 and brace 1422 are lodged in ends of different fixture supports, the fixture supports may be abutted without encroaching upon the fixture docking area of either fixture support.

Figure 15:
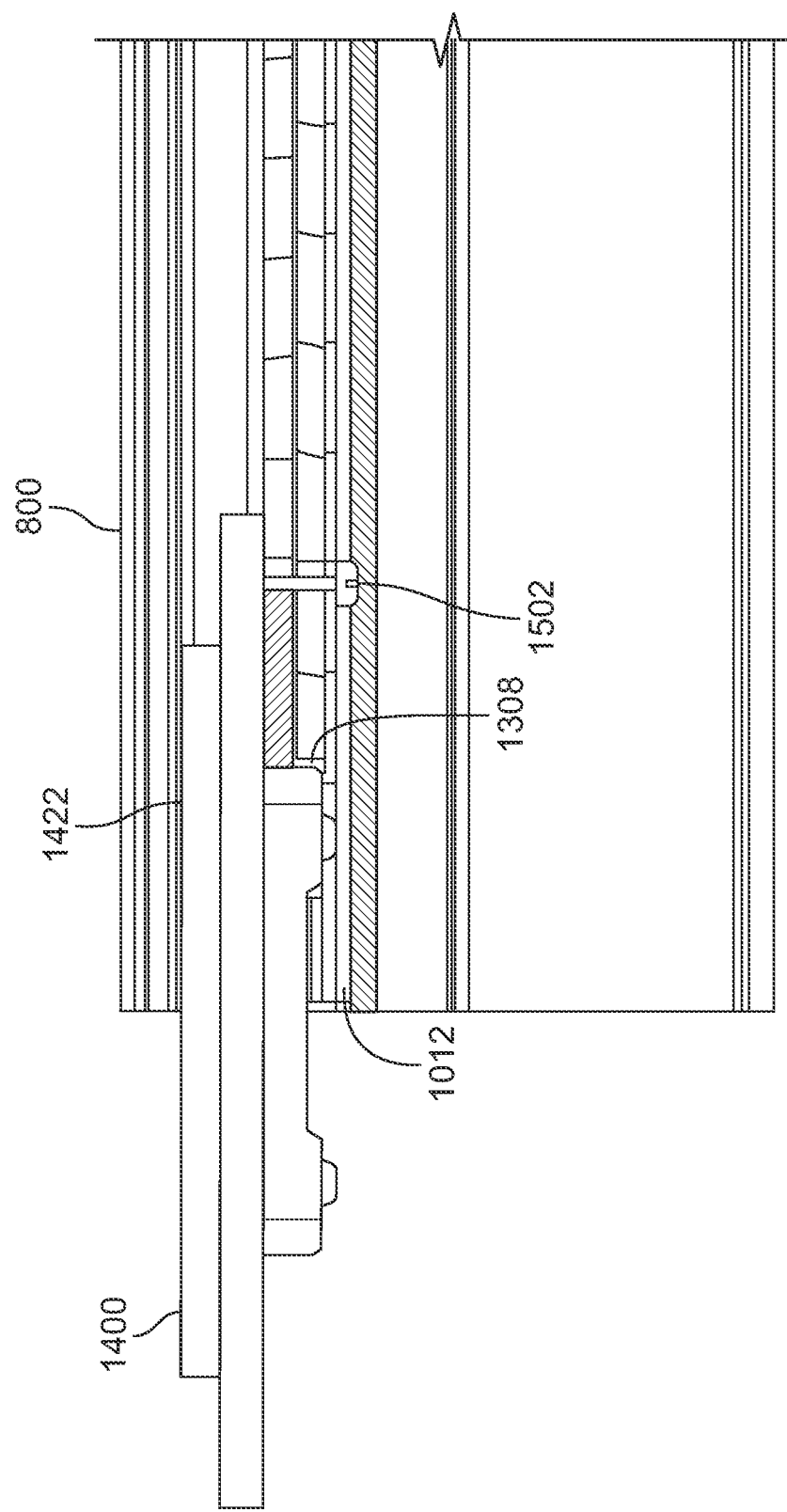
FIG. 15 is a partial cross-sectional view taken along lines 15-15 in FIG. 13.

FIG. 15 shows brace 1422 lodged in fixture support 800 (shown in partial cross-section). Screw 1502 may fasten brace 1422 to fixture 800.

Figure 16:
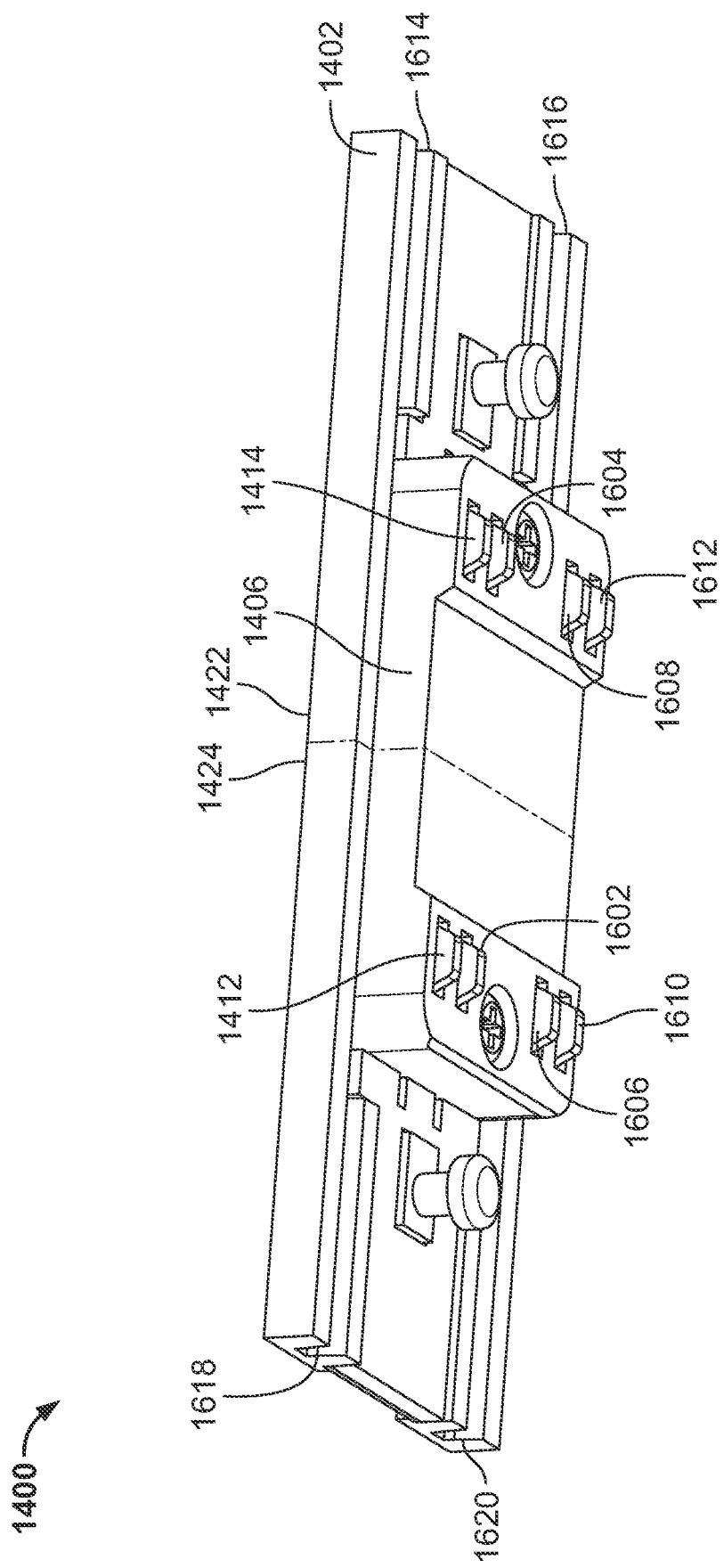
FIG. 16 shows illustrative apparatus in accordance with principles of the invention.

FIG. 16 shows connector 1400.

FIG. 16 shows that connector 1400 may include contacts 1602, 1606 and 1610, which may be in electrical communication, respectively, with contacts 1604, 1608 and 1612. Contacts 1414, 1604, 1608 and 1612 may be aligned, respectively, with conductors 1006, 1008, 1010 and 1012. Contacts 1412, 1602, 1606 and 1610 may be aligned with conductors disposed in a different fixture connector and corresponding to conductors 1006, 1008, 1010 and 1012 to provide electrical communication between conductors 1006, 1008, 1010 and 1012 and the corresponding conductors.

Grooves 1614 and 1616 may engage, respectively, rail 1306 and the complementary rail in fixture support 800. Grooves 1618 and 1620 may engage, respectively, in a different fixture support, a rail corresponding to rail 1306 and a rail corresponding to the complementary rail in fixture support 800.

Figure 17:
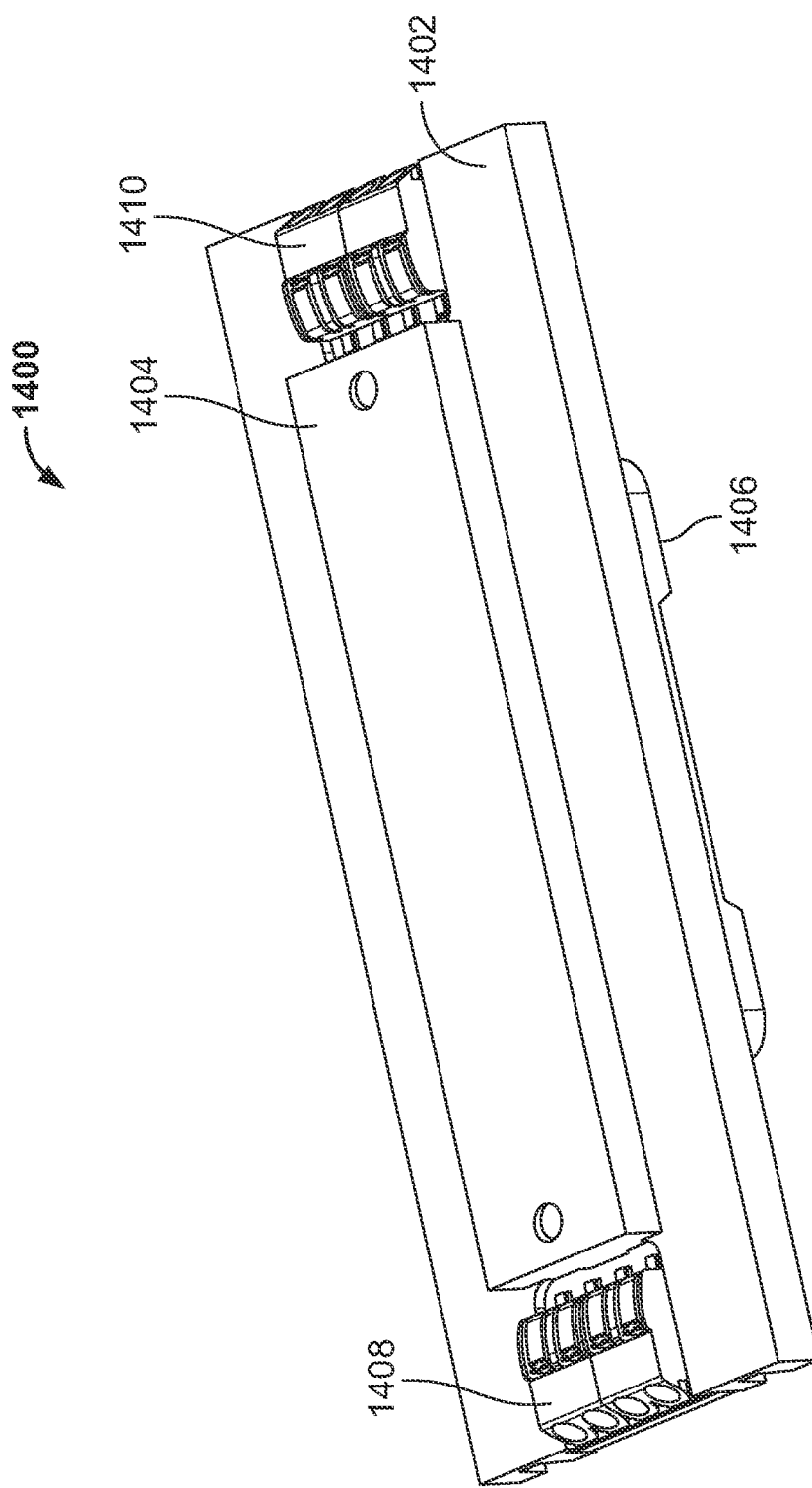
FIG. 17 shows illustrative apparatus in accordance with principles of the invention.

FIG. 17 shows that ports 1408 and 1410 may include terminals. Each one of the terminals in port 1408 may be in electrical communication with a corresponding one of contacts 1412, 1602, 1606 and 1610. Each one of the terminals in port 1410 may be in electrical communication with a corresponding one of contacts 1414, 1604, 1608 and 1612.

Figure 18:
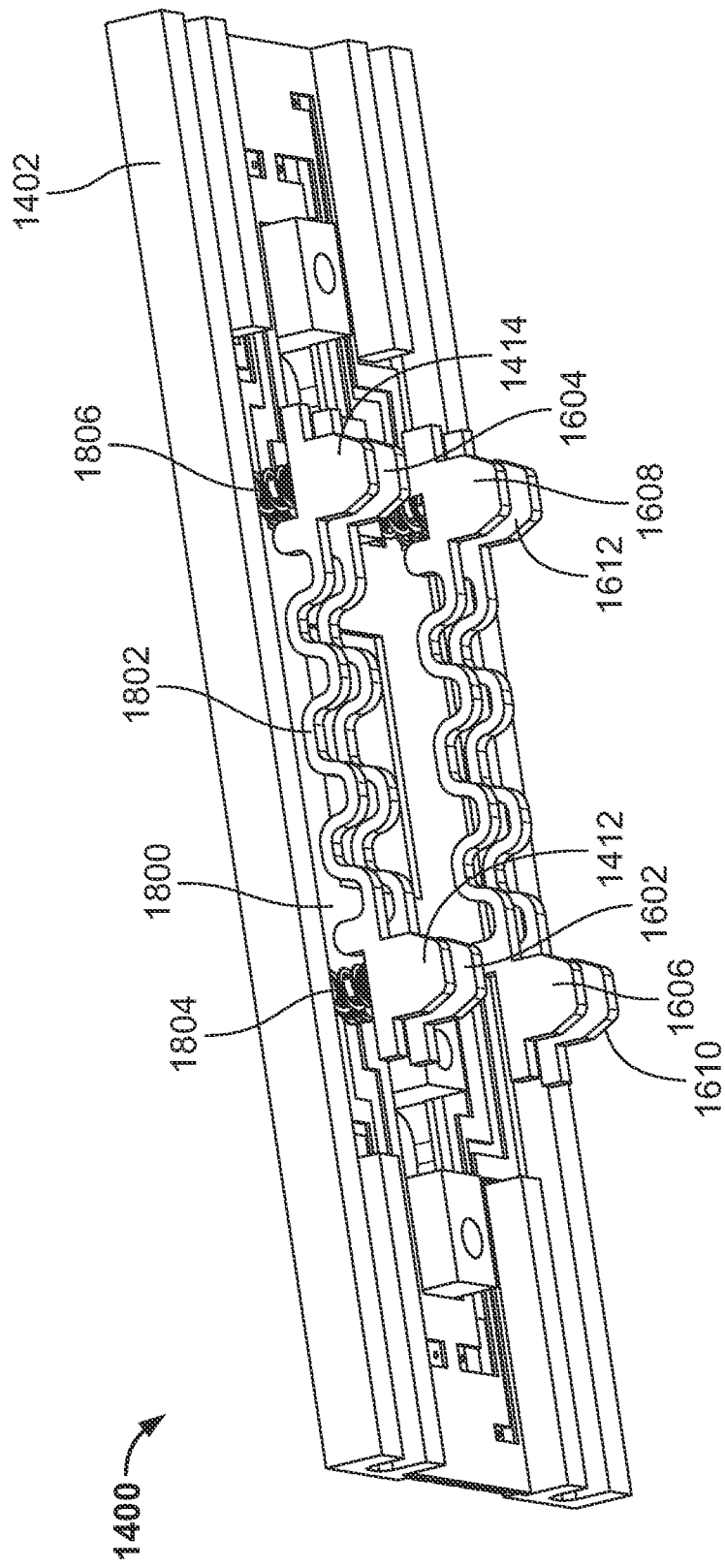
FIG. 18 shows illustrative apparatus in accordance with principles of the invention.

FIG. 18 shows base 1402 with cover 1406 removed. Base 1402 may include plate 1800. Plate 1800 may include conductors for providing electrical communication between the contacts and corresponding terminals in ports 1408 and 1410. Contacts 1412 and 1414 may be connected by crosspiece 1802. Contact 1412 may be suspended from plate 1800 by spring 1804. Contact 1414 may be suspended from plate 1800 by spring 1806. The other contacts may be connected by corresponding cross-pieces. The other contacts may be suspended by corresponding springs.

The springs may allow the contacts to retract in response to contact with platform 908 upon insertion of connector 1400 into fixture support 800. The springs may retain the contacts in contact with the connectors when head is in recess 1308.

Figure 19:
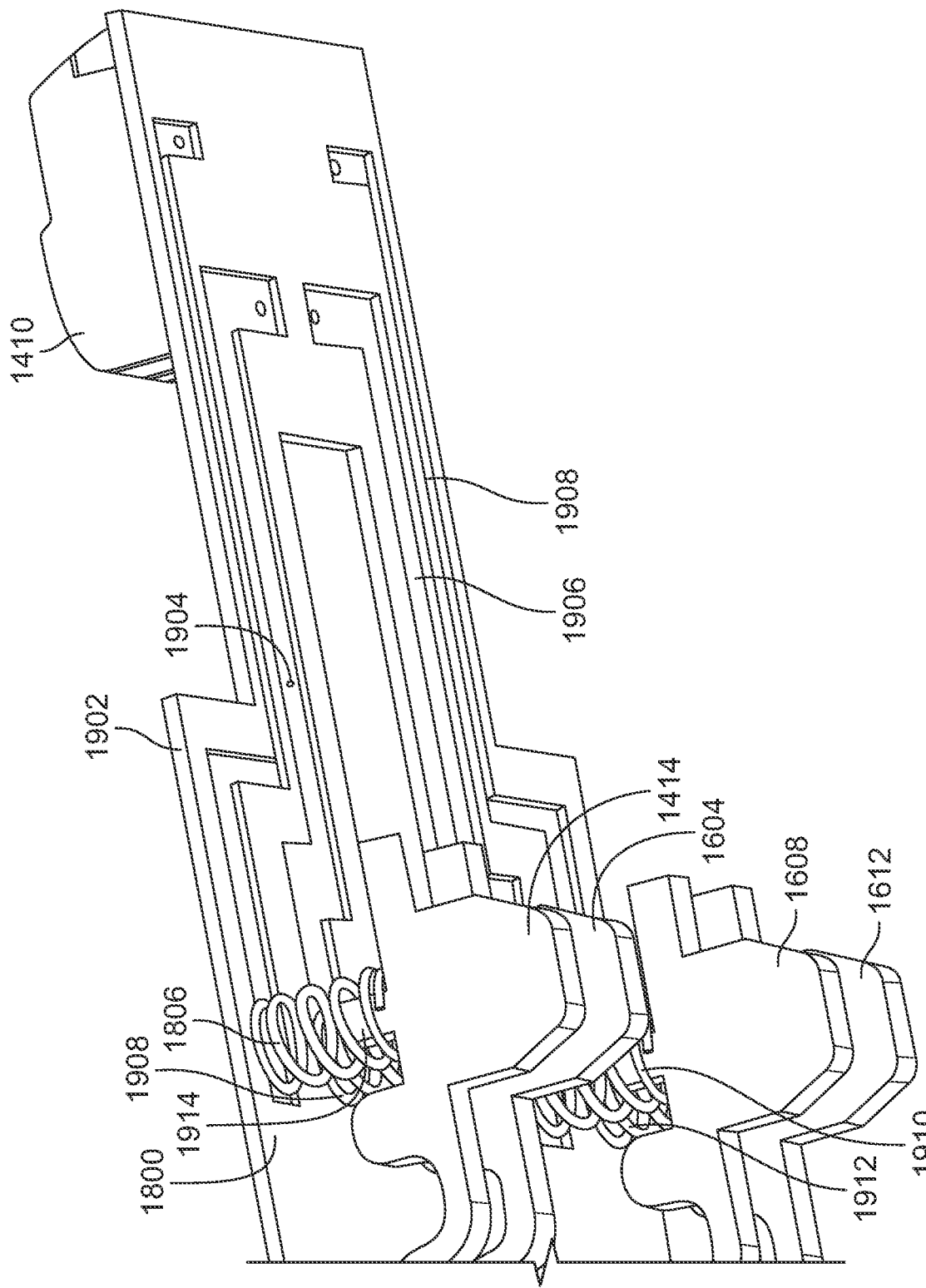
FIG. 19 shows illustrative apparatus in accordance with principles of the invention.

FIG. 19 shows contacts and springs in brace 1422. Plate 1800 may include conductors 1902, 1904, 1906 and 1908. Conductors 1902, 1904, 1906 and 1908 may provide electrical communication between springs 1806, 1908, 1910 and 1912, respectively, and corresponding terminals in port 1410. Contacts 1414, 1604, 1608 and 1612 may include tabs such as tab 1914. Springs 1806, 1908, 1910 and 1912 may be in electrical communication with corresponding tabs. Contacts 1414, 1604, 1608 and 1612 may thus change position relative to plate 1800 and maintain electrical communication with conductors 1902, 1904, 1906 and 1908, and the corresponding contacts of brace 1420.

Brace 1420 may include an arrangement analogous to that of brace 1424.

Figure 20:
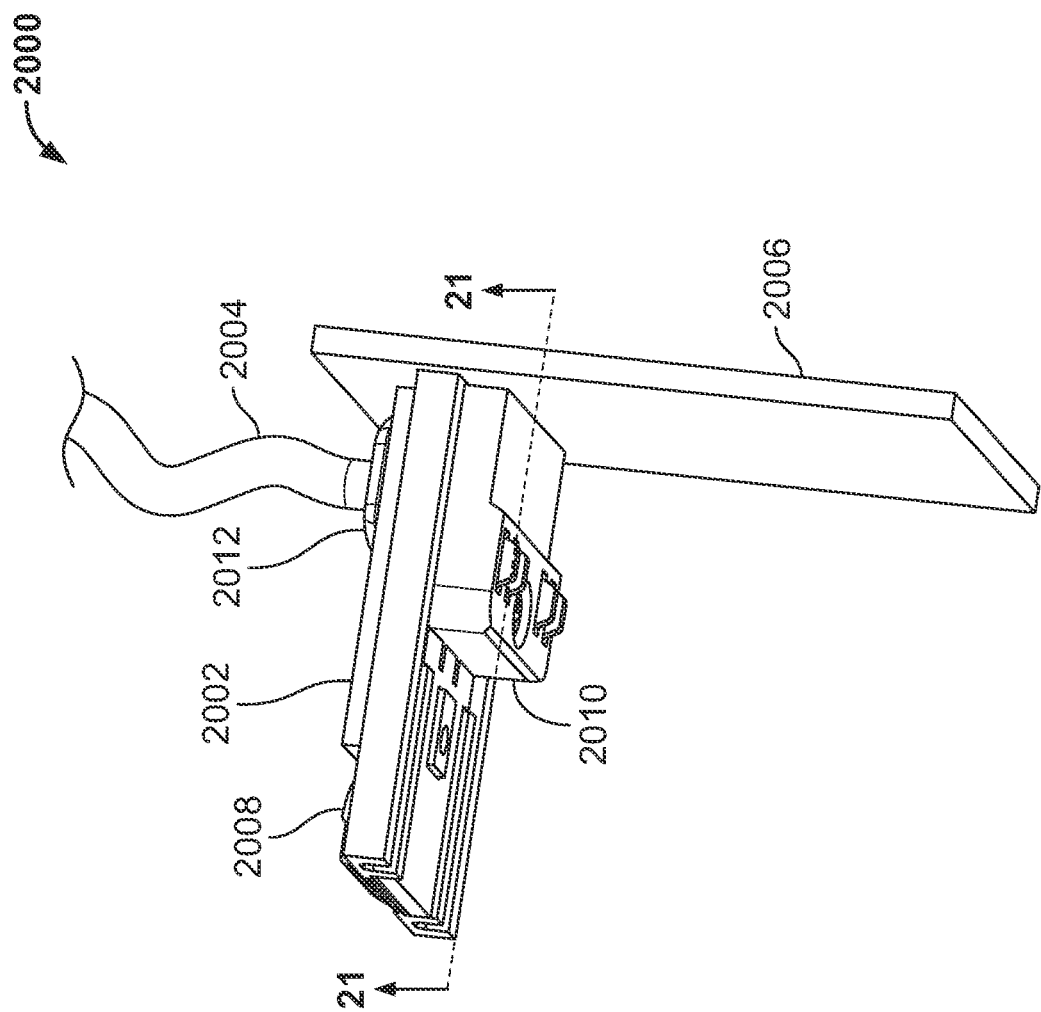
FIG. 20 shows illustrative apparatus in accordance with principles of the invention.

FIG. 20 shows illustrative connector 2000. Connector 2000 may include brace 2002. Brace 2002 may have one or more features in common with brace 1422 (shown in FIG. 14). Connector 2000 may include bundle 2004 of conductors. Connector 2000 may include wall 2006.

Bundle 2004 may include power conductors. Bundle 2004 may include power conductors for power transmission. Bundle 2004 may include communication conductors for communications such as 410. Bundle 2004 may be included in a cable such as cable 317.

Wall 2006 may include an electrically non-conductive plate. When brace 2002 is lodged in a fixture support such as 800, wall 2006 may abut or nearly abut an end of the fixture support, such as end 906. Wall 2006 may be disposed in abutment or near abutment with, and perpendicular to, docking tier 814.

Brace 2002 may include port 2008. Brace 2002 may include cover 2010.

Fitting 2012 may mechanically fix bundle 2004 to brace 2002.

Figure 21:
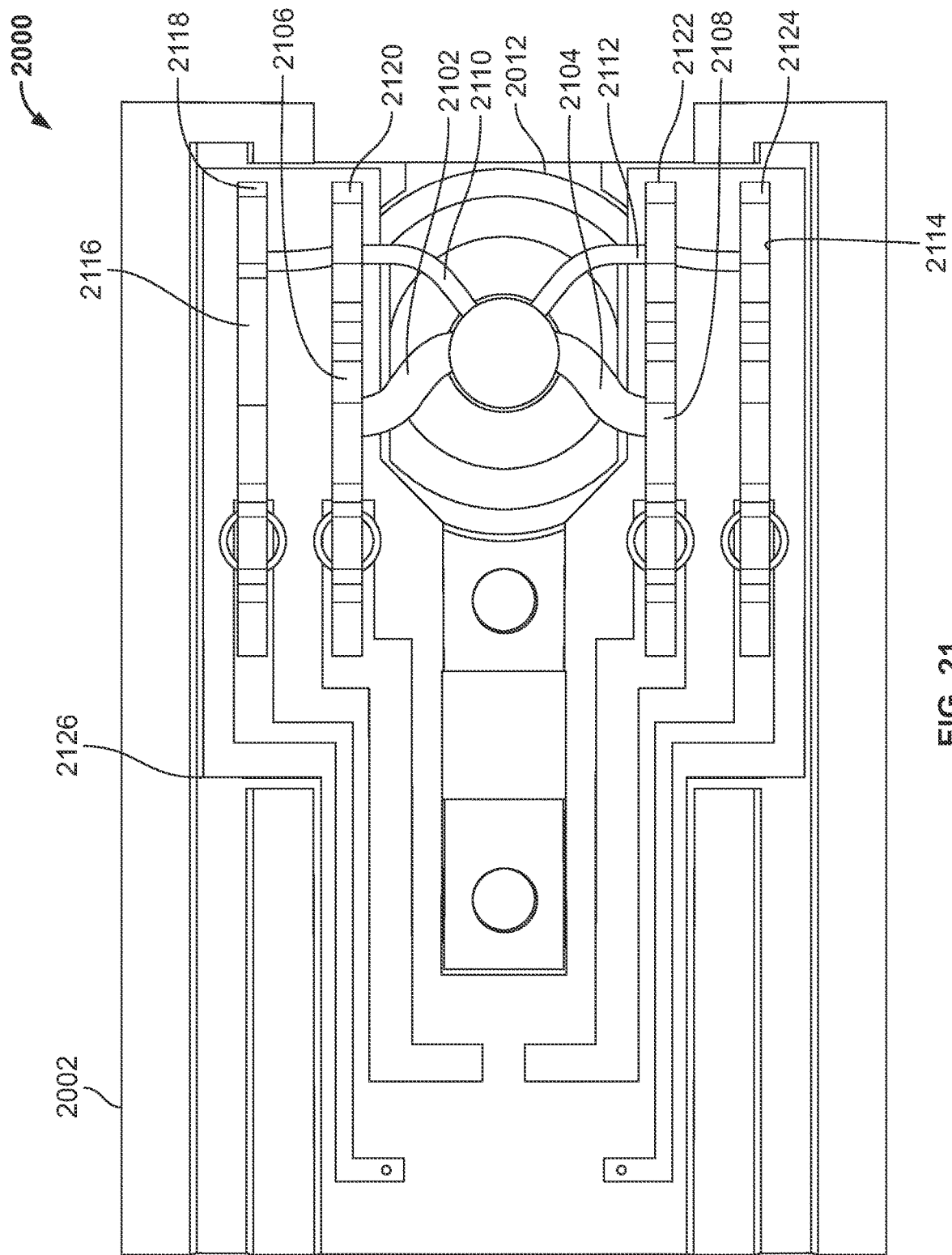
FIG. 21 is part of a view taken along lines 21-21 in FIG. 20.

FIG. 21 shows illustrative brace 2002 from view lines 21-21 (show in FIG. 20), with wall 2006 and cover 2010 removed. Power conductors 2102 and 2104 may provide power to cross-pieces 2106 and 2108, respectively. Communication conductors 2110 and 2112 may provide communications to cross-pieces 2114 and 2116, respectively. Power conductors 2102 and 2104 may be electrically isolated from cross-pieces 2114 and 2116. Communication conductors 2110 and 2112 may be electrically isolated from cross-pieces 2106 and 2108.

Cross-piece ends 2118, 2120, 2122 and 2124 may be anchored to plate 2126. Cross-piece ends 2118, 2120, 2122 and 2124 may be free ends.

Figure 22:
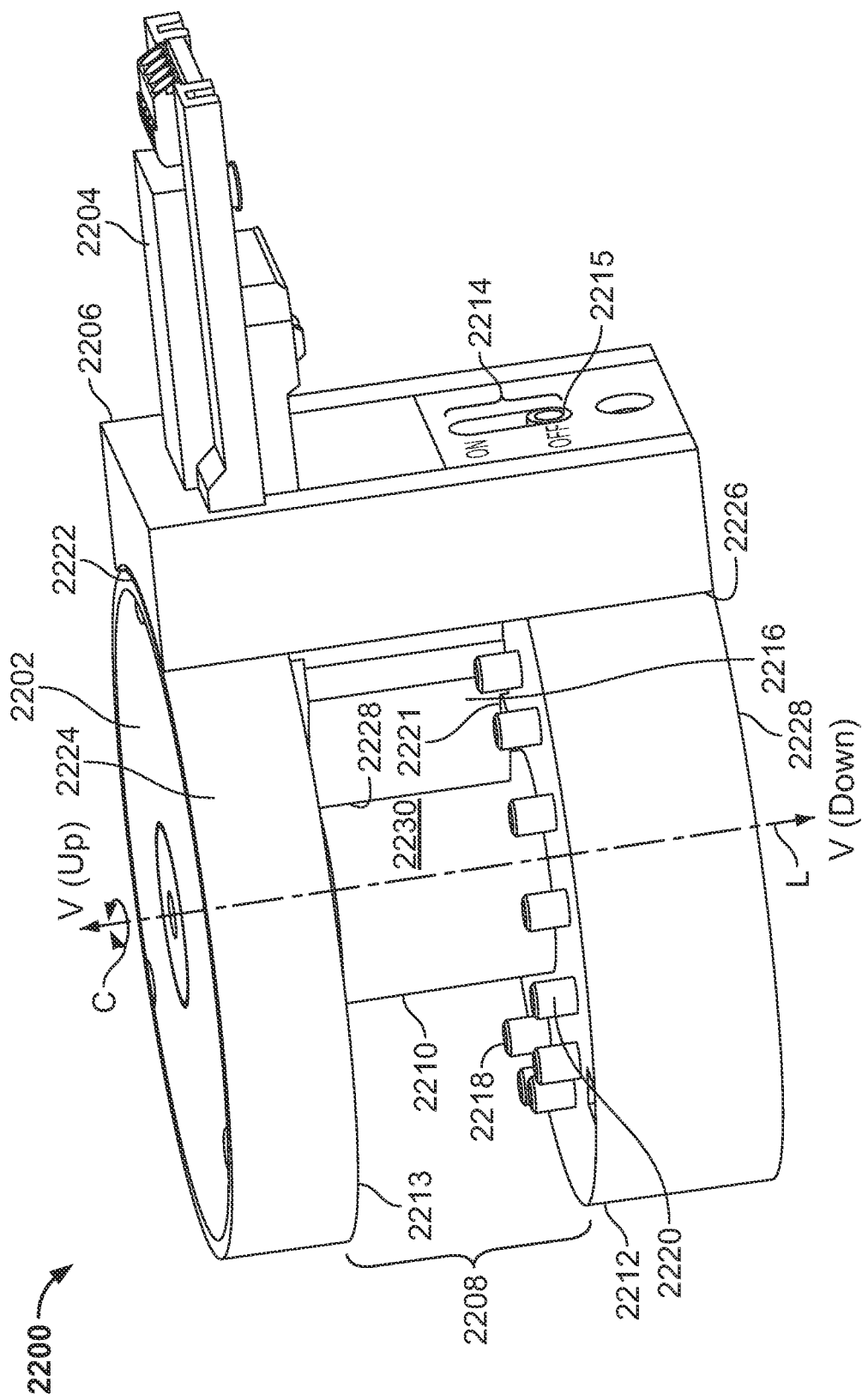

FIG. 22 shows illustrative hub arrangement 2200. Hub arrangement 2200 may include junction 2202. Hub arrangement 2200 may include brace 2204. Brace 2204 may have one or more features in common with brace 1422 (shown in FIG. 14). Hub arrangement 2200 may include bracket 2206. Bracket 2206 may be seated in annular receptacle 2208 between spacer 2210, lower unit 2212 and upper unit 2213. Bracket 2206 may be slidable circumferentially in directions C about spacer 2210.

Brace 2204 may mechanically and electrically engage with a fixture support such as 800 (shown in FIG. 8).

Bracket 2206 may include power and communication conductors (not shown) that are in electrical communication with contacts of brace 2204. The bracket 2206 power and communication conductors (not shown) may be in electrical communication with corresponding power and communication conductors (not shown) of junction 2202.

Bracket 2206 may include switch 2214. Switch 2214 may include knob 2215. Switch 2214 may close to provide electrical communication between the bracket 2206 conductors and the junction 2202 conductors. Switch 2214 may open to interrupt electrical communication between the bracket 2206 conductors and the junction 2202 conductors. In an arrangement in which junction 2202 provides power to the fixture support, switch 2214 may be used to set whether the fixtures of the fixture support have access to power. In an arrangement in which junction 2202 provides communication to the fixture support, switch 2214 may be used to set whether the fixtures of the fixture support have access to communication.

Bracket 2206 may include carriage 2216. Carriage 2216 may support bracket 2206 at a fixed radial distance from centerline L of junction 2202. Carriage 2216 may support bracket 2206 at a fixed vertical position relative to junction 2202.

Pegs 2218 together may form lower fence 2220. Pegs 2218 may include screws, bolts, threaded rod, or the like. Lower fence 2220 may guide carriage 2216 as carriage 2216 is moved about spacer 2210. Upper unit 2213 may include upper fence (not shown). The upper fence and lower fence 2220 may keep support bracket 2206 at a fixed radial distance from centerline L of junction 2202. The upper fence and lower fence 2220 may support bracket 2206 at a fixed vertical position relative to junction 2202.

Bracket 2206 may include surface 2222 that may conform to outer surface 2224 of upper unit 2213. Bracket 2206 may include surface 2226 that may conform to outer surface 2228 of lower unit 2212. Outer surface 2226 may be an extension of outer surface 2224.

Carriage 2216 may include surface 2228 that may conform to outer surface 2230 of spacer 2210.

Figure 23:
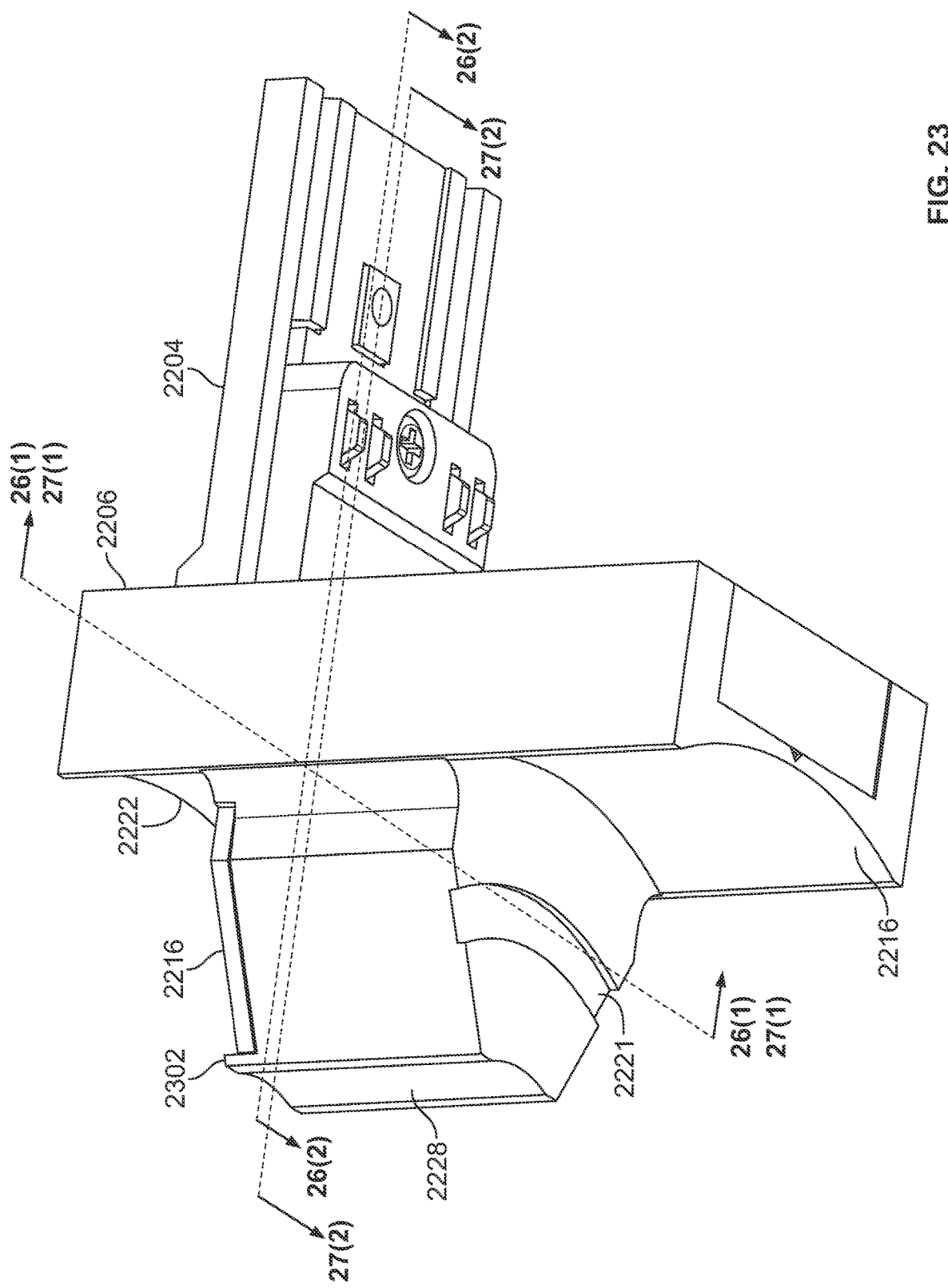
FIG. 23 shows illustrative apparatus in accordance with principles of the invention.

FIG. 23 shows surfaces 2222, 2226 and 2228 and groove 2221. Carriage 2216 may include carriage extension 2302. Carriage extension 2302 may be inserted into the upper fence of upper unit 2213.

Figure 24:
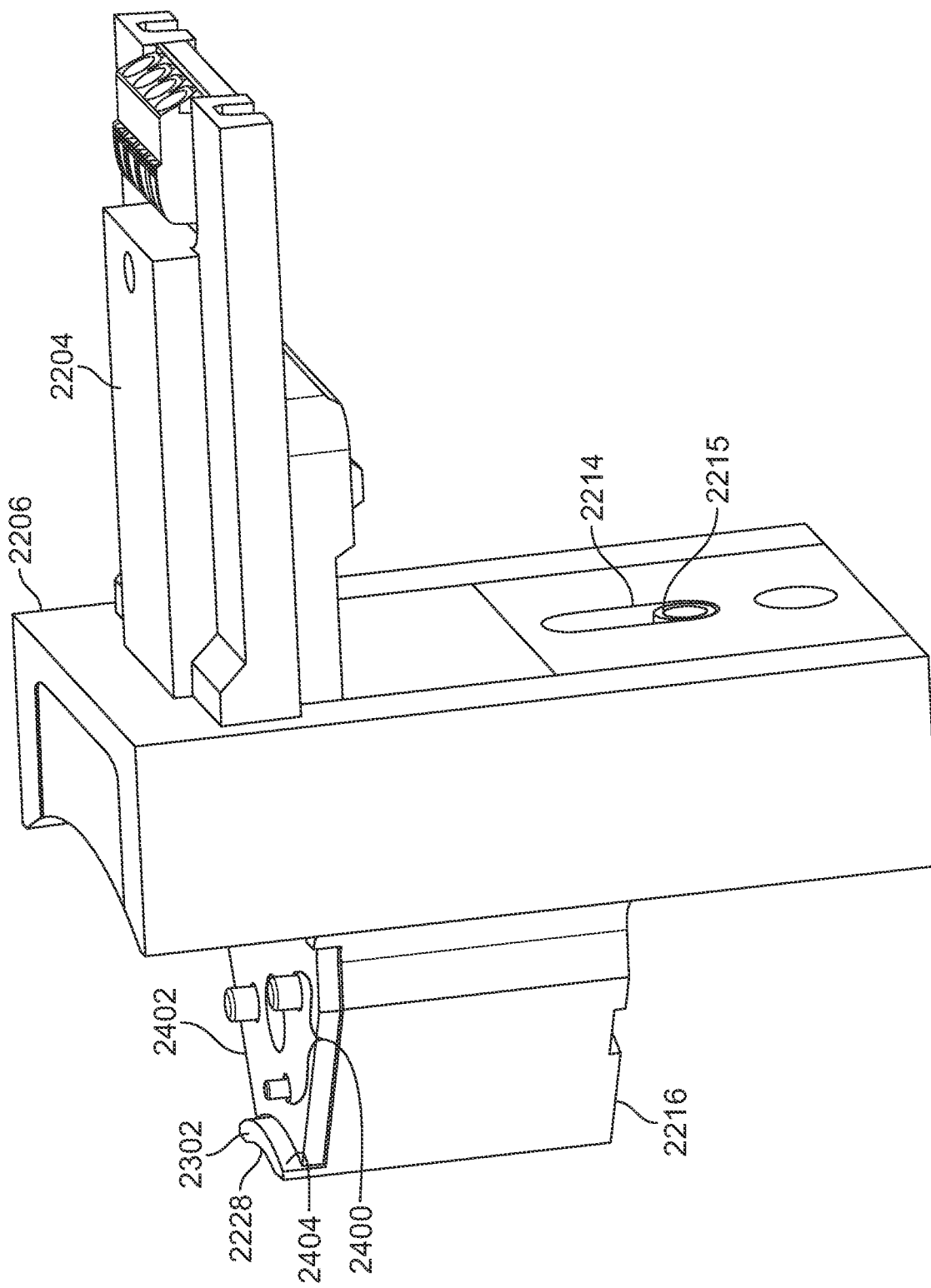
FIG. 24 shows illustrative apparatus in accordance with principles of the invention.

FIG. 24 shows pins 2400 extending through top 2402 of carriage 2216. Carriage 2216 may include a pin 2400 (three of four shown) corresponding to, and in electrical communication with, each of the contacts in brace 2204. Carriage extension 2302 may have surface 2404. Surface 2404 may interact with the upper fence to retain carriage 2216 in its operational position in receptacle 2208.

Figure 25:
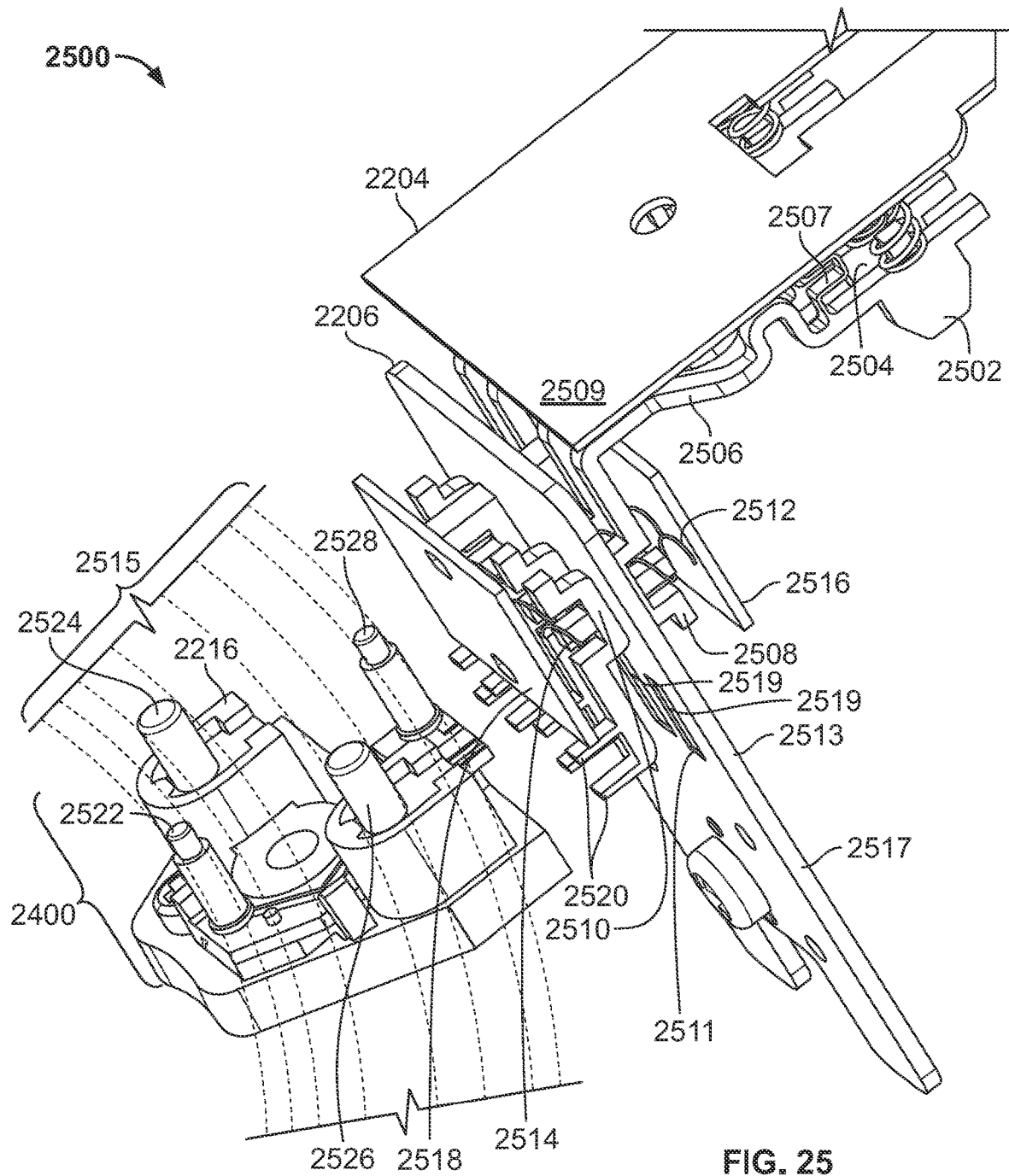
FIG. 25 shows illustrative apparatus in accordance with principles of the invention.

FIG. 25 shows arrangement 2500 for providing electrical continuity through brace 2204, bracket 2206 and carriage 2216, which are partially shown, to upper unit 2213 loop conductors 2515 of junction 2202. Contact 2502 may be a communication signal contact. Contact 2504 may be a power contact. Cross-piece 2506 may run from contact 2502 to terminal 2508. Zig-zag spring 2507 may support cross-piece below plate 2509 of brace 2204.

Switch 2214 may include slide 2513. Switch 2214 may include material 2517. Material 2517 may include material that is not electrically conductive to DC current. Material 2517 may include material that is not electrically conductive to AC current. Material 2517 may include material that has dielectric properties. Switch 2214 may include material 2519. Material 2519 may include material that is electrically conductive to DC current. Material 2517 may include material that is electrically conductive to AC current. Material 2519 may be arranged in slide 2513 as feedthroughs, such as 2509.

Terminal 2508 may be switched into electrical communication with terminal 2510 via feedthrough 2511.

Slide 2513 may be moved up to bring into electrical communication terminal 2508, terminal 2510 and feedthrough 2511. Terminal 2508 may be switched out of electrical communication with terminal 2510 by sliding slide 2513 to take feedthrough 2511 out of electrical communication with terminal 2508 and terminal 2510.

Slide 2513 may be fixed to knob 2215. A user may slide slide 2513 up or down by moving knob 2215 up or down, respectively. Terminals 2508 and 2510 may be urged toward each other by springs 2512 and 2514, respectively. Panels 2516 and 2518 may provide reactive forces to springs 2512 and 2514, respectively.

The other contacts of brace 2204 may be analogously in electrical communication with pins 2524, 2526 and 2528. The pins may be sprung to urge them into contact with the loop conductors. Power conducting pins 2524 and 2526 may have diameters greater than those of communication pins 2522 and 2528.

Figure 26:
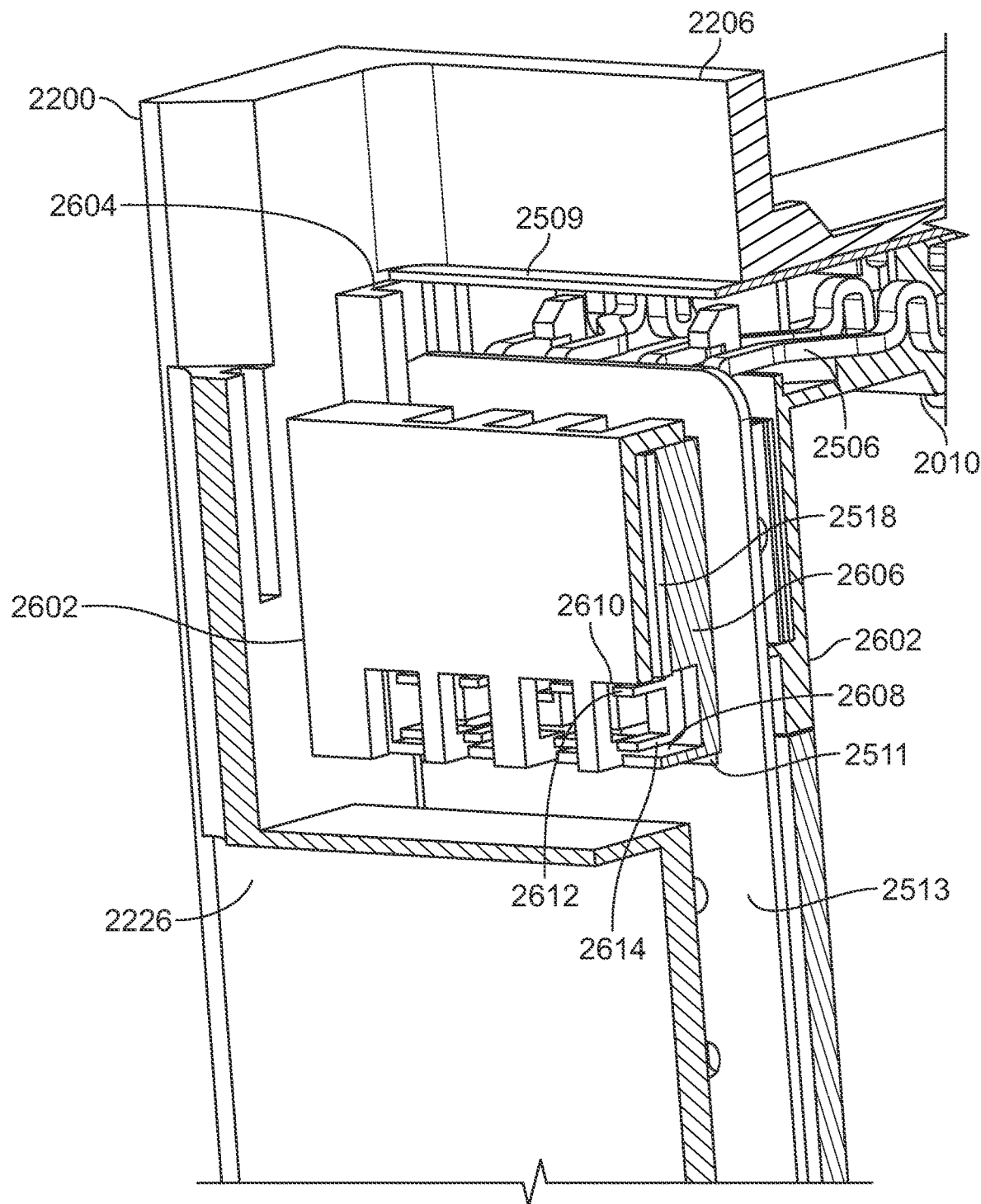
FIG. 26 is part of a view taken along lines 26(1)-26(1) and 26(2)-26(2) shown in FIG. 23.

FIG. 26 shows illustrative bracket chassis 2602. Chassis 2602 may be monolithic with cover 2010. Chassis 2602 may be fixed to bracket 2206. Chassis 2602 may include slot 2604. Slot 2604 may guide the sliding of slide 2513 (shown in an OFF position). Chassis 2602 may support structure 2606. Structure 2606 may include a ledge such as ledge 2608. Structure 2606 may include a facet such as facet 2610. Terminal 2520 may include upper prong 2612. Terminal 2520 may include lower prong 2614. Facet 2610 may interfere with upward motion of upper prong 2612. Ledge 2608 may interfere with downward motion of lower prong 2614. Chassis 2602 and structure 2606 may thus retain terminal 2510 in a vertical position or range when slide 2513 is moved up or down.

Figure 27:
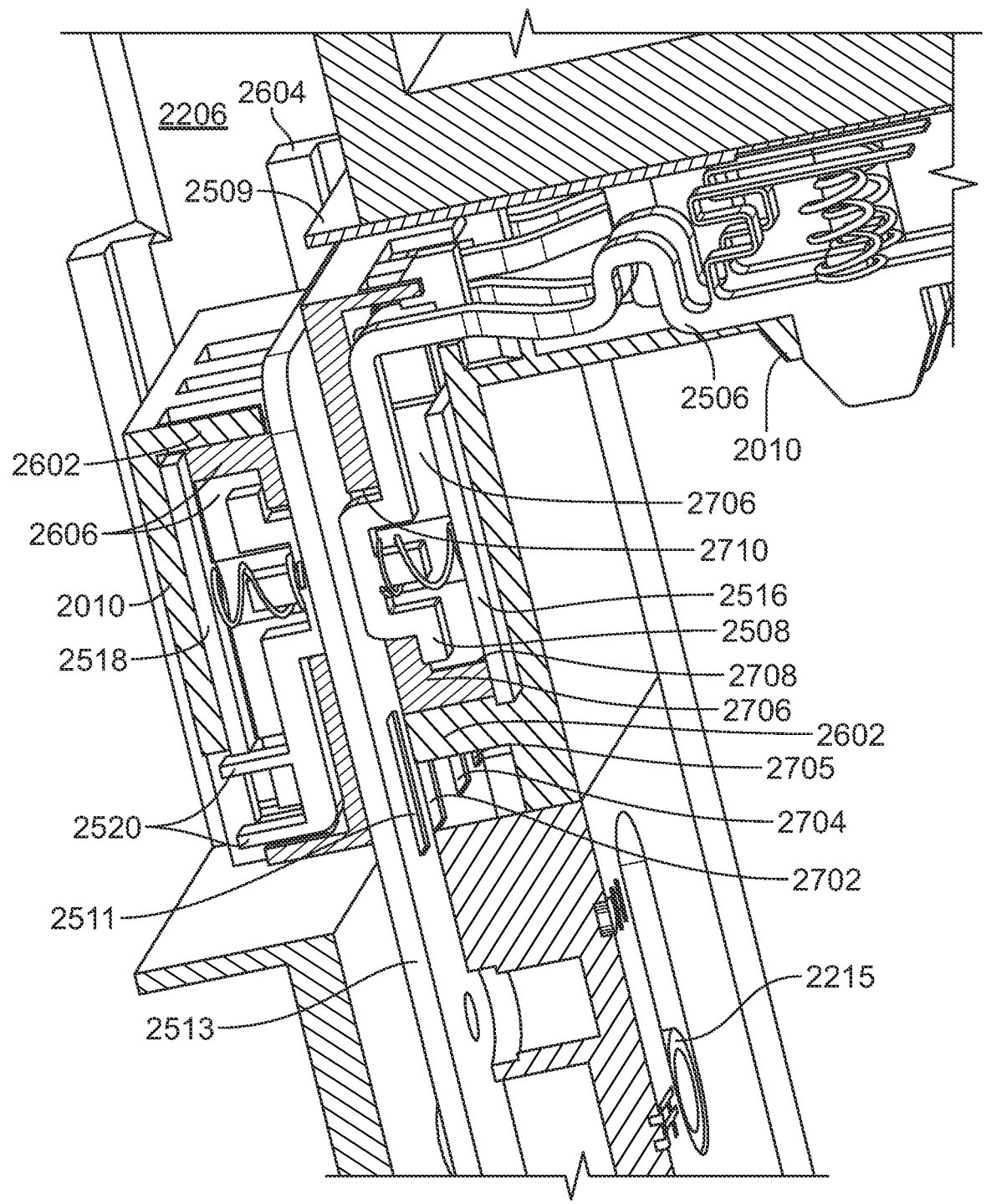
FIG. 27 is part of a view taken along lines 27(1)-27(1) and 27(2)-27(2) shown in FIG. 23.

FIG. 27 shows bracket chassis 2602 from a perspective different from that shown in FIG. 26. Chassis 2602 may support structure 2706. Structure 2706 may include a ledge such as ledge 2708. Structure 2706 may include a facet such as facet 2710. Facet 2710 may interfere with upward motion of terminal 2508. Ledge 2708 may interfere with downward motion of terminal 2508. Chassis 2602 and structure 2706 may thus retain terminal 2508 in a vertical position or range when slide 2513 is moved up or down.

Feedthroughs 2511, 2702, 2704 and 2705 are positioned away from, and not in electrical communication with, corresponding terminals such as 2508 and 2520. Knob 2215 is in the OFF position. Slide 2513 is in a lowered position.

Figure 28:
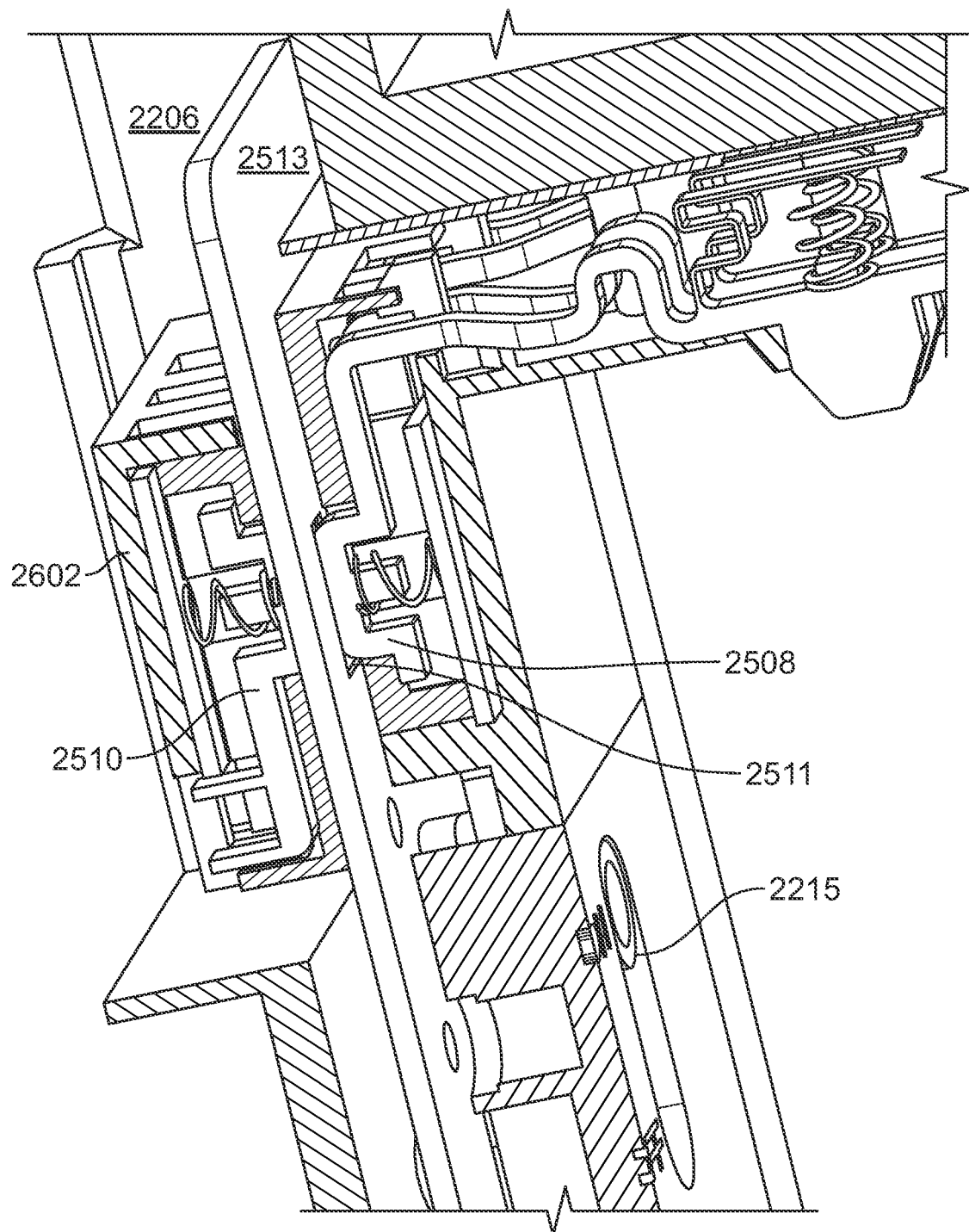
FIG. 28 shows the apparatus shown in FIG. 27 from a perspective that is different from that shown in FIG. 27 when the apparatus is in a state that is different from the state shown in FIG. 27.

FIG. 28 shows bracket chassis 2602 with slide 2513 in a raised position in slot 2604 (occluded). Knob 2215 is in the ON position. Feedthroughs 2511, 2702 (occluded), 2704 (occluded) and 2705 (occluded) are positioned in line with, and in electrical communication with, corresponding terminals such as 2508 and 2520.

Figure 29:
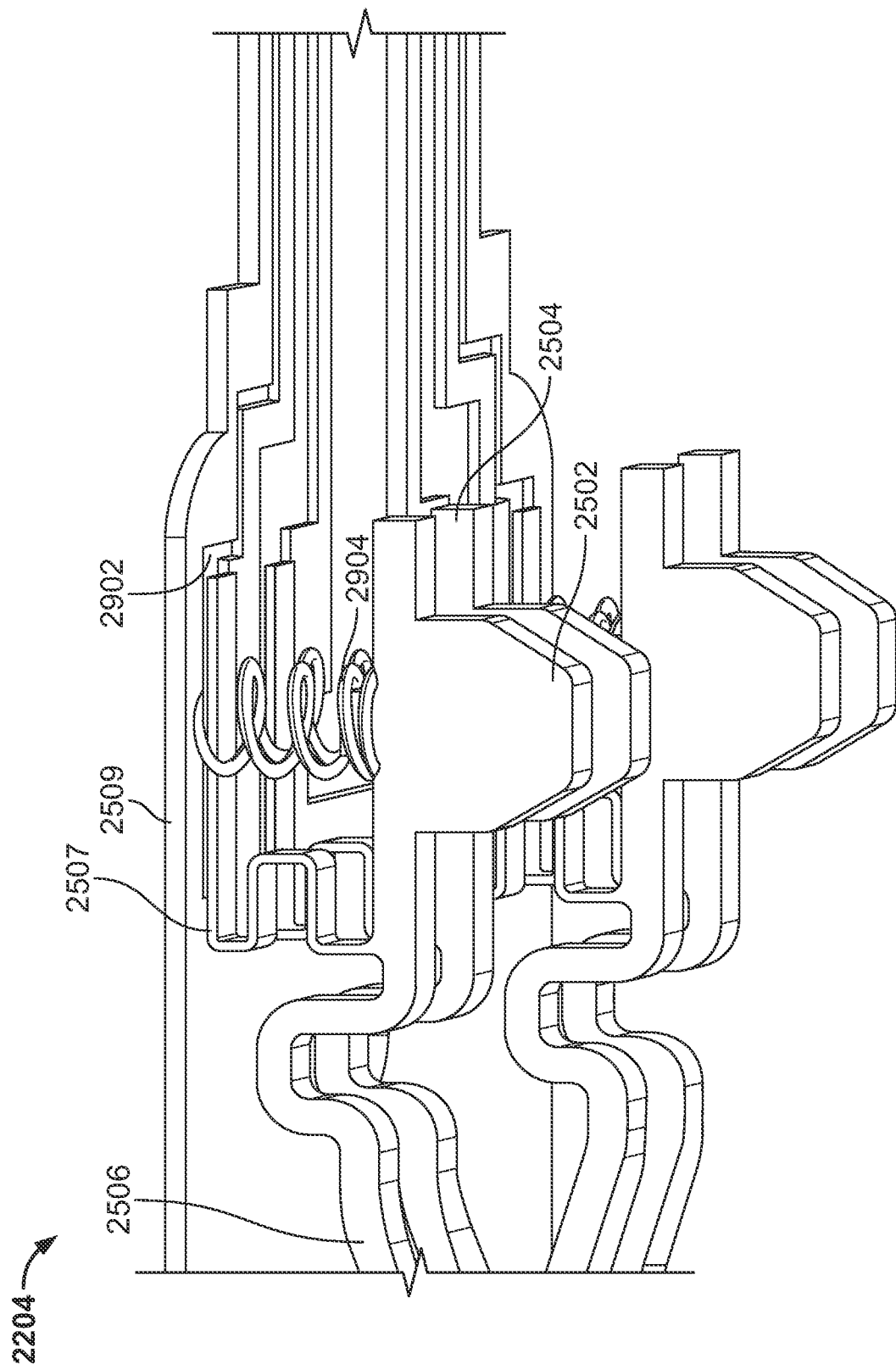
FIG. 29 shows illustrative apparatus in accordance with principles of the invention.

FIG. 29 shows brace 2204 in part. Zig-zag spring 2507 may provide resilient mechanical support to cross-piece 2506 from plate 2509. Zig-zag spring 2507 may provide electrical communication between contact 2502 and conductor 2902 in plate 2509. Spring 2904 may provide resilient mechanical support to contact 2502 from plate 2509. Spring 2904 may provide electrical communication between contact 2502 and conductor 2902 in plate 2509.

Figure 30:
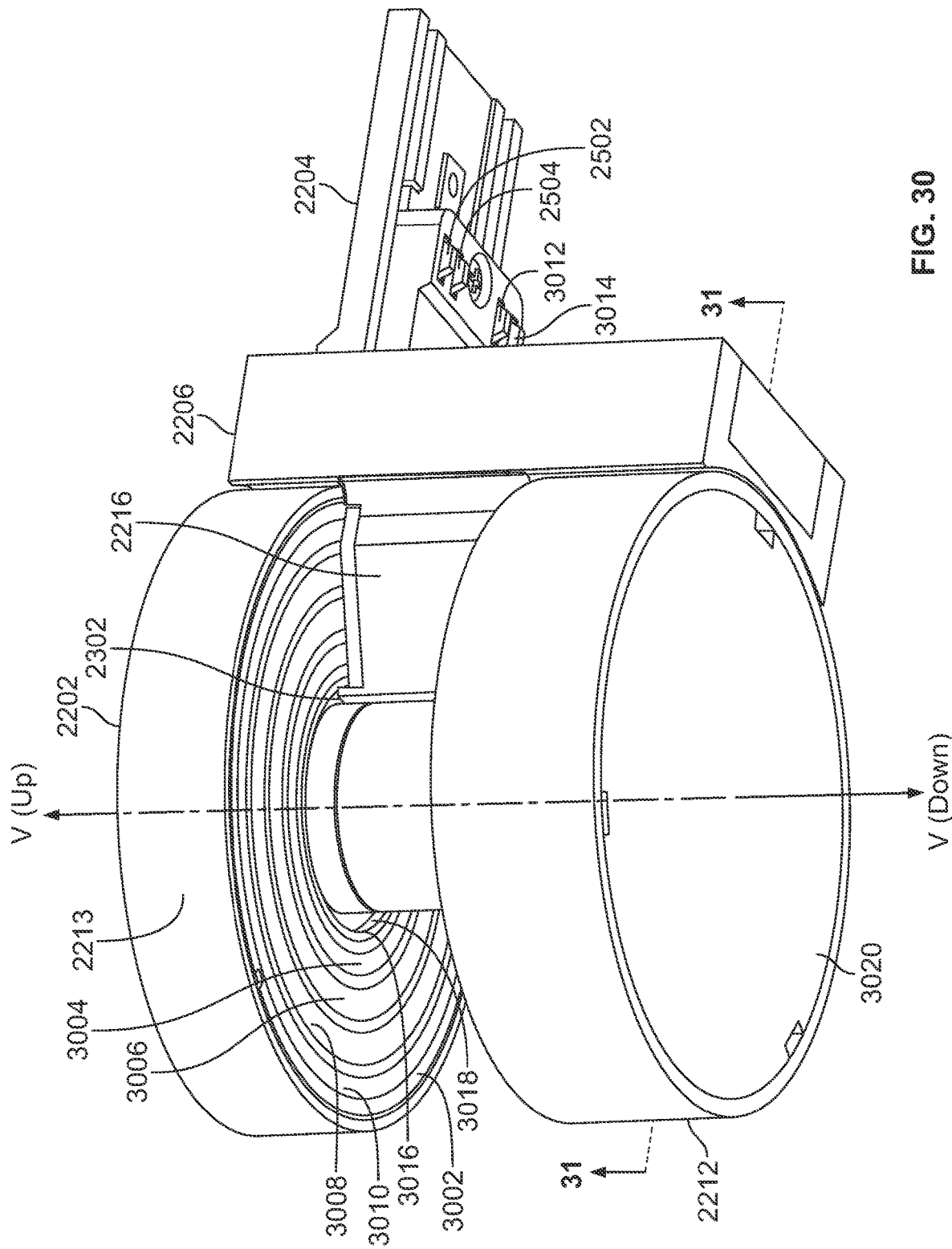
FIG. 30 shows illustrative apparatus in accordance with principles of the invention.

FIG. 30 shows bracket 2206 mechanically and electrically engaged with junction 2202. Upper unit 2213 may include disc 3002. Disc 3002 may include loop conductors 2515. Loop conductors 2515 may include conductors 3004, 3006, 3008 and 3010. Conductors 3004, 3006, 3008 and 3010 may be in electrical communication with contacts 2502, 2504, 3012 and 3014.

Upper unit 2213 may include upper fence 3016. Upper fence 3016 may receive carriage extension 2302. Upper fence 3016 may include surface 3018 for retaining carriage extension 2302 against motion in a direction radially away from the central axis of junction 2202.

Lower unit 2212 may include bottom 3020.

Figure 31:
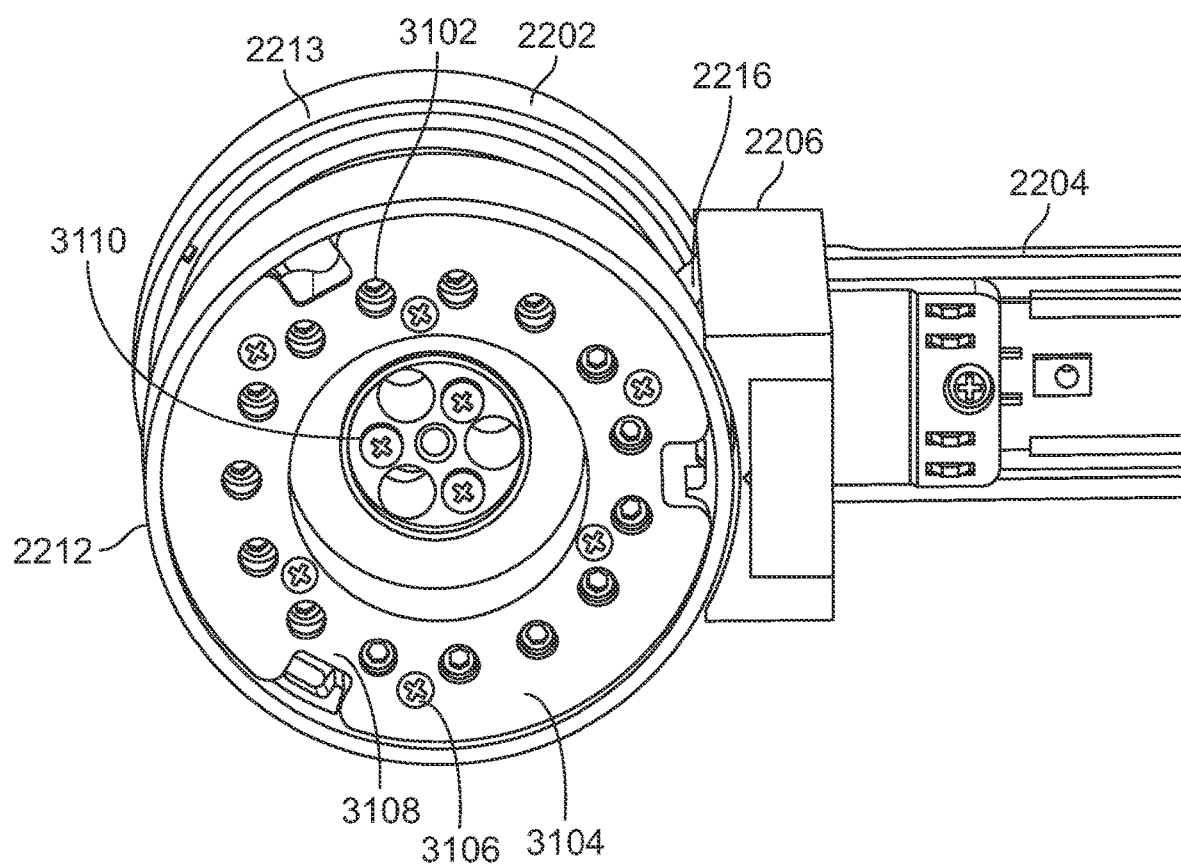
FIG. 31 is a partial cross-sectional view taken along lines 31-31 in FIG. 30.

FIG. 31 shows brace 2204, bracket 2206, carriage 2216 and junction 2202, with bottom 3020 removed. Heads such as 3102 of lower fence 2220 pegs 2218 may be accessed through plate 3104. Heads 3102 may be turned to raise and lower pegs 2218. Pegs 2218 may include a threaded section (not shown) that may be threadingly engaged with lower unit 2212. Pegs 2218 may be sprung to bias pegs 2218 toward carriage 2216. Detents (not shown) may retain pegs 2218, if sprung, to retain the pegs in a state in which the peg springs are compressed. Plate 3104 may include indicants such as 3108 to indicate degrees of arc about the central axis of junction 2202. A bracket such as 2206 may be moved continuously about the central axis and set at an arc angle chosen by the user.

Fasteners such as 3106 may hold plate 3104 to lower unit 2212. Fasteners such as 3110 may pass through spacer 2210 into upper unit 2213. Fasteners 3110 may fasten upper unit 2213, spacer 2210 and lower unit 2212.

The user may install carriage 2216 in junction 2202. Bottom 3020 may be removed from junction 2202. A selection of heads 3102 may be turned to lower corresponding pegs 2218. Carriage 2216 may be inserted into receptacle 2208. The selection of heads 3102 may be turned to raise corresponding pegs 2218. Pegs 2218 may be tightened to make snug the engagement of carriage extension 2302 with upper fence 3016. Pegs 2218 may be tightened to position one or more of: carriage extension 2302 relative to upper fence 3016; lower fence 2220 relative to groove 2221; bracket 2206 surface 2222 relative to outer surface 2224 of upper unit 2213; bracket 2206 surface 2226 relative to outer surface 2228 of lower unit 2212; and carriage 2216 surface 2228 relative to outer surface 2228 of spacer 2210; pins 2400 relative to conductors 3004, 3006, 3008 and 3010.

The user may remove carriage 2216 from junction 2202 by turning a selection of heads 3102 to lower corresponding pegs 2218. The user may then remove carriage 2216 from receptacle 2208.

Figure 32:
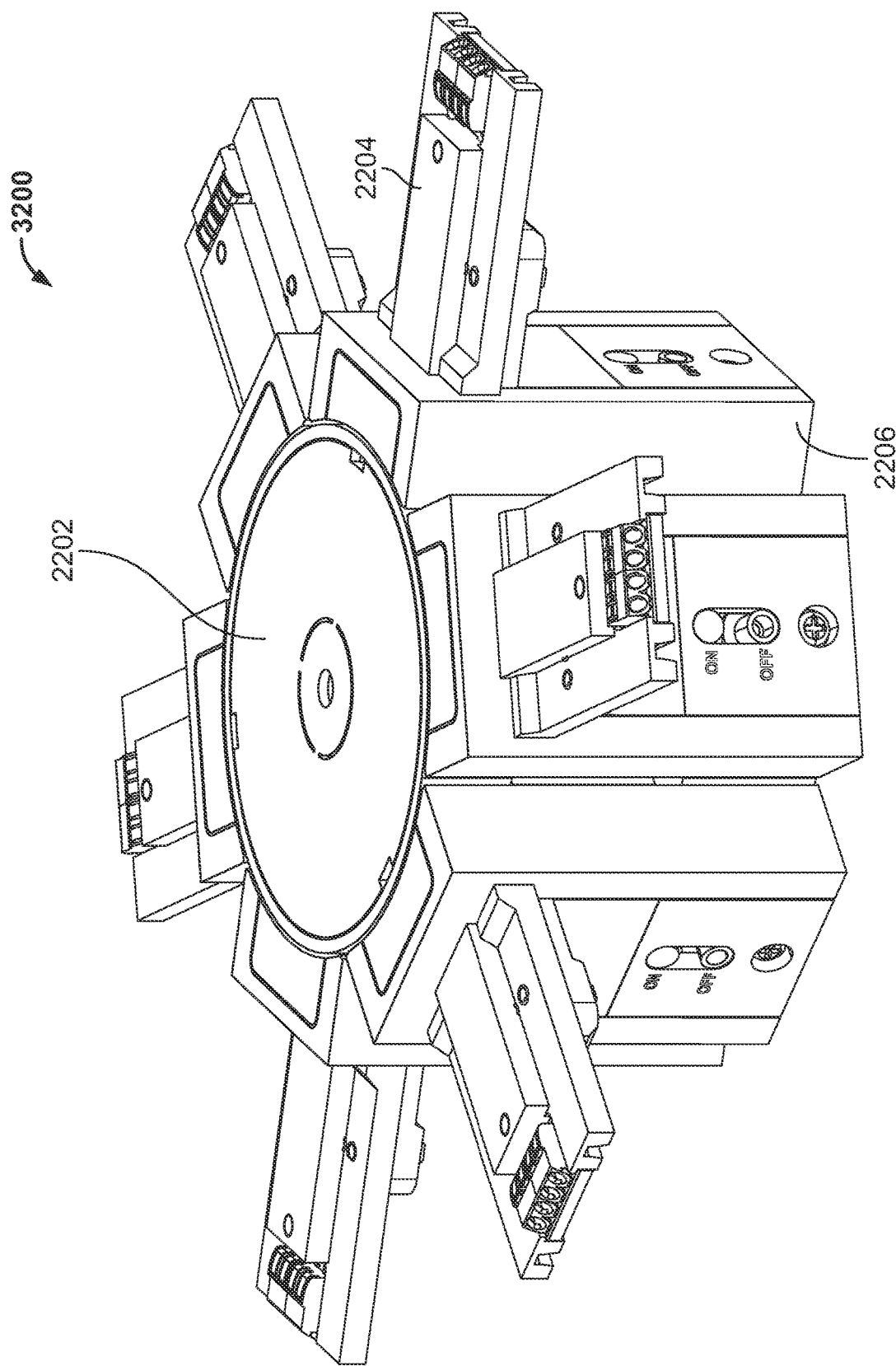
FIG. 32 shows illustrative apparatus in accordance with principles of the invention.
Figure 33:
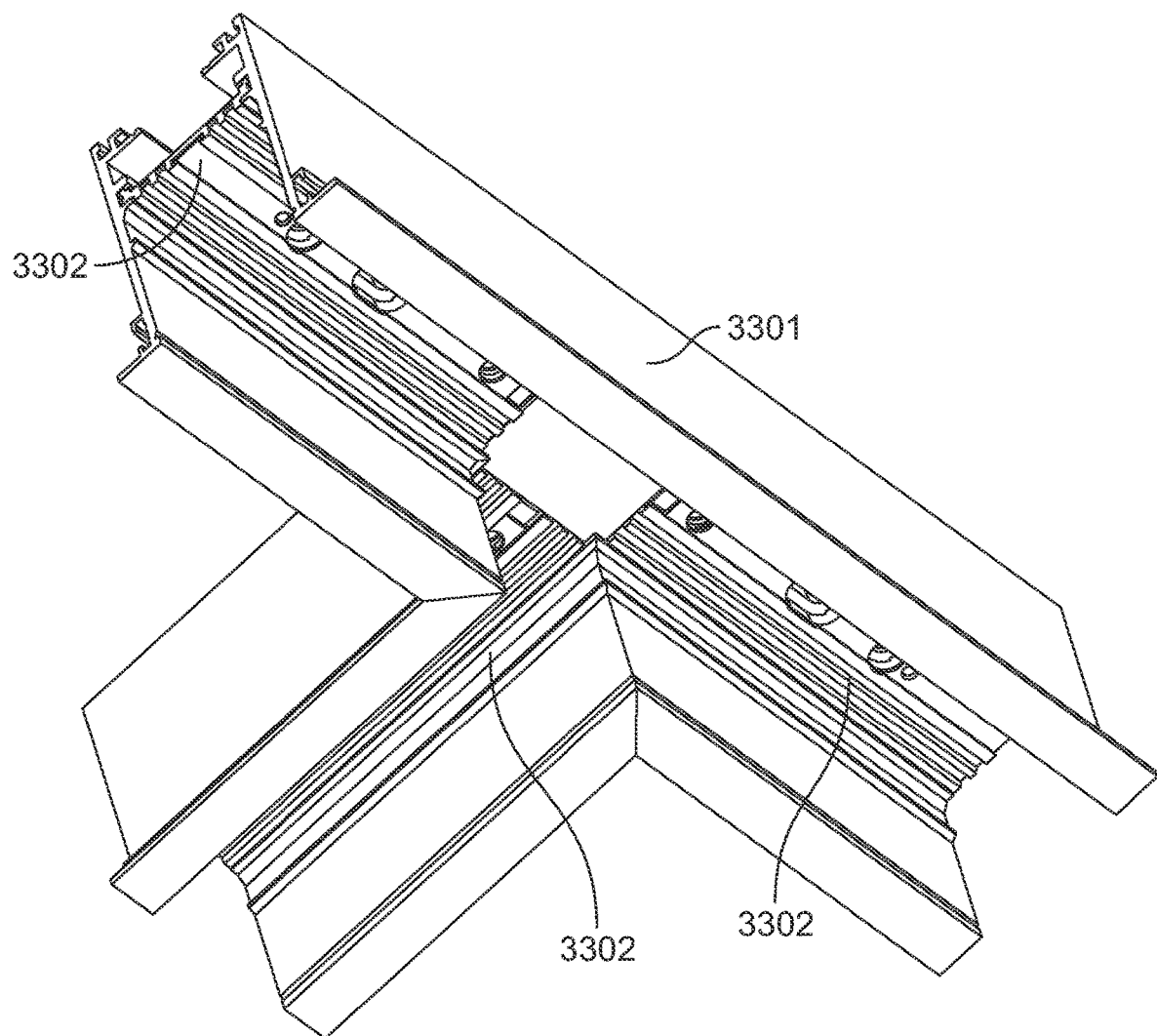
FIG. 33 shows illustrative apparatus in accordance with principles of the invention.
Figure 34:
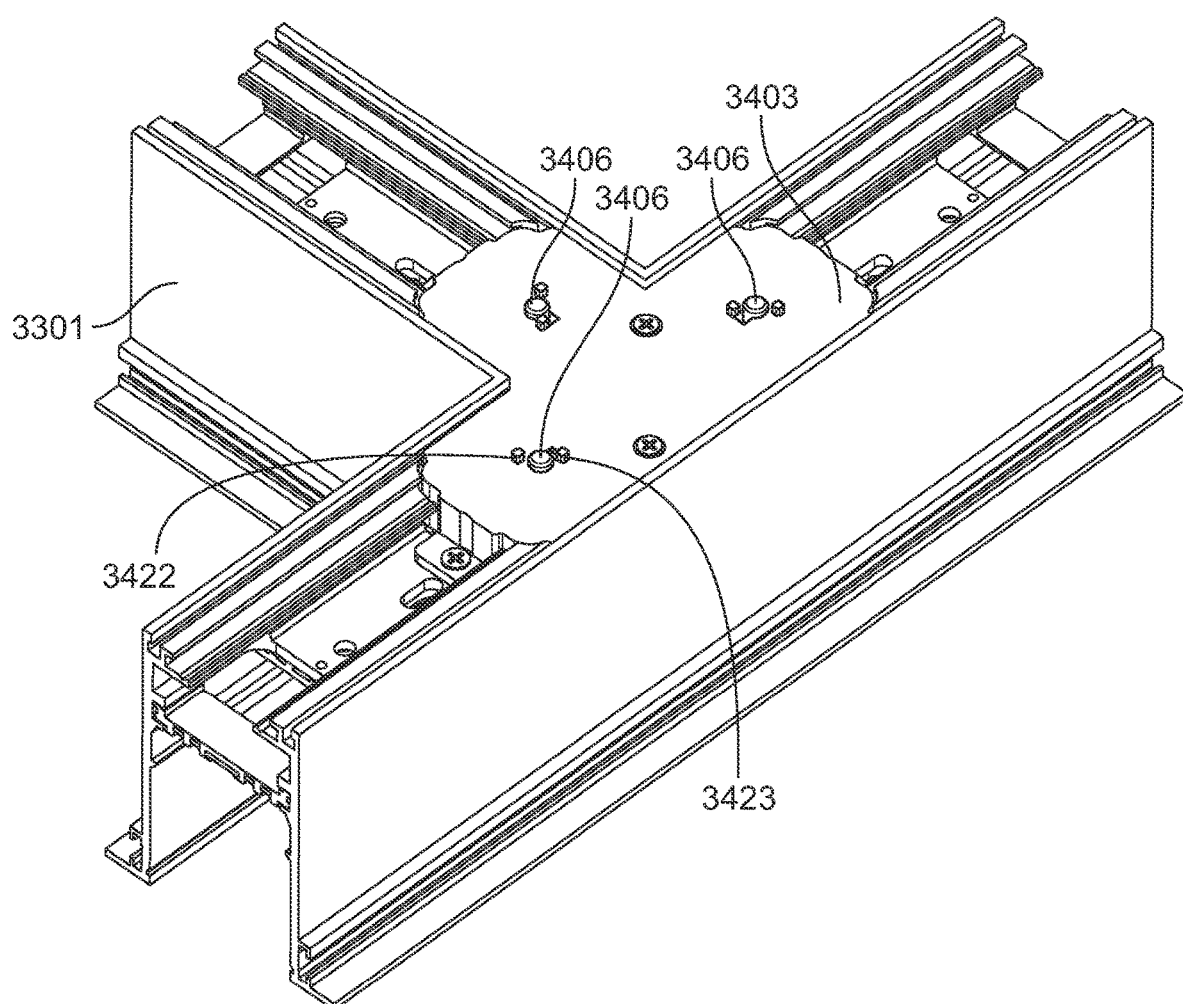
FIG. 34 shows illustrative apparatus in accordance with principles of the invention.
Figure 35:
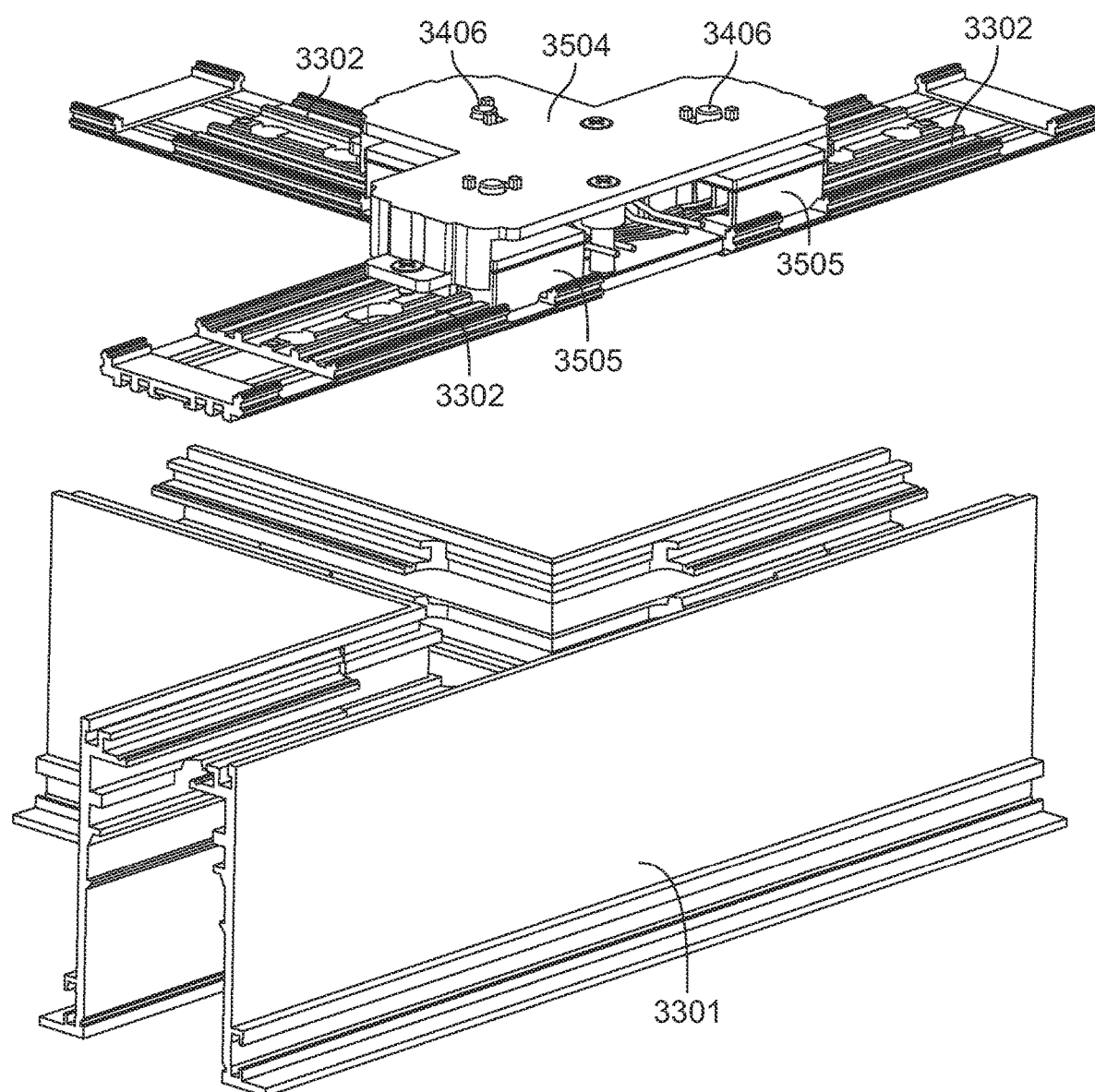
FIG. 35 shows illustrative apparatus in accordance with principles of the invention.
Figure 36:
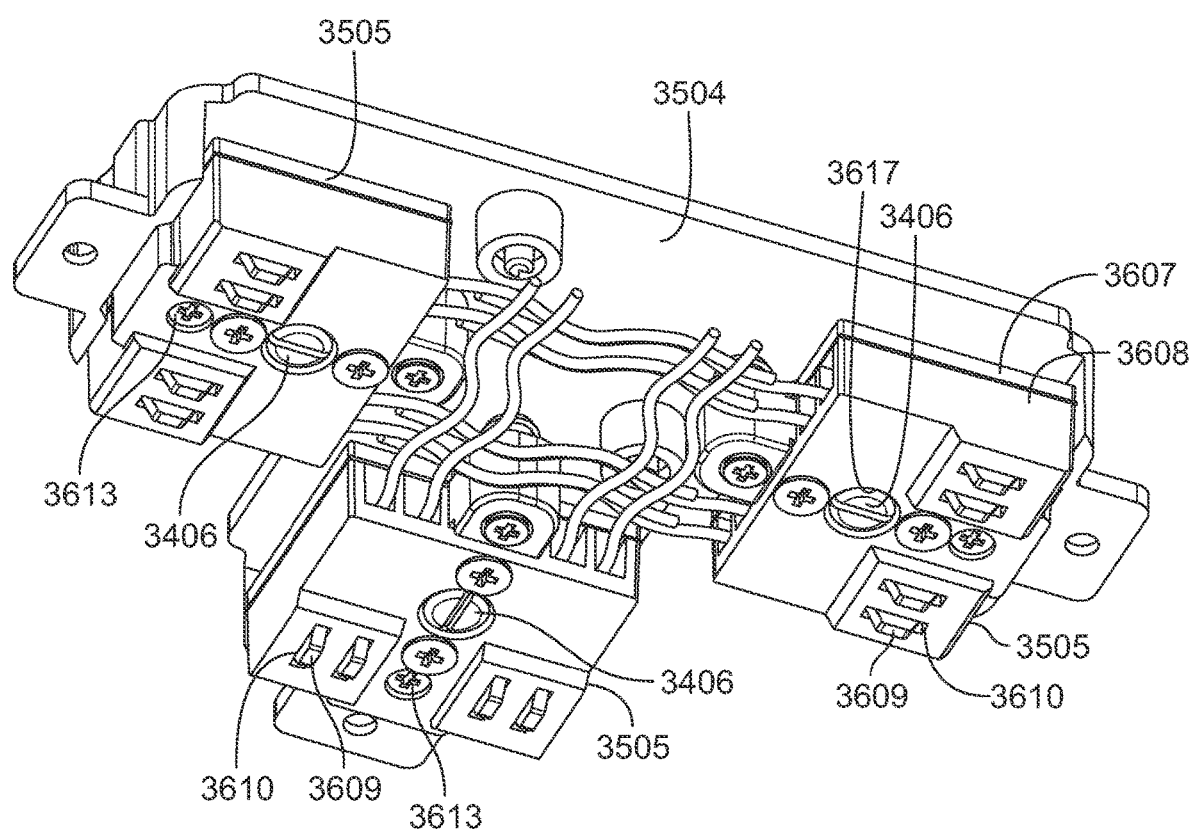
FIG. 36 shows illustrative apparatus in accordance with principles of the invention.
Figure 37:
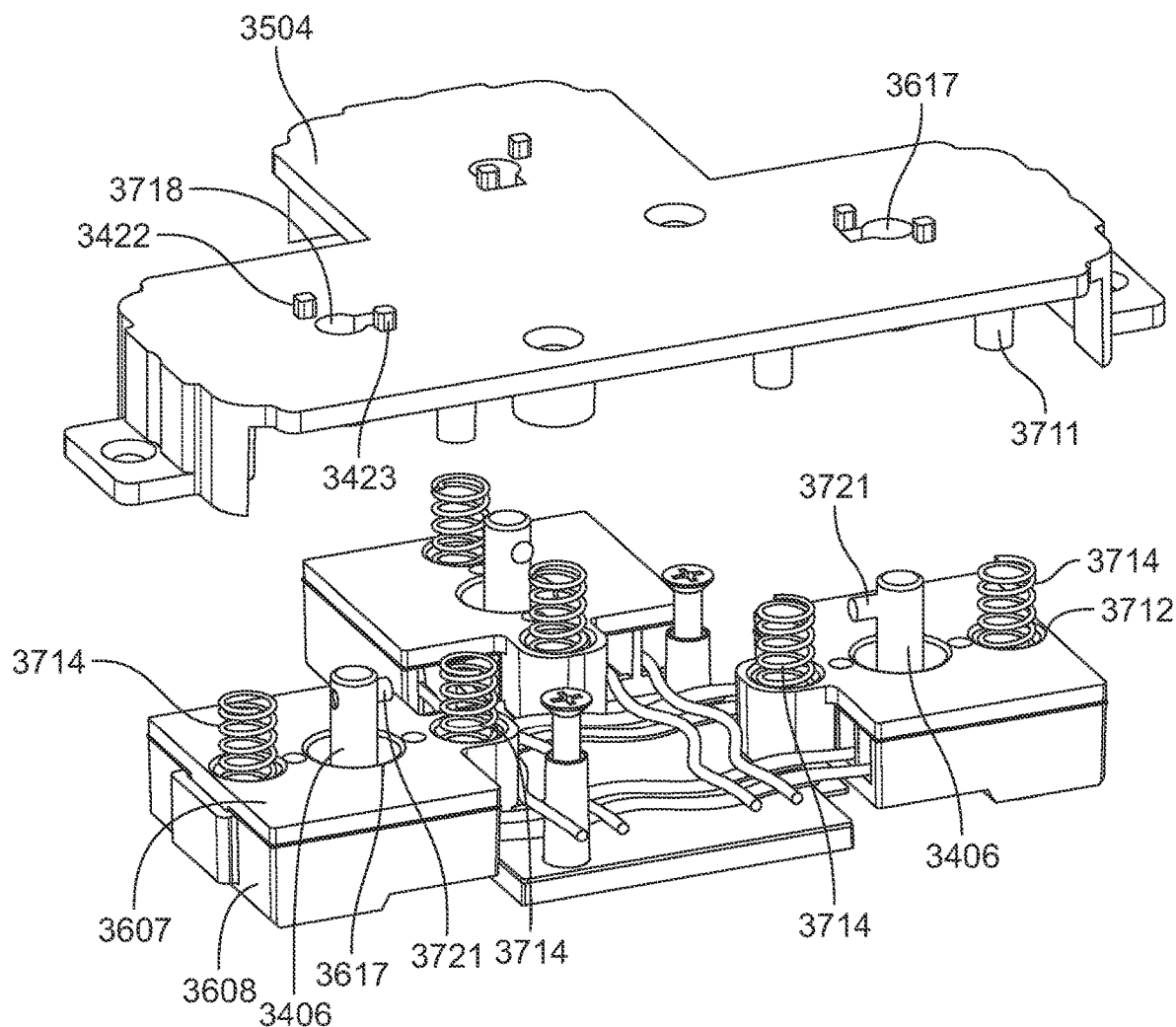
FIG. 37 shows illustrative apparatus in accordance with principles of the invention.
Figure 38:
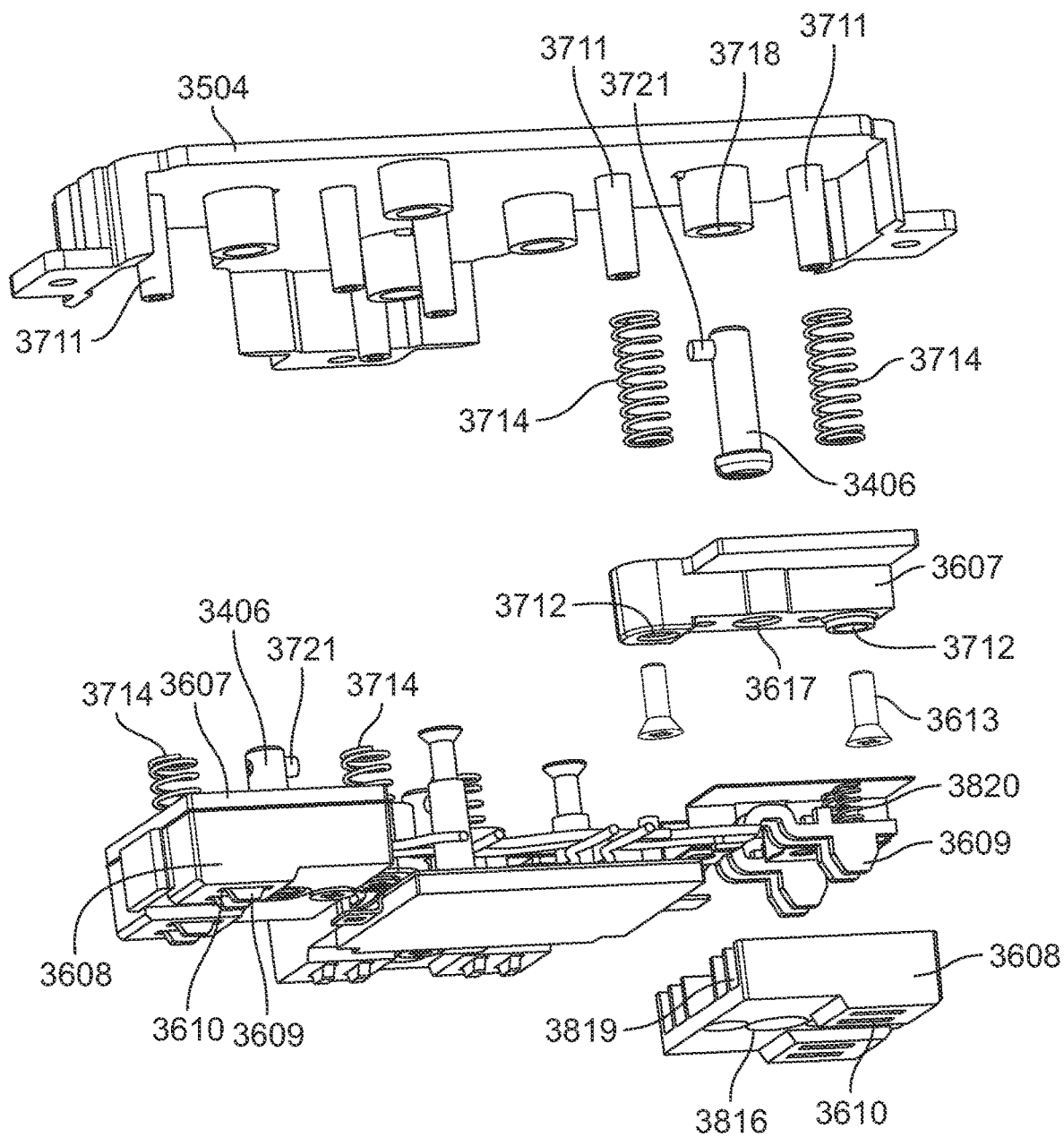
FIG. 38 shows illustrative apparatus in accordance with principles of the invention.

FIG. 32 shows arrangement 3200. Arrangement 3200 may include junction 2202, brace 2204 and bracket 2206. Arrangement 3200 may include five other braces that may have one or more features in common with brace 2204. Arrangement 3200 may include five other brackets that may have one or more features in common with bracket 2206.

Each of the other braces may have a contact in electrical communication, through junction 2202, with contact 2502. Each of the other braces may have a contact in electrical communication, through junction 2202, with contact 2504. Each of the other braces may have a contact in electrical communication, through junction 2202, with contact 3012. Each of the other braces may have a contact in electrical communication, through junction 2202, with contact 3014. Each of the brackets may have a switch that may interrupt electrical communication between the contacts that are configured to transmit power.

FIGS. 33-38 show illustrative fixture support joint 3301 and illustrative switch assembly 3403.

Fixture support joint 3301 may include an intersection of two or more fixture supports such as fixture support 800. The fixture supports may be adapted to connect with each other. Illustrative switch assembly 3403 may provide electrical power distribution among the fixture supports. Illustrative switch assembly 3403 may provide electrical communication signal distribution among the fixture supports.

Fixture support joint 3301 may include strip 3302. Strip 3302 may include a polymer body. Strip 3302 may include conductors. The polymer body may include electrically conductive polymer. Strip 3302 may be mounted on the fixture support joint 3301. Strip 3302 may have one or more features in common with docking tier 814, and may provide one or more of the functions of docking tier 814 and the conductors, magnet strip, and other elements associated therewith. Switch assembly 3403 may include a mounting plate 3504. Switch assembly 3403 may include conductive module 3505. Conductive module 3505 may have one or features in common with brace 1420. Conductive module 3505 may be mounted on mounting plate 3504 in a movable manner. Adjusting member 3406 may be configured to adjust a position of conductive module 3505. Adjusting member 3406 may move conductive module 3505 closer to or away from strip 3302. Mounting plate 3504 may be fixed to fixture support joint 3301.

When conductive module 3505 is made to move close to and abut against strip 3302, two fixture supports may be brought into electrical communication. When conductive module 3505 is made to move away from strip 3302, the electrical communication of the two fixture supports may be interrupted.

When fixture support joint 3301 is a one-way structure, one conductive module 3505 and one adjusting member 3406 may be provided. When fixture support joint 3301 is a two-, three- or four-way structure, two, three or four corresponding conductive modules 3505, and two, three, or four corresponding adjusting members 3406 may be provided. When fixture support joint 3301 is an n-way structure, n corresponding conductive modules and n corresponding adjusting members 3406 may be provided. n may be any suitable number.

Conductive module 3505 may include lifting seat 3607. Conductive module 3505 may include base 3608. Base 3608 may be disposed at the bottom of lifting seat 3607. Conductive module 3505 may include several conductive sheets 3609. Conductive sheets 3609 may be disposed in base 3608. The bottom of base 3608 may be provided with several openings 3610, an end of one of conductive sheets 3609 to extend therefrom. The bottom of mounting plate 3504 may be provided with several guide posts 3711. Lifting seat 3607 may be provided with guide holes 3712 for cooperative insertion of guide posts 3711. Bottom ends of guide posts 3711 may be connected to limiting screws 3613. Limiting screws 3613 limit lifting seat 3607 between mounting plate 3504 and limiting screws 3613. A first spring 3714 may be sleeved on the outer circumference of guide posts 3711. Two ends of first spring 3714 may be connected to mounting plate 3504 and lifting seat 3607, respectively.

Adjusting member 3406 may be an adjusting bolt. Base 3608 may be provided with a through hole 3816. Through hole 3816 may provide clearance for the adjusting bolt. Lifting seat 3607 may be provided with a first threaded hole 3617 for disposing the adjusting bolt. Mounting plate 3504 may be provided with a second threaded hole 3718. Groove 3718 may be cooperatively screwed to the adjusting bolt. First threaded hole 3617 and second threaded hole 3718 may be arranged correspondingly.

Strip 3302 may be provided with an access hole (not marked in the drawing). Adjusting member 3406 may be accessed via the access hole. Guide post 3711 may be cooperative with guide hole 3712, so that lifting seat 3607 of conductive module 3505 is stable when moving vertically. Limit screw 3613 and mounting plate 3504 may limit the moving range of lifting seat 3607. Limit screw 3613 and mounting plate 3504 may thus define a moving range of conductive module 3505. First spring 3714 may abut and move lifting seat 3607 to facilitate the downward movement and resetting of conductive module 3505. When conductive module 3505 is close to strip 3302, one end of a conductive sheet 3609 may extend out of opening 3610 to abut strip 3302 for electrical conduction. The adjusting bolt may be cooperatively connected to first thread groove 3617 and second thread groove 3718. A head of the adjusting bolt may abut against lifting seat 3607. Through hole 3816 and the access hole may be arranged correspondingly. The adjusting bolt may be exposed via through hole 3816 and the access hole.

Base 3608 may be provided with several accommodating slots 3819 for accommodating the several conductive sheets 3609. The top of an inner wall of an accommodating slot 3819 may be connected to a second spring 3820. Second spring 3820 may be connected to the top of conductive sheet 3609 to maintain one end of the conductive sheet 3609 in a state of extension out of opening 3610. The two ends of second spring 3820 may be connected to the inner wall of the accommodating slot 3819 and conductive sheet 3609, respectively, to ensure that one end of conductive sheet 3609 is maintained in a state of extension out of opening 3610. One end of conductive sheet 3609 may be provided with a protrusion that extends out of opening 3610. One end of conductive sheet 3609 may extend out of opening 3610 and abut against strip 3302 to provide electrical communication between conductive sheet 3609 and strip 3302.

A top end of the adjusting bolt may protrude from second threaded hole 3718. The top end may be connected to limiting post 3721. The top end of second threaded hole 3718 may include conduction limit block 3422. The top end of second threaded hole 3718 may include disconnection limit block 3423. Conduction limit block 3422 and disconnection limit block 3423 may cooperatively abut limiting post 3721 for limiting motion of the adjusting bolt. When the adjusting bolt is rotated to move conductive module 3505 vertically, conductive sheets 3609 of the conductive module 3505 abuts strip 3302 for conduction or conductive sheets 3609 are moved away from strip 3302 for disconnection. Conduction limit block 3422 and disconnection limit block 3423 may cooperatively abut limiting post 3721, and the rotation range of the adjusting bolt thus may be limited.

Conductive module 3505 may be mounted on mounting plate 3504 in a limited manner. Adjusting member 3406 may adjust vertically conductive module 3505. Adjusting member 3406 may adjust the position of conductive module 3505 closer to, or farther away from, a conductor of strip 3302. When conductive module 3505 is made to move close to and abut strip 3302 by operating the adjusting member 3406, conduction may be effected. When conductive module 3505 is made to move away from strip 3302 by operating adjusting member 3406, disconnection may be effected.

Figure 39:
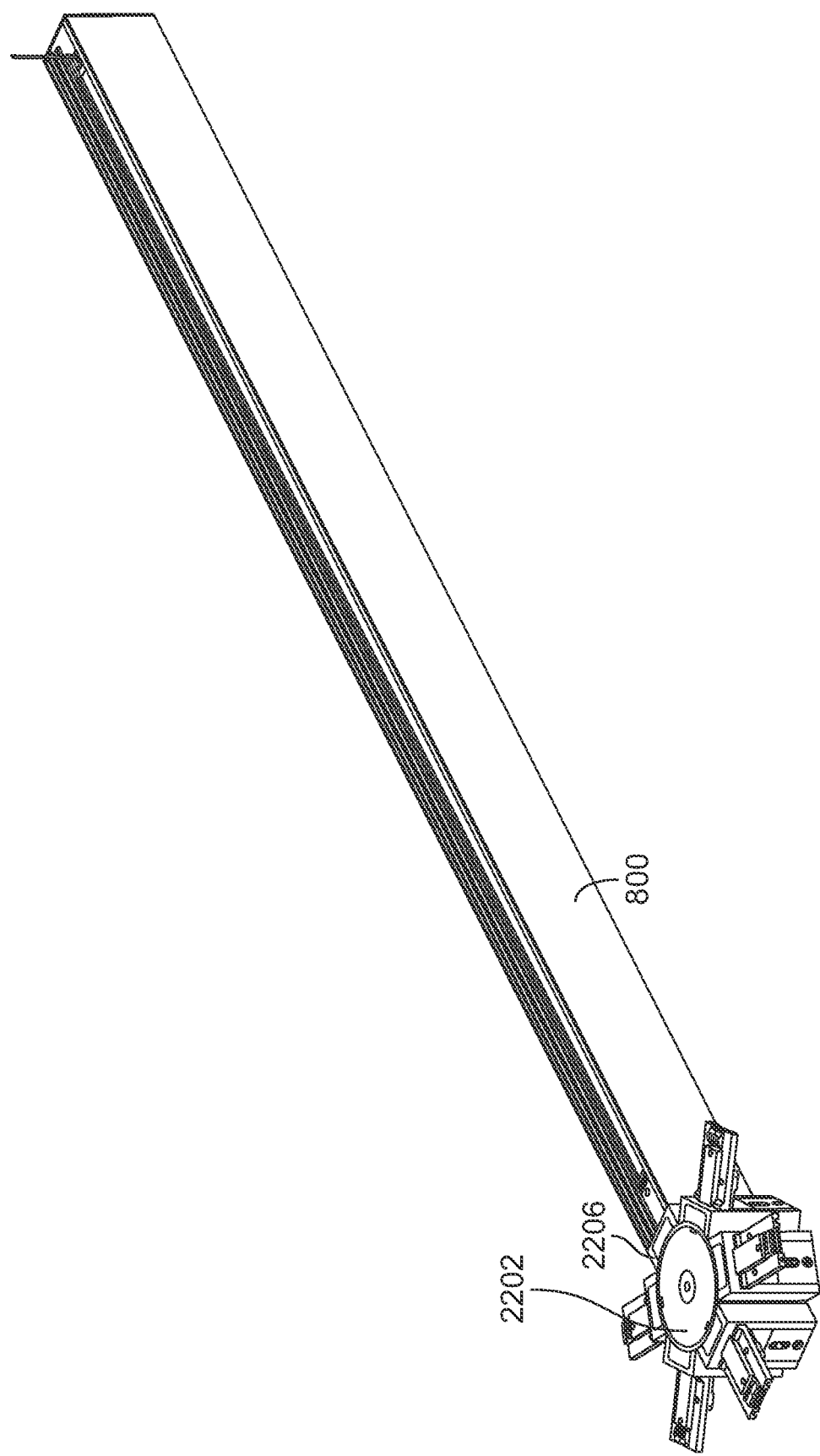
FIG. 39 shows illustrative apparatus in accordance with principles of the invention.

FIG. 39 shows arrangement 3200 with fixture support 800 attached to bracket 2206. Connector 2000 is inserted in fixture support 800. Other fixture supports having one or more features in common with fixture support 800 may be attached to corresponding other brackets. Power supplied through bundle 2004 may be transmitted from fixture support 800, through junction 2202, to the other fixture supports. Communications such as 410 transmitted through bundle 2004 may be transmitted from fixture support 800, through junction 2202, to the other fixture supports.

Figure 40:
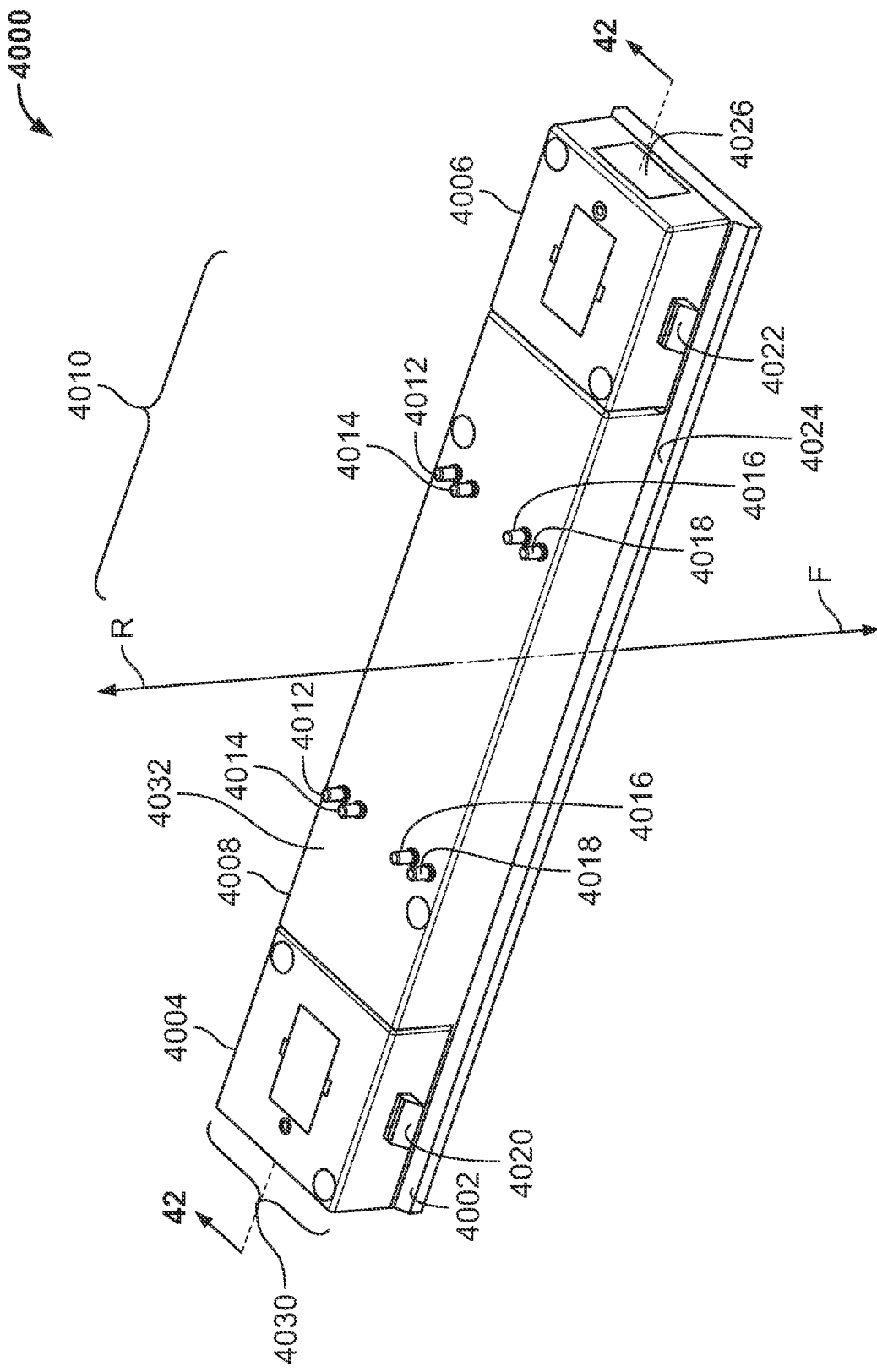
FIG. 40 shows illustrative apparatus in accordance with principles of the invention.

FIG. 40 shows illustrative fixture head 4000. Fixture head 4000 may connect a fixture such as 316 to a fixture support such as 400. Fixture head 4000 may include frame 4002. Fixture head 4000 may include latch 4004. Fixture head 4000 may include latch 4006. Fixture head 4000 may include pick-up unit 4008. Pick-up unit 4008 may include electrical contact pins 4010. Contact pins 4010 may transfer power and communication signals between fixture head 4000 and docking tier 814. Fixture head 4000 may include a magnetic element (not shown). Fixture head 4000 may include ferrous material. The magnetic element or the ferrous material may engage magnetically with magnetic strip 1014. The magnetic engagement may secure fixture 316 to docking tier 814. Contact pins 4010 may be sprung so that they retract into pick-up unit 4008 when fixture head 4000 is docked flush against docking tier 814.

Pick-up unit 4008 may include pin pairs 4012, 4014, 4016 and 4018. Pairs 4012, 4014, 4016 and 4018 may be positioned to contact, respectively, conductors 1006, 1008, 1010 and 1012 in docking tier 814.

Latches 4004 and 4006 may include, respectively, detents such 4020 and 4022. Detents 4020 and 4022 may be biased to extend outward from latches 4004 and 4006. The detents in operation may be supported by ridges 1038 and 1040. Ridges 1038 and 1040 may prevent the fixture from dropping from fixture support 800 if the magnetic engagement fails. Bezels such as 4024 may conform to angular limbs of ridges 1038 and 1040. Fixture head 4000 may include actuators such as button 4026 to withdraw the detents. Latches 4004 and 4006 may each include releases (not shown) to withdraw the detents into the latches. Fixture head 4000 may include backwall 4030. Back side 4032 of backwall 4030 may contact docking tier 814 when the fixture is disposed in fixture support 800. Direction R is the rear direction. Direction F is the forward direction. When disposed in fixture support 800, back side 4032 is forward of docking tier 814.

The fixture may be secured to fixture head 4000 in a position forward of fixture head 4000. The fixture may be secured to frame 4002.

The fixture may be installed in fixture support 800 by inserting fixture head 4000 in U-channel 1052. A user may insert fixture head 4000 along direction V(up) (shown in FIG. 9) into U-channel 1052. A user may slide fixture head 4000 along a direction perpendicular to direction V(up) (shown in FIG. 9) into U-channel 1052.

Figure 41:
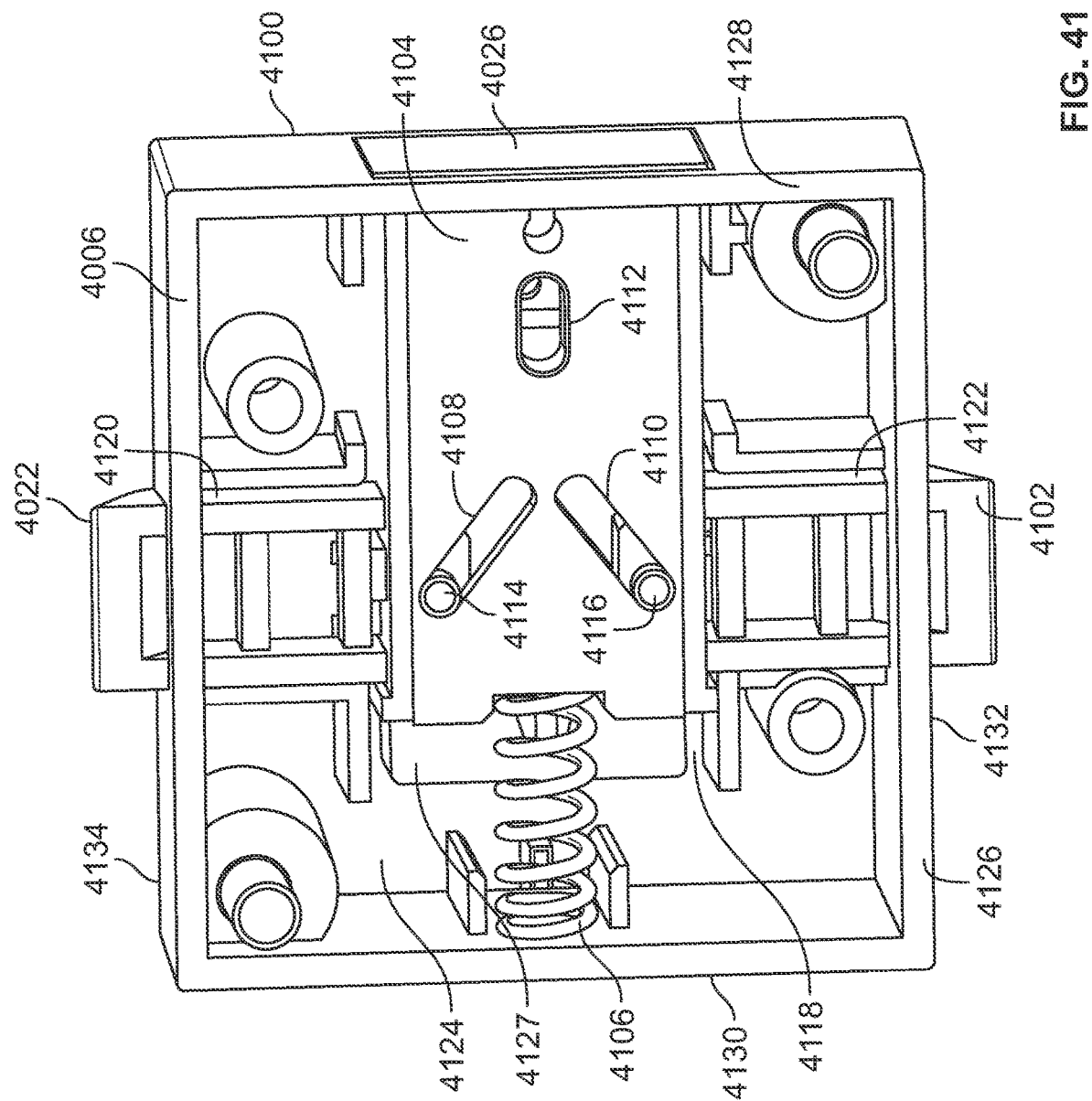
FIG. 41 shows illustrative apparatus in accordance with principles of the invention.

FIG. 41 shows illustrative chassis 4100 of latch 4006. Latch 4006 may include detent 4102. Latch 4006 may include release 4104. Latch 4006 may include spring 4106. Release 4104 may include retraction slot 4108. Release 4104 may include retraction slot 4110. Release 4104 may include engagement element 4112. Engagement element 4112 may include a recess, a ridge, an edge, a surface, or any other suitable engagement element. Detent 4022 may include boss 4114. Boss 4114 may be disposed in retraction slot 4108. Detent 4102 may include boss 4116. Boss 4116 may be disposed in retraction slot 4110.

Detents such as 4020 and 4022 may deflect inward into latches such as 4006 when fixture head 4000 is inserted in direction V(up) into U-channel 1052. The detents may spring out after passing ridges 1038 and 1040. Ridges 1038 and 1040, in an extended state, may prevent the fixture from coming out of U-channel 1052 in the V(down) direction. The detents, supported by ridges 1038 and 1040, may retain fixture head 4000 in U-channel 1052 when a user inserts fixture head 4000 into U-channel 1052 in a direction perpendicular to V(up) or V(down). The detents, supported by ridges 1038 and 1040, may retain fixture head 4000 in U-channel 1052 when a user slides fixture head 4000, in a direction perpendicular to V(up) or V(down), from one position to another in U-channel 1052.

Chassis 4100 may include course 4118. Release 4104 may be constrained to move along course 4118. Chassis 4100 may include course 4120. Detent 4022 may be constrained to move along course 4120. Chassis 4100 may include course 4122. Detent 4102 may be constrained to move along course 4122.

Chassis 4100 may include front side 4124 of backwall 4030. Chassis 4100 may include side wall 4126. Side wall 4126 may form a perimeter around release 4104.

Spring 4106 may bias release 4104 toward section 4128 of side wall 4126. Retraction slots 4108 and 4110 may be oriented such that when spring 4106 extends, retraction slots 4108 and 4110 act on bosses 4114 and 4116 to project detents 4022 and 4102 outwardly away from side wall 4126. The force of spring 4106 may hold detents 4022 and 4102 outwardly away from side wall 4126 in a projected configuration.

The user may move release 4104 toward section 4130 of side wall 4126 against spring 4106. Latch 4006 may include block 4127. Block 4127 may support release 4104 against movement to the rear of chassis 4100. The motion of release 4104 toward section 4130 may cause retraction slots 4108 and 4110 to act on bosses 4114 and 4116 to withdraw detents 4022 and 4102 inwardly. The detents may be drawn inward or flush with outer surfaces of side wall 4126. The user may move release 4104 by engaging engagement element 4112. The user may move release 4104 by pressing button 4026.

Engagement element 4112 may be disposed within a region defined by front side 4124 and side wall 4126.

Latch 4004 may include an arrangement analogous to that of latch 4006.

In the event that sections 4132 and 4134 of side wall 4126 are flush against panels such as 804 and 806, fixture head 4000 may be released from the fixture support by pushing button 4026. If section 4128 of side wall is inaccessible, fixture head 4000 may be released from the fixture support by accessing engagement element 4112 to move release 4104 toward section 4130.

Figure 42:
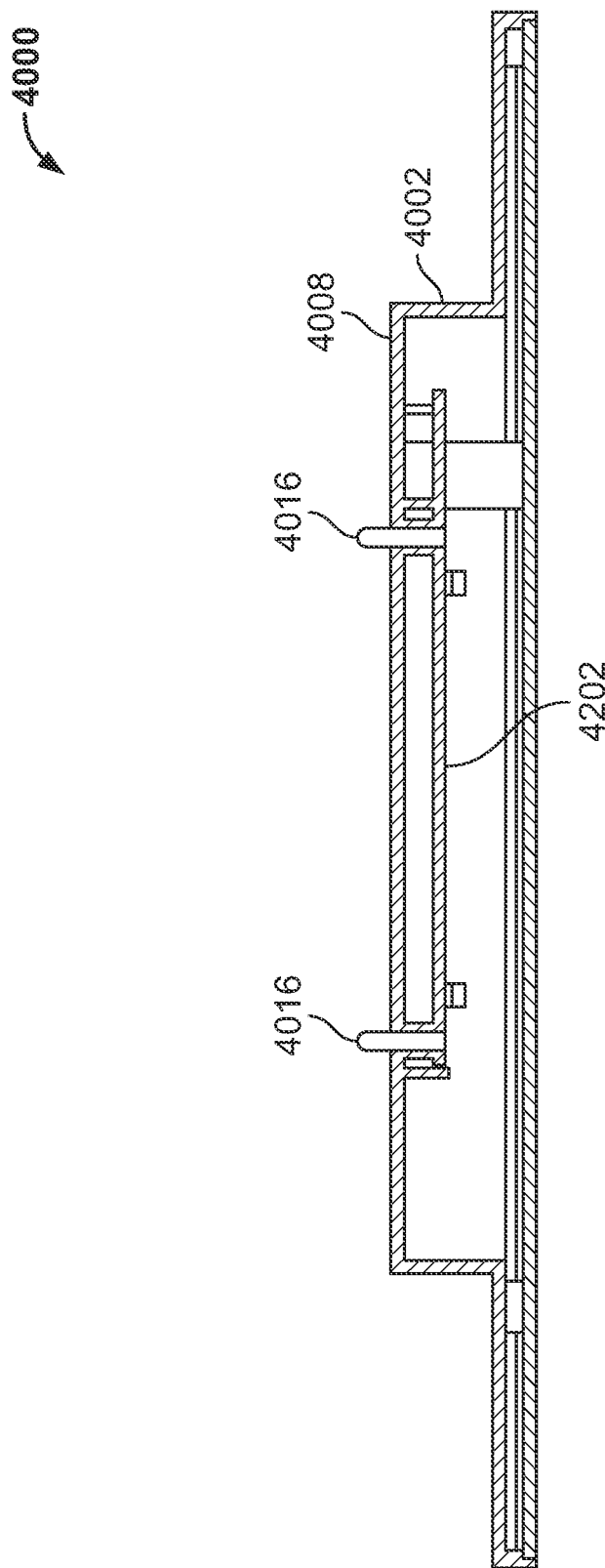
FIG. 42 is a partial cross-sectional view taken along lines 42-42 in FIG. 34.

FIG. 42 shows fixture head 4000 with latches 4004 and 4006 removed. Frame 4002 may support circuit board 4202. Pin pair 4016 is shown in electrical communication with circuit board 4202. Circuit board 4202 may receive power from pin pairs 4014 and 4016. Circuit board 4202 may receive communication signals from pin pairs 4012 and 4018. Circuit board 4202 may include a power distribution circuit (not shown). Circuit board 4202 may include a communication signal distribution circuit (not shown).

Figure 43:
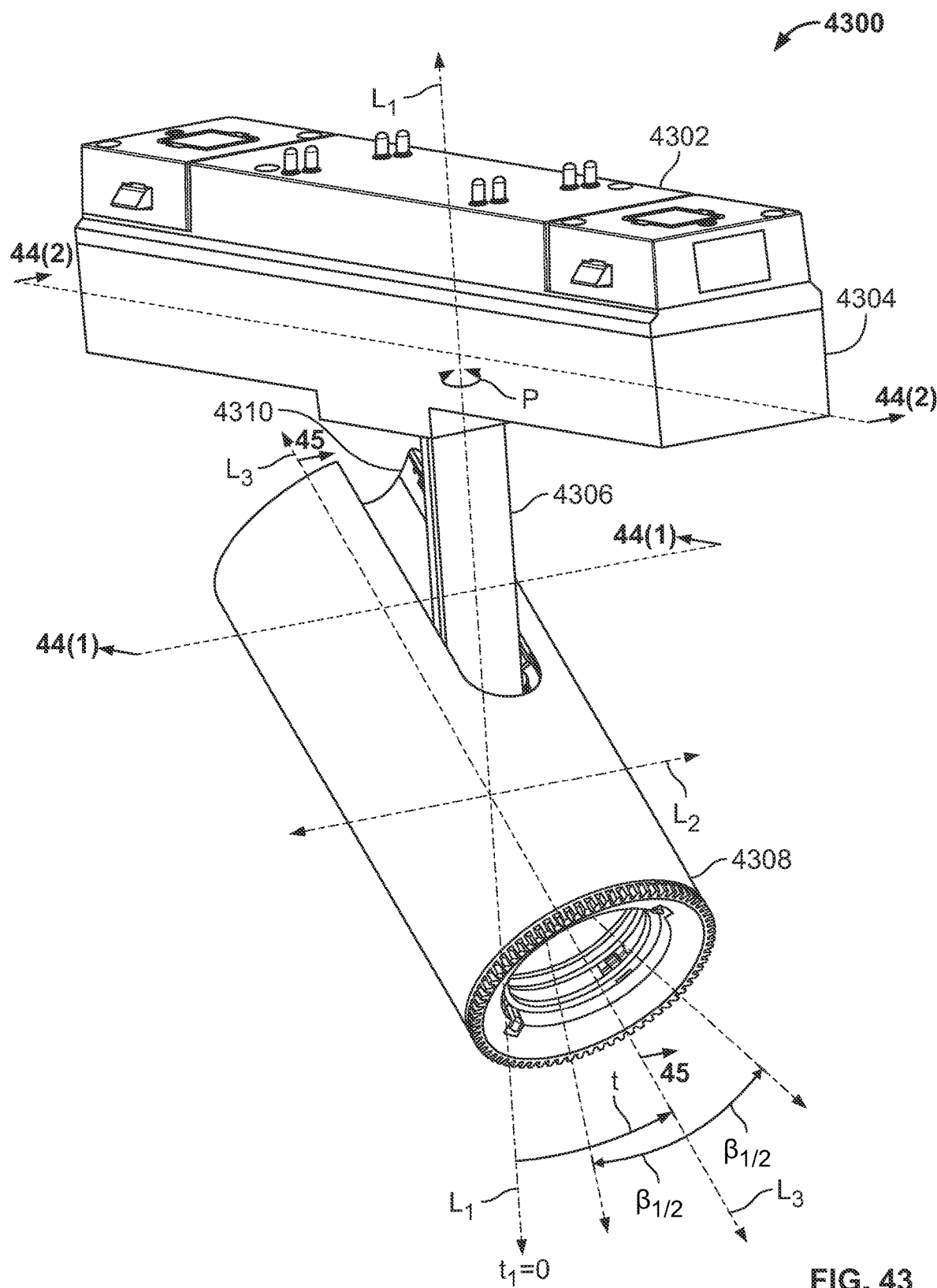
FIG. 43 shows illustrative apparatus in accordance with principles of the invention.

FIG. 43 shows illustrative fixture 4300. Fixture 4300 may include fixture head 4302. Fixture 4300 may include cabinet 4304. Fixture 4300 may include arm 4306. Fixture 4300 may include light 4308.

Fixture head 4302 may have one or more features in common with fixture head 4000.

One or more of cabinet 4304, arm 4306 and light 4308 may include circuits, devices, or both for changing fixture parameters of fixture 4300 based on communication signals or using power received from fixture head 4302.

Cabinet 4304 may include a pan motor for rotating arm 4306 about axis $L_1$ through pan angle p. Light 4308 may include a tilt motor for rotating light 4308 about axis $L_2$ through tilt angle $t_1$. Light 4308 may include a current-responsive lens for changing a beam spread angle $\beta$ of a beam emerging from light 4308 along axis $L_3$.

Light 4308 may include recess 4310. Arm 4306 may occupy some or all of recess 4310 when tilt angle $t_1=0$.

Figure 44:
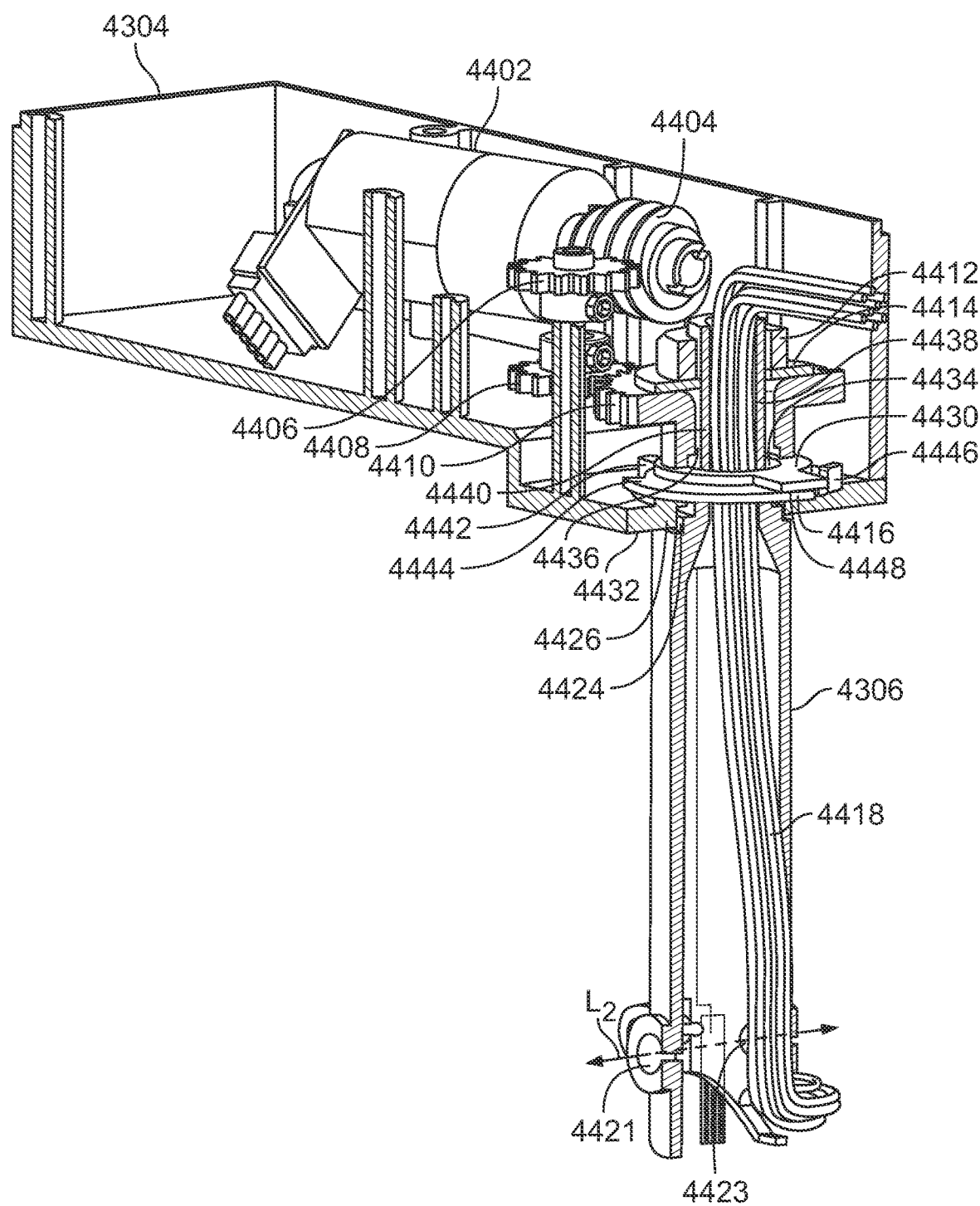
FIG. 44 is a partial cross-sectional view taken along lines 44(1)-44(1) and 44(2)-44(2) in FIG. 37.

FIG. 44 shows in part cabinet 4304 and arm 4306. Electric motor 4402 may drive worm screw 4404. Worm screw 4404 may drive worm wheel 4406. Wheel 4408 may be rigidly fixed to worm wheel 4406. Wheel 4408 may engage pan wheel 4410. Pan wheel 4410 may be coaxial with arm 4306. Pan wheel 4410 may be fixed to and rotatable with arm 4306. Compression nut 4412 may be threadingly engaged with arm 4306. Compression nut 4412 may pressurize washer 4414. Compression nut 4412 may pressurize washer 4416. Compression nut 4412 may pressurize washer 4430.

One or both of washers 4414 and 4430 may have a non-circular opening that matches a non-circular cross-section of arm 4306. One or both of washers 4414 and 4430 may be pressed against and cause engagement of pan wheel 4410 with arm 4306. Straight edges 4432 and 4434 may engage with corresponding straight sides 4436 and 4438 of neck 4440 of arm 4306. Washer 4414 may have one or more straight edges analogous to straight edges 4432 and 4434, and configured to engage sides such as 4436 and 4438. Washers 4414 and 4416 may cause arm 4306 to rotate under torque from wheel 4410.

Cabinet 4304 may include boss 4442 (partially shown). Washer 4416 may include notch 4444 (partially shown). Boss 4442 may limit rotation of washer 4416 about arm 4306. Detent 4446 of washer 4416 may interfere with tab 4448 of washer 4430. Thus, rotation of arm 4306 in one or both directions about axis $L_1$, by interference between tab 4448 and detent 4446 to the extent that boss 4442 interferes with washer 4416.

Cabling 4418 may deliver power from fixture head 4302. Cabling 4418 may provide exchange of communication signals with a microprocessor such as 516, which may be disposed in cabinet 4304.

Cabling 4420 may deliver power to devices in light 4308. Cabling 4420 may provide exchange of communication signals with a microprocessor such as 516, which may be disposed in cabinet 4304. The microprocessor may include a current-adjustable-lens controller.

Step 4426 in cabinet 4304 may provide a reactive force to resist corresponding step 4424 in arm 4306 under tension from compression nut 4412. Step 4424 and step 4426 may act as bearing surface when arm 4306 rotates.

Arm 4306 may include holes 4421 and 4423. Holes 4421 and 4423 may receive an axle for rotation of light 4308 about axis $L_2$.

Figure 45:
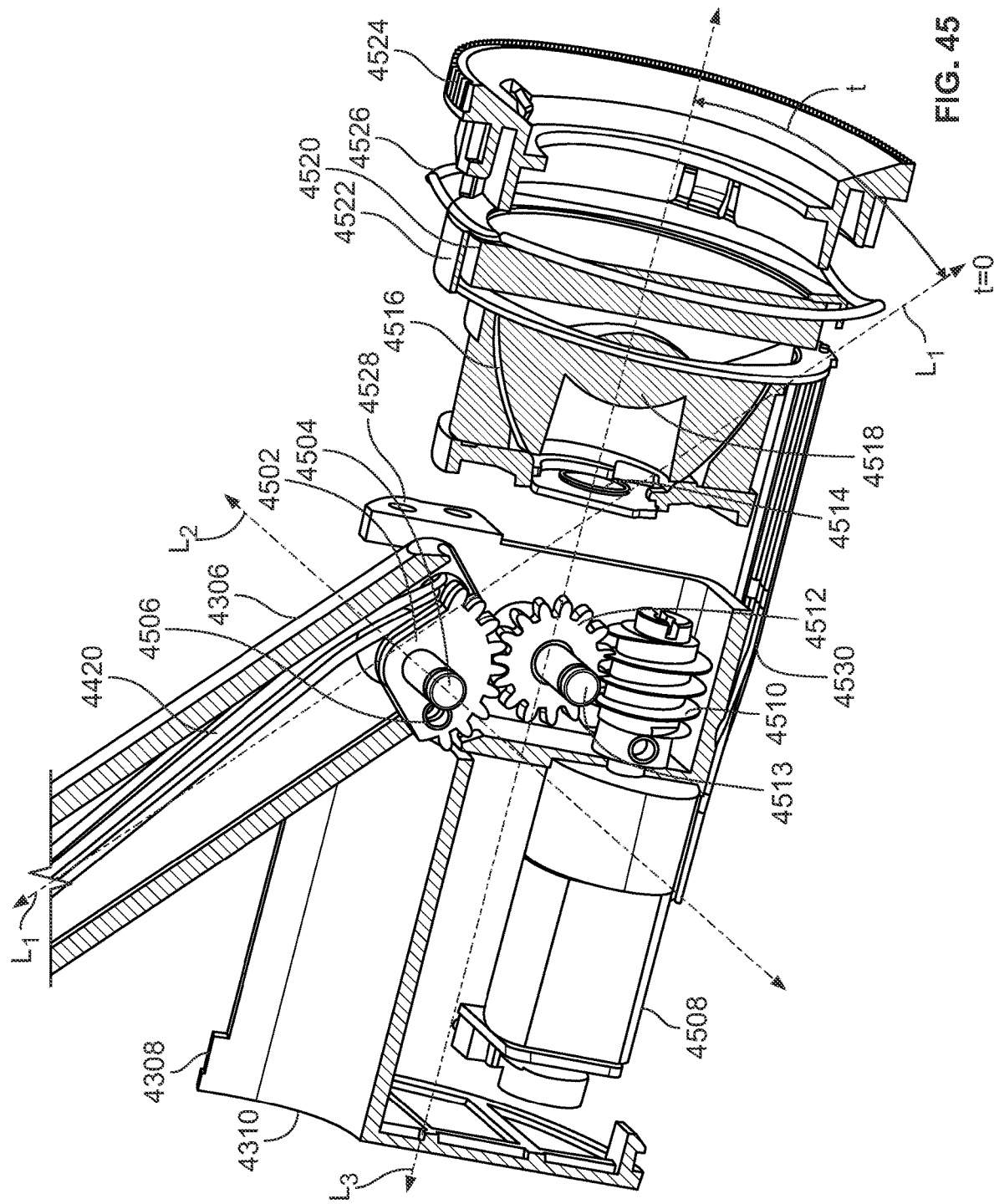
FIG. 45 is a partial cross-sectional view taken along lines 45-45 in FIG. 37.
Figure 46:
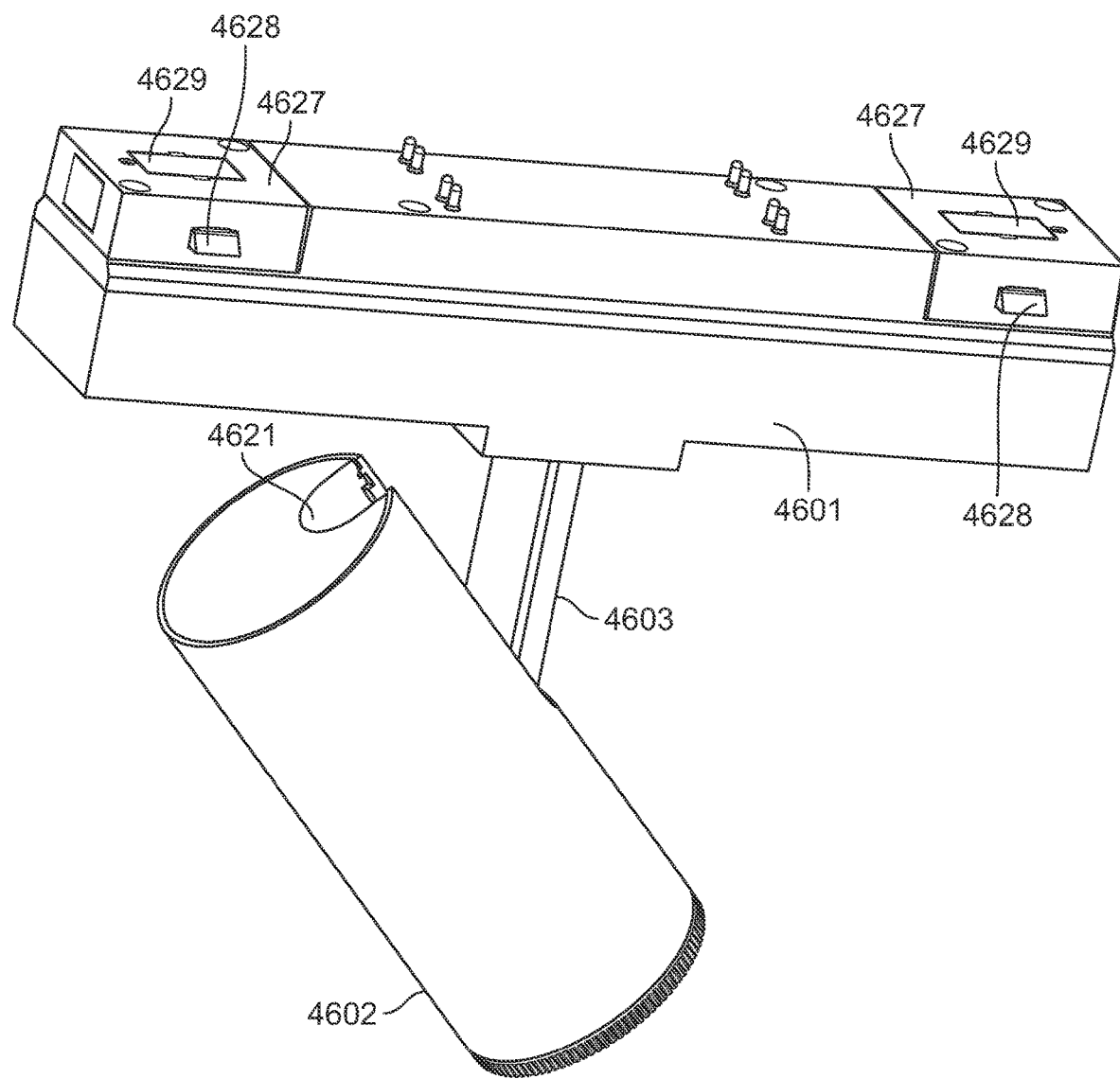
FIG. 46 shows illustrative apparatus in accordance with principles of the invention.
Figure 47:
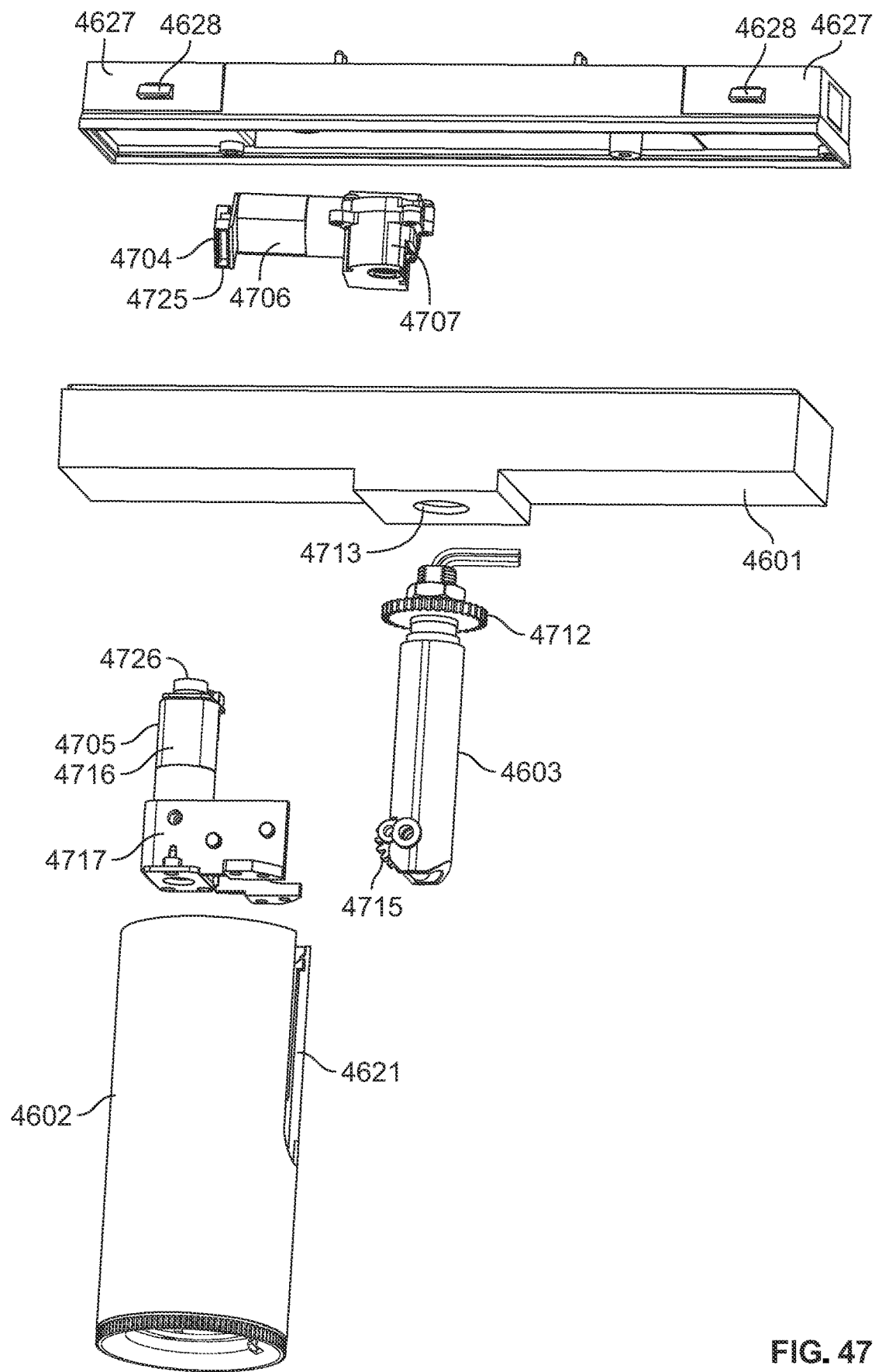
FIG. 47 shows illustrative apparatus in accordance with principles of the invention.
Figure 48:
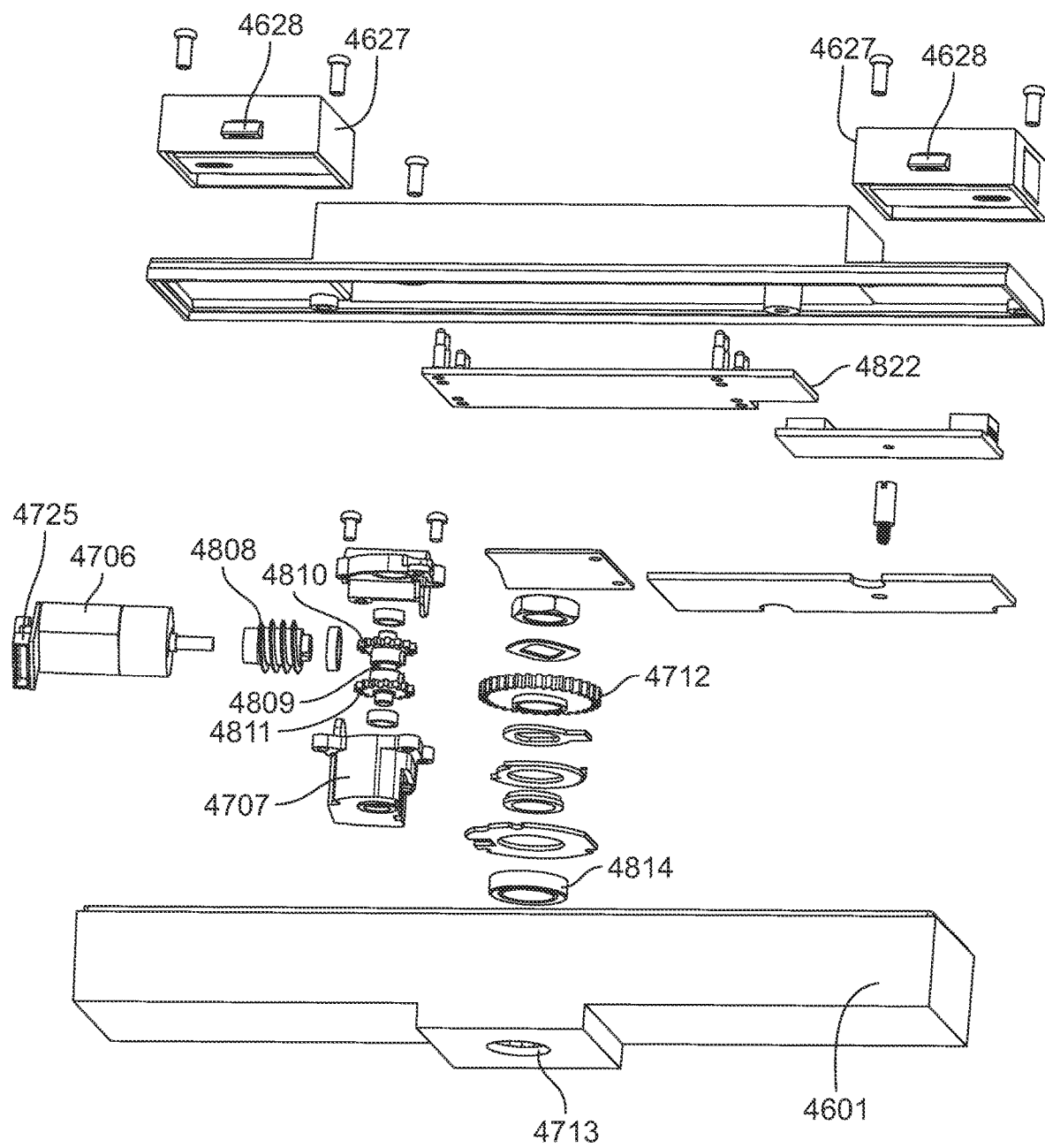
FIG. 48 shows illustrative apparatus in accordance with principles of the invention.
Figure 49:
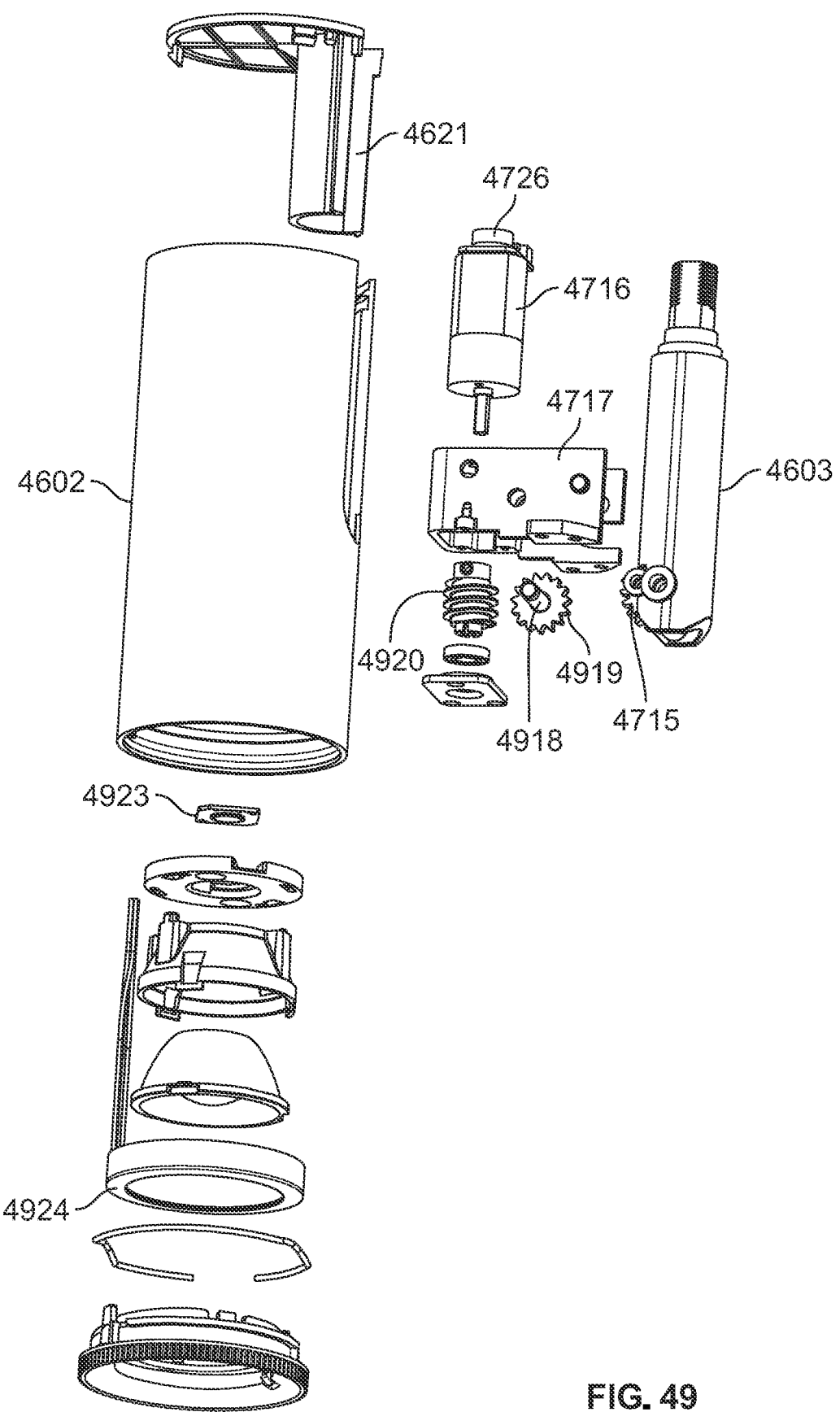
FIG. 49 shows illustrative apparatus in accordance with principles of the invention.

FIG. 45 shows in part arm 4306 and light 4308. Tilt wheel 4502 may be rigidly fixed to arm 4306 by axle 4504 along axis $L_2$. Hole 4506 in tilt wheel 4502 may receive a pin (not shown). The pin may be disposed in hole 4506 and in corresponding holes in arm 4306.

Electric motor 4508 may drive worm screw 4510. Worm screw 4510 may drive worm wheel 4512. Pin 4513 may support worm wheel 4512. Wheel 4512 may engage tilt wheel 4502. When worm wheel 4512 turns, axis $L_3$ may be moved to a different tilt angle $t_1$ relative to $L_1$.

LED emitter 4514 may emit light. Reflector surface 4516 may intensify the light. Static lens 4518 may form a beam centered along axis $L_3$ from the light. Static lens 4518 may include a convex surface. The beam may pass through liquid crystal lens 4520. Lens 4520 may include a liquid crystal material that converges light based on an electric field applied to the material. Frame 4522 may apply the electric field to lens 4520. Light 4308 may include shroud 4524. Clip 4526 may hold shroud 4524 in place.

Frame 4528 may support axle 4504 and pin 4513.

Cabling 4418 may deliver power from fixture head 4302. Cabling 4418 may provide exchange of communication signals with a microprocessor such as 516, which may be disposed in cabinet 4304.

Cabling 4530 may include an extension of some or all of cabling 4420.

Frame 4522 may receive current from cabling 4530.

FIGS. 46-49 show illustrative power supply box 4601, illustrative lamp body 4602, and illustrative lamp arm assembly 4603. Power supply box 4601 may have one or more features in common with fixture head 4000. Power supply box 4601 may have one or more features in common with cabinet 4304. Lamp body 4602 may have one or more features in common with light 4308. Lamp arm assembly may have one or more features in common with arm 4306.

Power supply box 4601 may include first driving assembly 4704. Lamp body assembly 4602 may include second driving assembly 4705. One end of lamp arm assembly 4603 may be rotatably connected to power supply box 4601. The other end of the lamp arm assembly 4603 may be rotatably connected to lamp body assembly 4602. First driving assembly 4704 may be used to drive lamp arm assembly 4603 to rotate. Second driving assembly 4705 may be used to drive lamp body assembly 4602 to rotate. The top of power supply box 4601 may be provided with fixing blocks 4627. Each fixing block 4627 may include sliding protrusions 4628. Sliding protrusions 4628 may be configured to slidingly retract and extend from power supply box 4601 for installation or deinstallation of power box 4601 in a fixture support such as fixture support 800. First driving assembly 4704 may drive lamp arm assembly 4603 to rotate. Second driving assembly 4705 may drive lamp body assembly 4602 to rotate. The position of lamp body assembly 4602 and an angle (an "irradiation angle") of a beam from lamp body assembly 4602 may thus be controlled by a motor. Power supply box 4601 may include control circuit board module 4822. Control circuit board module 4822 may be in electrical communication with first driving assembly 4704 and second driving assembly 4705. Control circuit board module 4822 may include a wireless communication module. The wireless communication module may be configured to communicate with a control module such as 304 or an input such as 306.

The top of fixing block 4627 may provided with magnet 4629. Fixing block 4627 may thus be attached to the fixture support by the magnet 4629.

First driving assembly 4704 may include first drive motor 4706. First driving assembly 4704 may include first gear box 4707. An output shaft of first drive motor 4706 may be connected to first encoder 4808. First gear shaft 4809 may be rotatably arranged in first gear box 4707. First transmission gear 4810 may be in meshing transmission connection with first encoder 4808. First transmission gear 4810 may be disposed over the outer circumference of one end of first gear shaft 4809. Second transmission gear 4811 may be disposed over the outer circumference of the other end of first gear shaft 4809. First lamp arm gear 4712 may be in meshing transmission connection with second transmission gear 4811. First lamp arm gear 4712 may be fixedly disposed over the outer circumference of one end of the lamp arm assembly 4603. First gear box 4707 may be disposed in power supply box 4601. First drive motor 4706 may be disposed on first gear box 4707. First drive motor 4706 may drive first encoder 4808 to rotate. First drive motor 4706 may drive first transmission gear 4810 to rotate. Second transmission gear 4811 may thus be driven to rotate through the cooperation of first gear shaft 4809 the second transmission gear 4811. This may cause rotation of first lamp arm gear 4712 and lamp arm assembly 4603.

A center element of a lower end surface of the power supply box 4601 may include a rotating hole 4713. A lamp arm bearing 4814 may be disposed in the rotating hole 4713. One end of lamp arm assembly 4603 may be rotatably connected to rotating hole 4713 through lamp arm bearing 4814.

The other end of lamp arm assembly 4603 may include second lamp arm gear 4715. Second driving assembly 4705 may include second drive motor 4716. Second driving assembly 4705 may include second gear box 4717. Second gear shaft 4918 may be rotatably arranged in second gear box 4717. Third transmission gear 4919 may be disposed over the outer circumference of second gear shaft 4918. An output shaft of second drive motor 4716 may be connected to second worm 4920. Second worm 4920 and second lamp arm gear 4715 may be respectively in meshing transmission connection with third transmission gear 4919. Second gear box 4717 may be disposed in lamp body assembly 4602. Second drive motor 4716 may be disposed on second gear box 4717. Second drive motor 4716 may drive second worm 4920 to rotate. Second drive motor 4716 may drive third transmission gear 4919 to rotate. Rotational control of lamp body assembly 4602 may be accomplished through the cooperative meshing transmission of third transmission gear 4919 and second lamp arm gear 4715.

Pocket groove 4621 may be disposed on one side of an outer wall of lamp body assembly 4602. Pocket groove 4621 may be arranged complementarily with lamp arm assembly 4603. Pocket groove 4621 receive lamp arm assembly 4603 to facilitate angle adjustment between the lamp arm assembly 4603 and the lamp body assembly 4602.

Lamp body assembly 4602 may include light source 4923. Light source 4923 may be in electrical communication with control circuit board module 4822. Current supplied by control circuit board module 4822 to light source 4923 assembly may be adjusted to adjust the brightness of light source 4923 assembly. The brightness of light source 4923 may be controlled through a control module such as 304 or an input such as 306.

Lamp body assembly 4602 may include lens 4924. Lens 4924 may be electrically connected to the control circuit board module 4822. The transparency of lens 4924 may be controlled through a control module such as 304 or an input such as 306. A beam angle of lamp body assembly may be controlled through a control module such as 304 or an input such as 306.

A first encoder 4725 may be disposed at a tail portion of the first drive motor 4706. First encoder 4725 may be configured to record a rotational position of the first drive motor 4706. Second encoder 4726 may be arranged at a tail portion of second drive motor 4716. Second encoder 4726 may be configured to record a rotational position of second drive motor 4716. Recordation of a rotational position may provide a reference for performing a further rotation that is defined relative to a recorded rotational position.

Figure 50:
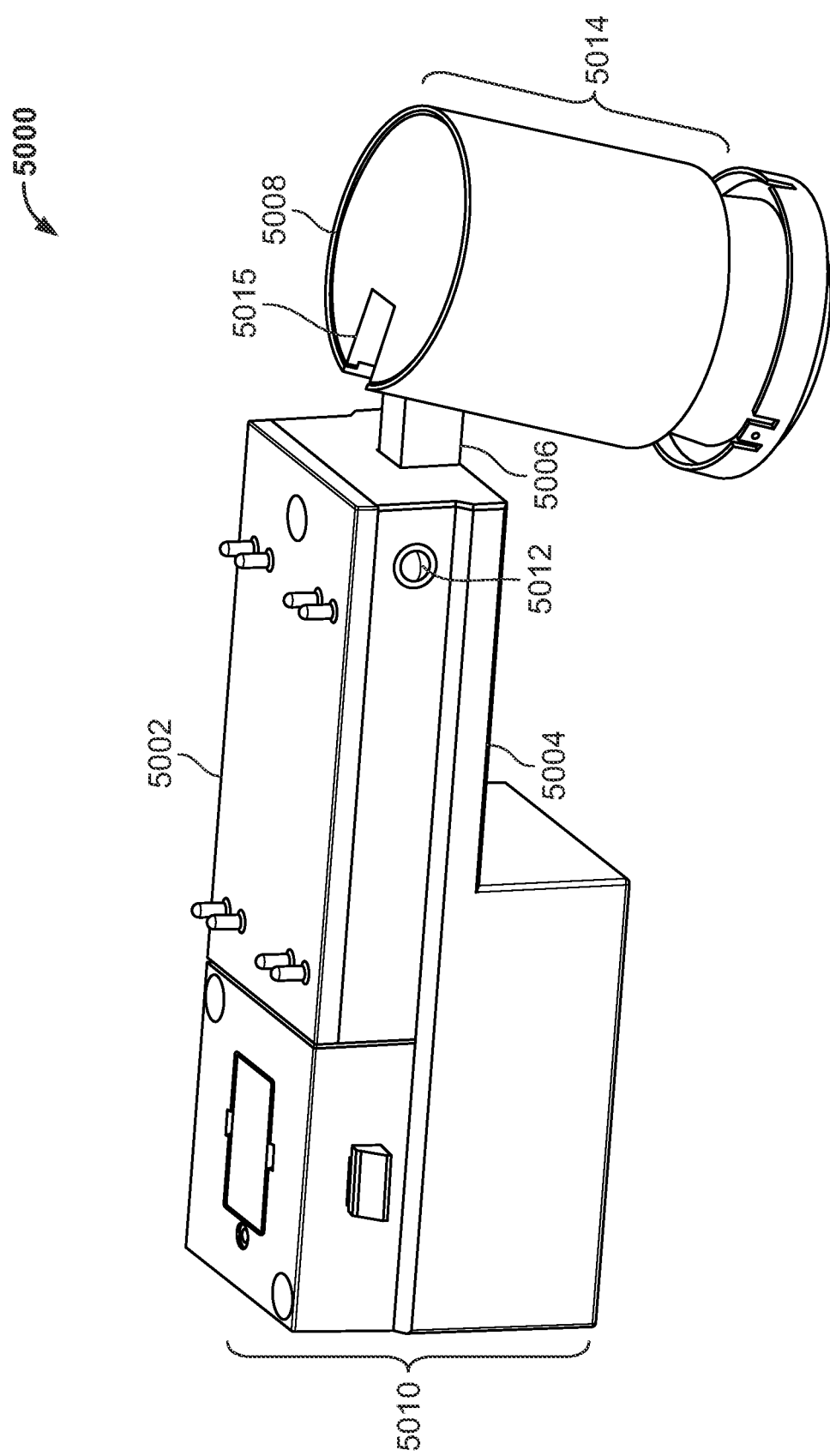
FIG. 50 shows illustrative apparatus in accordance with principles of the invention.

FIG. 50 shows illustrative fixture 5000. Fixture 5000 may include fixture head 5002. Fixture 5000 may include cabinet 5004. Fixture 5000 may include arm 5006. Fixture 5000 may include light 5008.

Fixture head 5002 may have one or more features in common with fixture head 4000.

One or more of cabinet 5004, arm 5006 and light 5008 may include circuits, devices, or both for changing fixture parameters of fixture 5000 based on communication signals or using power received from fixture head 5002.

Fixture head 5002 and cabinet 5004 may form base 5010. Fixture head 5002 may include detent 5012. Fixture head 5002 may have a detent (not shown) on a side of fixture head 5002 opposite the side including detent 5012. Detent 5012 and the corresponding opposite detent in operation may be supported by ridges 1038 and 1040.

Light 5008 may include housing 5014. Housing 5014 may include recess 5015. Recess 5015 may receive arm 5006 when housing 5014 is tilted relative to arm 5006.

Figure 51:
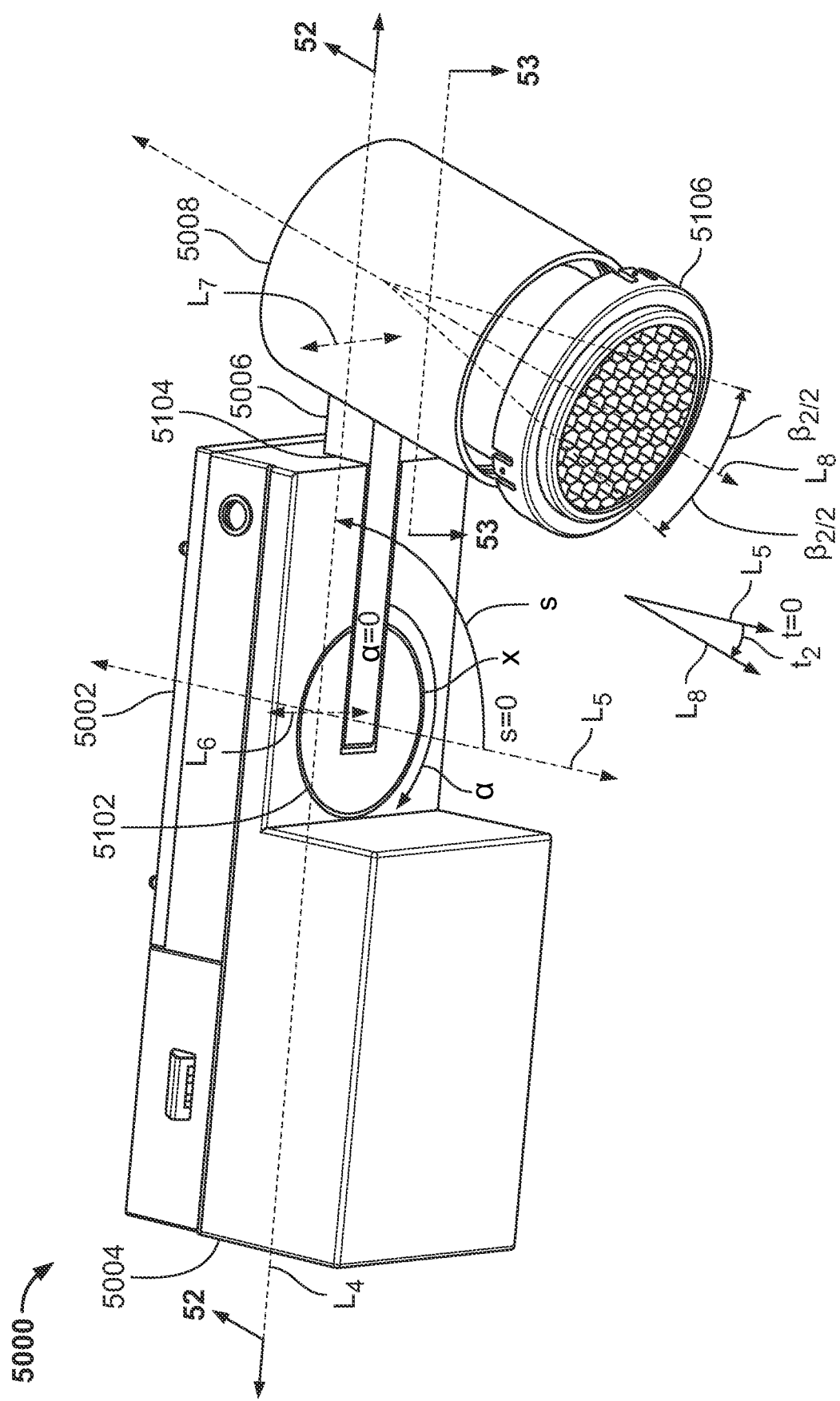
FIG. 51 shows illustrative apparatus in accordance with principles of the invention.

FIG. 51 shows that cabinet 5004 may include turntable 5102. Turntable 5102 may include a joint that pivotably links turntable 5102 to arm 5006. Arm 5006 may include central axis $L_4$. Turntable may be rotatable about axis $L_5$ through pan angle p when arm 5006 is clear of cabinet 5004. Turntable 5102 may rotate through pan angle p to permit rotation of light 5008. Arm 5006 may be rotated about axis $L_6$ through swing angle s. When swing angle s is 180° and pan angle p is 0, arm 5006 may be seated in recess 5104 in fixture head 5002.

Light 5008 may include a joint (not shown) on axis $L_7$ that pivotably links light 5008 to arm 5006. The joint may permit rotation of light 5008 relative to arm 5006 about axis $L_7$ through tilt angle $t_2$. When tilt angle $t_2$=0, arm 5006 may be seated in recess 5015.

Rotation of annulus 5106 may displace a lens (not shown) in light 5008 relative to an LED emitter (not shown) in light 5008. The displacement may change beam spread angle $\beta_2$.

Figure 52:
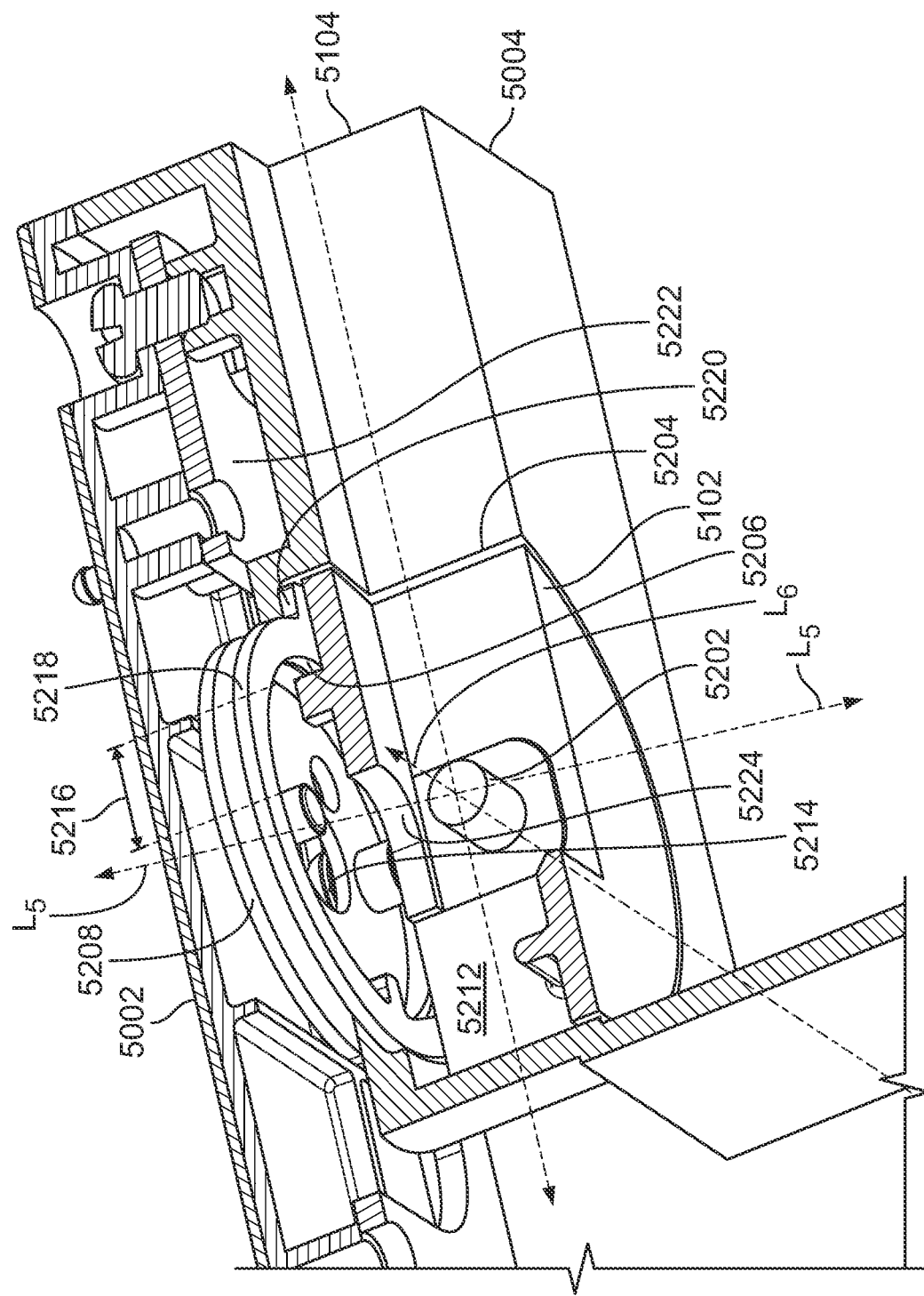
FIG. 52 is a partial cross-sectional view taken along lines 52-52 in FIG. 41.

FIG. 52 shows partially turntable 5102 in cabinet 5004. Pin 5202 may extend along axis $L_6$ from turntable 5102. Arm 5006 (not shown) may be rotatable around pin 5202.

A half of turntable 5102 that is not shown in the view of FIG. 52 may mirror the half of turntable 5102 that is shown in the view.

Turntable 5102 may conform to well 5204 with suitable tolerance for rotation. Cabinet 5004 may include shelf 5206. Shelf 5206 may retain turntable 5102 in a fixed position relative to cabinet 5004 along axis $L_5$. Shelf 5206 may be the sole element of cabinet 5004 that retains turntable 5102 in a fixed position relative to cabinet 5004 along axis $L_5$.

Turntable 5102 may include runner 5208. Turntable 5102 may include washer 5218. Runner 5208 may be fixed to body 5212 of turntable 5102 by fasteners 5214 and 5216. Washer 5218 may be disposed between shelf 5206 and body 5212. Tension from fasteners 5214 and 5216 may compress shelf 5206 and washer 5218 between runner 5208 and body 5212. The tension may provide enough frictional resistance to prevent turntable 5102 from inadvertently rotating about axis $L_5$ but permit the user to conveniently manually rotate turntable 5102.

Washer 5218 may include tab 5220. Cabinet 4304 may include a projection that may interfere with tab 5220 when washer 5218 rotates. The projection may prevent rotation of washer 5218 when turntable 5102 rotates.

Fixture head 5002 may include circuit board 5222. Circuit board 5222 may be in electrical communication with pins such as 4010.

Bay 5224 may provide passage for cabling (not show) for light 5008.

Figure 53:
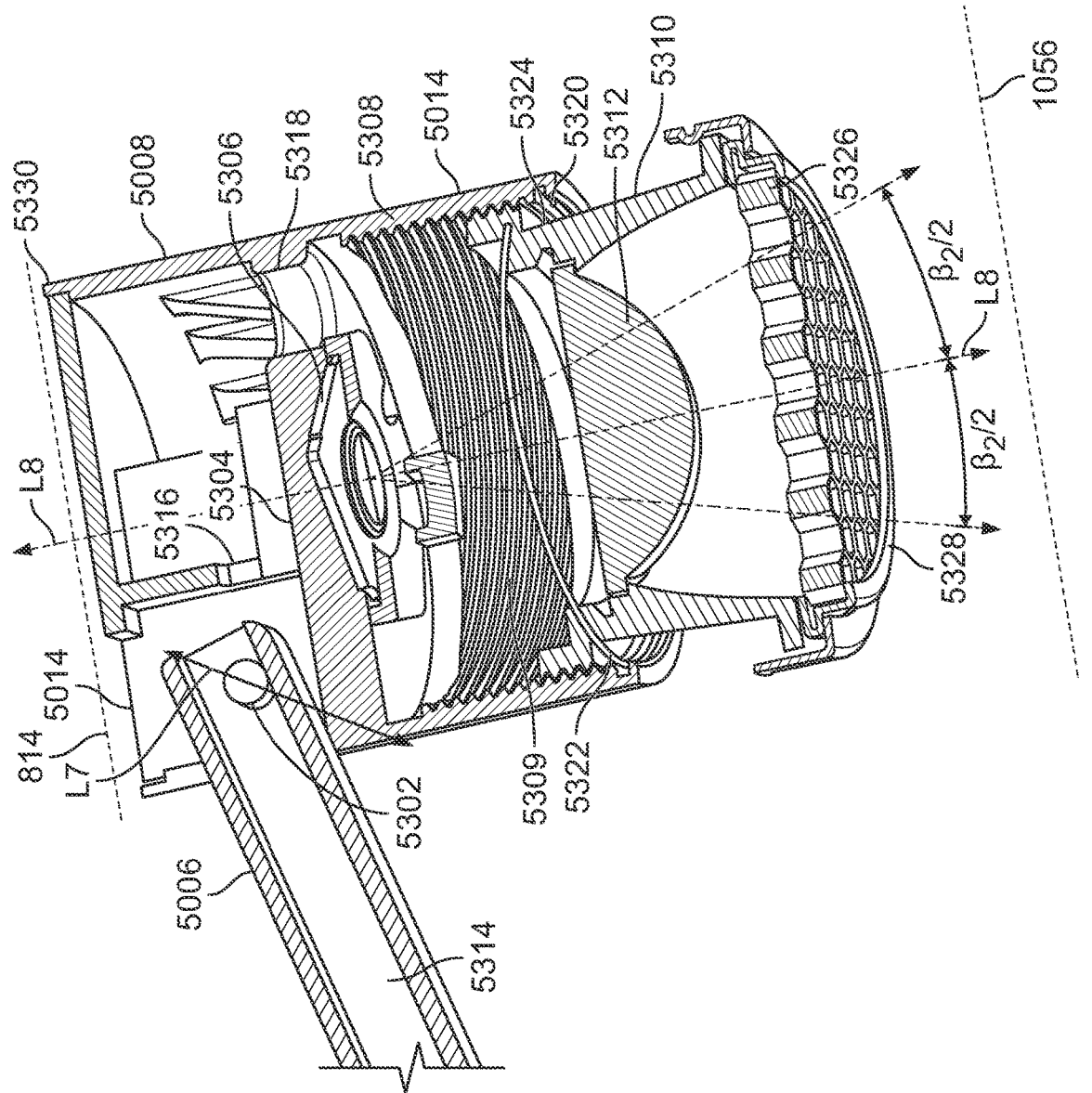
FIG. 53 is a partial cross-sectional view taken along lines 53-53 in FIG. 41.
Figure 54:
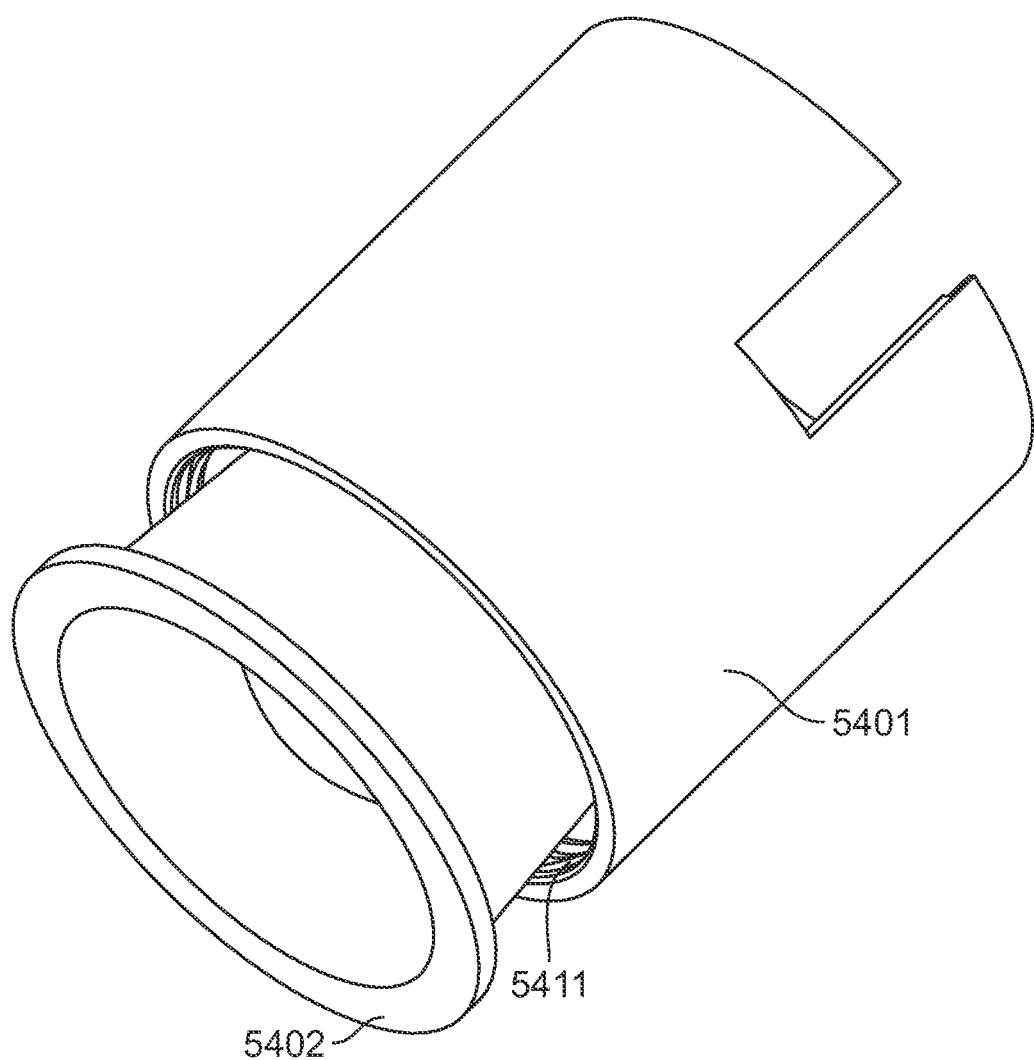
FIG. 54 shows illustrative apparatus in accordance with principles of the invention.
Figure 55:
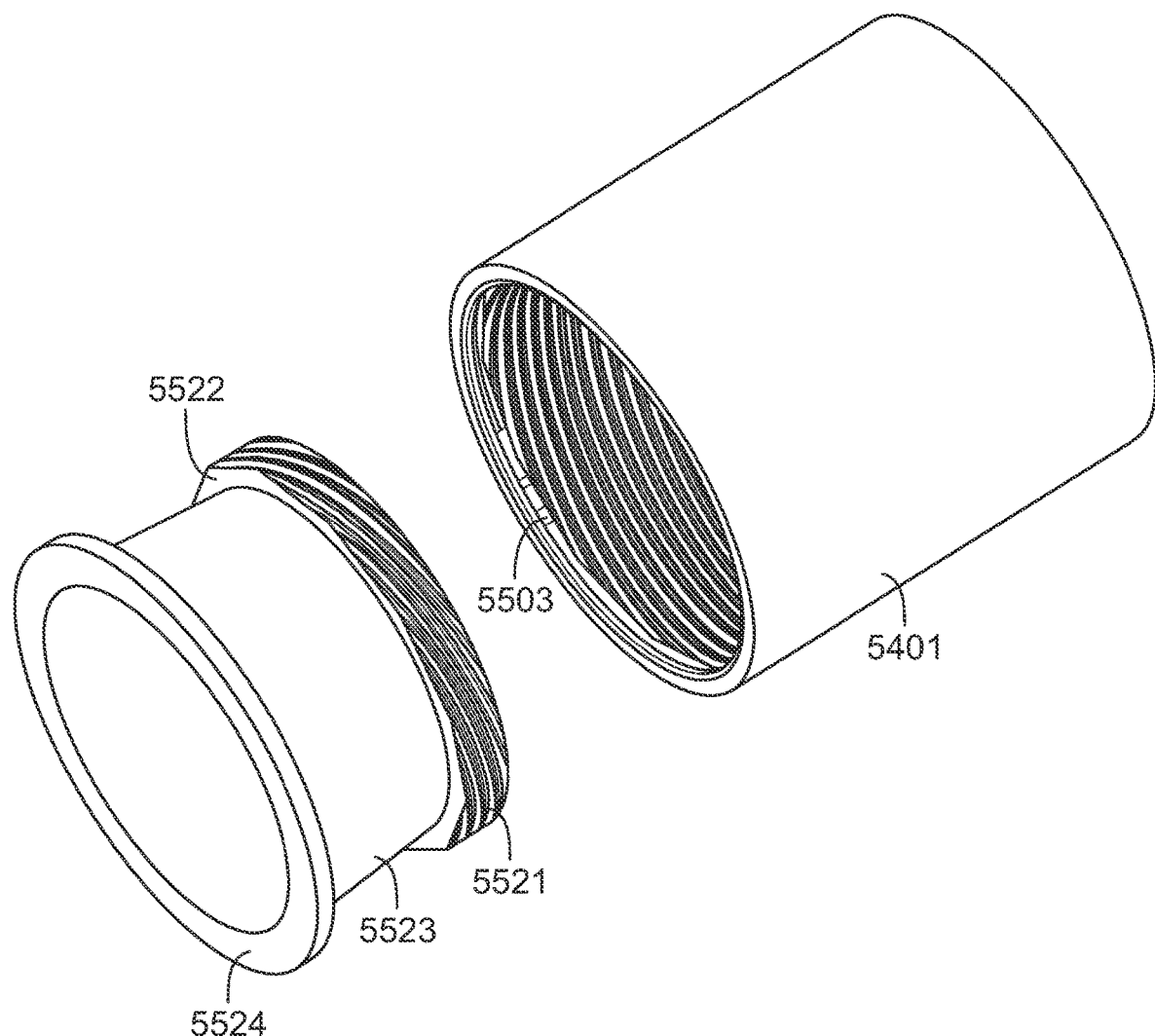
FIG. 55 shows illustrative apparatus in accordance with principles of the invention.
Figure 56:
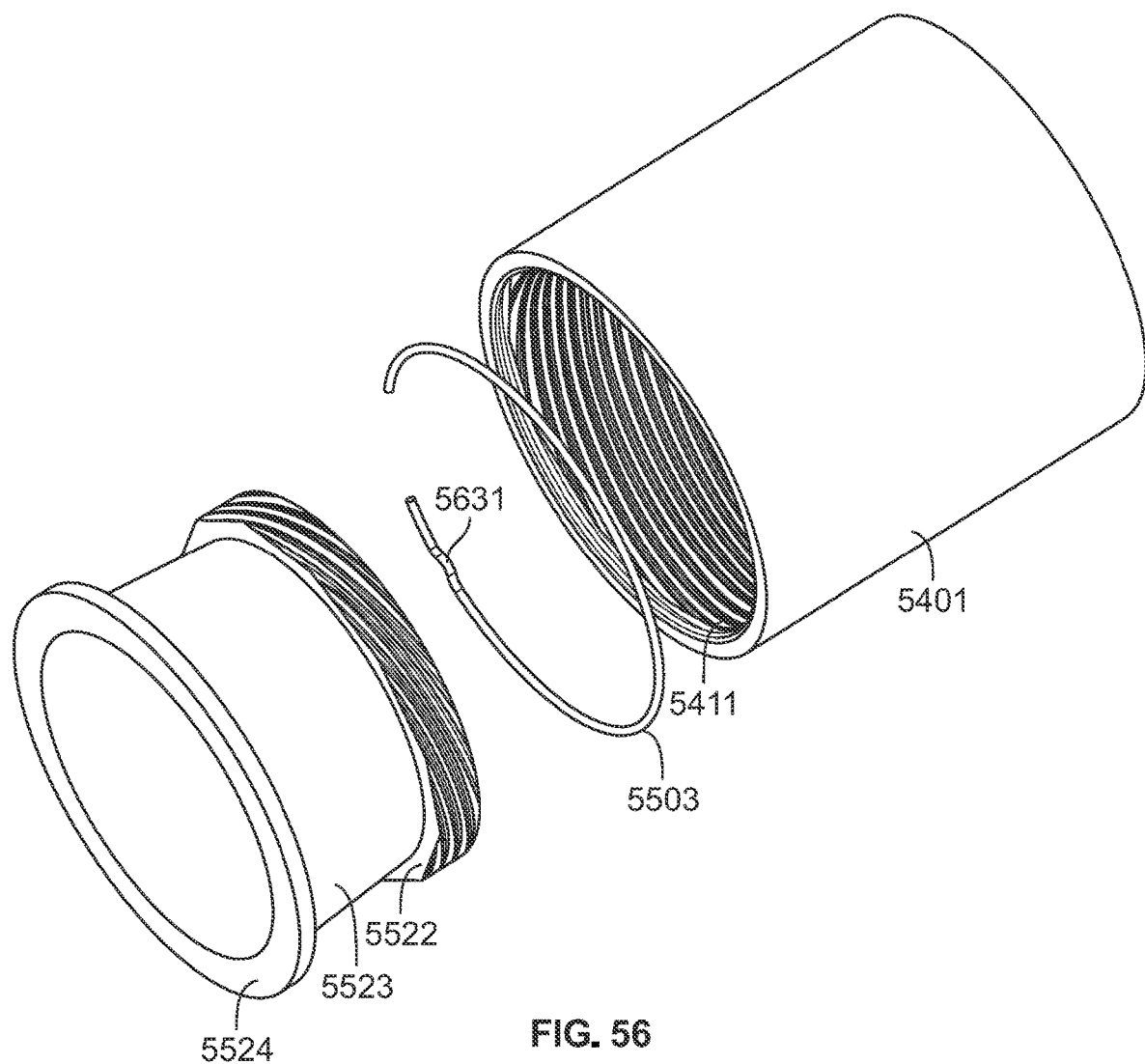
FIG. 56 shows illustrative apparatus in accordance with principles of the invention.
Figure 57:
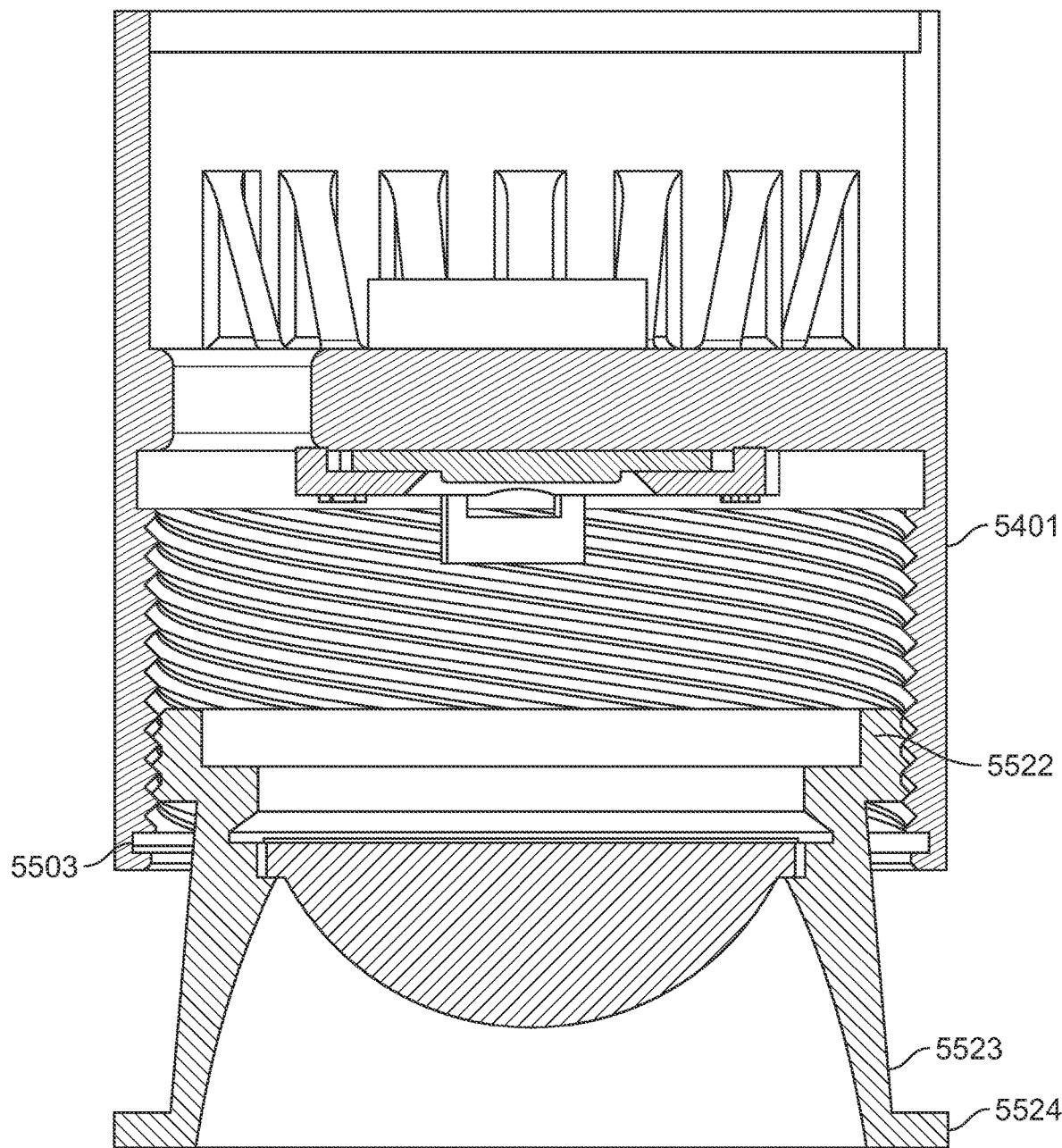
FIG. 57 shows illustrative apparatus in accordance with principles of the invention.

FIG. 53 shows partially arm 5006 and light 5008. Arm 5006 may swing relative to light 5008 about pin 5302, along axis $L_7$. Housing 5014 may include bench 5304. Bench 5304 may support LED emitter 5306. Housing 5014 may include threads 5308. Threads 5308 may line annular recess 5309. Threads 5308 may support collar 5310. Collar 5310 may be threadingly engaged with threads 5308. Collar 5310 may be manually moved up and down along axis $L_8$ by rotating collar 5310 in threads 5308. Moving collar 5310 up or down along axis $L_8$ changes the distance between lens 5312 and LED emitter 5306. The change in distance changes beam spread angle $\beta_2$.

Passageway 5314, pass-through 5316, and hole 5318 may provide for passage of cabling from fixture head 5002 to LED emitter 5306.

Housing 5014 may include groove 5320. Clip 5322 may be disposed in groove 5320. Clip 5322 may be shaped and biased to prevent collar 5310 from exiting threads 5308 by interfering with flange 5324 of collar 5310 while remaining lodged in groove 5320.

Honeycomb 5326 may reduce glare from a beam emitted from LED emitter 5306.

Housing 5014 may include lip 5328. Housing 5014 may be retractable into a U-channel such as U-channel 1052. When housing 5014 is retracted into U-channel 1052, lip 5328 may be drawn above a distal edge of the U-channel, such as distal edge 1056 (schematically shown in broken line). When housing 5014 is retracted into U-channel 1052, crown 5330 of housing 5014 may abut or nearly abut a docking tier such as docking tier 814 (schematically shown in broken line).

FIG. 58 shows illustrative fixture 5800. Fixture 5800 may include fixture head 5802. Fixture 5800 may include cabinet 5804. Fixture 5800 may include cord 5806. Fixture 5800 may include light 5808.

Fixture head 5802 may have one or more features in common with fixture head 4000.

One or both of cabinet 5804 and light 5808 may include circuits, devices, or both for changing fixture parameters of fixture 5800 based on communication signals or using power received from fixture head 5802.

Fixture head 5802 and cabinet 5804 may form base 5810. Light 5808 may include housing 5814.

Light 5808 may be positioned along axis $L_9$ of cord 5806 at a height h above a reference level r. Level r may correspond to a structure, a floor, the ground or any other reference object. Axis $L_9$ may define radial direction R.

FIGS. 54-57 show illustrative radiator 5401, condensing cover 5402 and clamping ring 5503. Radiator 5401 may have one or more features in common with light 4308. Radiator 5401 may have one or more features in common with housing 5014. Condensing cover 5402 may have one or more features in common with shroud 4524. Condensing cover 5402 may have one or more features in common with annulus 5106. Clamping ring 5503 may have one or more features in common with clip 5322.

An inner wall of radiator may include internal thread 5411. Condensing cover 5402 may include external thread 5521. Clamping ring 5503 may be disposed near the inner wall of radiator 5401. Clamping ring 5503 may be rotatably mounted to internal thread 5411. Condensing cover 5402 may be screwed to radiator 5401 via external thread 5521.

When condensing cover 5402 is rotated for focusing, the position of condensing cover 5402 may be e limited by clamping ring 5503 to prevent condensing cover 5402 and a lens associated therewith from being detached from radiator 5401 due to excessive rotation.

Condensing cover 5402 may include mounting element 5522. Condensing cover 5402 may include connecting element 5523. Condensing cover 5402 may include fixing element 5524. Mounting element 5522 and fixing element 5524 may be arranged at two ends of connecting element 5523. External thread 5521 may be arranged on mounting element 5522. Mounting element 5522 may be rotatably mounted to the radiator 5401 via external thread 5521. External thread 5521 on mounting element 5522 may be screwed to internal thread 5411 of radiator 5401.

Clamping ring 5503 may protrude inward to form disassembling element 5631. When clamping ring 5503 is installed, first condensing cover 5402 may be rotated into radiator 5401, and then clamping ring 5503 may be placed in internal thread 5411 of radiator 5401 in a surrounding manner. For disassembly, tweezers or another similar item may be used to clamp disassembling element 5631 and withdraw clamping ring 5503 from internal thread 5411. When a light source or lens needs to be replaced, disassembly may be performed directly from the front of condensing cover 5402.

An outer diameter of connecting element 5523 may gradually decrease from left to right (along a direction from condensing cover 5402 to radiator 5401). This may expose a gap between condensing cover 5402 and radiator 5401. The gap may facilitate heat dissipation.

An outer diameter of fixing element 5524 may be greater than an inner diameter of radiator 5401. When rotated to the deepest position, fixing element 5524 may abut against radiator 5401.

FIG. 59 shows that light 5808 may include lens 5902. Light 5808 may include shield 5904. Shield 5904 may be extendable away from housing 5814 along axis $L_9$. Shield 5904 may be rotated relative to housing 5814 to adjust beam spread angle $\beta_3$. Shield 5904 may be translated along axis $L_9$ to prevent light from light 5808 from spreading outside a targeted area.

Figure 60:
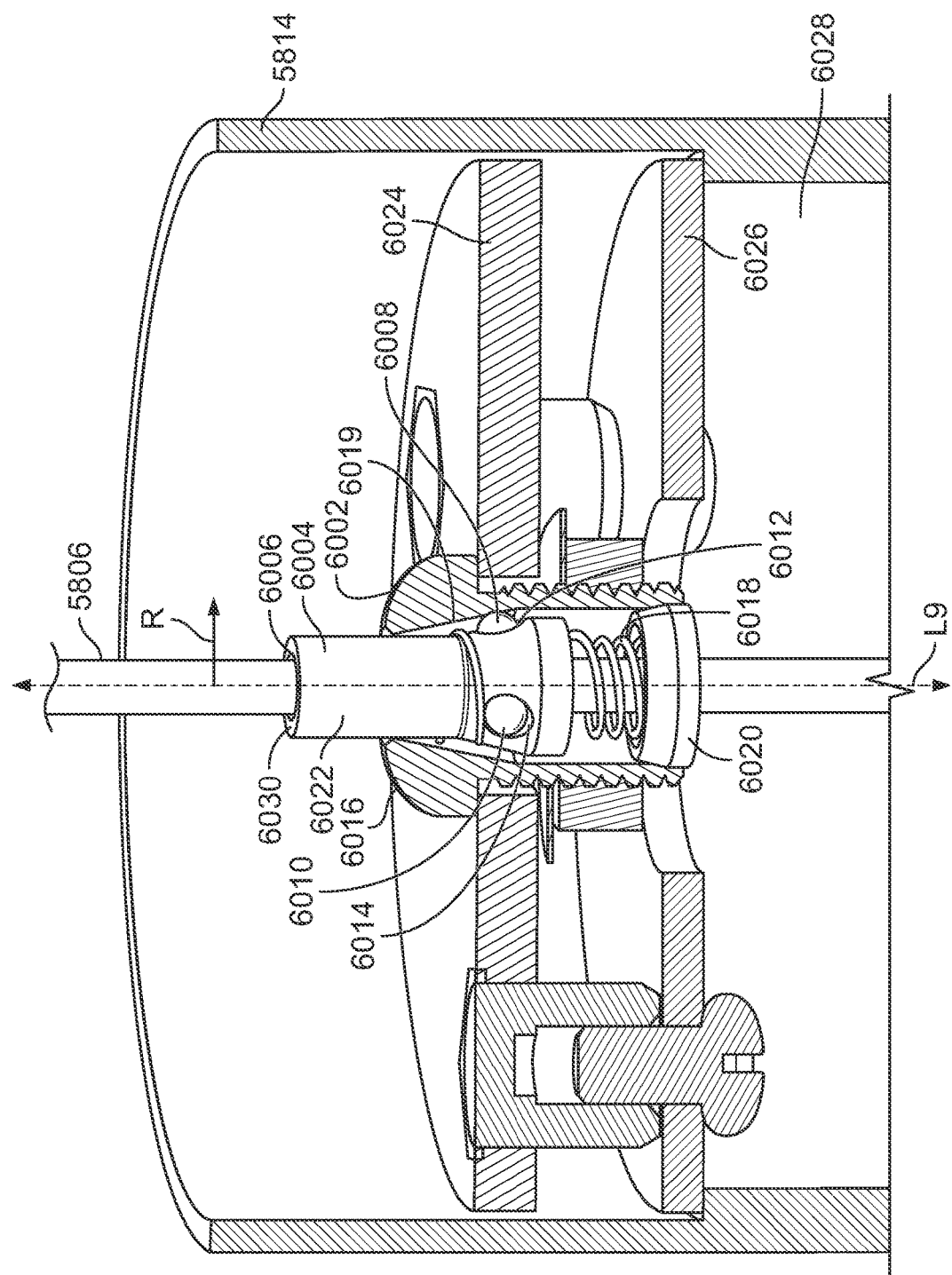
FIG. 60 is a partial cross-sectional view taken along lines 60-60 in FIG. 44.
Figure 61:
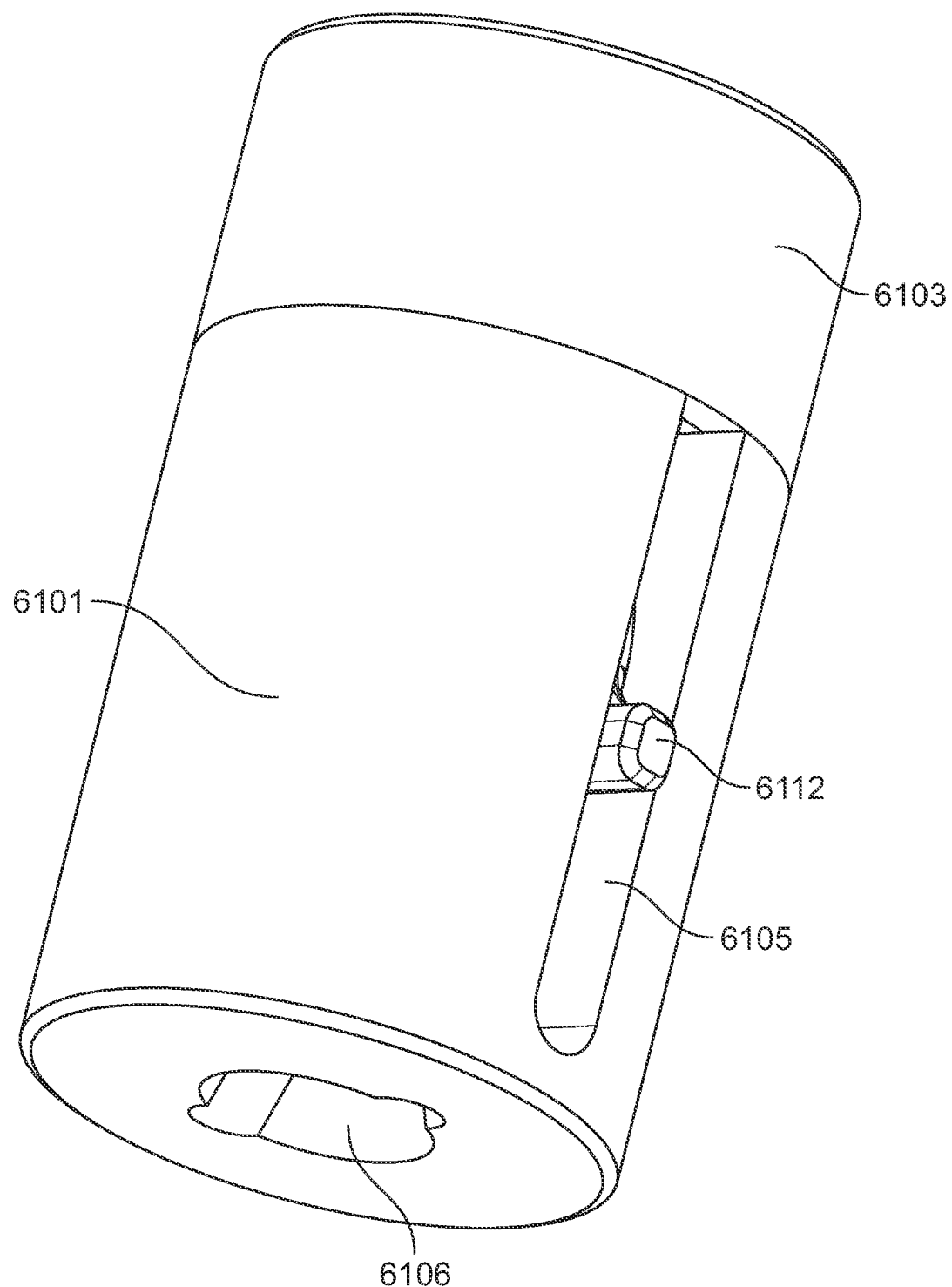
FIG. 61 shows illustrative apparatus in accordance with principles of the invention.
Figure 62:
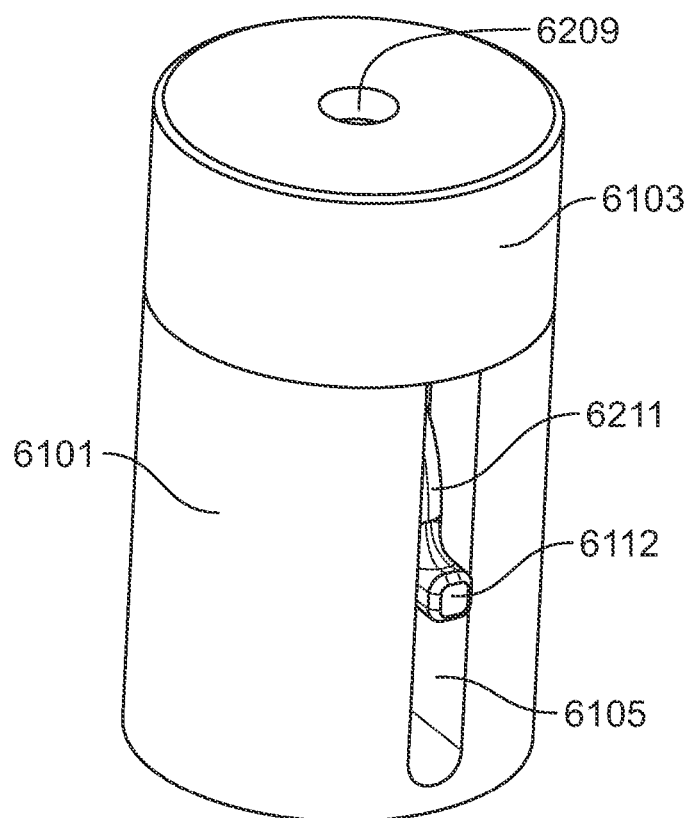
FIG. 62 shows illustrative apparatus in accordance with principles of the invention.
Figure 63:
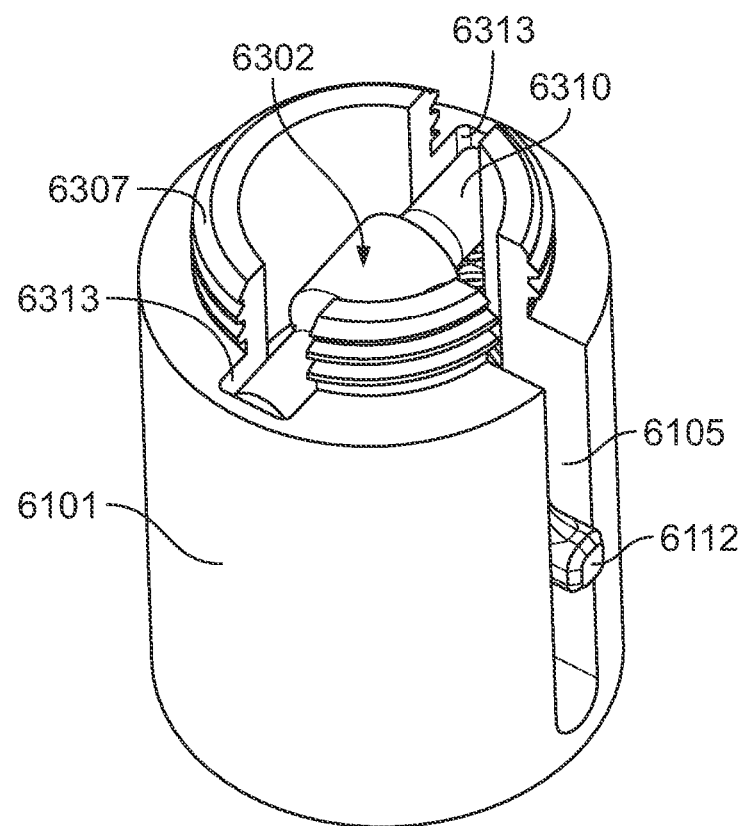
FIG. 63 shows illustrative apparatus in accordance with principles of the invention.
Figure 64:
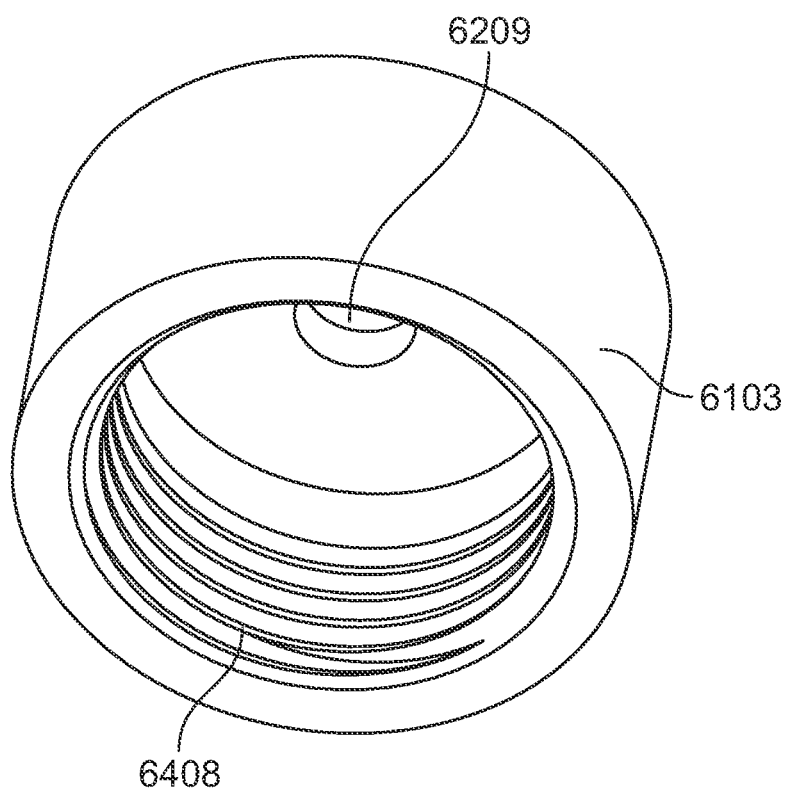
FIG. 64 shows illustrative apparatus in accordance with principles of the invention.
Figure 65:
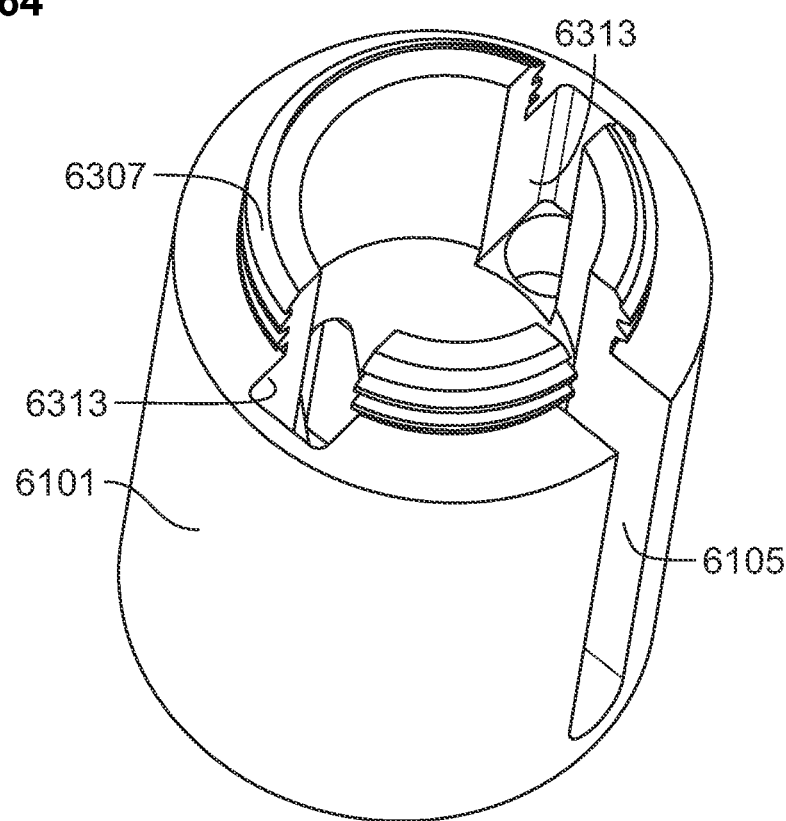
FIG. 65 shows illustrative apparatus in accordance with principles of the invention.
Figure 66:
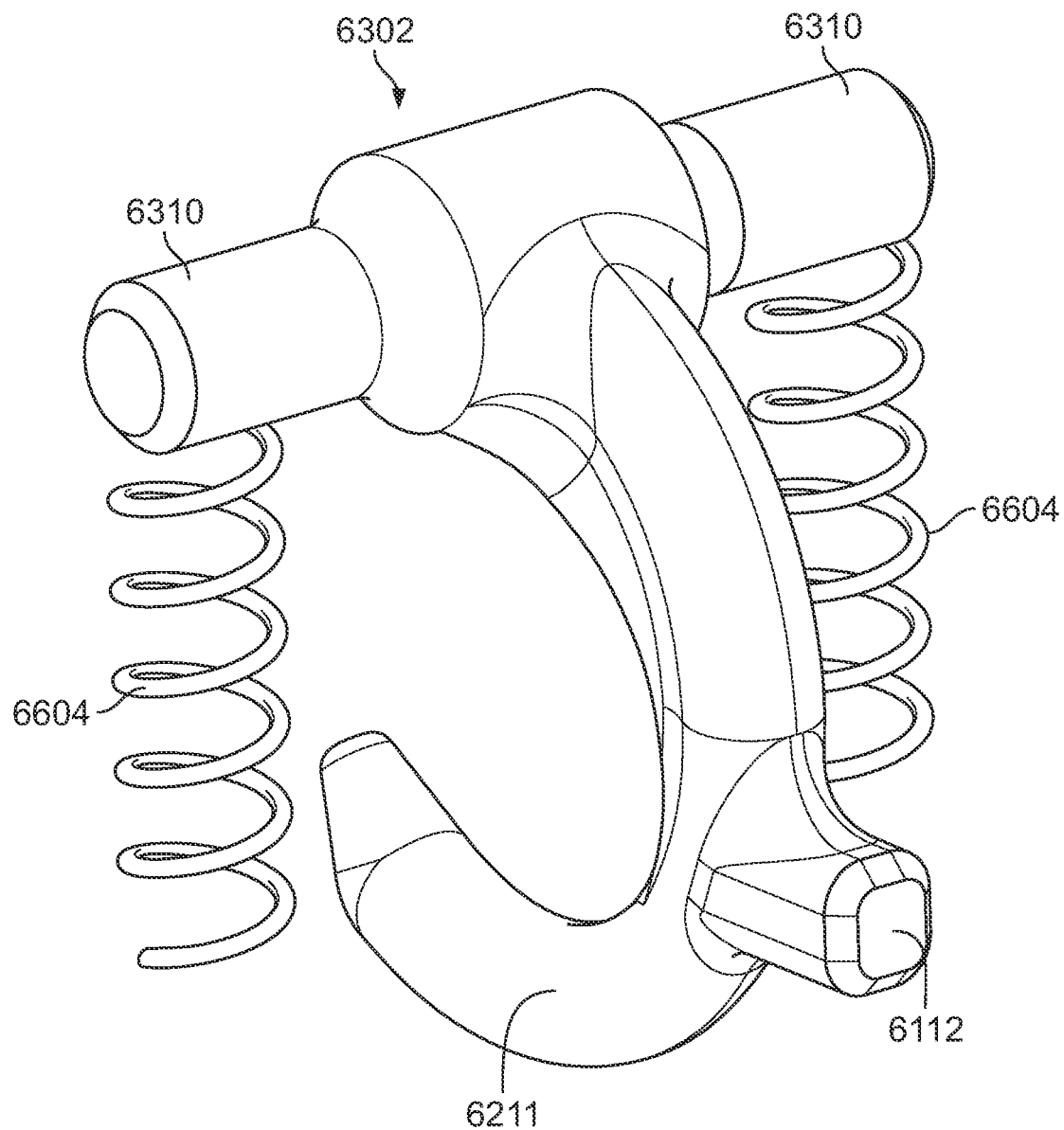
FIG. 66 shows illustrative apparatus in accordance with principles of the invention.

FIG. 60 shows illustrative gripper 6002. Gripper 6002 may include tapered tube 6004. Tube 6004 may include cannula 6006. Cannula 6006 may be cylindrical. Cord 5806 may be disposed in cannula 6006 with a tolerance sufficient to permit sliding of cord 5806 through cannula 6006 with a small amount of friction. Gripper 6002 may include bumpers such as 6008 and 6010. Bumpers 6008, 6010 and a third bumper (not shown) may be arranged about $L_9$ axis. The bumpers may be arranged symmetrically, such as at 120° arc from each other, about the axis. The bumpers may be captured in sockets 6012, 6014 and a third socket (not shown), respectively. The sockets may allow the bumpers to translate radially in an out relative to axis $L_9$. When positioned inwardly, the bumpers may contact cord 5806. In the absence of an inward radial force on the bumpers, the bumpers may allow cord 5806 to translate freely along $L_9$ relative to housing 5814. When an inward radial force is applied to the bumpers, the bumpers may seize cord 5806 and prevent cord 5806 from translating along $L_9$ relative to housing 5814.

When cord 5806 is drawn upward relative to housing 5814, the small amount of friction may draw tube 6004 upward inside cannulated tapered bolt 6016. Taper 6019 may apply an inward radial force to the bumpers. The relative movement between tube 6004 and housing 5814 may be generated by the user. The relative movement between tube 6004 and housing 5814 may be generated by a gravitational pull on light 5808.

Spring 6018 may be anchored in bushing 6020. Spring 6018 may be engaged with tube 6004 at narrow section 6022 of tube 6004. Spring 6018 may be normally in tension. Spring 6018 thus urges tube 6004 down, away from taper 6019. Spring 6018 thus acts to release cord 5806 from gripper 6002. Tension in spring 6018 may be selected to offset some but not all of the gravitational force on light 5808 so that cord 5806 is normally seized in gripper 6002. The user may adjust height h of light 5808 by manually urging cord 5806 down in gripper 6002 and overcoming the tendency of the bumpers to continue to seize cord 5806 even after the user manually supports light 5808 and relieves the gravitational force.

The user may increase h by feeding cord 5806 down through gripper 6002. The user may decrease h by drawing cord 5806 up through gripper 6002. The seizing force of the bumpers may be insufficient to prevent manual withdrawal of cord 5806 from gripper 6002. The user may manually press down on top 6030 of tube 6004 to release the bumpers from cord 5806.

Shelves 6024 and 6026 may support bolt 6016. Housing 5814 may support shelves 6024 and 6026. Interior 6028 of housing 5814 may store lengths of cord 5806.

FIGS. 61-66 show an illustrative shifting mechanism for suspending a cord. The cord may be used to suspend a light fixture. The fixture may have one or more features in common with fixture 5800. The cord may have one or more features in common with cord 5806. The shifting mechanism may include main body 6101. The shifting mechanism may include hanging member 6302. The shifting mechanism may include connector 6103. The shifting mechanism may include a reset member. Hanging member 6302 may be movably connected to main body 6101. Two ends of the reset member may be connected to hanging member 6302 and the main body 6101, respectively. A top of main body 6101 may be detachably connected to connector 6103. Main body 6101 may include open slot 6106. Main body 6101 may include moving slot 6105, in which hanging member 6302 may move. Moving slot 6105 may be in communication with open slot 6106.

Main body 6101 may be fixed to a structure such as S. Main body 6101 may be fixed to a fixture such as fixture 5800. Hanging member 6302 may be rotated so that hook 6211 is outside main body 6101. The cord may be inserted into open slot 6106. A loop of the cord may be inserted into open slot 6106. Hanging member 6302 may be rotated back into main body 6101. Hanging member 6302 may engage the cord inside main body 6101. Hanging member 6302 may engage the loop inside main body 6101. Main body 6101 may be tightened against connector 6103 using threaded connecting portion 6307 and internal thread 6408. The tightening may prevent rotating shaft portion 6310 from rotating. The cord may thus be "locked" in main body 6101 at a position that leaves a desired amount of cord hanging between the structure and the fixture.

Hanging member 6302 may be movably connected with main body 6101. During use, hanging member 6302 may be pulled out main body 6101 from moving slot 6105 by a human hand. The cord may then be extended from open slot 6106 to a position where main body 6101 matches hanging member 6302. Hanging member 6302 may be pushed into main body 6101. Hanging member 6302 may hook the cord to effect the hanging and placement of the cord. Connector 6103 may be fixed to the ceiling by a mounting element such as a screw and a bolt. Main body 6101 the connector 6103 may be detachably connected to facilitate mounting. That is, adjustment and mounting may be performed after shifting to a suitable position based on environmental structures. The reset member may pull hanging member 6302 to prevent loosening of the hanging member 6302. This may ensure the stability of hanging and placement of the cord, and facilitating the reset of hanging member 6302.

The top of main body 6101 may include a threaded connecting portion 6307. Threaded connecting portion 6307 may include an external thread. An inner wall of connector 6103 may include internal thread 6408 that matches the external thread. Mounting hole 6209 may penetrate through connector 6103. Connector 6103 and main body 6101 thus may be disassembled and assembled. Mounting hole 6209 may cooperate with an assembly screw and bolt to engage a ceiling or other structure such as structure S. Connector 6103 may be locked through the cooperation of an external connecting member and mounting hole 6209.

Hanging member 6302 may include rotating shaft portion 6310. Hanging member 6302 may include hook portion 6211. Hanging member 6302 may include protrusion 6112. Main body 6101 may include rotating slot 6313. Rotating slot 6313 may rotates cooperatively with rotating shaft portion 6310. The reset member may be disposed in rotating slot 6313. Two ends of the reset member may be connected to rotating shaft portion 6310 and an inner wall of rotating slot 6313, respectively. The hook portion 6211 may be connected to a lower end of the rotating shaft portion 6310. Protrusion 6112 may be connected to an outer wall of hook portion 6211. Through protrusion 6112, an operator may pull protrusion 6112 to pull out hook portion 6211 of hanging member 6302, and rotating shaft portion 6310 may rotate in rotation slot 6313 to effect moving of the hook portion 6211. Under action of the reset member, rotating shaft portion 6310 may be pressed tightly to ensure that the position of the rotating shaft portion 6310 does not easily loosen, and that hook portion 6211 hangs the cord stably.

Rotating shaft portion 6310, hook portion 6211, and protrusion 6112 may be integrally formed.

The reset member may be reset spring 6604. Two reset springs 6604 may be provided, respectively, at two ends of rotating slot 6313. Reset springs 6604 may match the two ends of rotating shaft portion 6310 for maintaining the balance of the two ends of the rotating shaft portion 6310 and reset stability.

Figure 67:
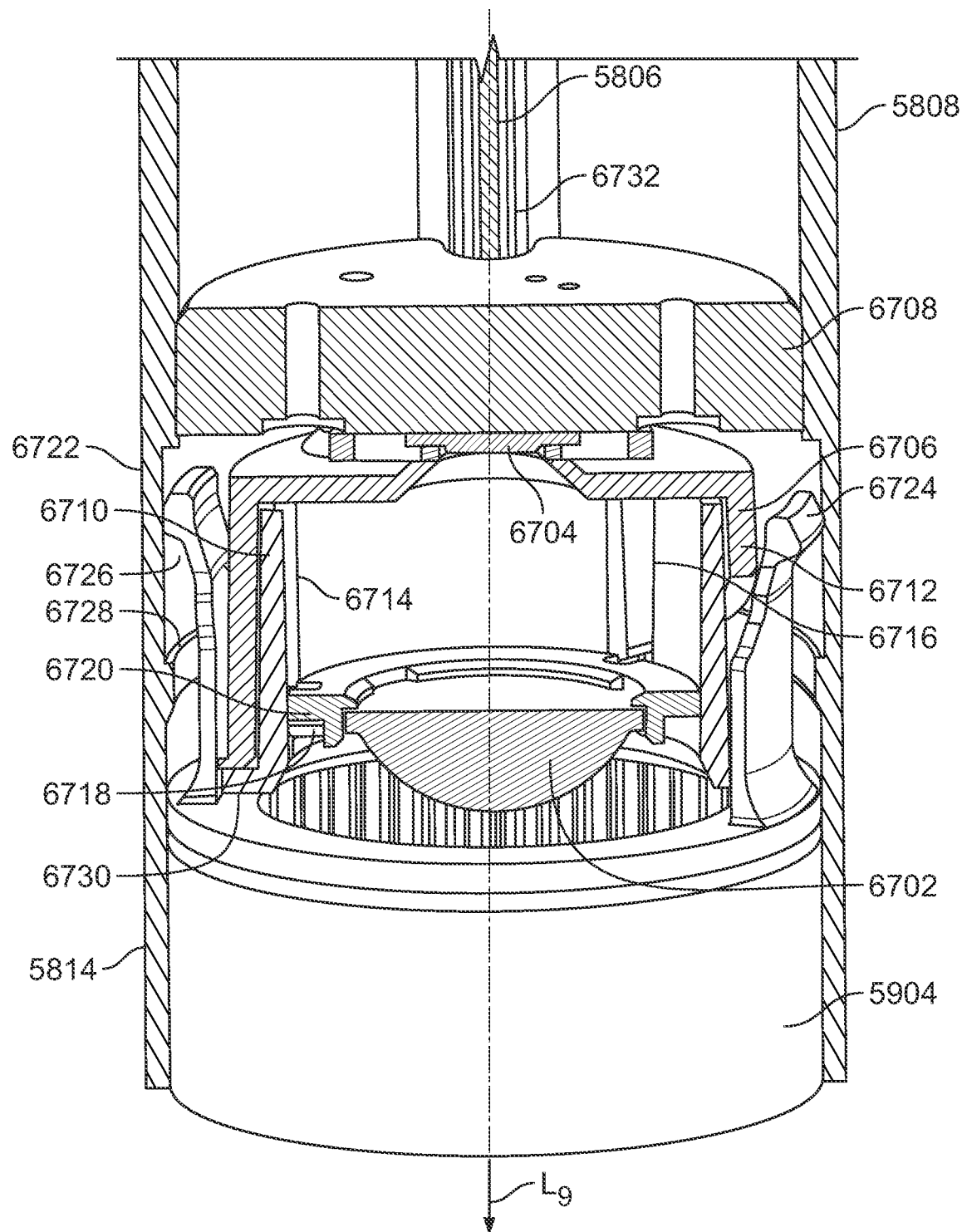
FIG. 67 is a partial cross-sectional view taken along lines 67-67 in FIG. 44.

FIG. 67 shows shield 5904 in housing 5814. Light 5808 may include lens 6702. Lens 6702 may form a beam from light emitted by LED emitter 6704. Lens well 6706 may be fixed to shelf 6708. Shelf 6708 may be fixed to housing 5814. Lens positioning bushing 6710 may be disposed in well 6706. Bushing 6710 may rotate about axis $L_9$ in well 6706. Well 6706 may include slots such as 6712. Slot 6712 may be helical about axis $L_9$. Bushing 6710 may include slots such as 6714 and 6716. Slots 6714 and 6716 may be parallel to axis $L_9$. As bushing 6710 is rotated relative to well 6706, intersections between the helical and parallel slots may move along axis $L_9$. Projections such as 6718 from lens table 6720 may be disposed in the intersections. Thus, relative rotation between bushing 6710 and well 6706 may move lens 6702 along axis $L_9$ relative to emitter 6704. This may change beam spread angle $\beta_3$. Rotation of shield 5904 about axis $L_9$ may cause interference of an edge (not shown) of shield 5904 with a catch of bushing 6710. The interference may cause the relative rotation.

Fingers 6722 and 6724 may be biased radially outward from axis $L_9$ to maintain contact between fingers 6722 and 6724 with inner surface 6726 of housing 5814. The user may manually move shield 5904 may be up and down along axis $L_9$. When the user releases shield 5904, friction between fingers 6722 and 6724 and surface 6726 may maintain the position of shield 5904 relative to housing 5814. Band 6728 in housing 5814 may limit the downward extension of shield 5904. Foot 6730 of bushing 6710 may limit the upward insertion of shield 5904.

Sheath 6732 may provide lateral support to cord 5806.

Figure 68:
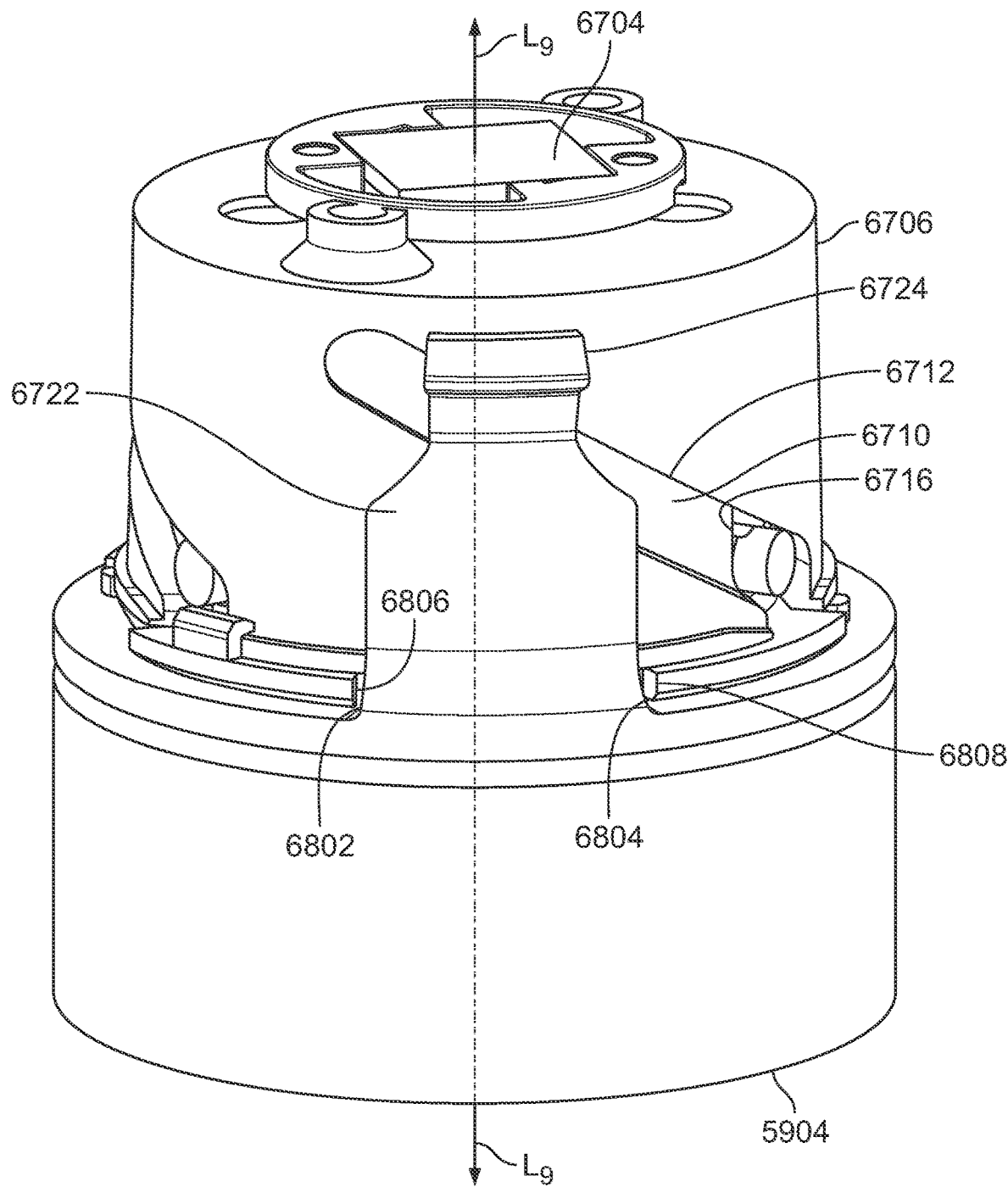
FIG. 68 shows illustrative apparatus in accordance with principles of the invention.
Figure 69:
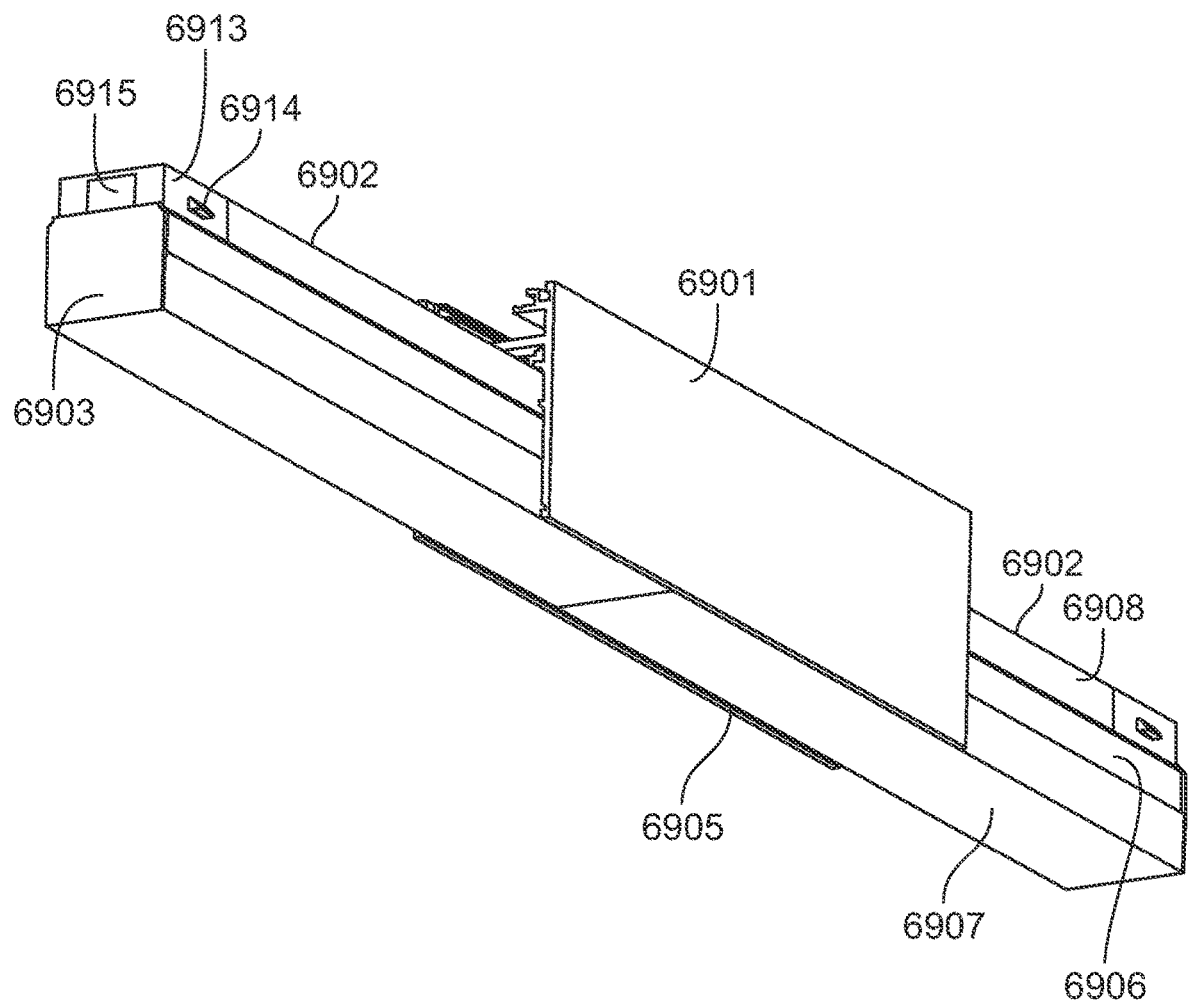
FIG. 69 shows illustrative apparatus in accordance with principles of the invention.
Figure 70:
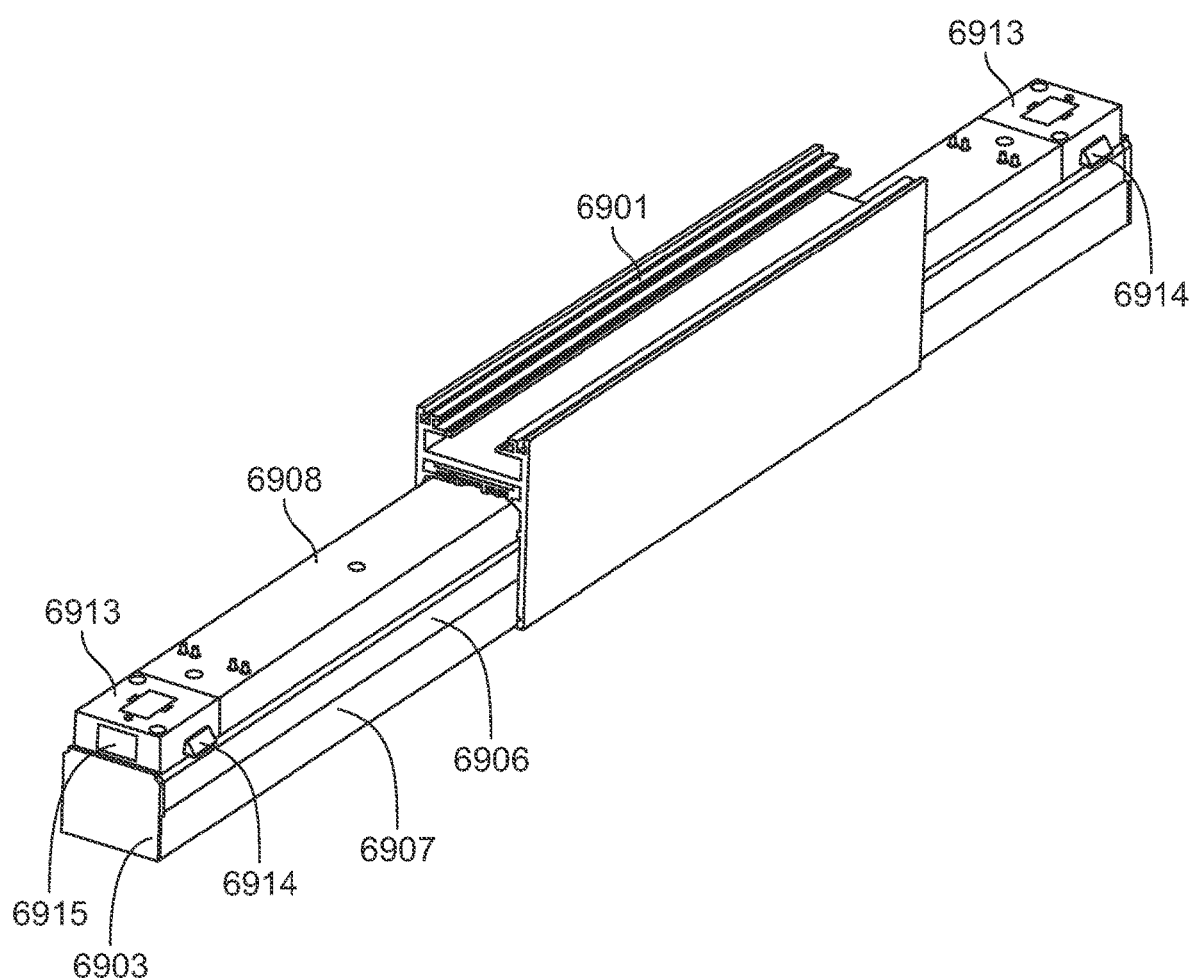
FIG. 70 shows illustrative apparatus in accordance with principles of the invention.
Figure 71:
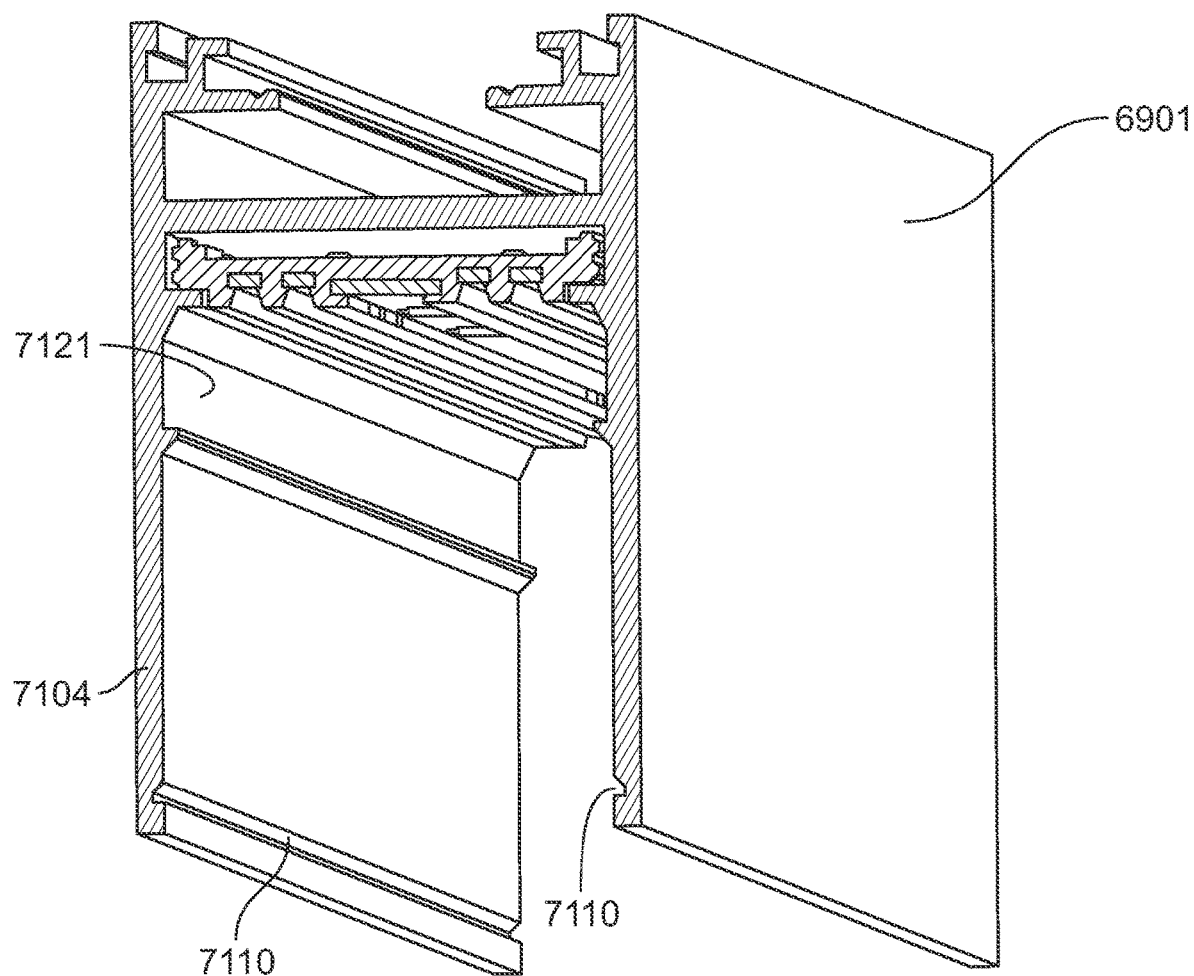
FIG. 71 shows illustrative apparatus in accordance with principles of the invention.
Figure 72:
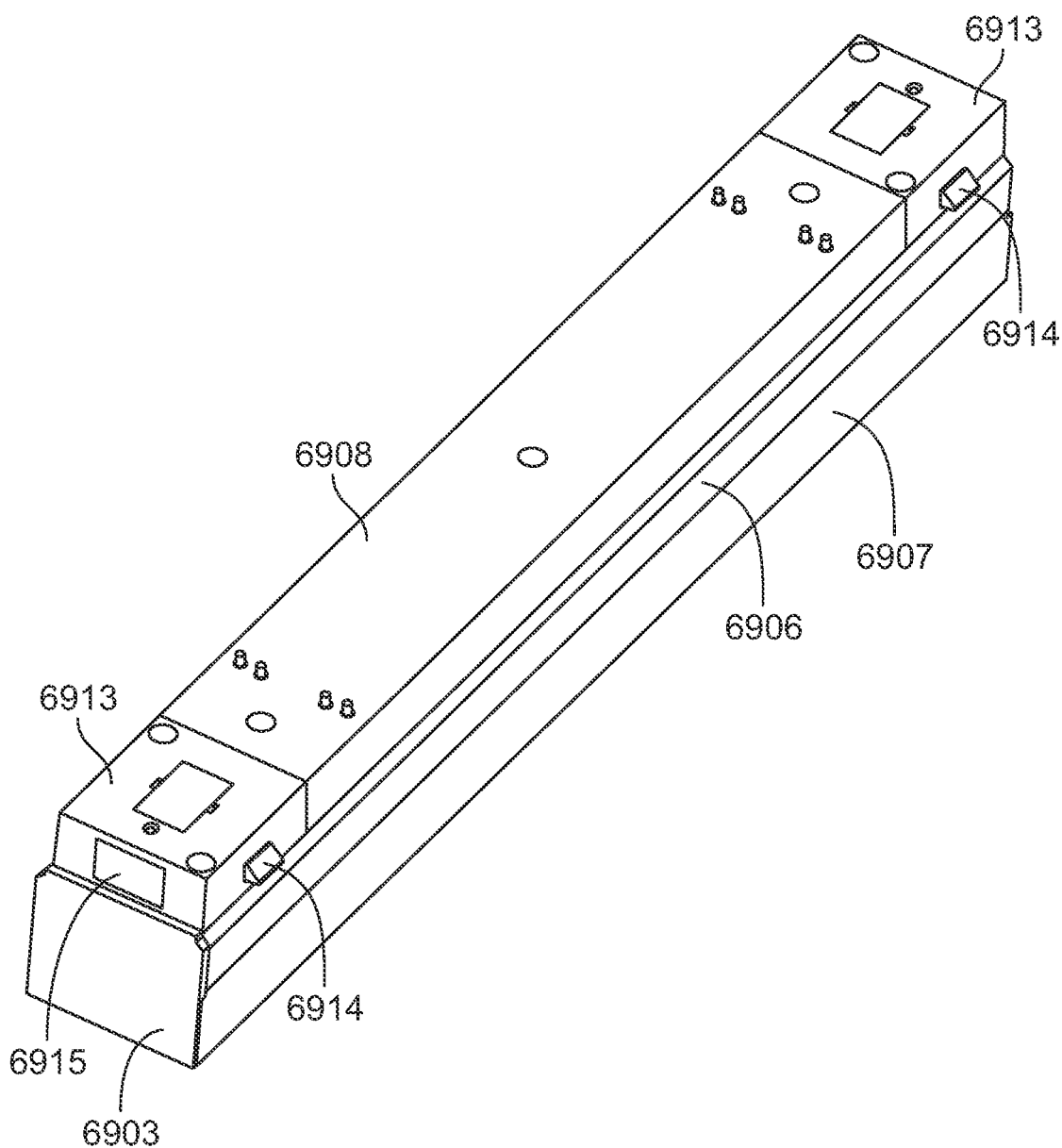
FIG. 72 shows illustrative apparatus in accordance with principles of the invention.
Figure 73:
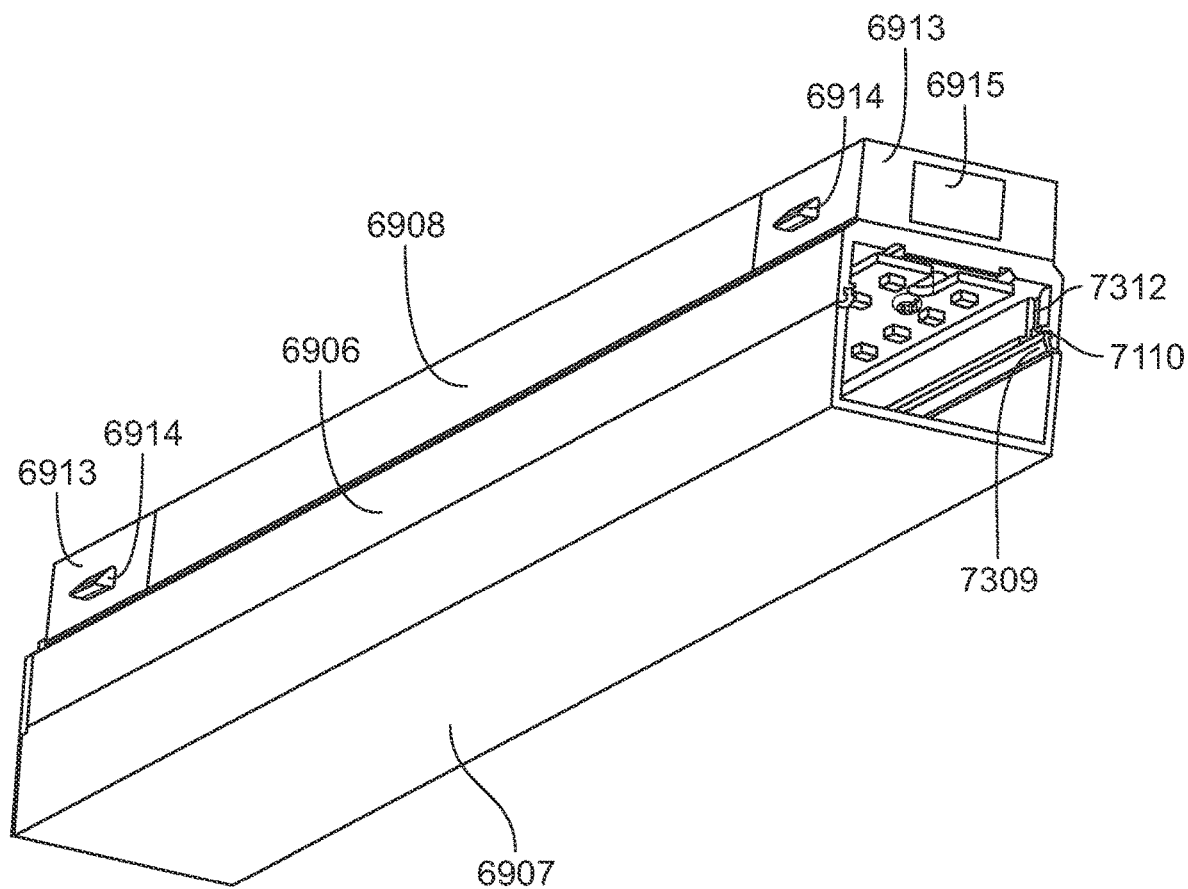
FIG. 73 shows illustrative apparatus in accordance with principles of the invention.
Figure 74:
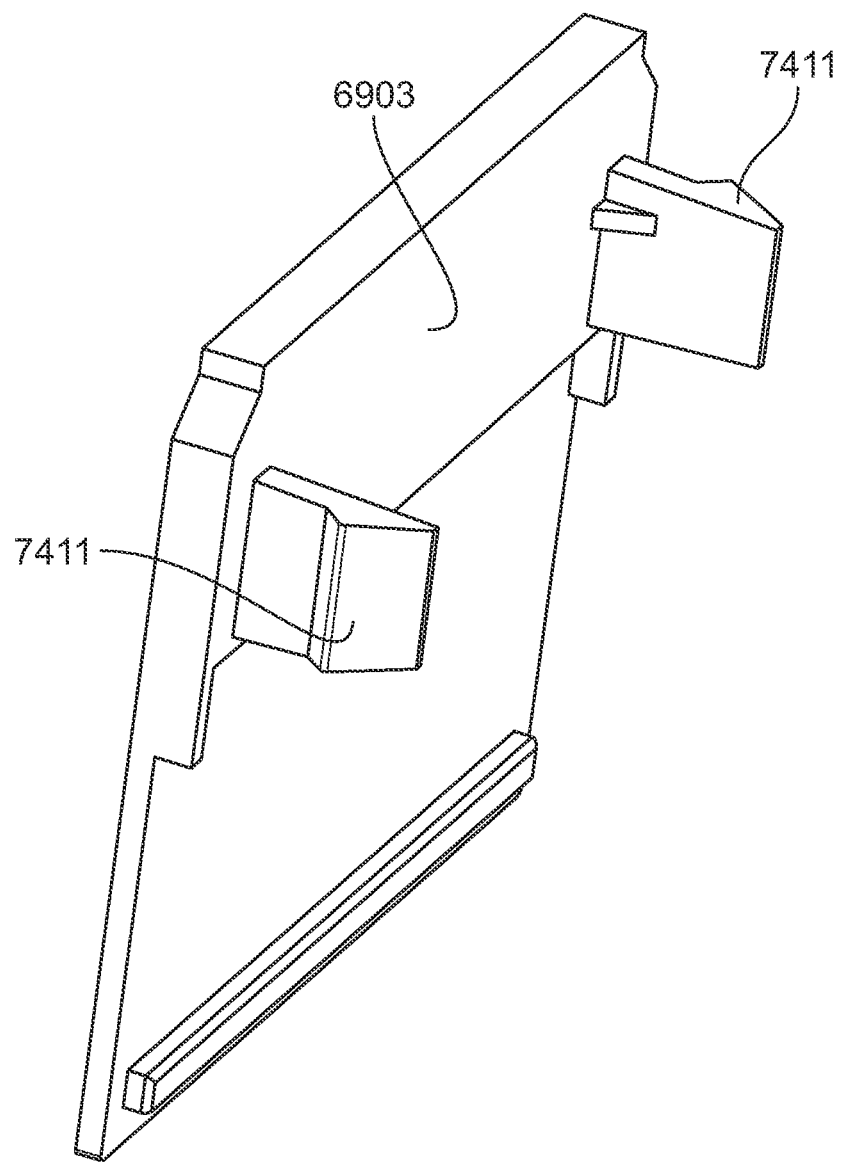
FIG. 74 shows illustrative apparatus in accordance with principles of the invention.
Figure 75:
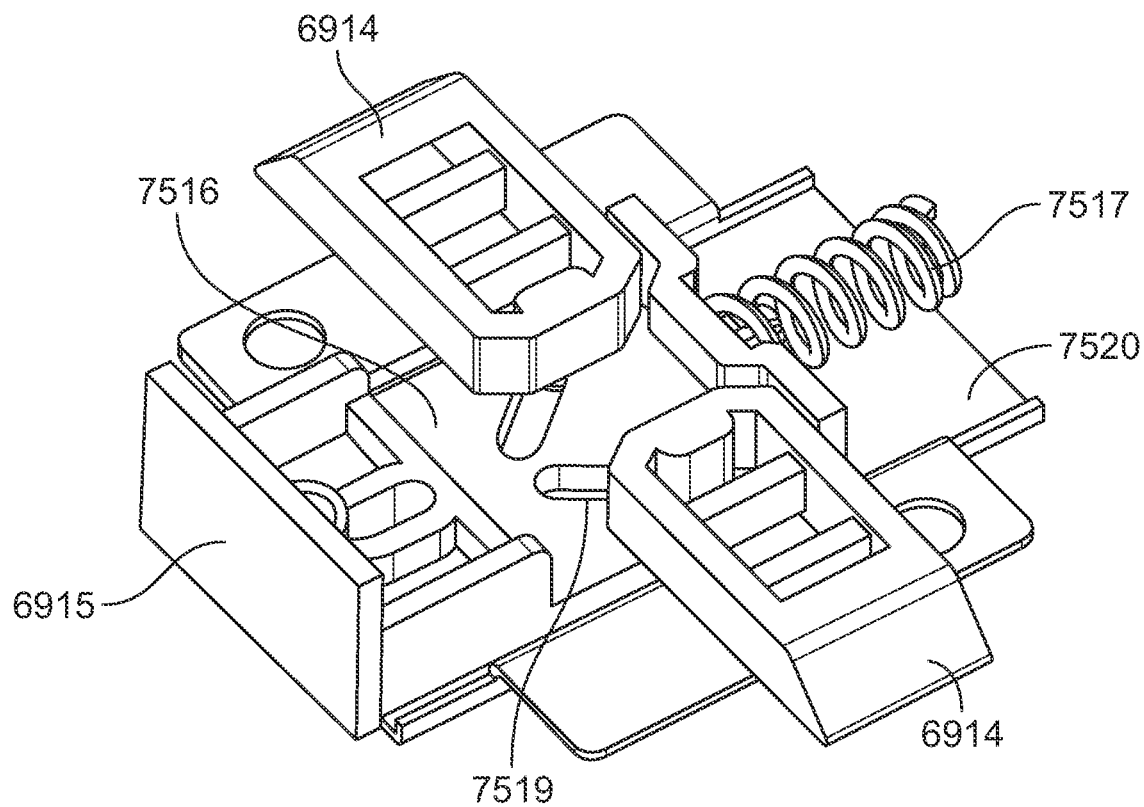
FIG. 75 shows illustrative apparatus in accordance with principles of the invention.
Figure 76:
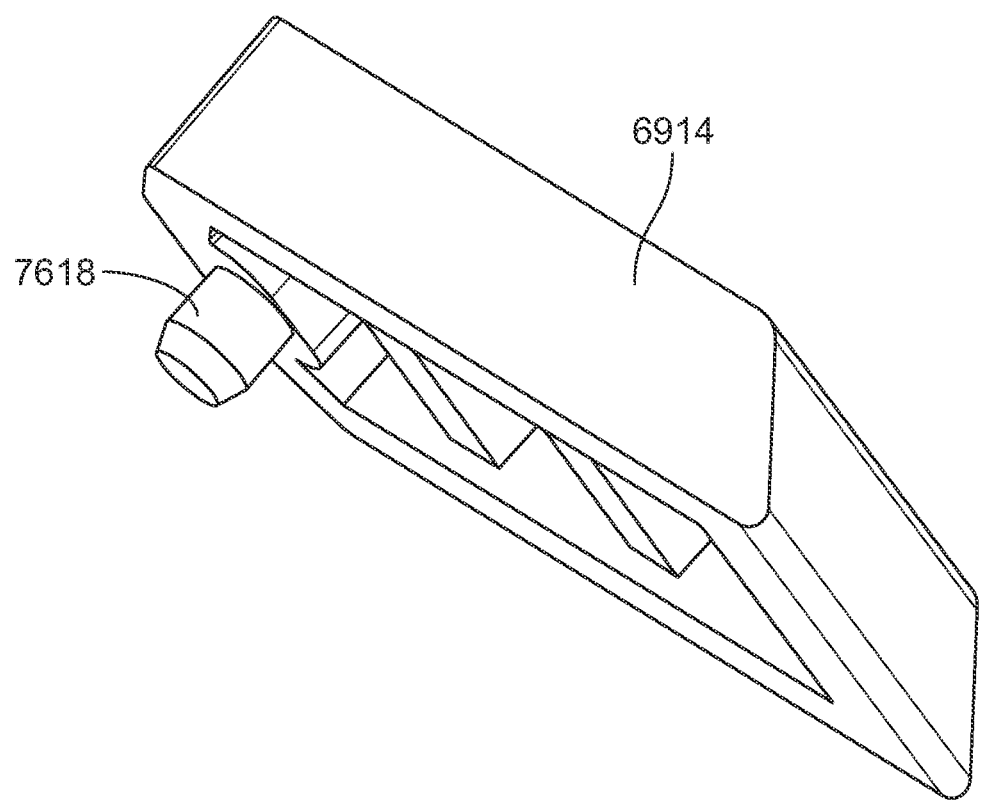
FIG. 76 shows illustrative apparatus in accordance with principles of the invention.
Figure 77:
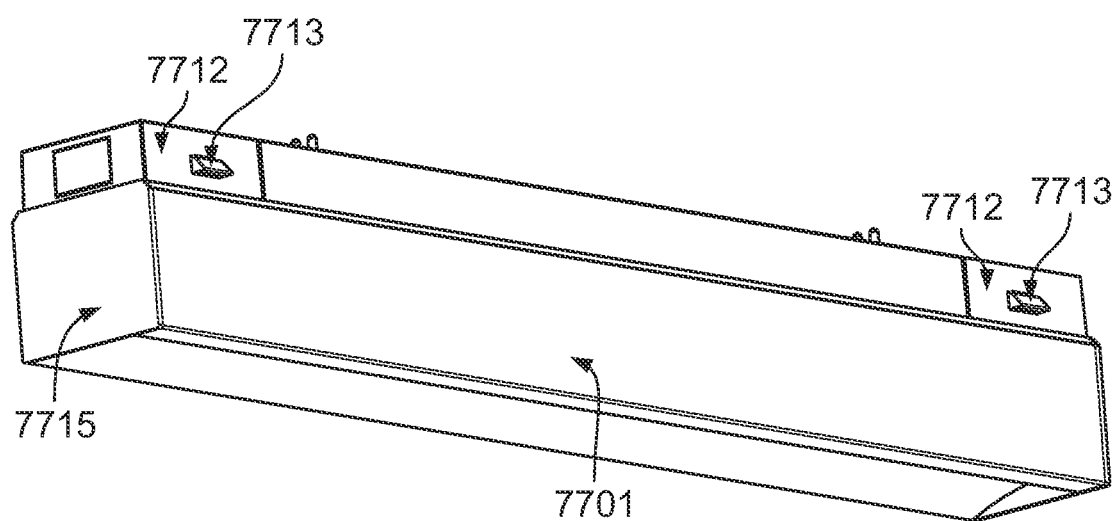
FIG. 77 shows illustrative apparatus in accordance with principles of the invention.
Figure 78:
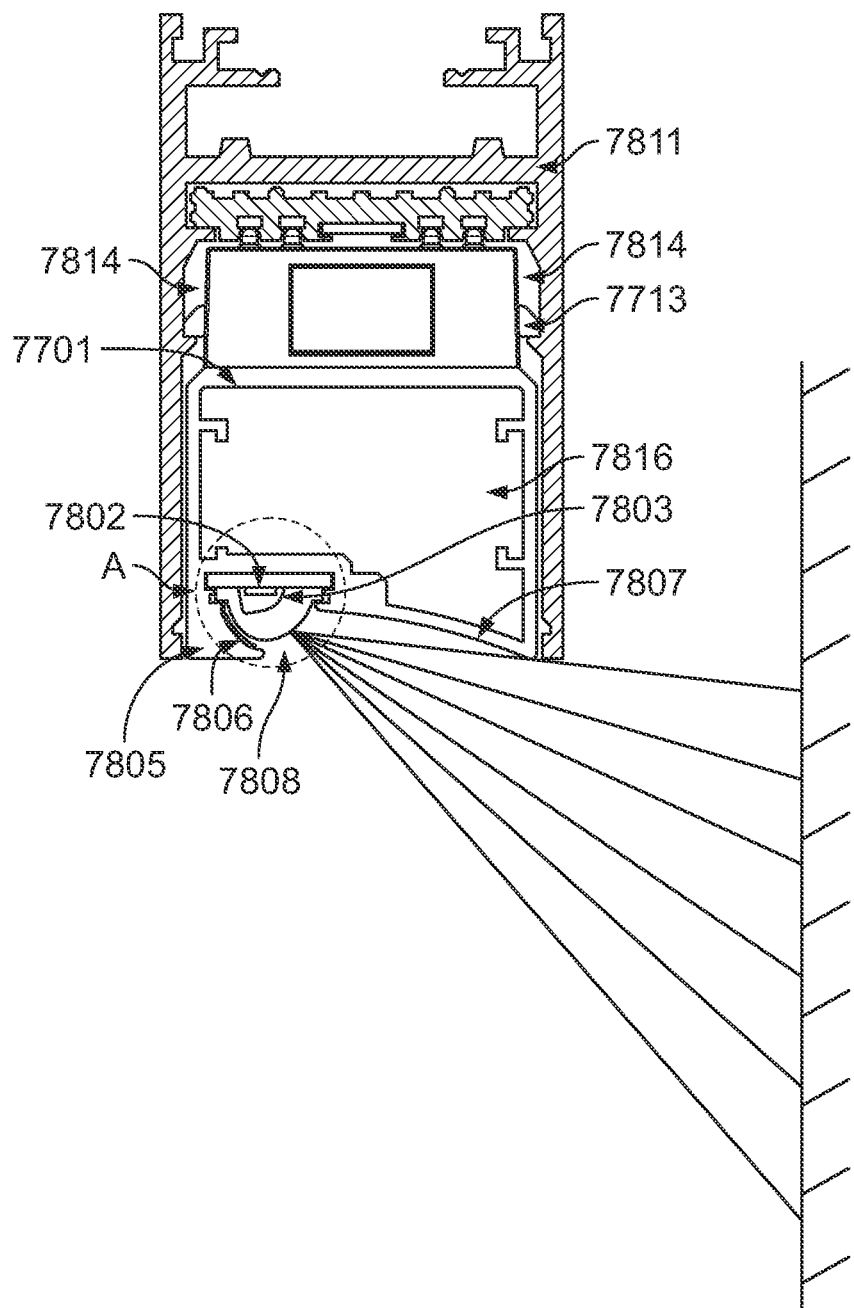
FIG. 78 shows illustrative apparatus in accordance with principles of the invention.
Figure 79:
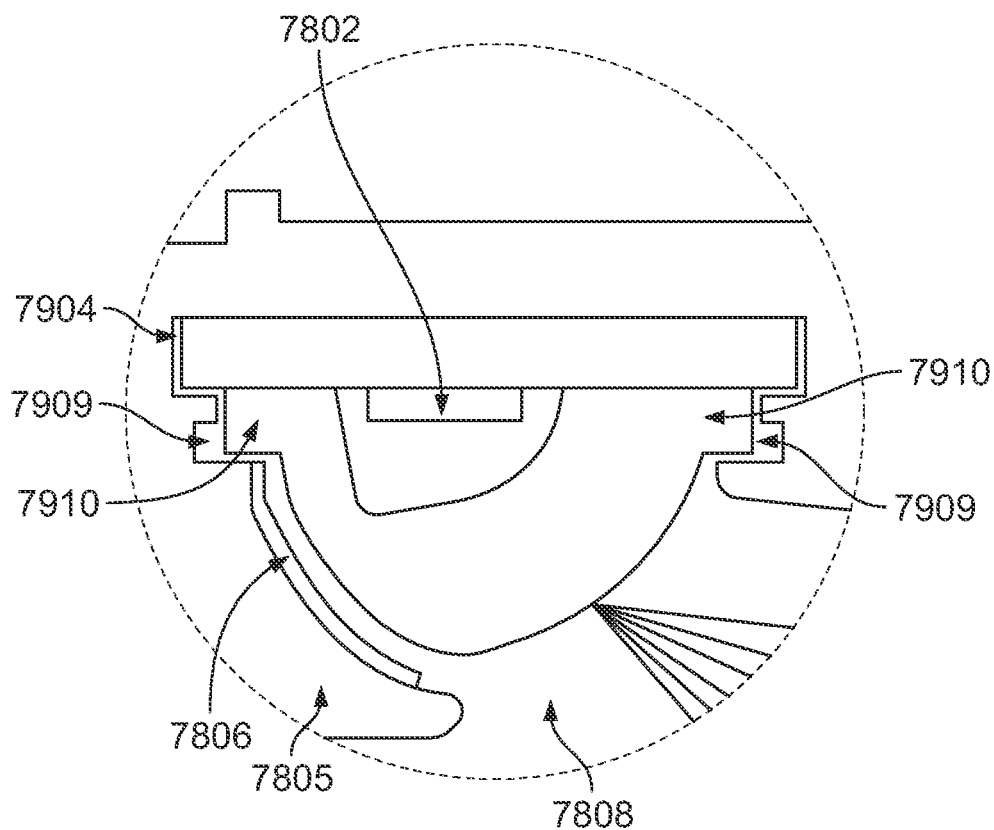
FIG. 79 shows illustrative apparatus in accordance with principles of the invention.
Figure 80:
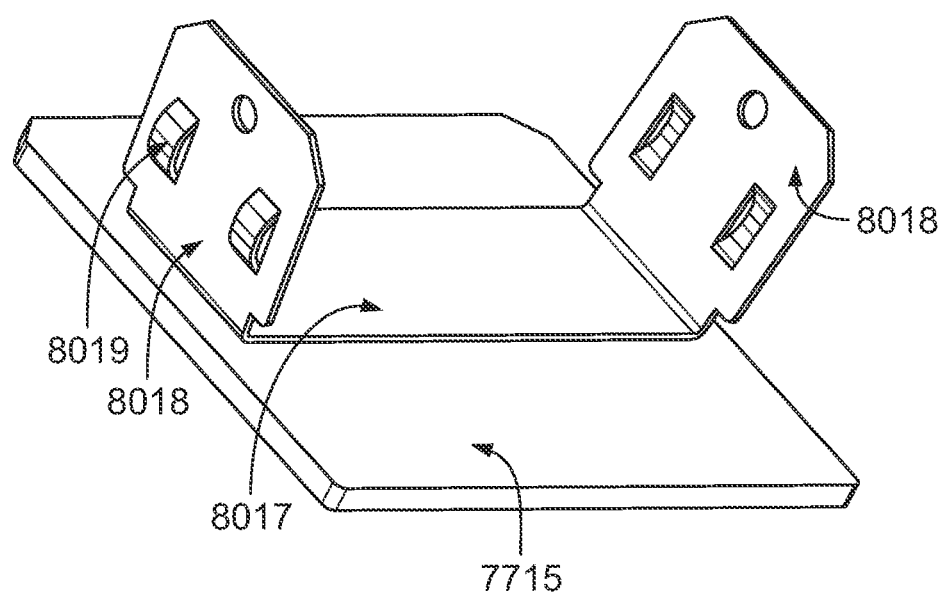
FIG. 80 shows illustrative apparatus in accordance with principles of the invention.

FIG. 68 shows edges 6802 and 6804 of shield 5904 that may engage with catches 6806 and 6808 of bushing 6710. Shield 5904 may thus move longitudinally along axis $L_9$ without rotating bushing 6710. Shield 5904 may be rotated about axis $L_9$ without moving longitudinally along axis $L_9$.

FIGS. 69-76 show illustrative fixture support 6901 and at least two illustrative lamp bodies 6902. Fixture support 6901 may have one or more features in common with fixture support 310. Lamp bodies 6902 may have one or more features in common with fixture 316. Ends of each of the lamp bodies 6902 may be detachably connected to end covers 6903. Lamp body 6902 may be slidably arranged in fixture support 6901. Adjacent ends of two adjacent lamp bodies 6902 may abut each other. Left and right ends of fixture support 6901 may include lamp entrances 7104. The bottom of fixture support 6901 may include exposure port 6905. Lamp bodies 6902 may be exposed at exposure port 6905. End cover 6903 may be detachably connected to lamp body 6902. Two or more lamp bodies 6902 may be installed in fixture support 6901. After end covers 6903 are disassembled, lamp bodies 6902 abut each other in fixture support 6901 to form a seamless joint effect. The structure may be stable and reliable, and light leakage may be avoided. Lamp body 6902 may be pushed into fixture support 6901 from lamp entrances 7104 at the left and right ends of fixture support 6901 for installation. Exposure port 6905 may provide for light transmission.

Lamp body 6902 may include lamp housing 6906. Lamp body 6902 may include light-emitting cover 6907. Lamp body 6902 may include light-emitting body 6908. Light-emitting body 6908 may be disposed on lamp housing 6906. Light-emitting cover 6907 may be disposed at the bottom of lamp housing 6906. Light of the light-emitting body 6908 may face light-emitting cover 6907. End cover 6903 may be detachably connected to lamp housing 6906.

Adjacent ends of light-emitting covers 6907 of two adjacent lamp bodies 6902 may abut each other. The seamless joint between two or more lamps assembled in fixture support 6901 may reduce or avoid light leakage. The seamless joint between two or more lamps assembled in fixture support 6901 may reduce or avoid light leakage may have good structural integrity.

Sides of the top end of light-emitting cover 6907 may include clamping strips 7309. Sides of an inner wall of the bottom of lamp housing 6906 may include clamping slots 7110. Clamping slots 7110 may match clamping strips 7309. This may provide clamping of light-emitting cover 6907 and lamp housing 6906.

Sides of end cover 6903 may include buckling blocks 7411. Sides of the inner wall of the bottom of lamp housing 6906 may include buckling slots 7312. Buckling slots 7312 may fit buckling blocks 7411. The detachable connection of end cover 6903 may be effected through cooperation of buckling block 7411 and buckling slot 7312. This may facilitate the assembly and disassembly of the end cover 6903. This may facilitate replacement of a lamp.

Ends of the top of lamp housing 6906 may include fixing blocks 6913. Sides of the fixing block 6913 may include sliding protrusions 6914. Sides of an inner wall of fixture support 6901 may include sliding slots 7121. Sliding slots 7121 may match sliding protrusions 6914. Cooperation of sliding protrusion 6914 and sliding slot 7121 may provide for the sliding of lamp body 6902 along the inner wall of fixture support 6901.

One end of fixing block 6913 may include button 6915. Button 6915 may be connected to pushing block 7516. Pushing block 7516 may be slidably arranged in fixing block 6913. An end of pushing block 7516 away from button 6915 may be connected to reset spring 7517. An end of reset spring 7517 away from pushing block 7516 may be connected to an inner wall of fixing block 6913. An end of sliding protrusion 6914 may extend into fixing block 6913. An end of sliding protrusion 6914 may include limiting sliding column 7618. Sides of pushing block 7516 may include limiting sliding slots 7519. Limited sliding slots 7519 may match limiting sliding columns 7618. Limiting sliding columns 7618 may be slidably arranged in limiting sliding slots 7519. Sides of fixing block 6913 may include through-holes. An end of sliding protrusion 6914 may protrude from the through-hole. The bottom of fixing block 6913 may include pushing slot 7520. Pushing block 7516 may be slidably arranged on pushing slot 7520. When the lamp body 6902 is to be taken out of fixture support 6901, button 6915 may be pressed so that pushing block 7516 moves along pushing slot 7520, and sliding protrusion 6914 is driven, by limiting sliding slot 7519, to be retracted from the through-hole into fixing block 6913. At this time, sliding protrusion 6914 may be separated from sliding slot 7121. This may facilitate removal of lamp body 6902 from fixture support 6901. When button 6915 is released, under action of reset spring 7517, reset spring 7517 may drive the pushing block 7516 to reset. Button 6915 may reset. Then reset spring 7517 may drive sliding protrusion 6914 to extend from the through-hole to effect the reset. Sliding protrusion 6914 and sliding slot 7121 may be slidingly matched to facilitate sliding connection between lamp body 6902 and the inner wall of fixture support 6901.

Displacement of two or more lamp bodies 6902 may be limited by abutting each other. Clamping columns and clamping holes for cooperative limiting may be provided at positions corresponding to two ends of lamp housing 6906 or two ends of light-emitting cover 6907. Magnets may be arranged at ends of lamp housing 6906 or at positions corresponding to ends of light-emitting cover 6907. Abutting cooperation and seamless joints may be provided by mutual attraction of the magnets.

FIGS. 77-80 show illustrative lamp housing 7701, light source 7802, and polarizing lens 7803. One or more of lamp housing 7701, light source 7802, and polarizing lens 7803 may be part of a fixture such as fixture 316. Mounting slot 7904 may be recessed on a side of a lower end surface of lamp housing 7701. Light source 7802 may be disposed in mounting slot 7904. Polarizing lens 7803 may be disposed on a lower end surface of light source 7802. Light blocking element 7805 may be provided on a side of the lower end surface of lamp housing 7701. Light blocking element 7805 may include reflective film 7806. Arc-shaped reflective surface 7807 may be provided on a side of the lower end surface of lamp housing 7701. Light exit port 7808 may be defined between arc-shaped reflective surface 7807 and light blocking element 7805. Light emitted by light source 7802 may pass through polarizing lens 7803. The light then may be emitted from light exit port 7808. Light source 7802 may be arranged in mounting slot 7904. After the light passes through polarizing lens 7803, the light may propagate from light exit port 7808. Light blocking element 7805 may be provided. Reflective film 7806 may be provided on light blocking element 7805. Reflective film 7806 may reflect the light away from light blocking element 7805. Arc-shaped reflective surface 7807 may reflect the light downward. The guiding of light from light source 7802 may reduce or avoid glare.

Reflective film 7806 may include a diffuse reflective film.

Arc-shaped reflective surface 7807 may span an arc of less than 90°.

A lower end of mounting slot 7904 may be provided with limiting slot 7909. An upper end of the polarizing lens 7803 may be provided with limiting element 7910. Limiting element 7910 may be accommodated in limiting slot 7909. Limiting slot 7909 and limiting element 7910 may limit polarizing lens 7803 to prevent polarizing lens 7803 from loosening.

Ends of lamp housing 7701 may include detachable cover plates 7715. Sides of an inner wall of the lamp housing 7701 may include clamping slots 7816. An inner side of cover plate 7715 may include fixing sheet 8017. Sides of fixing sheet 8017 may include elastic clamping sheets 8018. An outer wall of elastic clamping sheet 8018 may include arched bulge 8019. When cover plates 7715 are assembled to the ends of lamp housing 7701, elastic clamping sheet 8018 may be aligned with clamping slot 7816 and snapped into clamping slot 7816. Elastic clamping sheet 8018 and arched bulge 8019 may be matched so that elastic clamping sheet 8018 may be firmly fixed in clamping slot 7816. Cover plates 7715 may abut the end surfaces of lamp housing 7701. When cover plate 7715 is to be disassembled, cover plate 7715 may be pulled so that elastic clamping sheet 8018 separates from clamping slot 7816. The end cover may be disassembled by bare hands.

Fixture support 7811 may support lamp housing 7701. Ends of a top of lamp housing 7701 may include fixing blocks 7712. Sides of fixing block 7712 may include sliding blocks 7713. An inner wall of fixture support 7811 may include slideways 7814. Sliding blocks 7713 may be slidably arranged in slideways 7814. This may facilitate installation and removal of cover plate 7715. When the lamp housing 7701 is to be assembled into fixture support 7811, cover plate 7715 may be removed alone, and lamp housing 7701 may be accommodated in fixture support 7811. Installation of lamp housing 7701 can be achieved through cooperation of slideway 7814 and sliding block 7713, when disposed between the fixture support 7811 and lamp housing 7701. During installation of two or more lamp housings 7701 in fixture support 7811, the lamp housings 7701 may be disposed in abutment with each other so that they appear as a continuous whole, with no dark areas or visual discontinuity.

Figure 81:
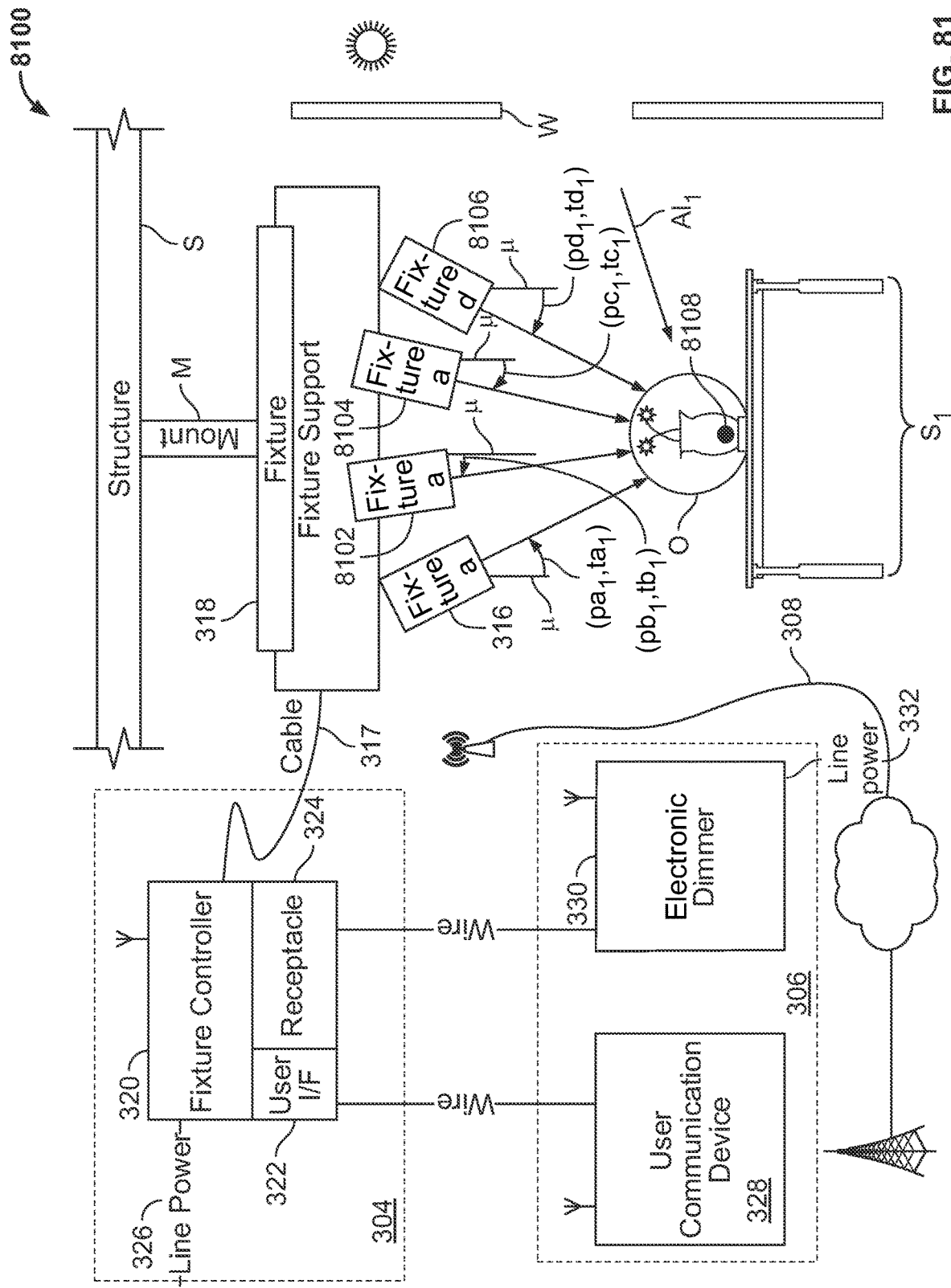
FIG. 81 shows illustrative apparatus in accordance with principles of the invention.

FIG. 81 shows illustrative configuration 8100 of fixtures 316, 8102, 8104 and 8106 (indexed below as "a," "b," "c" and "d," respectively) in connection with architecture 300. Configuration 8100 creates scene $S_1$. Scene $S_1$ may include object O. Object O may be the target. Object O may include target 8108. Ambient light $\Delta L_1$ may illuminate object O. Ambient light may include light from sources other than fixtures 316, 8102, 8104 and 8106. Ambient light may include diffuse light. Ambient light may include direct light. Ambient light may include light originating outside, such as that entering through window W.

The user may instruct architecture 300 to illuminate object O based on one or more selected beam parameters. Pitch and tilt angle pairs of the fixtures (viz., $(p_{a_1}, t_{a_1})$, $(p_{b_1}, t_{b_1})$, $(p_{c_1}, t_{c_1})$, $(p_{d_1}, t_{d_1})$, . . . ) may be set by locating target 8108. Tilt angles may be defined in reference to vertical v, which may be a plumb line.

Figure 82:
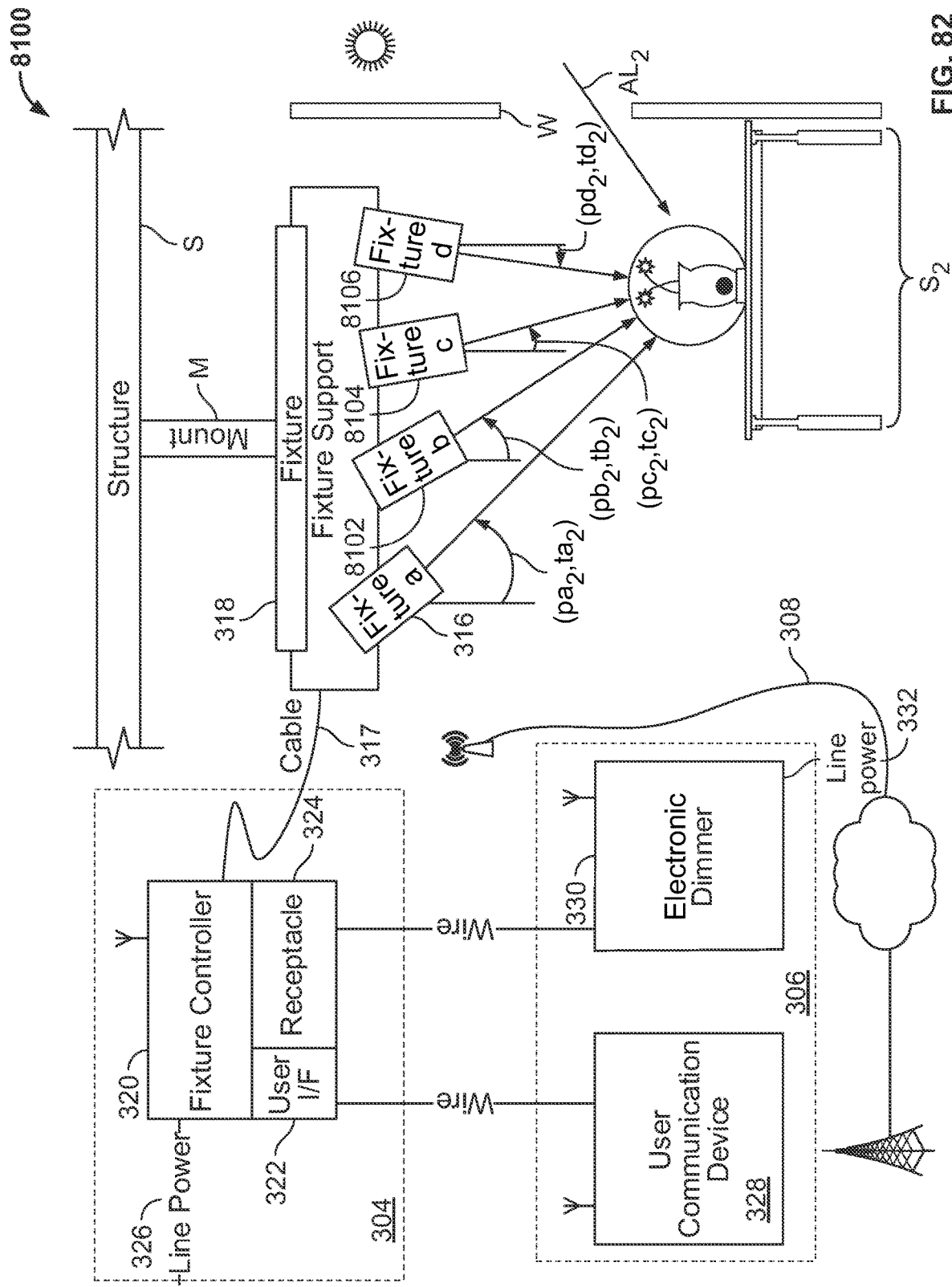
FIG. 82 shows illustrative apparatus in accordance with principles of the invention.

FIG. 82 shows illustrative configuration 8100 of fixtures 316, 8102, 8104 and 8106 (indexed below as "a," "b," "c" and "d," respectively) in connection with architecture 300 after object O has been moved to a second location. Configuration 8100 creates scene $S_2$. Ambient light $AL_2$ may illuminate object O.

The user may instruct architecture 300 to illuminate object O based on one or more selected beam parameters. Pitch and tilt angle pairs of the fixtures (viz., a a $(p_{a_2}, t_{a_2})$, $(p_{b_2}, t_{b_2})$, $(p_{c_2}, t_{c_2})$, $(p_{d_2}, t_{d_2})$, . . . ) may be reset by locating target 8108 in scene S2.

Figure 83:
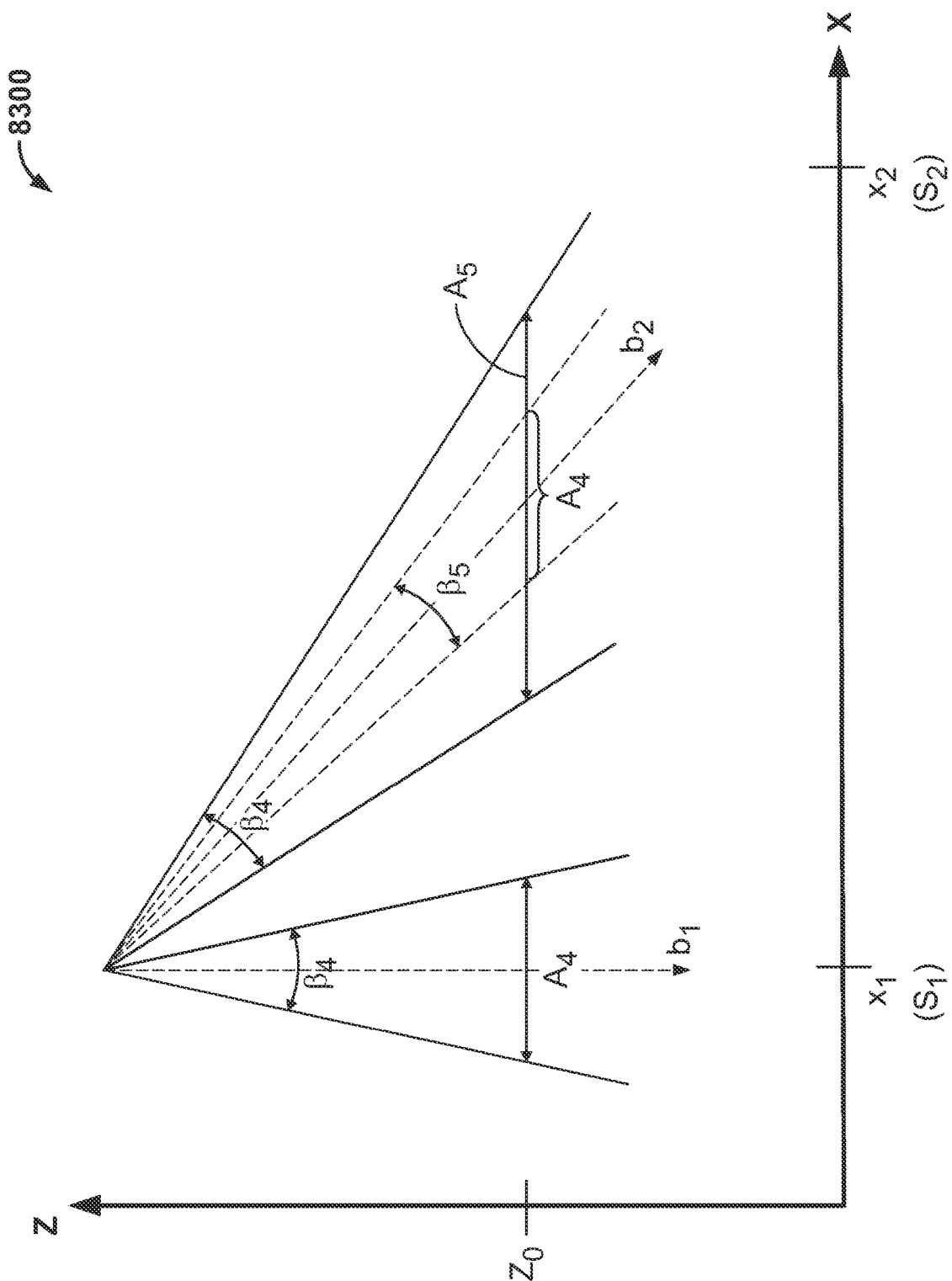
FIG. 83 shows illustrative information in accordance with principles of the invention.

FIG. 83 shows schematic transform 8300 of a fixture such as 316 between scene $S_1$, with object O at location $x_1$, to scene $S_2$, with objection O at location $x_2$. As configured for scene $S_1$, fixture 316 has bearing $b_1$ and beam spread angle $\beta_4$. At the height zo, corresponding to object O, the fixture 316 beam has horizontal area $A_4$. When object O is moved to location $x_2$, for scene $S_2$, architecture 300 may change the fixture 316 bearing to $b_2$ to direct the beam to object O at $x_2$. Architecture 300 may perform calculations to derive a beam spread angle $\beta_4$ that results in horizontal area $A_4$ at height $z_0$. This gives the beam the same "footprint" in $S_2$ as it had in $S_1$. Horizontal area $A_5$, resulting from beam spread angle $\beta_4$ at bearing $b_2$, is shown for comparison.

Figure 84:
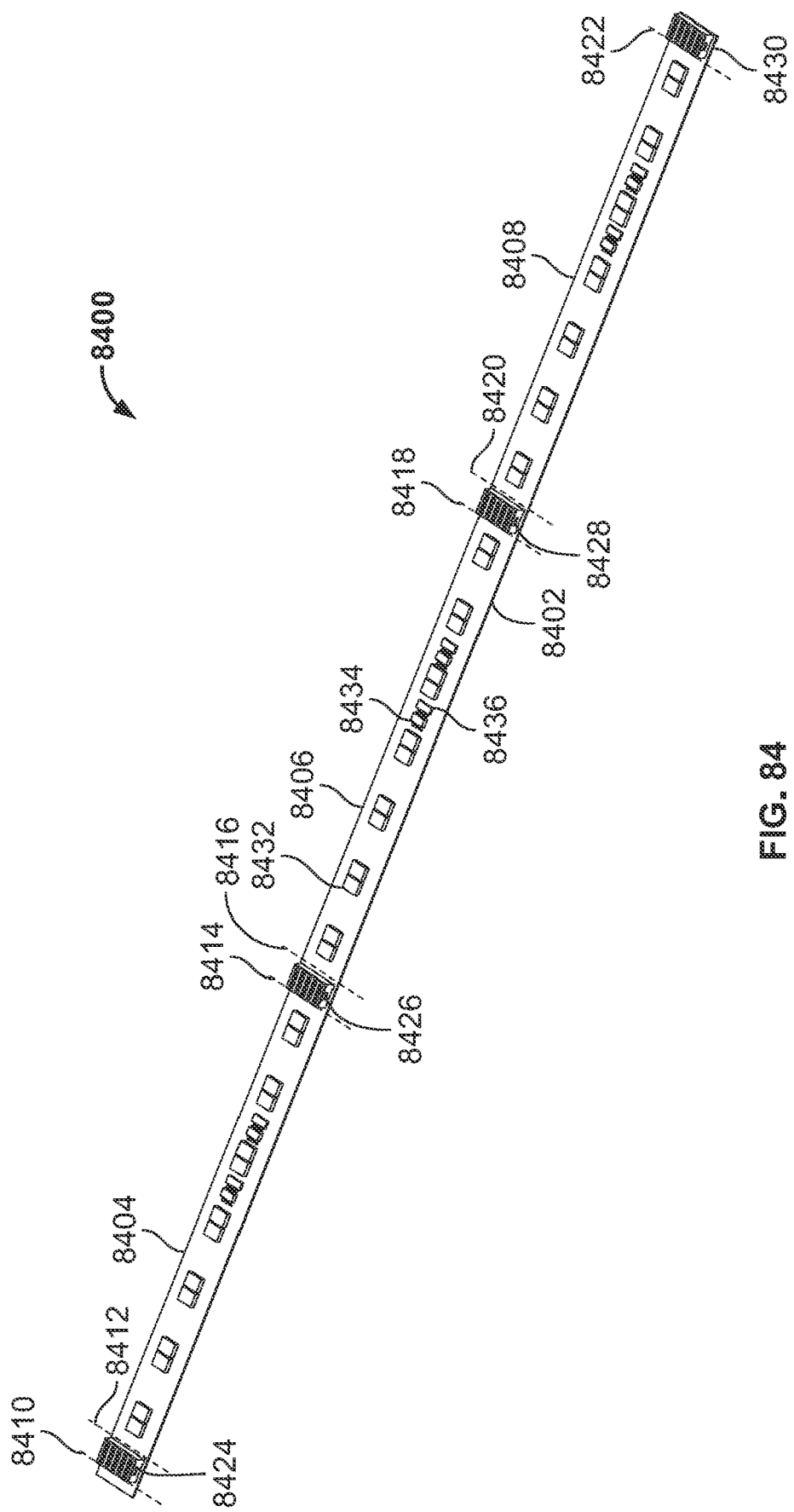
FIG. 84 shows illustrative apparatus in accordance with principles of the invention.

FIG. 84 shows illustrative fixture 8400. Fixture 8400 may have one or more features in common with fixture 318. Fixture 8400 may include lamina section 8402. Lamina 8402 may include sections such as 8404, 8406 and 8408. Segments 8404, 8406 and 8408 may be terminated by break-away joints 8410, 8412, 8414, 8416, 8418, 8420 and 8422. Connectors 8424, 8426, 8428 and 8430 may be disposed on the lamina section between or adjacent the break-away joints. A user may separate sections and connectors at the break-away joints to provide a desired length of fixture 8400.

Fixture 8400 may be connected with one or more of contacts 1414, 1604, 1608 and 1612 for transmission of electrical power. Fixture 8400 may be connected with one or more of contacts 1414, 1604, 1608 and 1612 for transmission of communications such as 510.

Each section may include a first LED emitter string. Each section may include a second LED emitter string. Emitters in the first string may have a nominal first CCT. Emitters in the second string may have a nominal second CCT. The second CCT may be different from the first CCT. The user may instruct architecture 300 to mix the first CCT and the second CCT to provide illumination having a CCT that is between the first and second CCTs.

An emitter having the first CCT may be located adjacent an emitter having the second CCT. Emitter pair 8432 may include one emitter having the first CCT and one emitter having the second CCT.

Each string may include a current-regulating chip such as 8434 and a dissipative element such as 8436. The dissipative element may include a resistor.

Lamina 8402 may be slidable into grooves such as 1044 and 1046 of fixture support 800.

Figure 85:
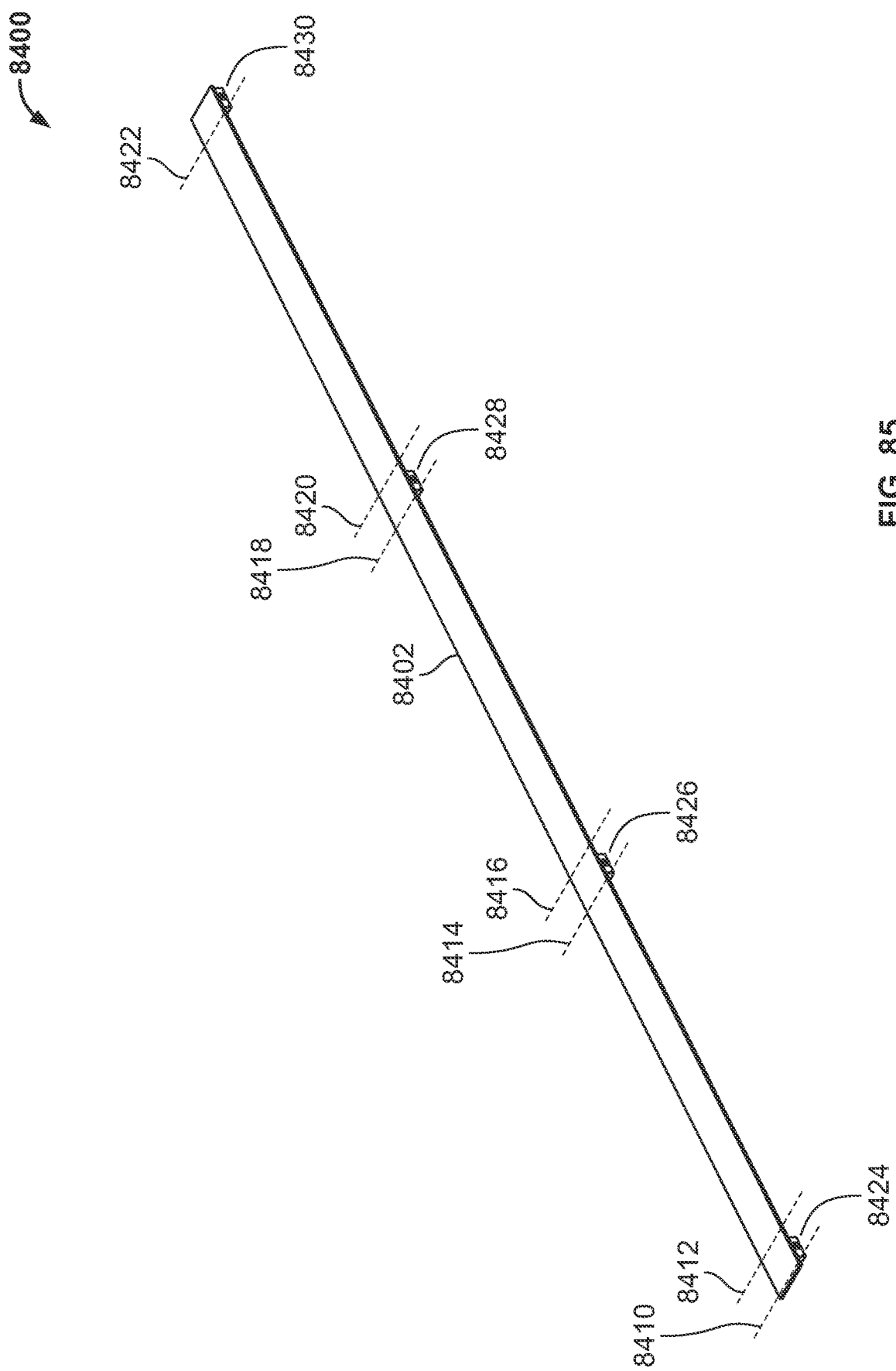
FIG. 85 shows illustrative apparatus in accordance with principles of the invention.

FIG. 85 shows fixture 8400 from a view different from that shown in FIG. 84.

Figure 86:
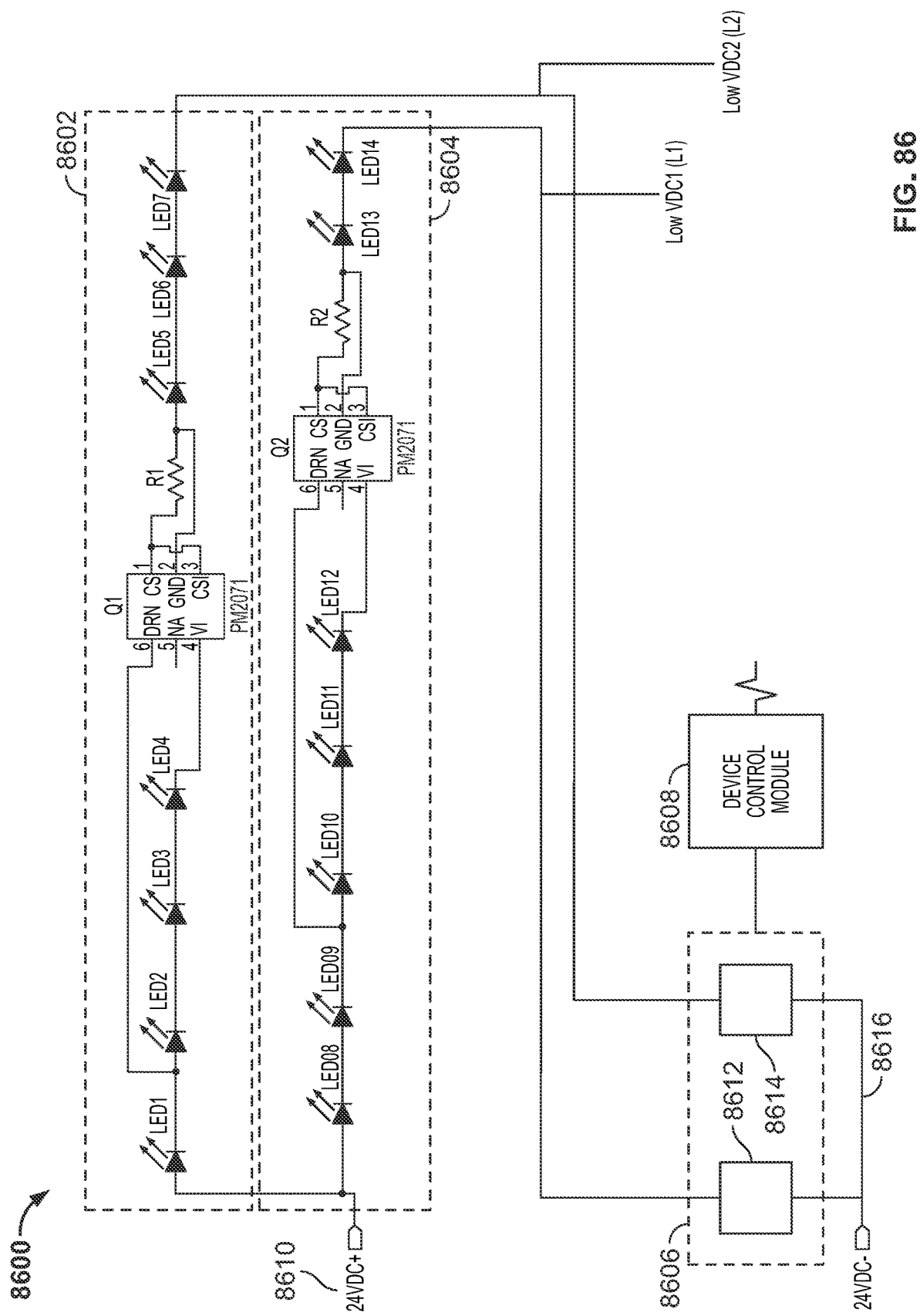
FIG. 86 shows illustrative apparatus in accordance with principles of the invention.

FIG. 86 shows schematically illustrative circuit 8600. Circuit 8600 may include string 8602. Circuit 8600 may include string 8604. Circuit 8600 may include power supply 8606. Power supply 8606 may be controlled by device control module 8608.

String 8602 may include high CCT LEDs 1-7 in series with current regulator Q1 and resistor R1. String 8604 may include low CCT LEDs 8-14 in series with current regulator Q2 and resistor R2. Table 39 lists illustrative string 8602 and string 8604 component IDs.

TABLE 39

Illustrative string 8602 and string 8604 component IDs.
Illustrative string 8602 and string 8604 components.

| String 8602 | | String 8604 | |
|---|---|---|---|
| Component | Illustrative ID | Component | Illustrative ID |
| LED 1-7... | 2835W9N-F-Ra95-2P (D04-2HM) 5000 k | LED 8-14 | 2835W6N-F-Ra95-2P (H20-2HM) 2700 K |
| Q1 | IC PM2071 SOT23-6 RoHS | Q2 | IC PM2071 SOT23-6 RoHS |
| R1 | 1/4W, 15R ± 1%(1206) | R2 | 1/4W, 15R ± 1%(1206) |
| T | Socket Other suitable part IDs | T | Socket Other suitable part IDs |

Input 8610 may be tied to a 24 VDC terminal of architecture 300.

Power supply 8606 may provide pulse-width modulation ("PWM"), via a MOSFET in line 8612, corresponding to Low $VDC_1$ ("L1") of string 8602. Power supply 8606 may provide pulse-width modulation ("PWM"), via a MOSFET in line 8614, corresponding to Low $VDC_2$ ("L2") of string 8604. Power supply 8606 may provide separately controllable PWM to lines 8612 and 8614. The power modulation may, for each line, reduce power output of the LEDs. By reducing power to one string relative to the other, a mixed CCT illumination may be achieved. Low end 8616 of power supply 8606 may a −24 VDC terminal of architecture 300.

Device control module 8608 may correspond to a device control module such as 866.

Each section of fixture 8600 may include a pair of strings such as 8602 and 8604. Strings of different sections may run from a common high voltage rail to a common low voltage rail.

Figure 87:
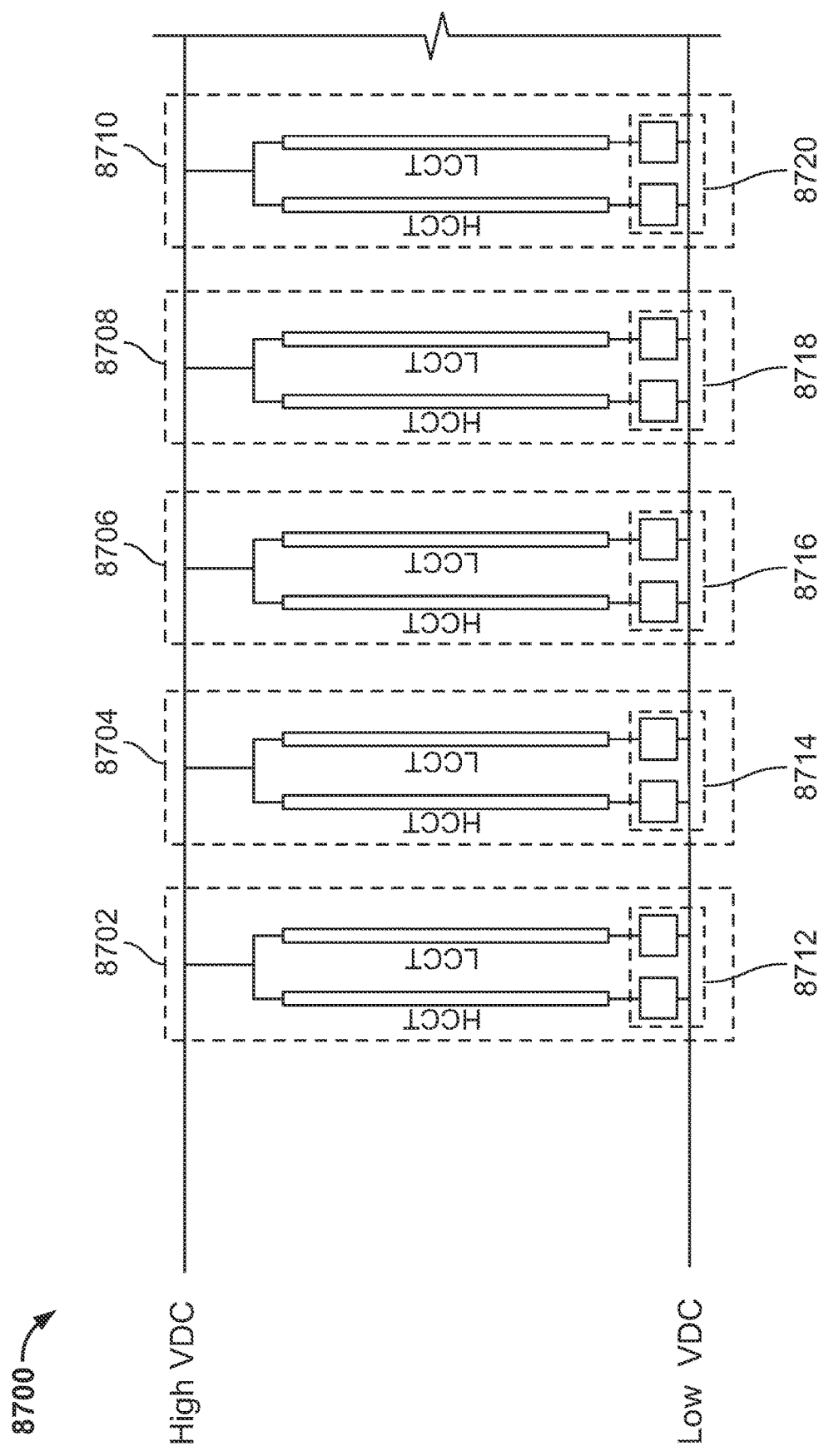
FIG. 87 shows illustrative apparatus in accordance with principles of the invention.

FIG. 87 shows schematically illustrative fixture 8700. Fixture 8700 may include sections 8702, 8704, 8706, 8708 and 8710. Each of the sections may be separable from the others by break-away joints. Each of the sections may include a high CCT ("HCCT") string and a low CCT ("LCCT") string. Each of the HCCT strings may have one or more features in common with string 8602. Each of the LCCT strings may have one or more features in common with string 8604. Sections 8702, 8704, 8706, 8708 and 8710 may include power modulation units 8712, 8714, 8716, 8718 and 8720, respectively. Each of the power modulation units may have one or more features in common with power supply 8606. Each of the sections may include a device control module (not shown) to control the corresponding power modulation unit. Each device control module may correspond to a device control module such as 866.

Figure 88:
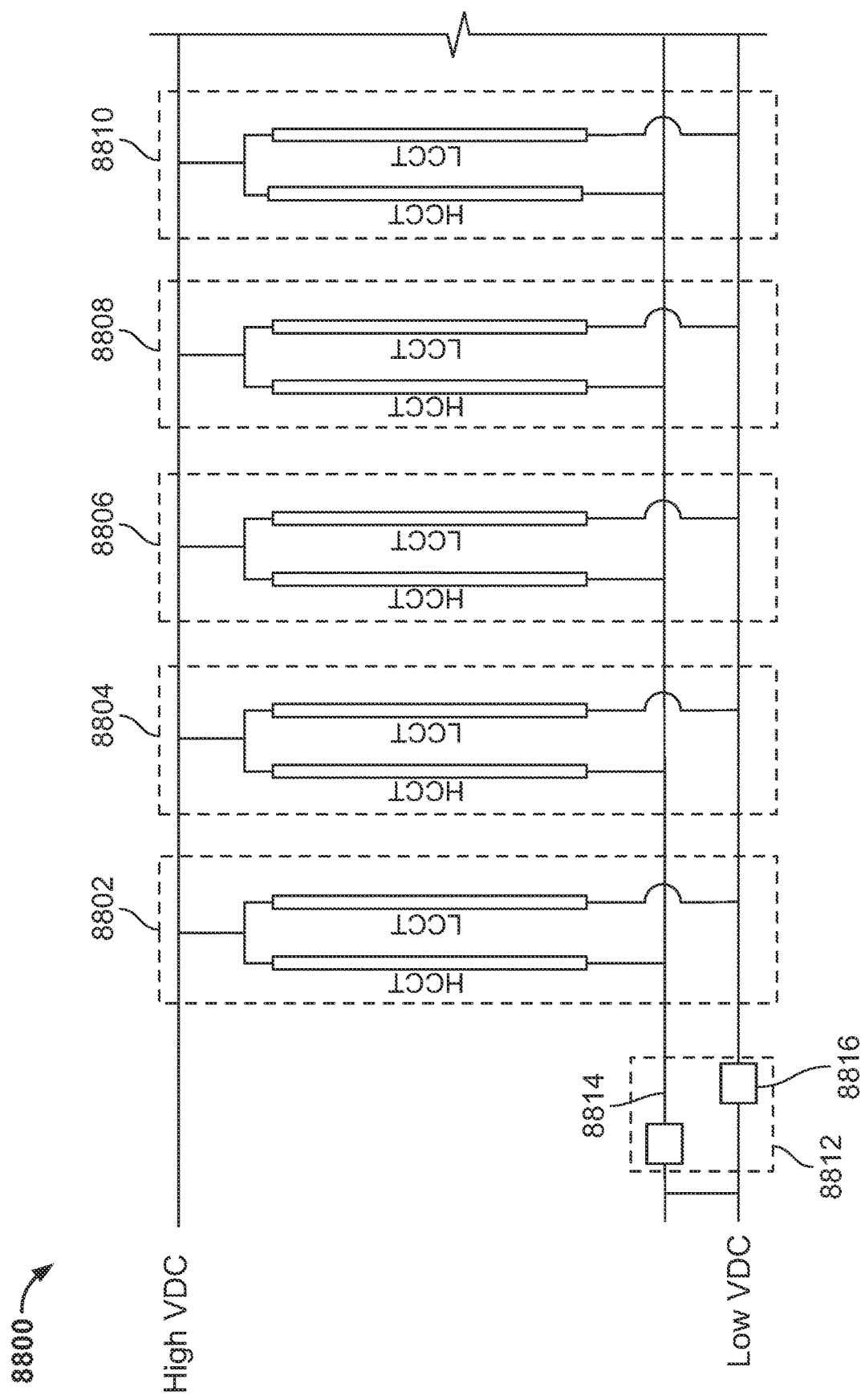
FIG. 88 shows illustrative apparatus in accordance with principles of the invention.

FIG. 88 shows schematically illustrative fixture 8800. Fixture 8800 may include sections 8802, 8804, 8806, 8808 and 8810. Each of the sections may be separable from the others by break-away joints. Each of the sections may include a high CCT ("HCCT") string and a low CCT ("LCCT") string. Each of the HCCT strings may have one or more features in common with string 8602. Each of the LCCT strings may have one or more features in common with string 8604. All of sections 8802, 8804, 8806, 8808 and 8810 may modulated by power supply 8812. Power supply 8812 may have one or more features in common with power supply 8606. Power supply 8812 may provide pulse-width modulation ("PWM"), via a MOSFET in line 8814, corresponding to the HCCT strings. Power supply 8812 may provide pulse-width modulation ("PWM"), via a MOSFET in line 8816, corresponding to the LCCT strings.

Fixture 8800 may include a device control module (not shown) to control power supply 8606. The device control module may correspond to a device control module such as 866.

Figure 89:
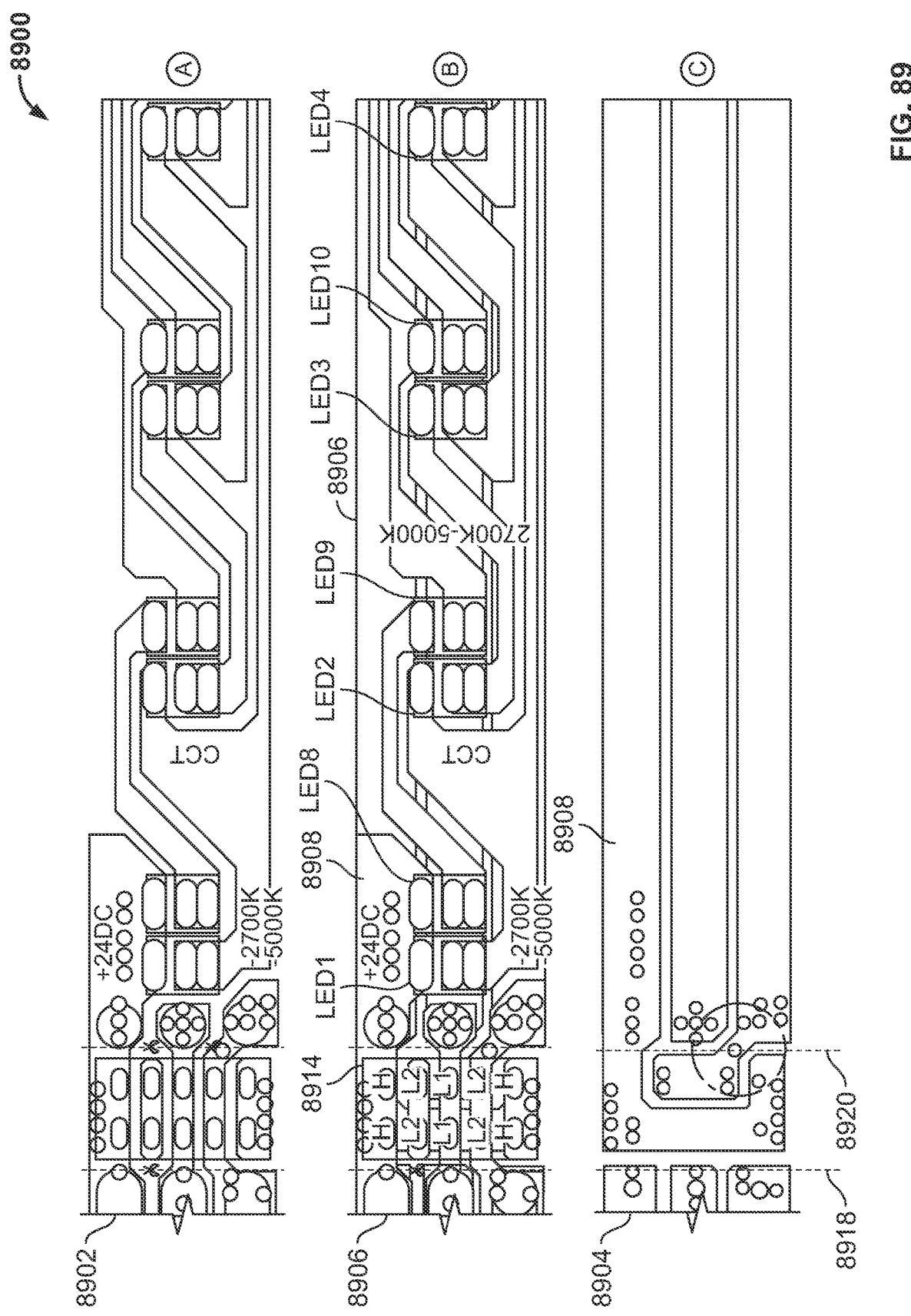
FIG. 89 shows illustrative apparatus in accordance with principles of the invention.

FIG. 89 shows illustrative printed circuit board composite layout 8900 for a fixture section based on high and low CCT LED strings such as 8602 and 8604. A top layer of layout 8900 is shown in top layer view 8902. A bottom layer of layout 8900 is shown in bottom layer view 8904. View 8906 is a combination of top layer view 8902 and bottom layer view 8904. Mounting locations for each of high CCT LEDs 1-7 are provided adjacent mounting locations for one of low CCT LEDs 8-14 in view 8906. The high CCT LEDs are in series with current regulator Q1 and resistor R1 to form the high CCT string. The low CCT LEDs are in series with current regulator Q2 and resistor R2 to form the low CCT string.

The high CCT string runs from high voltage ("H") power rail 8908 to low voltage ("L1") power rail 8910. The low CCT string runs from high voltage ("H") power rail 8908 to low voltage ("L2") power rail 8912.

Connector interfaces 8914 and 8916 include mounting locations for continuity with each of high voltage ("H") power rail 8908, low voltage ("L1") power rail 8910 and low voltage ("L2") power rail 8912.

Break-away joints 8918, 8920, 8922 and 8924 are provided. Because adjacent sections are arranged in parallel, a section that is powered via a connector may be separated from an adjacent section without loss of functionality. Multiple adjacent sections may be powered via a single connector.

Figure 90:
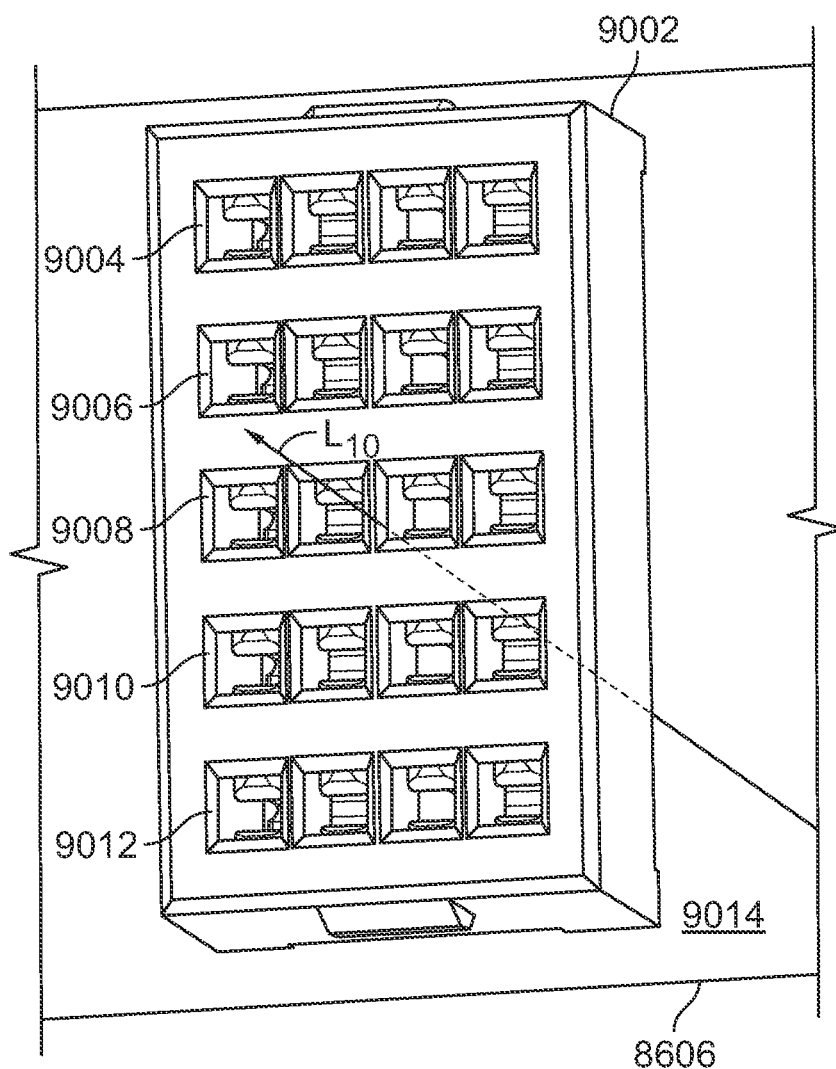
FIG. 90 shows illustrative apparatus in accordance with principles of the invention.

FIG. 90 shows board 8906 with surface mounted female connector block 9002. Block 9002 includes five rows, 9004, 9006, 9008, 9010 and 9012 of receptacles configured to receive a pin from a corresponding male connector block (not shown). Block 9002 may be mounted at connector interface 8914. Thus, rows 9004 and 9012 may correspond to high voltage ("H") power rail 8908; rows 9006 and 9010 may correspond to low voltage ("L1") power rail 8910; and row 9008 may correspond to low voltage ("L2") power rail 8912. Axis $L_{10}$ is a central axis of block 9002 and is normal to face 9014 of board 8906. The operational electrical potentials of the receptacles may be symmetrical under a 180 rotation about axis $L_{10}$. Therefore, a male connector block configured to couple to female block 9002 can be coupled to in two orientations 180 apart without reversing polarity relative to female block 9002.

Figure 91:
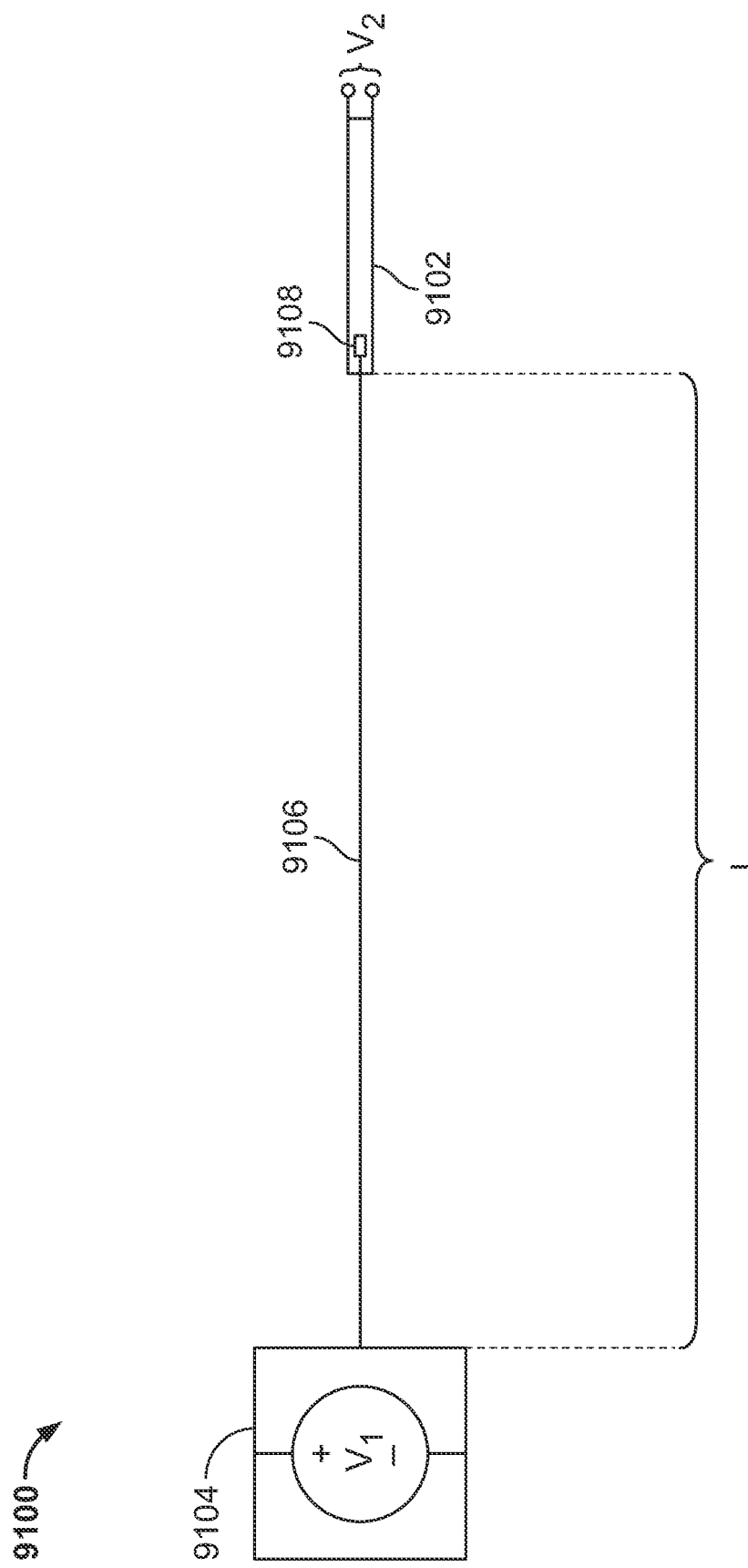
FIG. 91 shows illustrative apparatus in accordance with principles of the invention.
Figure 92:
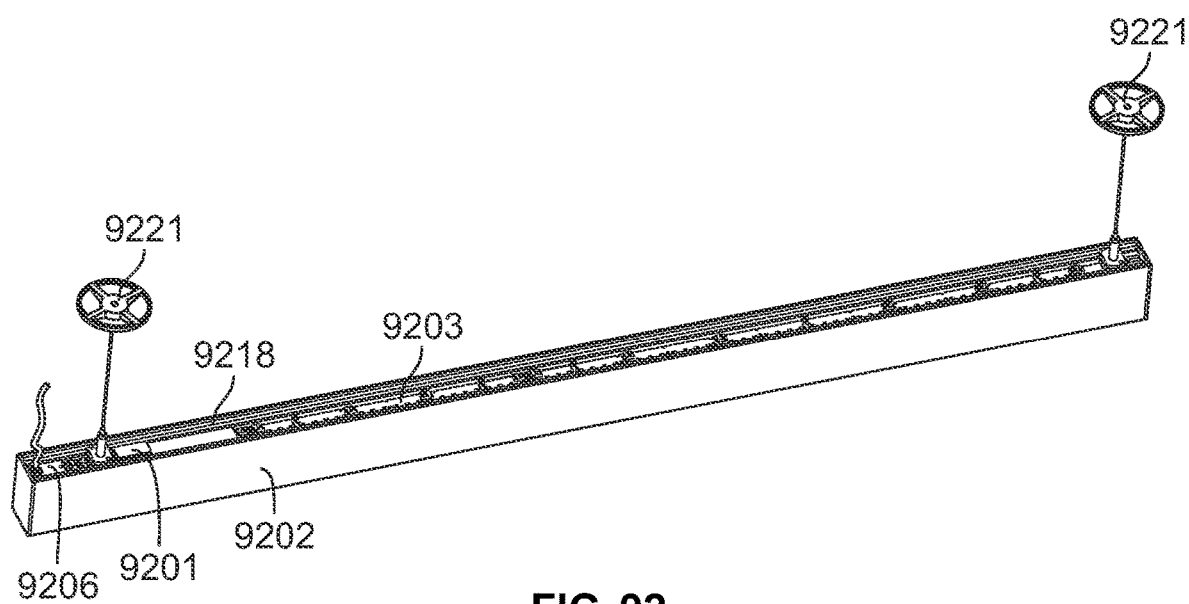
FIG. 92 shows illustrative apparatus in accordance with principles of the invention.
Figure 93:
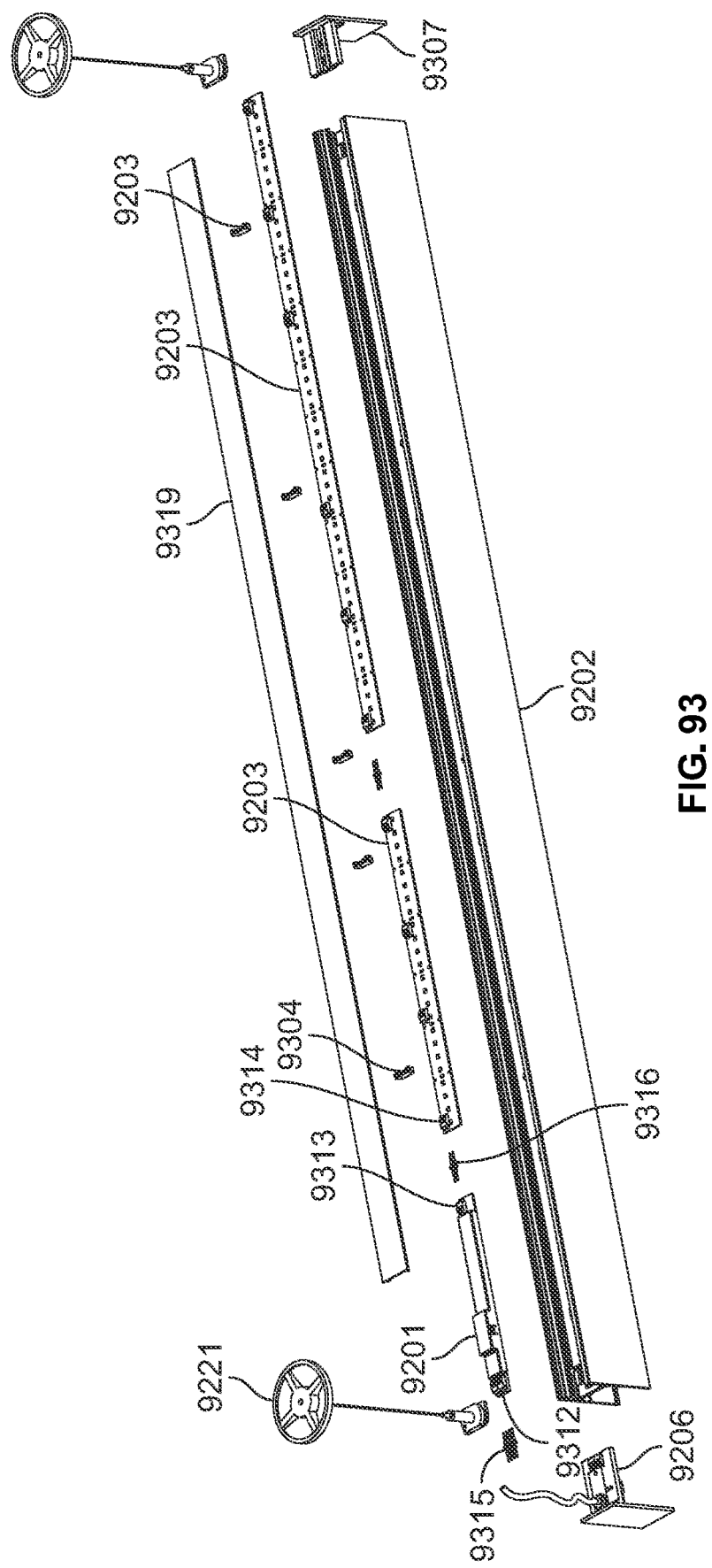
FIG. 93 shows illustrative apparatus in accordance with principles of the invention.
Figure 94:
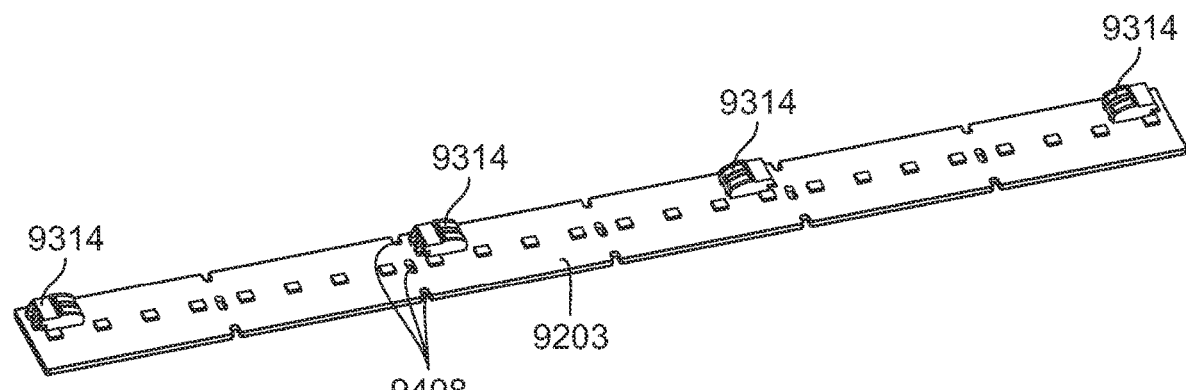
FIG. 94 shows illustrative apparatus in accordance with principles of the invention.
Figure 95:
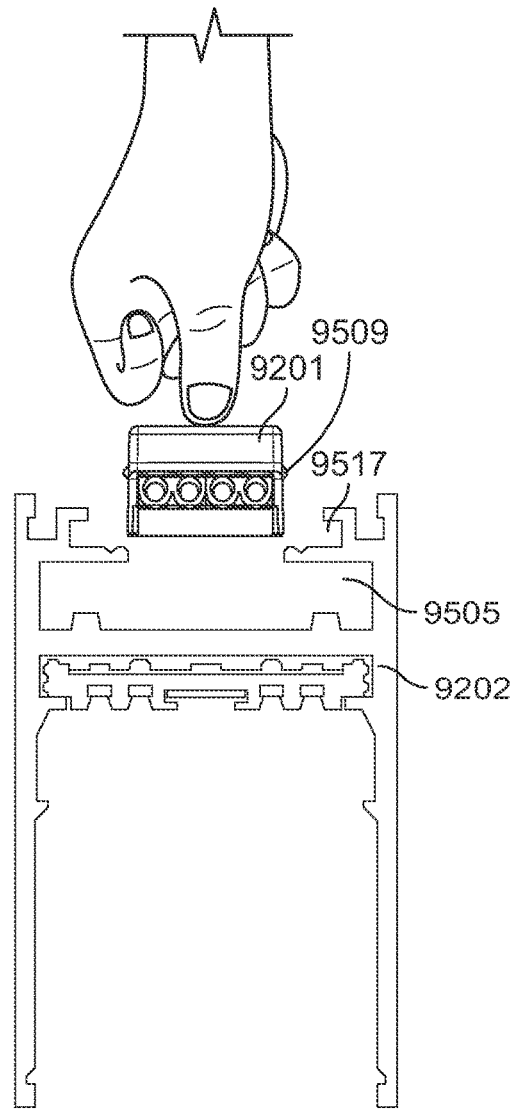
FIG. 95 shows illustrative apparatus in accordance with principles of the invention.
Figure 96:
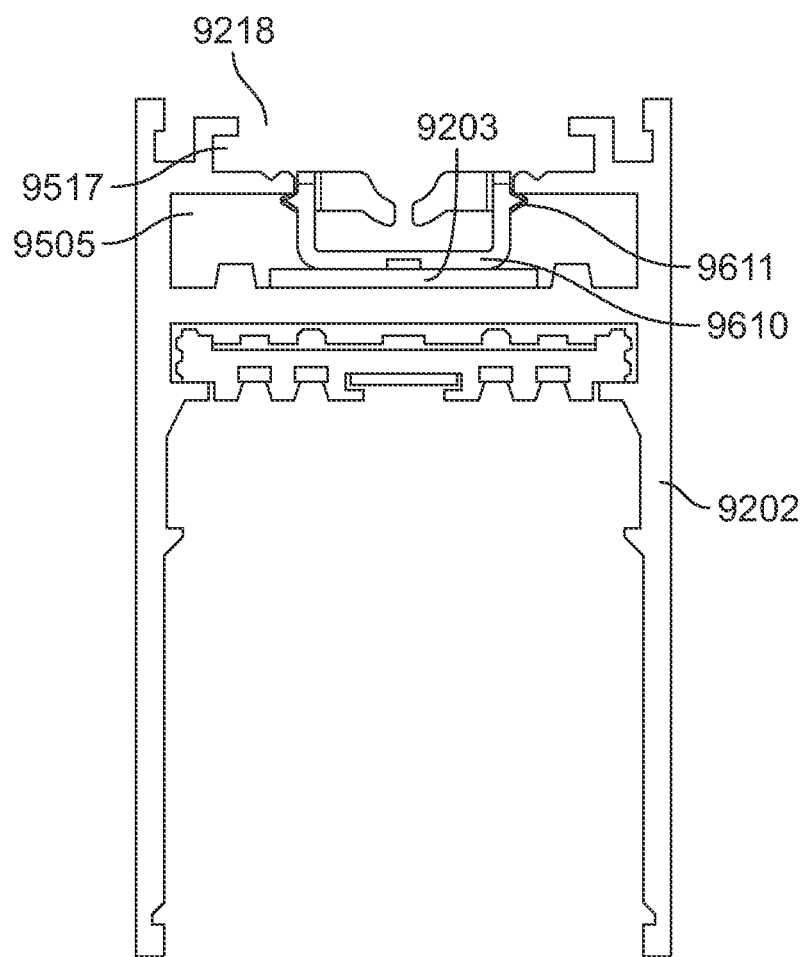
FIG. 96 shows illustrative apparatus in accordance with principles of the invention.
Figure 97:
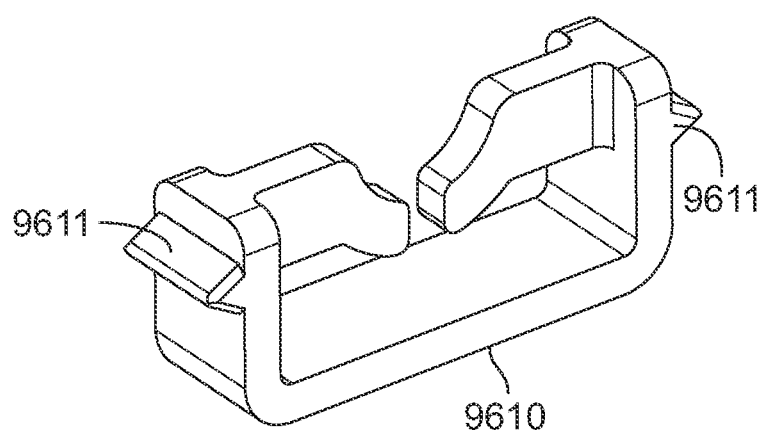
FIG. 97 shows illustrative apparatus in accordance with principles of the invention.
Figure 98:
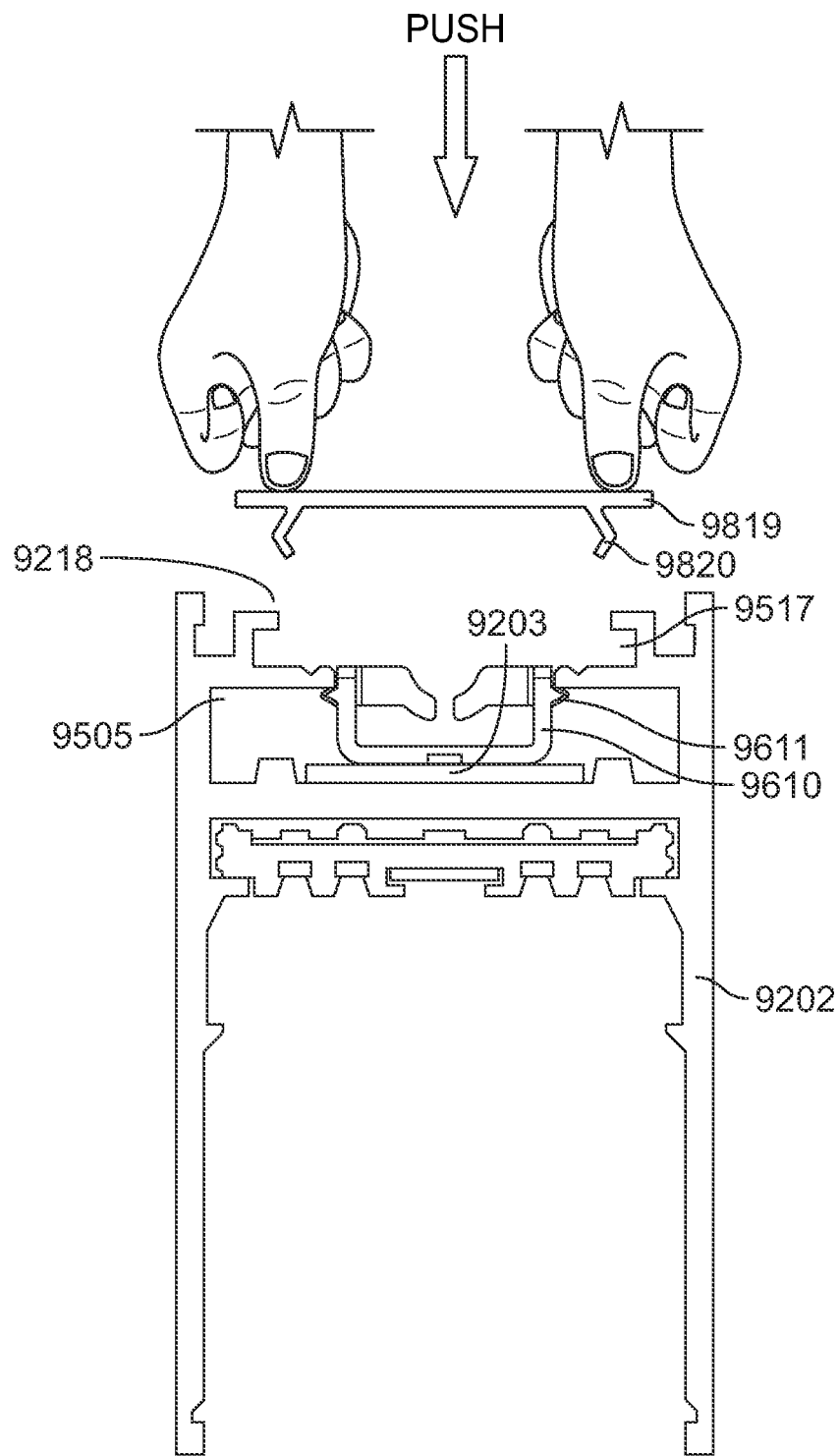
FIG. 98 shows illustrative apparatus in accordance with principles of the invention.

FIG. 91 shows schematic layout 9100. Layout 9100 may include fixture 9102. Layout 9100 may include DC power supply 9104. Layout 9100 may include power cable 9106 between power supply 9104 and fixture 9102.

Fixture 9102 may include connector block 9108. Connector block 9108 may include one or more features in common with connector block 9108.

Power supply 9104 may be regulated to provide DC voltage V1. Fixture 9102 may operate at DC voltage $V_2$. $V_1$ and $V_2$ may have a common ground. Fixture 9102 may include current-regulated strings such as 8602 and 8604 of circuit 8600. Illustrative lengths L of cable 9106 between power supply 9104 and connector block 9108 are set forth above. For any of the lengths, $V_2$ may be no less than 85% $V_1$, despite any line loss that may be caused by cable 9106, and without any voltage boost between power supply 9104 and connector block 9108.

FIGS. 92-98 show illustrative driving element 9201, fixture support 9202, LED modules 9203, and module pressing buckles 9304. Driving element 9201 may have one or more features in common with circuit 8600. Fixture support 9202 may have one or more features in common with fixture support 800. LED modules 9203 may have one or more features in common with section 8404. Fixture support 9202 may include mounting slot 9505. An end of fixture support 9202 may be engaged by power inlet 9206. An end of fixture support 9202 may be engaged by tail cover 9307. Driving element 9201 and LED modules 9203 may be disposed in mounting slot 9505. Module pressing buckles 9304 may be disposed in mounting slot 9505. Module pressing buckles 9304 may press and limit LED modules 9203. Power inlet 9206 may be in electrical communication with driving element 9201. Driving element 9201 may be in electrical communication with LED modules 9203. When assembled, driving element 9201 and LED modules 9203 may be disposed in mounting slot 9505, and power inlet 9206 and tail cover 9307 may be disposed at the head and tail ends of fixture support 9202. Power inlet 9206 and tail cover 9307 may block the ends of fixture support 9202. Power inlet 9206 may be in electrical communication with driving element 9201 to effect power supply connection. LED modules 9203 may be press-fitted into mounting slot 9505 using module pressing buckles 9304. Module pressing buckles 9304 may be lodged in mounting slot 9505 such that they stably press LED modules 9203 to prevent LED modules 9203 from loosening.

LED module 9203 may include cut-off hole groups 9408. Cut-off hole groups 9408 may be distributed at equal intervals along the length of LED module 9203. Each cut-off hole group 9408 may include several cut-off holes. Cut-off hole groups 9408 may be arranged for conveniently severing LED modules 9203. A user may cut LED module 9203 by scissors to adjust the length of an LED module 9203 LED modules 9203 may thus be installed in fixture supports 9202 of different lengths.

A side of driving element 9201 may include driving buckle position 9509. Driving buckle position 9509 may abut an inner wall of mounting slot 9505. Driving element 9201 may be press-fitted in mounting slot 9505. Driving buckle positions 9509 may abut, and may be fastened to, an inner wall of mounting slot 9505.

Module pressing buckle 9304 may include pressing element 9610. Sides of pressing element 9610 may be provided with pressing buckle positions 9611. Pressing buckle positions 9611 may abut inner wall of mounting slot 9505. A lower end surface of pressing element 9610 may abut the surface of the LED module 9203. When module pressing buckle 9304 is mounted, it may be put into mounting slot 9505 from the upper end of fixture support 9202; module pressing buckle 9304 may be placed diagonally at a middle position of two light sources on LED module 9203 at an angle of 59°; and module pressing buckle 9304 may be pressed by hands and rotated 59° (e.g., clockwise) to be perpendicular to the side wall of the fixture support. This may facilitate the pressing buckle positions 9611 to be buckled into the inner wall of the mounting slot 9505.

Lower end surface of pressing element 9610 may be a horizontal surface. Lower end surface of pressing element 9610 may be a horizontal smooth surface. This may reduce or avoid wear of LED module 9203 when module pressing buckle 9304 presses LED module 9203.

Driving element 9201 may be provided with first electrical connector 9312 at an end close to power inlet 9206. First electrical connector 9312 may be electrically connected to power inlet 9206. First electrical connector 9312 may be electrically connected to power inlet 9206 via a first conductive pin 9315 or a wire. First conductive pin 9315 may be directly plugged in. The wire may be suitable for connection over a longer distance.

Driving element 9201 may include second electrical connector 9313 at an end away from the power inlet 9206. LED module 9203 may include provided third electrical connectors 9314. Second electrical connector 9313 may be electrically connected to third electrical connector 9314. Second electrical connector 9313 may be electrically connected to third electrical connector 9314 via a second conductive pin 9316 or a wire. Second conductive pin 9316 may be directly plugged in. The wire may be suitable for connection over a longer distance.

Two adjacent LED modules 9203 may be connected via a conductive pin or wire.

Upper end surface of fixture support 9202 may include a clamping slot 9517 and opening 9218. Opening 9218 may be in communication with clamping slot 9517. The lamp may include light-transmitting cover 9319. Sides of a lower end surface of light-transmitting cover 9319 may be provided with clamping sheets 9820. Clamping sheets 9820 may be arranged in clamping slot 9517. Light-transmitting cover 9319 may be used to cover opening 9218. Opening 9218 may be in communication with mounting slot 9505. This may facilitate installation of LED module 9203 and the driving element 9201. Light-emitting cover 9819 may protect the LED module 9203.

The lamp may include a hanging member such as 9221. Hanging member 9221 may be respectively disposed on ends of the upper end surface of fixture support 9202. Hanging member 9221 may be used to hoist or suspend fixture support 9202.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus and methods for fixtures, power and control of same have been provided. Persons skilled in the art will appreciate that the present invention can be practiced by other than the described examples, which are presented for purposes of illustration rather than of limitation. The present invention is limited only by the claims that follow.

What is claimed is:

1. An apparatus for providing light, the apparatus comprising a light fixture that includes:
   a light-emitting diode ("LED");
   a magnet; and
   a communication bus contact that is configured to:
      push against a power rail of a fixture support; and
      be held, between panels of the fixture support, against the power rail by the magnet;
   wherein the light fixture is configured to:
      depend from the fixture support;
      emit a beam;
      receive a control message from a conductor of the fixture support; and,
      in response to the control message, adjust a beam-spread angle of the beam.

2. The apparatus of claim 1 wherein the conductor is a bus.

3. The apparatus of claim 1 further comprising a lens that is configured to adjust the beam-spread angle in response to an electric field applied to the lens.

4. The apparatus of claim 1 wherein the light fixture is further configured to adjust, in response to the control message, a height along a vertical direction that passes through the fixture when the fixture is in operation.

5. The apparatus of claim 1 wherein the light fixture is further configured to adjust, in response to the control message, a tilt angle between a centerline of the beam and a vertical direction that passes through the fixture when the fixture is in operation.

6. The apparatus of claim 1 wherein the light fixture is further configured to adjust, in response to the control message, a pan angle defined about a vertical direction that passes through the fixture when the fixture is in operation.

7. The apparatus of claim 3 wherein the lens includes a liquid crystal.

8. The apparatus of claim 1 wherein the light fixture further includes a power contact that is configured to:
   contact the power rail on the fixture support; and
   be held against the power rail by the magnet.

9. An apparatus for providing light, the apparatus comprising a motorized light fixture that includes:
   a light-emitting diode ("LED");
   a magnet; and
   a communication bus contact that is configured to:
      push against a power rail of a fixture support; and
      be held between panels of the fixture support, against the power rail by the magnet;
   wherein the light fixture is configured to:
      depend from the fixture support;
      receive a control message from a conductor of the fixture support; and,
      in response to the control message:
         pan the LED; and
         tilt the LED.

10. The apparatus of claim 9 wherein the motorized light fixture is further configured to adjust, in response to the control message, a beam-spread angle of a beam to be emitted, in operation, from the emitter.

11. The apparatus of claim 9 wherein the light fixture is further configured to adjust, in response to the control message, a height along a vertical direction that passes through the fixture when the fixture is in operation.

12. The apparatus of claim 9 wherein the light fixture is further configured to adjust, in response to the control message, a tilt angle between a centerline of a beam to be emitted, in operation, from the emitter, and a vertical direction that passes through the fixture when the fixture is in operation.

13. The apparatus of claim 9 wherein the light fixture is further configured to adjust, in response to the control message, a pan angle defined about a vertical direction that passes through the fixture when the fixture is in operation.

14. The apparatus of claim 9 wherein the light fixture further includes a power contact that is configured to:
- contact a power rail on the fixture support; and
- be held in contact with the power rail solely by the magnet.

15. The apparatus of claim 10 further comprising a lens that is configured to adjust the beam-spread angle in response to an electrical current applied to the lens.

16. The apparatus of claim 15 wherein the lens includes a liquid crystal.

\* \* \* \* \*